US012732938B2

(12) United States Patent
Qiao et al.

(10) Patent No.: US 12,732,938 B2
(45) Date of Patent: Sep. 8, 2026

(54) END-TO-END LATENCY MEASUREMENT

(71) Applicant: Comcast Cable Communications, LLC, Philadelphia, PA (US)

(72) Inventors: Weihua Qiao, Herndon, VA (US); SungDuck Chun, Fairfax, VA (US); Esmael Hejazi Dinan, McLean, VA (US); Taehun Kim, Fairfax, VA (US); Kyungmin Park, Vienna, VA (US); Peyman Talebi Fard, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 613 days.

(21) Appl. No.: 18/175,661

(22) Filed: Feb. 28, 2023

(65) Prior Publication Data

US 2023/0276391 A1 Aug. 31, 2023

Related U.S. Application Data

(60) Provisional application No. 63/314,534, filed on Feb. 28, 2022.

(51) Int. Cl.

*H04W 56/00* (2009.01)
*H04L 43/0864* (2022.01)
*H04L 43/106* (2022.01)

(52) U.S. Cl.

CPC ..... *H04W 56/0065* (2013.01); *H04L 43/0864* (2013.01); *H04L 43/106* (2013.01)

(58) Field of Classification Search

CPC . H04L 43/022; H04L 43/062; H04L 43/0823; H04L 43/0858; H04L 43/0864; H04L 43/0876; H04L 43/106; H04L 43/16; H04L 43/20; H04W 24/08; H04W 56/0065

(Continued)

(56) References Cited

U.S. PATENT DOCUMENTS 11,032,723 B2 * 6/2021 Yang .................... H04W 24/02
11,234,157 B2 * 1/2022 Lekutai ................ H04W 40/20

(Continued)

FOREIGN PATENT DOCUMENTS

EP 4016933 A4 9/2022
WO 2021/054747 A1 3/2021

OTHER PUBLICATIONS

Jul. 12, 2023—European Search Report—EP App. No. 23159056.3.

(Continued)

*Primary Examiner* — Robert J Lopata
(74) *Attorney, Agent, or Firm* — Banner & Witcoff, Ltd.

(57) ABSTRACT

End-to-end latency measurements for synchronization are described. A first wireless device may determine an uplink latency associated with sending communications to a second wireless device. The first wireless device may determine a downlink latency associated with receiving communications from the second wireless device. Based on the uplink latency being different from the downlink latency, the first wireless device, the second wireless, and/or a base station may perform an alignment (e.g., time-based alignment, channel-based alignment) to modify and/or adjust one or more parameters to make the uplink latency equivalent to the downlink latency.

20 Claims, 34 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,659,444 | B1 * | 5/2023 | Xing | H04W 24/02 370/235 |
| 2015/0295835 | A1 * | 10/2015 | Yang | H04L 47/18 370/235 |
| 2018/0115392 | A1 * | 4/2018 | Yang | H04W 24/02 |
| 2019/0288953 | A1 | 9/2019 | Yavuz et al. | |
| 2020/0204469 | A1 * | 6/2020 | Filsfils | H04L 45/123 |
| 2022/0039034 | A1 * | 2/2022 | Ma | H04W 40/02 |
| 2022/0045924 | A1 * | 2/2022 | Yao | H04W 12/037 |
| 2022/0217560 | A1 * | 7/2022 | Kumar | H04W 24/10 |
| 2023/0269156 | A1 * | 8/2023 | Hong | H04L 43/0858 370/252 |
| 2024/0040440 | A1 * | 2/2024 | Hu | H04L 41/5009 |
| 2024/0251374 | A1 * | 7/2024 | Wei | H04W 64/006 |
| 2024/0406771 | A1 * | 12/2024 | Tao | H04B 7/18519 |
| 2024/0406902 | A1 * | 12/2024 | Yang | H04W 24/10 |
| 2025/0113320 | A1 * | 4/2025 | Tan | H04W 56/0065 |

OTHER PUBLICATIONS

R3-200484 3GPP TSG-RAN WG3 #107e, Feb. 24-Mar. 6, 2020, Source: Huawei, Title: E2E delay measurement for Qos monitoring for URLLC.
3GPP TS 22.104 V18.3.0 (Dec. 2021), Technical Specification; 3rd Generation Partnership Project; Technical Specification Group Services and System Aspects; Service requirements for cyber-physical control applications in vertical domains; Stage 1 (Release 18).
3GPP TR 22.867 V18.2.0 (Dec. 2021), 3rd Generation Partnership Project; Technical Specification Group Services and System Aspects; Study on 5G Smart Energy and Infrastructure (Release 18).
3GPP TS 23.401 V17.3.0 (Dec. 2021), Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 17).
3GPP TS 23.501 V17.3.0 (Dec. 2021), Technical Specification; 3rd Generation Partnership Project; Technical Specification Group Services and System Aspects; System architecture for the 5G System (5GS); Stage 2 (Release 17).
3GPP TS 23.502 V17.3.0 (Dec. 2021), Technical Specification; 3rd Generation Partnership Project; Technical Specification Group Services and System Aspects; Procedures for the 5G System (5GS); Stage 2 (Release 17).
3GPP TS 23.503 V17.3.0 (Dec. 2021), 3rd Generation Partnership Project; Technical Specification Group Services and System Aspects; Policy and charging control framework for the 5G System (5GS); Stage 2.
3GPP TS 28.552 V17.5.0 (Dec. 2021), 3rd Generation Partnership Project; Technical Specification Group Services and System Aspects; Management and orchestration; 5G performance measurements (Release 17).
3GPP TS 38.214 V16.7.0 (Sep. 2021) 3rd Generation Partnership Project; Technical Specification Group Radio Access Network; NR; Physical layer procedures for data (Release 16).
3GPP TS 38.300 V16.8.0 (Dec. 2021) 3rd Generation Partnership Project; Technical Specification Group Radio Access Network; NR; NR and NG-RAN Overall Description; Stage 2 (Release 16).
3GPP TS 38.321 V16.7.0 (Dec. 2021) 3rd Generation Partnership Project; Technical Specification Group Radio Access Network; NR; Medium Access Control (MAC) protocol specification (Release 16).
3GPP TS 38.331 V16.7.0 (Dec. 2021) 3rd Generation Partnership Project; Technical Specification Group Radio Access Network; NR; Radio Resource Control (RRC) protocol specification (Release 16).
Ye Yan, et al. "A Survey on Smart Grid Communication Infrastructures: Motivations, Requirements and Challenges", IEEE Communications Surveys & Tutorials, vol. 15, No. 1, First Quarter 2013.
S5-202105 3GPP TSG-SA5 Meeting #130e, Apr. 20-28, 2020, E-meeting, Source: Intel, Title: Add measurements related to DL packet delay between NG-RAN and UE.
Fredrik Ege Abrahamsen, et al. "Communication Technologies for Smart Grid: A Comprehensive Survey", arXiv:2103.11657v2 [eess. SP] Jun. 7, 2021.
GE Products & Services: Communications solutions from power generation to consumers, Example: Communications from AMI, Copyright @ GE, 2021.
ITU Smart Grid, Smart-O-34Rev.4, Telecommunication Standardization Sector Study Period 2009-2012, Geneva, Dec. 18-21, 2011, Source: Editors, Title: "Smart Grid overview" deliverable.
Daniel Fahlborg, "Measuring one-way Packet Delay in a Radio Network", Master of Science Thesis in Electrical Engineering Department of Electrical Engineering, Linköping University, 2018.
One-Way Delay Measurement Techniques, Accedian Networks Inc., Jan. 2012 | Rev 1.0.
R2-1910714 3GPP TSG-RAN WG2 Meeting #107, Prague, Czech Republic, Aug. 26-30, 2019, Source: Nokia, Nokia Shanghai Bell, Title: Accurate UE-RAN delay measurement.
R3-190030 3GPP TSG-RAN WG3 #103, Prague, Athens, Greece, Feb. 25-Mar. 1, 2019, Source: SA2, Title: LS on 5G_URLLC.
R3-191770 3GPP TSG-RAN WG3 #103bis, Xi'An, China, Apr. 8-Apr. 12, 2019, Source: Ericsson, Title: Discussion on QoS Monitoring for URLLC.
R3-191771 3GPP TSG-RAN WG3 #103bis, Xi'An, China, Apr. 8-Apr. 12, 2019, Source: Ericsson [to be RAN3], Title: [Draft] Reply LS on 5G_URLLC.
RP-211574 3GPP TSG RAN Meeting #92e, Electronic Meeting, Jun. 14-18, 2021, Source: Ericsson, Title: Revised WID on support of reduced capability NR devices.
S1-203342 3GPP TSG-SA WG1 Meeting #91e, Electronic Meeting, Aug. 24-Sep. 2, 2020, Source: Huawei, China Telecom, Samsung Electronics GmbH, Orange, Title: FS_5GSEI Use case of Line Current Differential Protection in power distribution grid.
S1-213296 3GPP TSG-SA1 Meeting #95e, Electronic Meeting, Aug. 23-Sep. 2, 2021, Source: Samsung, EUTC, China Telecom, ZTE, Vodafone, Huawei, NOVAMINT, Nokia, Nokia Shanghai Bell, Anterix, Title: Introduction of Smart Energy Infrastructure Requirements.
S1-213297 3GPP TSG-SA1 Meeting #95e, Electronic Meeting, Aug. 23-Sep. 2, 2021, Source: Samsung, China Telecom, ZTE, Huawei, NOVAMINT, Nokia, Nokia Shanghai Bell, Anterix, Title: Inclusion of Smart Energy Infrastructure Requirements.
Ketan Rajawat, "Smart Grid Communications", IIT Kanpur—QIP Short Term Course on Smart Grid Technology, May 9-13, 2019.
Kabalci, Ersan, et al. "Smart Grids and Their Communication Systems". © Springer Nature Singapore Pte Ltd. 2019.
Department of Energy: Communications Requirements of Smart GRID5, 2010.

* cited by examiner

NF 251 consumer
NF 252 producer
NF 253 consumer
subscribe 261
subscribe 262
condition ?
yes
notify 263
notify 264

NF 271 consumer
NF 272 producer
NF 273 consumer
subscribe 281
condition ?
yes
notify 284

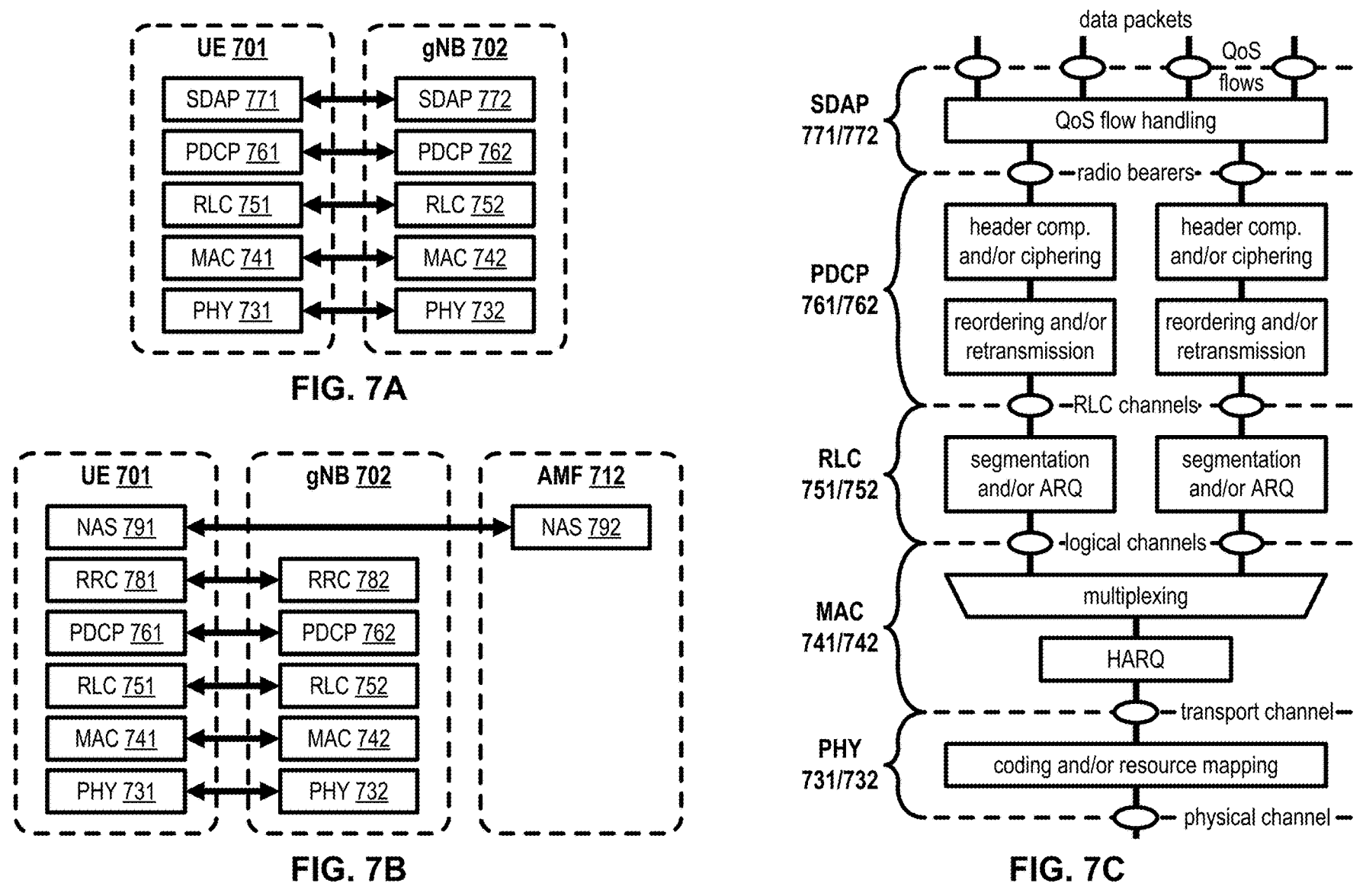

UE 701
SDAP 771
PDCP 761
RLC 751
MAC 741
PHY 731 gNB 702
SDAP 772
PDCP 762
RLC 752
MAC 742
PHY 732

FIG. 7A

UE 701
NAS 791
RRC 781
PDCP 761
RLC 751
MAC 741
PHY 731 gNB 702
RRC 782
PDCP 762
RLC 752
MAC 742
PHY 732

AMF 712
NAS 792

FIG. 7B

SDAP 771/772
PDCP 761/762
RLC 751/752
MAC 741/742
PHY 731/732 data packets
QoS flows
QoS flow handling
radio bearers
header comp. and/or ciphering
header comp. and/or ciphering
reordering and/or retransmission
reordering and/or retransmission
RLC channels
segmentation and/or ARQ
segmentation and/or ARQ
logical channels
multiplexing
HARQ
transport channel
coding and/or resource mapping
physical channel

FIG. 7C

Deployment 1510
NF 1511
Deployment 1520
NF 1521
Interface 1590
Deployment 1530
NF 1531

Deployment 1510
NF 1511
NF 1511A
Deployment 1520
NF 1521
NF 1522
Interface 1590
Deployment 1530
NF 1531

Deployment 1510
NF 1511
NF 1511A
Deployment 1520
NF 1521
NF 1522
Interface 1590
Deployment 1530
NF 1531
Deployment 1540
NF 1522

Deployment 1550
NF 1511
NF 1511A
NF 1521
NF 1522
Interface 1590
Deployment 1530
NF 1531
Deployment 1540
NF 1522

Relay_a / Wireless Device 1
2205
uplink
downlink
(R)AN 1
2210
UPF 1
2215
Data Network/ Router(s)
2220
UPF 2
2225
(R)AN 2
2230
Relay_b / Wireless Device 2
2235

Relay_a / UE 1
2205
Relay_b / UE 2
2235
Sample I_a1 at t1
2240
Sample I_b1 at t1
2242
I_a1
2244
I_b1
2246
Sample I_a2 at t2
2248
Sample I_b2 at t2
2250
I_a2
2252
I_b2
2254
Sample I_a3 at t3
2256
Sample I_b3 at t3
2258
I_a3
2260
I_b3
2262
Measure RTT between Relay_a / UE 1 and Relay_b / UE 2
2264
Compare local current with received current from the remote relay
2266

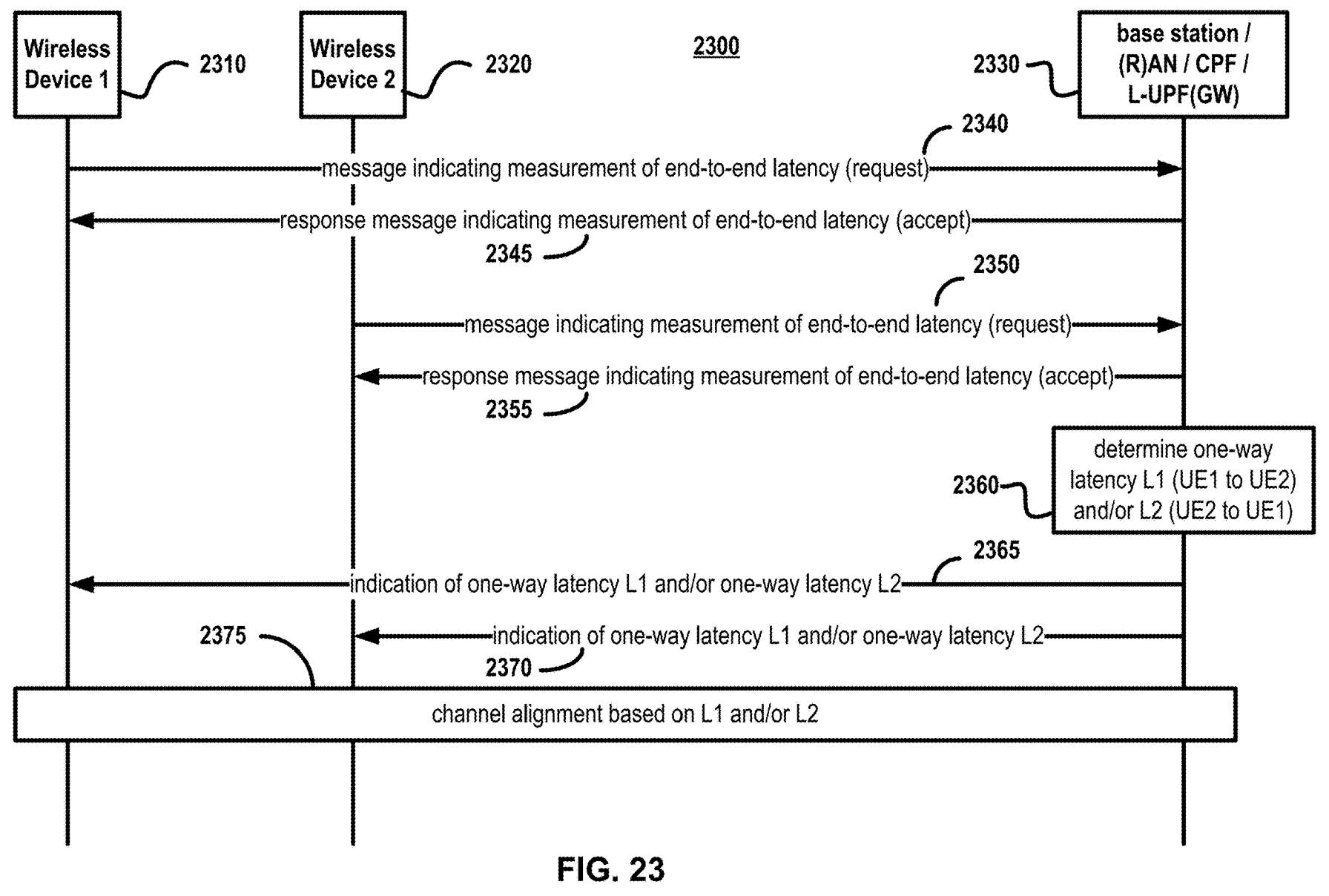

2300

Wireless Device 1
2310
Wireless Device 2
2320
base station / (R)AN / CPF / L-UPF(GW)
2330 message indicating measurement of end-to-end latency (request)
2340
response message indicating measurement of end-to-end latency (accept)
2345
message indicating measurement of end-to-end latency (request)
2350
response message indicating measurement of end-to-end latency (accept)
2355
determine one-way latency L1 (UE1 to UE2) and/or L2 (UE2 to UE1)
2360
indication of one-way latency L1 and/or one-way latency L2
2365
indication of one-way latency L1 and/or one-way latency L2
2370
channel alignment based on L1 and/or L2
2375

FIG. 23

RRCSetupRequest message

```
-- ASN1START
-- TAG-RRCSETUPREQUEST-START

RRCSetupRequest ::=             SEQUENCE {
   rrcSetupRequest              RRCSetupRequest-IEs
}

RRCSetupRequest-IEs ::=          SEQUENCE {
   ue-Identity                  InitialUE-Identity,
   establishmentCause              EstablishmentCause,
   spare                        BIT STRING (SIZE (1))
}

InitialUE-Identity ::=          CHOICE {
   ng-5G-S-TMSI-Part1              BIT STRING (SIZE (39)),
   randomValue                  BIT STRING (SIZE (39))
}

EstablishmentCause ::=           ENUMERATED {
                          emergency, highPriorityAccess, mt-Access, mo-Signalling,
                          mo-Data, mo-VoiceCall, mo-VideoCall, mo-SMS, mps-PriorityAccess, mcs-PriorityAccess,
                          EndtoEndLatencyMeasurementRequest, spare5, spare4, spare3, spare2, spare1}

-- TAG-RRCSETUPREQUEST-STOP
-- ASN1STOP
```

FIG. 24

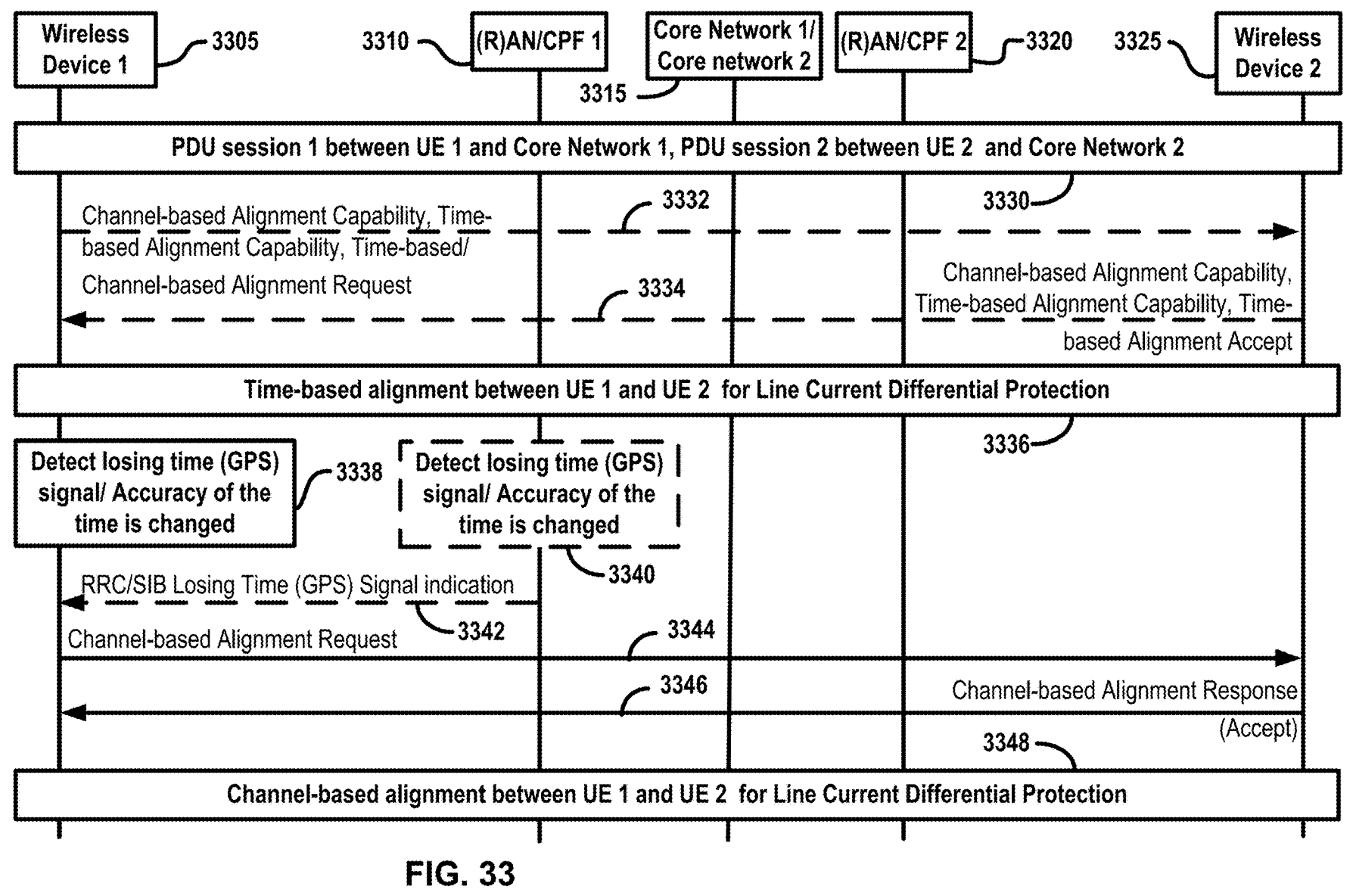

Wireless Device 1
3305
(R)AN/CPF 1
3310
Core Network 1/ Core network 2
3315
(R)AN/CPF 2
3320
Wireless Device 2
3325

PDU session 1 between UE 1 and Core Network 1, PDU session 2 between UE 2 and Core Network 2
3330

Channel-based Alignment Capability, Time-based Alignment Capability, Time-based/ Channel-based Alignment Request
3332

Channel-based Alignment Capability, Time-based Alignment Capability, Time-based Alignment Accept
3334

Time-based alignment between UE 1 and UE 2 for Line Current Differential Protection
3336

Detect losing time (GPS) signal/ Accuracy of the time is changed
3338

Detect losing time (GPS) signal/ Accuracy of the time is changed
3340

RRC/SIB Losing Time (GPS) Signal indication
3342

Channel-based Alignment Request
3344

Channel-based Alignment Response (Accept)
3346

Channel-based alignment between UE 1 and UE 2 for Line Current Differential Protection
3348

FIG. 33

END-TO-END LATENCY MEASUREMENT

CROSS-REFERENCE TO RELATED APPLICATIONS

This application claims the benefit of U.S. Provisional Application No. 63/314,534, filed on Feb. 28, 2022. The above referenced application is hereby incorporated by reference in its entirety.

BACKGROUND

Various procedures may be used to synchronize communications between devices. A first wireless device may determine an end-to-end latency with a second wireless device. The second wireless device may determine an end-to-end latency with the first wireless device.

SUMMARY

The following summary presents a simplified summary of certain features. The summary is not an extensive overview and is not intended to identify key or critical elements.

Wireless communications may require synchronization of devices. For example, a first wireless device and a second wireless device may be synchronized in time. The first wireless device and the second wireless device may exchange data. The first wireless device and the second wireless device may then compare data that was obtained at a same point in time, for example, based on the synchronization. Synchronization may be maintained, for example, based on a latency associated with an uplink channel being equivalent to a latency associated with a downlink channel. Channel symmetry may be achieved when the latency associated with the uplink channel is equivalent to the latency associated with the downlink channel. In at least some wireless communications, a latency associated with an uplink channel may be different from a latency associated with a downlink channel. This difference in latencies may result in the first wireless device and the second wireless device comparing data incorrectly. For example, the first wireless device may compare datapoints that were taken at different points in time. To address the different latencies, the first wireless device and/or the second wireless device may determine an end-to-end latency between the first wireless device and the second wireless device. The first wireless device may determine an uplink latency associated with sending communications to the second wireless device. The first wireless device may determine a downlink latency associated with receiving communications from the second wireless device. Based on the uplink latency being different from the downlink latency, the first wireless device, the second wireless, and/or a base station (e.g., in communication with the first wireless device and the second wireless device) may modify one or more parameters to improve symmetry between uplink latency and downlink latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7A shows an example a user plane protocol stack.

FIG. 7B shows an example a control plane protocol stack.

FIG. 7C shows example services provided between protocol layers of the user plane protocol stack.

FIG. 23 shows an example of a process for a base station to measure a one-way latency between a first wireless device and a second wireless device.

FIG. 24 shows an example of an RRCSetupRequest message.

FIG. 33 shows an example of a process for determining capabilities of a relay for line current differential protection.

DETAILED DESCRIPTION

Figures 1A, 1B:
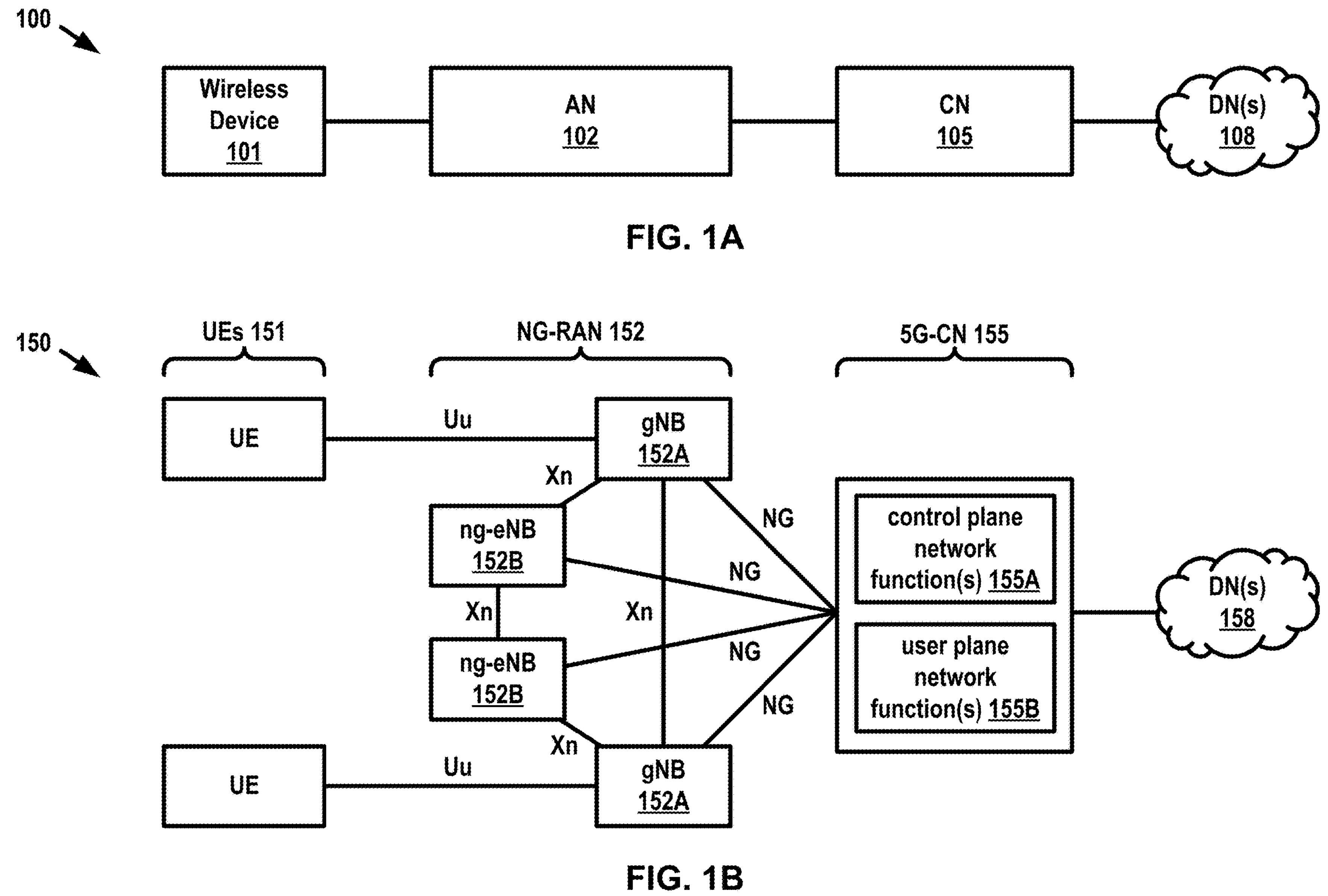
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to a multiple access procedure for wireless communications.

FIG. 1A shows an example communication network 100. The communication network 100 may comprise, for example, a public land mobile network (PLMN) operated/managed/run by a network operator. The communication network 100 comprise one or more of a wireless device 101, an access network (AN) 102, a core network (CN) 105, and/or one or more data network(s) (DNs) 108.

The wireless device 101 may communicate with DNs 108, for example, via AN 102 and/or CN 105. As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, an unmanned aerial vehicle, an urban air mobility aircraft, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The AN 102 may connect the wireless device 101 to the CN 105. A communication direction from the AN 102 to the wireless device 101 may be referred to as a downlink and/or a downlink communication direction. The communication direction from the wireless device 101 to the AN 102 may be referred to as an uplink and/or an uplink communication direction. Downlink transmissions may be separated and/or distinguished from uplink transmissions using frequency division duplexing (FDD), time-division duplexing (TDD), any other duplexing and/or multiplexing schemes, and/or some combination of the two duplexing techniques. The AN 102 may connect to and/or communicate with wireless device 101 via radio communications over an air interface. An AN that at least partially operates over the air interface may be referred to as a radio access network (RAN). A RAN may comprise one or more of: a radio unit (RU), distributed unit (DU), and/or a centralized unit (CU). A RAN may operate in a virtualized and/or in a non-virtualized environment. A RAN may perform one or more network functions in hardware. A RAN may perform one or more network functions in software. A RAN may perform one or more network functions in hardware and/or software. The CN 105 may set up/configure one or more end-to-end connections between wireless device 101 and the one or more DNs 108. The CN 105 may authenticate wireless device 101, provide a charging functionality, and/or provide/configure one or more additional functionalities/services for the wireless device 101.

As used throughout, the term "base station" may refer to, comprise, and/or encompass any element of the AN 102 that facilitates communication between wireless device 101 and the AN 102 (and/or any other elements of the communication network 100). A base station may comprise an RU. ANs and base stations may be referred to by other terminologies and/or may have other implementations. The base station may be a terrestrial base station at a fixed location on the earth. The base station may be a mobile base station with a moving coverage area. The base station may be on an aerial vehicle and/or may be located in space. For example, the base station may be on board an aircraft or a satellite. The RAN may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

The base station may be referred to using different terminologies in different communication standards/protocols. For example, WiFi and other standards may use the term access point. The Third-Generation Partnership Project (3GPP) has produced specifications for three generations of mobile networks, each of which uses a different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use different terminologies to refer to the elements/components which implement the methods described in the present disclosure (e.g., wireless devices, base stations, ANs, CNs, components thereof, and/or other elements in a communication network). A base station may be and/or comprise a repeater or relay node used to extend the coverage area of a donor node. A repeater node may amplify and rebroadcast a radio signal received from a donor node. A relay node may perform the same/similar functions as a repeater node. A relay node may decode radio signals received from the donor node (e.g., to remove noise) before amplifying and rebroadcasting the radio signal.

The AN 102 may include one or more base stations. The one or more base stations may have/serve one or more coverage areas. A geographical size and/or an extent of a coverage area may be based on a range at which a receiver of AN 102 can successfully receive transmissions from a transmitter (e.g., the wireless device 101) operating within the coverage area (and/or vice-versa). The coverage areas may be referred to as sectors or cells. In some contexts, the term cell may refer to a carrier frequency used in a particular coverage area. Base stations with large coverage areas may be referred to as macrocell base stations. Base stations may cover/serve smaller areas, for example, to provide coverage in areas/locations with weak macrocell coverage, and/or to provide additional coverage in areas with high traffic (e.g., referred to as hotspots). Examples of small cell base stations comprise (e.g., in order of decreasing coverage areas) microcell base stations, picocell base stations, femtocell base stations, and/or home base stations. In combination, the coverage areas of the base stations may provide radio coverage/service to the wireless device 101 over a wide geographic area to support wireless device mobility.

A base station may comprise one or more sets of antennas for communicating with the wireless device 101 over an air interface. Each set of antennas may be separately controlled by the base station. Each set of antennas may have a corresponding coverage area. For example, a base station may comprise three sets of antennas to respectively control three coverage areas (e.g., on three different sides) of the base station. A base station may comprise any quantity of antennas, which may correspond to any quantity of coverage areas. The entirety of the base station (and its corresponding antennas) may be deployed at a single location or at a plurality of locations. A controller (e.g., at a central location) may control/operate one or more sets of antennas at one or more distributed locations. The controller may be, for example, a baseband processing unit that comprises a centralized and/or cloud-based RAN architecture. The baseband processing unit may be either centralized in a pool of baseband processing units or may be virtualized. A set of antennas at a distributed location may be referred to as a remote radio head (RRH).

FIG. 1B shows another example communication network 150. The communication network 150 may comprise, for example, a PLMN operated/run by a network operator. The communication network 150 may comprise wireless devices 151, a next generation radio access network (NG-RAN) 152, a 5G core network (5G-CN) 155, and one or more DNs 158. The NG-RAN 152 may comprise one or more base stations (e.g., generation node Bs (gNBs) 152A and/or next generation evolved Node Bs (ng eNBs) 152B). The 5G-CN 155 may comprise one or more network functions (NFs). The one or more NFs may comprise control plane functions 155A and user plane functions 155B. The one or more DNs 158 may comprise public DNs (e.g., the Internet), private DNs, and/or intra-operator DNs. The components/elements shown in FIG. 1B may represent specific implementations and/or terminology of components/elements shown in FIG. 1A.

The base stations of the NG-RAN 152 may be connected to the wireless devices 151 via one or more Uu interfaces. The base stations of the NG-RAN 152 may be connected to each other via one or more first interface(s) (e.g., Xn interface(s)). The base stations of the NG-RAN 152 may be connected to 5G-CN 155 via one or more second interfaces (e.g., NG interface(s)). An interfaces may comprise one or more air interfaces, direct physical connections, indirect connections, and/or combinations thereof. For example, the Uu interface may comprise an air interface. The NG and Xn interfaces may comprise an air interface, direct physical connections, and/or indirect connections over an underlying transport network (e.g., an internet protocol (IP) transport network).

Each of the Uu, Xn, and NG interfaces may be associated with a protocol stack. The protocol stacks may comprise a user plane (UP) protocol stack and a control plane (CP) protocol stack. User plane data may comprise data corresponding to (e.g., associated with and/or pertaining to) users of the wireless devices 151. For example, user plane data may comprise internet content downloaded via a web browser application, sensor data uploaded via a tracking application, and/or email data communicated to and/or from an email server. Control plane data may comprise signaling and/or control message messages. For example, control plane data may facilitate packaging and routing of user plane data such that the user plane data may be communicated with (e.g., sent to and/or received from) the DN(s). The NG interface may be divided into (e.g., may comprise) an NG user plane interface (NG-U) and an NG control plane interface (NG-C). The NG-U interface may provide/perform delivery of user plane data between the base stations and the one or more user plane network functions 155B. The NG-C interface may be used for control signaling between the base stations and the one or more control plane network functions 155A. The NG-C interface may provide, for example, NG interface management, wireless device context management, wireless device mobility management, transport of non-access stratum (NAS) messages, paging, protocol data unit (PDU) session management, and configuration transfer and/or warning message transmission. In at least some scenarios, the NG-C interface may support transmission of user data (e.g., a small data transmission for an IoT device).

One or more of the base stations of the NG-RAN 152 may be split into a central unit (CU) and one or more distributed units (DUs). A CU may be coupled to one or more DUs via an interface (e.g., an F1 interface). The CU may handle one or more upper layers in the protocol stack and the DU may handle one or more lower layers in the protocol stack. For example, the CU may handle a radio resource control (RRC) layer, a physical data convergence protocol (PDCP) layer, and/or a service data application protocol (SDAP) layer, and the DU may handle radio link control (RLC) layer, a medium access control (MAC) layer, and/or a physical (PHY) layer. The one or more DUs may be in geographically diverse locations relative to the CU and/or each other. The CU/DU split architecture may permit increased coverage and/or better coordination.

The gNBs 152A and ng-eNBs 152B may provide different user plane and control plane protocol termination towards the wireless devices 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate wireless devices 151, set up end-to-end connections between wireless devices 151 and the one or more DNs 158, and/or provide charging functionality. The 5G-CN 155 may be based on a service-based architecture. The service-based architecture may enable the NFs comprising the 5G-CN 155 to offer services to each other and to other elements of the communication network 150 via interfaces. The 5G-CN 155 may include any quantity of other NFs and any quantity of instances of each NF.

FIG. 2A, FIG. 2B, FIG. 2C, and FIG. 2D show example frameworks for a service-based architecture within a core network. A service, in a service-based architecture, may be requested/sought by a service consumer and provided by a service producer. An NF may determine, prior to obtaining the requested service, where the requested service may be obtained. The NF may communicate with a network repository function (NRF) to discover a service. For example, an NF that provides one or more services may register with a network repository function (NRF). The NRF may store data relating to the one or more services that the NF is prepared to provide to other NFs in the service-based architecture. A consumer NF may query the NRF to discover/determine a producer NF. For example, the consumer NF may obtain, from the NRF, a list of NF instances that provide a particular service).

Figures 2A, 2B, 2C, 2D:
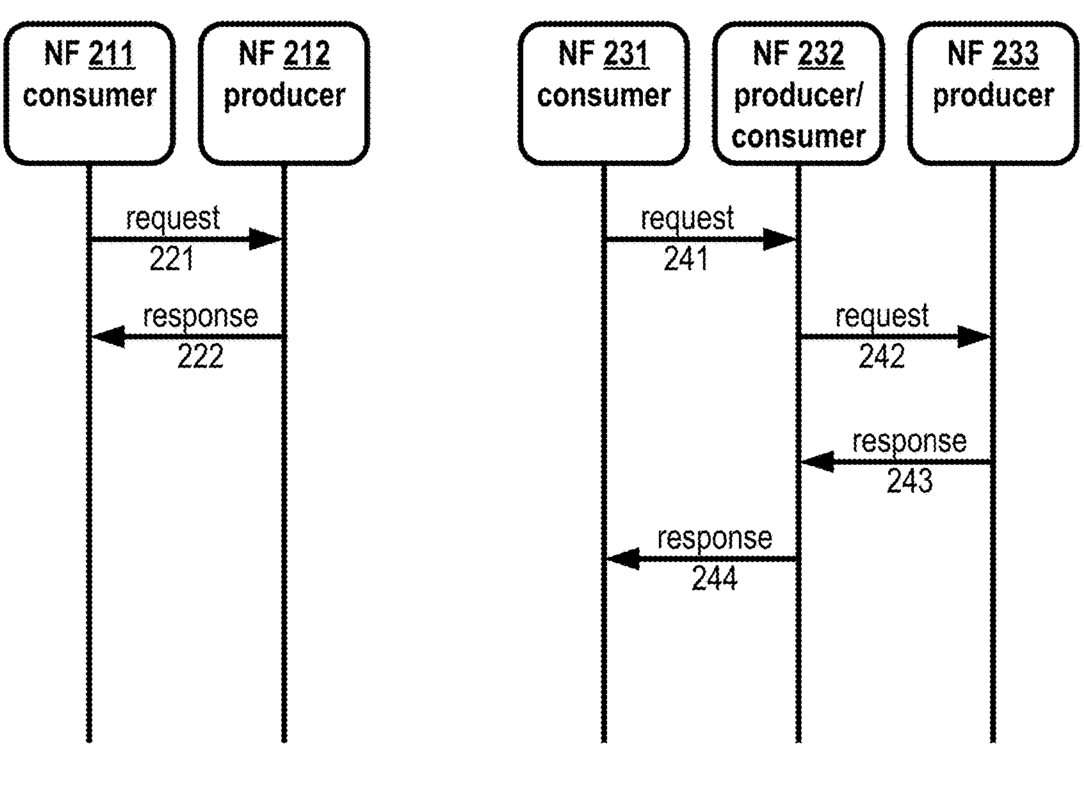
FIG. 2A, FIG. 2B, FIG. 2C, and FIG. 2D show examples frameworks for a service-based architecture within a core network.

As shown in FIG. 2A, an NF 211 (e.g., a consumer NF) may send a request 221 to an NF 212 (e.g., a producer NF). The request 221 may be a request for a particular service. The request 221 may be sent based on a discovery that NF 212 is a producer of that service. The request 221 may comprise data relating to NF 211 and/or the requested service. The NF 212 may receive the request 221, perform one or more actions associated with the requested service (e.g., retrieving data), and provide/send a response 221. The one or more actions performed by the NF 212 may be based on request data included in the request 221, data stored by the NF 212, and/or data retrieved by the NF 212. The response 222 may notify/indicate, to the NF 211, that the one or more actions have been completed. The response 222 may comprise response data relating to the NF 212, the one or more actions, and/or the requested service.

As shown in FIG. 2B, an NF 231 may send a request 241 to an NF 232. A service produced/provided by the NF 232 may comprise sending a request 242 to an NF 233 (e.g., based on receiving the request 241). The NF 233 may perform one or more actions and provide/send a response 243 to the NF 232. The NF 232 may send a response 244 to the NF 231, for example, based on receiving the response 243. As shown in FIG. 2B, an NF (e.g., a single NF) may perform the role of a producer of services, consumer of services, and/or both. A particular NF service may comprise any quantity/number of nested NF services produced by one or more other NFs.

FIG. 2C shows an example of subscribe-notify interactions between a consumer NF and a producer NF. An NF 251 may send a subscription 261 (e.g., a subscription request) to an NF 252. An NF 253 may send a subscription 262 (e.g., a subscription request) to the NF 252. Although FIG. 2C shows two NFs and the NF 252 providing multiple subscription services to the two NFs, a subscribe-notify interaction may comprise one subscriber, and/or any other quantity of subscribers. The NFs 251, 253 may be independent from one another. For example, the NFs 251, 253 may independently discover the NF 252 and/or independently determine to subscribe to the service offered by the NF 252. The NF 252 may provide/send a notification to a subscribing NF, for example, based on receiving the subscription. For example, the NF 252 may send a notification 263 to the NF 251 based on the subscription 261 and/or may send a notification 264 to the NF 253 based on the subscription 262.

The sending of the notifications 263, 264 may be conditional. The sending of the notifications 263, 264 may be based on a determination that a condition has occurred. The notifications 263, 264 may be based on a determination that a particular event has occurred, a determination that a particular condition is outstanding, and/or a determination that a duration of time associated with the subscription has elapsed. The duration of time may be a time period associated with a subscription for notifications (e.g., periodic notifications). The NF 252 may send the notifications 263, 264 to the NFs 251, 253 simultaneously, substantially simultaneously, and/or based on/in response to a same condition. The NF 252 may send the notifications 263, 264 at different times and/or based on/in response to different notification conditions. The NF 251 may request a notification based on a certain parameter, as measured by the NF 252, exceeding a first threshold. The NF 252 may request a notification based on the parameter exceeding a second threshold (e.g., different from the first threshold). A parameter of interest and/or a corresponding threshold may be indicated in the subscriptions 261, 262.

FIG. 2D shows another example of a subscribe-notify interaction. An NF 271 may send a subscription 281 to an NF 272. The NF 272 may send a notification 284, for example, based on/in response to receipt of the subscription 281 and/or a determination that a notification condition has occurred. The notification 284 may be sent to an NF 273. While the example of FIG. 2C shows a notification being sent to the subscribing NF, the example of FIG. 2D shows that a subscription and its corresponding notification may be associated with (e.g., received from and sent to) different NFs. For example, the NF 271 may subscribe to the service provided by the NF 272 on behalf of the NF 273.

Figure 3:
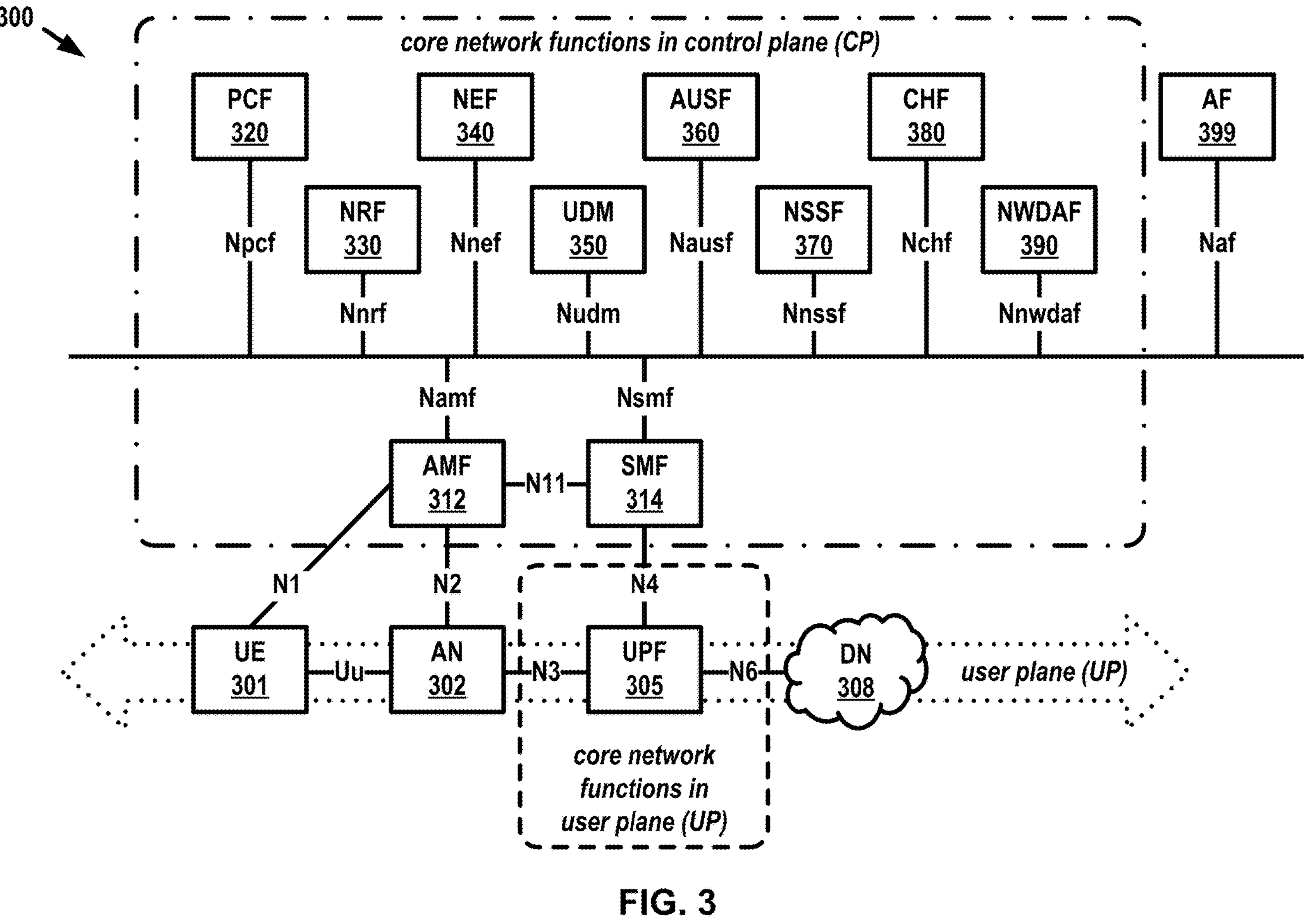
FIG. 3 shows an example communication network.

FIG. 3 shows an example communication network 300. The Communication network 300 may comprise a wireless device 301, an AN 302, and/or a DN 308. The other elements shown in FIG. 3 may be included in and/or associated with a core network. An element (e.g., each element) of the core network may be an NF.

The NFs may comprise a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and/or an application function (AF) 399. The UPF 305 may be a user plane core network function. The NFs 312, 314, and 320-390 may be control plane core network functions. The core network may comprise additional instances of any of the NFs shown in FIG. 3 and/or one or more different types of NF that provide different services. Other examples of NF type may comprise a gateway mobile location center (GMLC), a location management function (LMF), an operations, administration, and maintenance function (OAM), a public warning system (PWS), a short message service function (SMSF), a unified data repository (UDR), and/or an unstructured data storage function (UDSF).

An element (e.g., each element) shown in FIG. 3 may comprise an interface with at least one other element. The interface may be a logical connection and/or a direct physical connection. Any interface may be identified/indicated using a reference point representation and/or a service-based representation. In a reference point representation, the letter N may be used followed by a numeral to indicate an interface between two specific elements. For example, as shown in FIG. 3, the AN 302 and the UPF 305 may interface via N3, whereas UPF 305 and DN 308 may interface via N6. In a service-based representation, the letter N may be followed by one or more alphabets/letters. The letters may identify/indicate an NF that provides services to the core network. For example, PCF 320 may provide services via interface Npcf. The PCF 320 may provide services to any NF in the core network via Npcf. A service-based representation may correspond to a bundle of reference point representations. For example, the Npcf interface between PCF 320 and the core network may generally correspond to an N7 interface between PCF 320 and SMF 314, an N30 interface between PCF 320 and NEF 340, and/or an N# interface between any functions where # may indicate any number.

The UPF 305 may serve as a gateway for user plane traffic between the AN 302 and the DN 308. The wireless device 301 may connect to UPF 305 via a Uu interface and an N3 interface (also described as NG-U interface). The UPF 305 may connect to the DN 308 via an N6 interface. The UPF 305 may connect to one or more other UPFs (not shown) via an N9 interface. The wireless device 301 may be configured to receive services through a protocol data unit (PDU) session. The PDU session may be a logical connection between the wireless device 301 and the DN 308. The UPF 305 (or a plurality of UPFs) may be selected by the SMF 314 to handle/process a particular PDU session between the wireless device 301 and the DN 308. The SMF 314 may control the functions of the UPF 305 with respect to the PDU session. The SMF 314 may connect to the UPF 305 via an N4 interface. The UPF 305 may handle/process any quantity of PDU sessions associated with any quantity of wireless devices (via any quantity of ANs). The UPF 305 may be controlled, for handling the one or more PDU sessions, by any quantity of SMFs via any quantity of corresponding N4 interfaces.

The AMF 312 may control wireless device access to the core network. The wireless device 301 may register with the network via the AMF 312. for the wireless device 301 may register with the network prior to establishing a PDU session. The AMF 312 may manage a registration area of the wireless device 301, which may enable the network to track the physical location of wireless device 301 within the network. The AMF 312 may manage wireless device mobility for a wireless device in connected mode. For example, the AMF 312 may manage wireless device handovers from one AN (or portion thereof) to another. The AMF 312 may perform, for a wireless device in idle mode, registration updates, and/or page the wireless device to transition the wireless device to connected mode.

The AMF 312 may receive, from the wireless device 301, NAS messages. The NAS messages may be sent/transmitted in accordance with NAS protocol. NAS messages may relate to communications between the wireless device 301 and the core network. NAS messages may be relayed to the AMF 312 via the AN 302. Communication between the wireless device 301 and the AMF 312 may be represented as communication via the N1 interface. NAS messages may facilitate wireless device registration and mobility management, for example, by authenticating, identifying, configuring, and/or managing a connection of the wireless device 301. NAS messages may support session management procedures for maintaining user plane connectivity and quality of service (QoS) of a session between the wireless device 301 and the DN 309. The AMF 312 may send a NAS message to SMF 314, for example, if the NAS message involves (e.g., is associated with, corresponds to) session management. NAS messages may be used to transport messages between wireless device 301 and other components of the core network (e.g., core network components other than AMF 312 and SMF 314). The AMF 312 may act on/process a NAS message, or alternatively, forward the NAS message to an appropriate core NF (e.g., SMF 314, etc.).

The SMF 314 may establish, modify, and/or release a PDU session based on messaging received from the wireless device 301. The SMF 314 may allocate, manage, and/or assign an IP address to the wireless device 301, for example, based on establishment of a PDU session. Multiple SMFs may be in/associated with the network. Each of the SMFs may be associated with a respective group of wireless devices, base stations, and/or UPFs. A wireless device with multiple PDU sessions may be associated with a different SMF for each PDU session. The SMF 314 may select one or more UPFs to handle/process a PDU session. The SMF 314 may control the handling/processing of the PDU session by the selected UPF by providing rules for packet handling (e.g., packet detection rules (PDRs), forwarding action rules (FARs), QoS enforcement rules (QERs), etc.). Rules relating to QoS and/or charging for a particular PDU session may be obtained from the PCF 320 and provided to the UPF 305 (e.g., by the SMF 314).

The PCF 320 may provide/send, to other NFs, services relating to policy rules. The PCF 320 may use subscription data and information about network conditions to determine policy rules. The PCF 320 may provide the policy rules to a particular NF which may be responsible for enforcement of those rules. Policy rules may relate to policy control for access and mobility, and may be enforced by the AMF 312. Policy rules may relate to session management, and may be enforced by the SMF 314. Policy rules may be network-specific, wireless device-specific, session-specific, and/or data flow-specific.

The NRF 330 may provide service discovery functions. The NRF 330 may belong/correspond to a particular PLMN. The NRF 330 may maintain NF profiles relating to other NFs in the communication network 300. The NF profile may comprise, for example, an address, PLMN, and/or type of the NF, a slice indicator/identifier, a list of the one or more services provided by the NF, and/or authorization required to access the services.

The NEF 340 may provide an interface to external domains, permitting the external domains to selectively access the control plane of the communication network 300. The external domain may comprise, for example, third-party network functions, application functions, and/or any other functions. The NEF 340 may act as a proxy between external elements and network functions such as the AMF 312, the SMF 314, the PCF 320, the UDM 350, and/or any other functions. As an example, the NEF 340 may determine a location and/or reachability status of the wireless device 301 based on reports from the AMF 312, and/or may provide status information to an external element. An external element may provide, via the NEF 340, information that facilitates the setting of parameters for establishment of a PDU session. The NEF 340 may determine which data and capabilities of the control plane are exposed to the external domain. The NEF 340 may provide secure exposure (e.g., by authenticating and/or authorizing an external entity) to exposed data or capabilities of the communication network 300. The NEF 340 may selectively control the exposure such that the internal architecture of the core network is hidden/obscured from the external domain.

The UDM 350 may provide data storage for other NFs. The UDM 350 may permit a consolidated view of network information. The consolidated view may be used to ensure that the most relevant information may be made available to different NFs from a single resource. The UDM 350 may store and/or retrieve information from a unified data repository (UDR). For example, the UDM 350 may obtain user subscription data relating to the wireless device 301 from the UDR.

The AUSF 360 may support mutual authentication of the wireless device 301 by the core network and authentication of the core network by the wireless device 301. The AUSF 360 may perform key agreement procedures and provide keying material that may be used to improve security.

The NSSF 370 may select/determine one or more network slices to be used by the wireless device 301. The NSSF 370 may select a slice based on slice selection information. For example, the NSSF 370 may receive single network slice selection assistance information (S-NSSAI) and map the S-NSSAI to a network slice instance identifier (NSI).

The CHF 380 may control billing-related tasks associated with wireless device 301. For example, the UPF 305 may report/send traffic usage information, associated with wireless device 301, to the SMF 314. The SMF 314 may collect usage data from the UPF 305 and one or more other UPFs. The usage data may indicate a quantity of data exchanged, a DN that the data is exchanged with, a network slice associated with the data, and/or any other information that may influence billing. The SMF 314 may share the collected usage data with the CHF 380. The CHF 380 may use the collected usage data to perform billing-related tasks associated with wireless device 301. The CHF 380 may, depending on the billing status of wireless device 301, instruct the SMF 314 to limit and/or influence/control access of the wireless device 301 and/or provide billing-related notifications to wireless device 301.

The NWDAF 390 may collect and/or analyze data from other NFs and/or offer data analysis services to other NFs. The NWDAF 390 may receive/collect, from the UPF 305, the AMF 312, and/or the SMF 314, data/information relating to a load level for a particular network slice instance. The NWDAF 390 may provide (e.g., based on the collected data) load level data to the PCF 320 and/or the NSSF 370, and/or may notify the PCF 320 and/or the NSSF 370 if a load level for a slice reaches and/or if a load level for a slice exceeds a load level threshold.

The AF 399 may be outside the core network, but may interact with the core network to provide information relating to the QoS requirements and/or traffic routing preferences associated with a particular application. The AF 399 may access the core network based on the exposure constraints imposed by the NEF 340. An operator of the core network may consider the AF 399 to be a trusted domain that may directly access the core network (and/or the communication network 300).

Figure 4A:
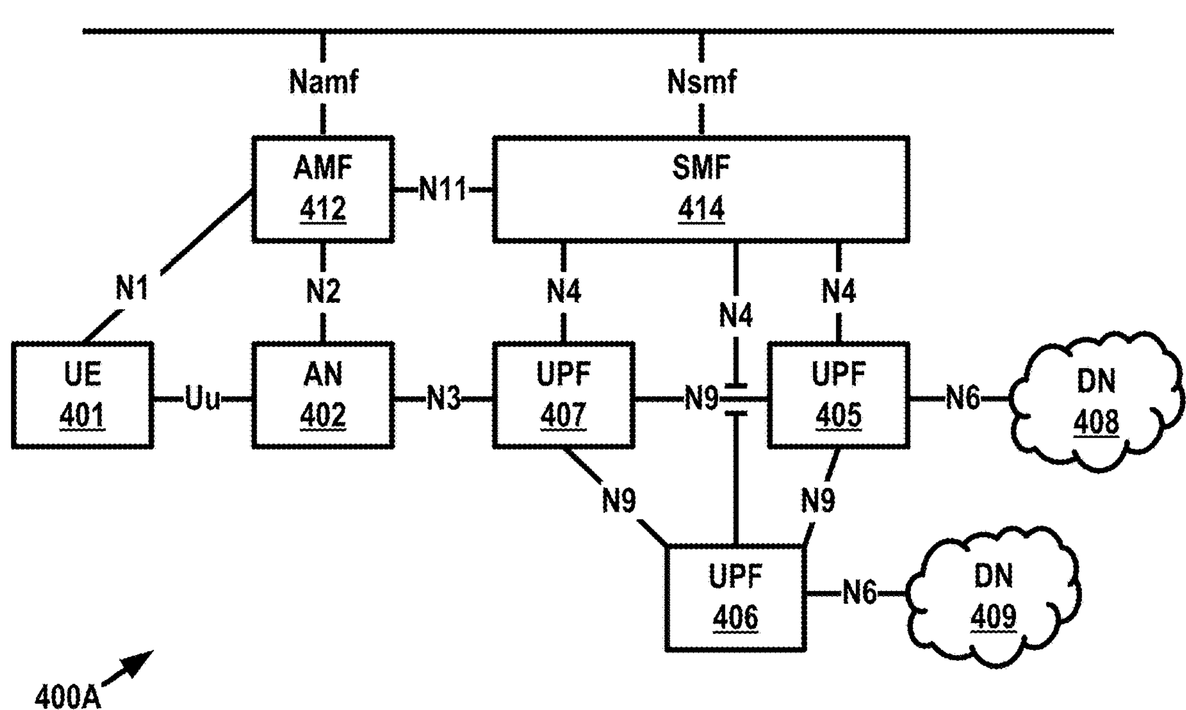
FIG. 4A and FIG. 4B show example core network architectures.
Figure 4B:
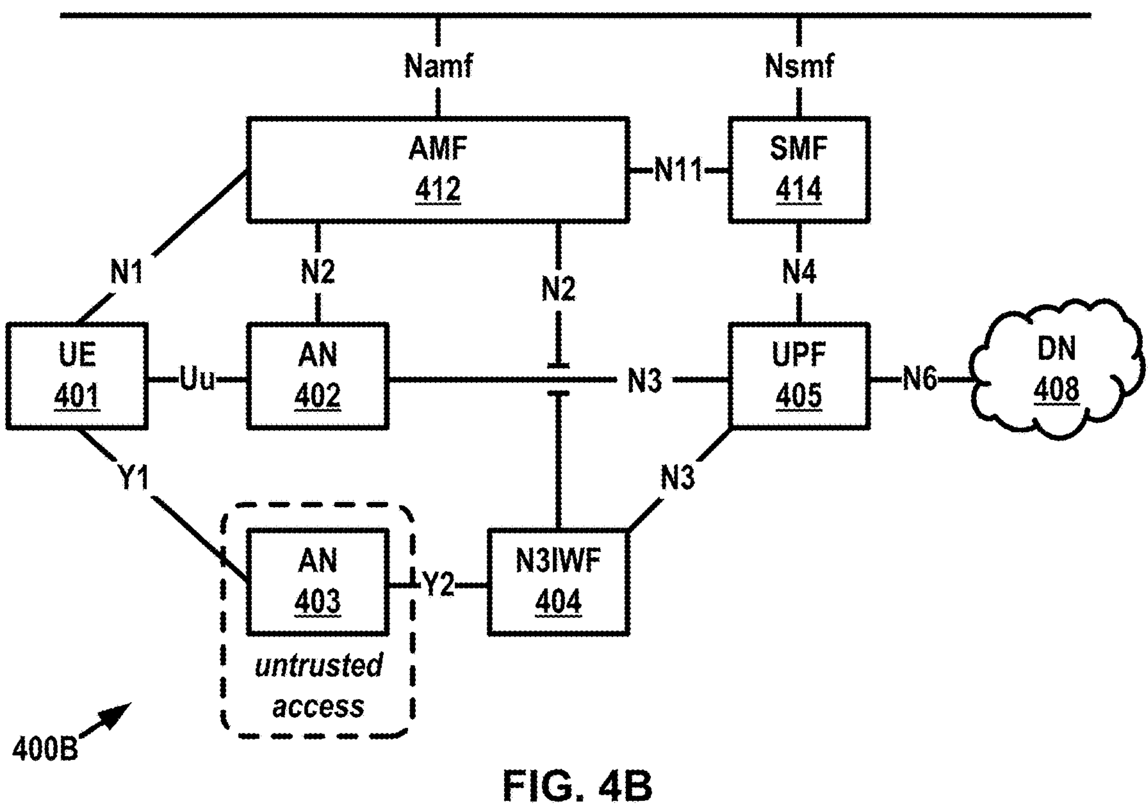
Figure 5:
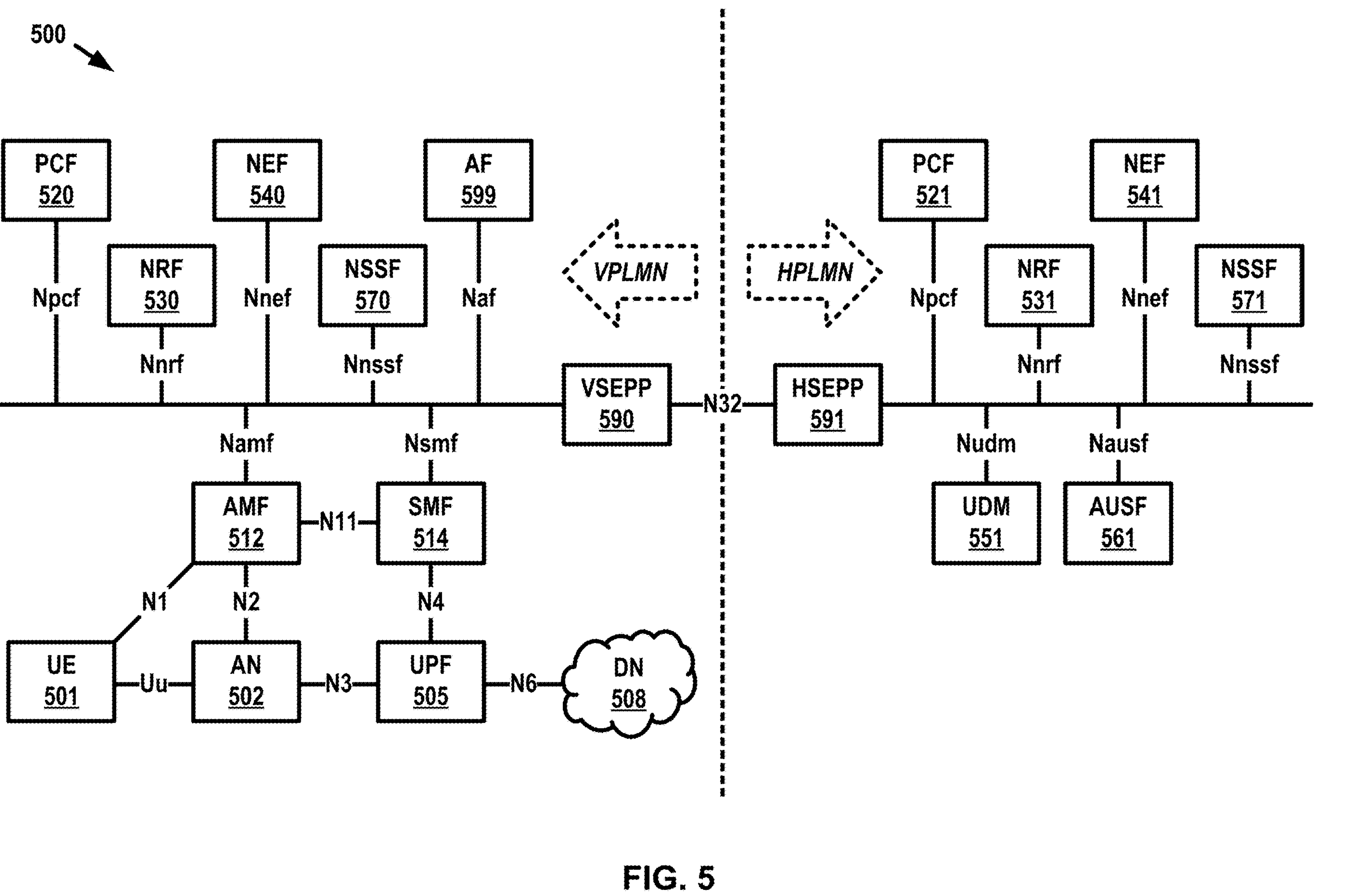
FIG. 5 shows an example of a core network architecture.

FIGS. 4A, 4B, and 5 show examples of core network architectures. The core network architectures shown in FIGS. 4A, 4B, and 5 may be analogous in some respects to the core network architecture 300 shown in FIG. 3. For brevity, some of the core network elements shown in FIG. 3 are not shown in FIGS. 4A, 4B, and 5 but may be included in one or more of these core network architectures. Many of the elements shown in FIGS. 4A, 4B, and 5 may be analogous in some respects to elements depicted in FIG. 3. For brevity, some of the details relating to their functions or operation are not shown but may be included in one or more of these core network architectures. Operation of one or more elements shown in FIGS. 4A, 4B, and 5 may be similar, or substantially similar, to corresponding elements shown in FIG. 3.

FIG. 4A shows an example of a core network architecture. The core network architecture 400A of FIG. 4A may comprise an arrangement of multiple UPFs. Core network architecture 400A may comprise one or more of: a wireless device 401, an AN 402, an AMF 412, and/or an SMF 414. The core network architecture 400A may comprise multiple UPFs (e.g., a UPF 405, a UPF 406, and a UPF 407) and multiple DNs (e.g., a DN 408 and a DN 409). Each of the multiple UPFs 405, 406, 407 may communicate with the SMF 414 via a corresponding N4 interface. The DNs 408, 409 may communicate with the UPFs 405, 406, respectively, via N6 interfaces. The multiple UPFs 405, 406, 407 may communicate with one another via N9 interfaces.

The UPFs 405, 406, 407 may perform traffic detection. The UPFs 405, 406, 407 may indicate, identify, and/or classify packets. Packet indication/identification may be performed based on PDRs provided by the SMF 414. PDRs may comprise packet detection information. Packet detection information may comprise one or more of: a source interface, a wireless device IP address, core network (CN) tunnel information (e.g., a CN address of an N3/N9 tunnel corresponding to a PDU session), a network instance indicator/identifier, a QoS flow indicator/identifier (QFI), a filter set (e.g., an IP packet filter set and/or an ethernet packet filter set), and/or an application indicator/identifier.

PDRs may indicate one or more rules for handling the packet upon detection thereof. The one or more rules may comprise, for example, FARs, multi-access rules (MARs), usage reporting rules (URRs), QERs, and/or any other rule. For example, the PDR may comprise one or more FAR identifiers, MAR identifiers, URR identifiers, and/or QER identifiers. The identifiers may indicate the rules that are prescribed/to be used for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface (e.g., "access" for downlink or "core" for uplink). The FAR may indicate a buffering action rule (BAR), for example, if a packet is to be buffered. The UPF 405 may perform data buffering of a certain quantity downlink packets, for example, if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark/indicate packets belonging to a particular QoS flow with a corresponding QFI. The marking may enable a recipient of the packet to determine a QoS of the packet (e.g., a QoS to be enforced for the packet).

The UPF 405 may provide/send usage reports to the SMF 414 in accordance with a URR. The URR may indicate one or more triggering conditions for generation and/or reporting of the usage report. The reporting may be based on immediate reporting, periodic reporting, a threshold for incoming uplink traffic, and/or any other suitable triggering condition.

The URR may indicate a method for measuring usage of network resources (e.g., data volume, duration, and/or event).

The DNs 408, 409 may comprise public DNs (e.g., the Internet), private DNs (e.g., private, internal corporate-owned DNs), and/or intra-operator DNs. A DN (e.g., each DN) may provide an operator service and/or a third-party service. The service provided by a DN may be an Internet service, an IP multimedia subsystem (IMS), an augmented or virtual reality network, an edge computing or mobile edge computing (MEC) network, and/or any other service. A DN (e.g., each DN) may be indicated/identified using a data network name (DNN). The wireless device 401 may be configured to establish a first logical connection with the DN 408 (e.g., a first PDU session), a second logical connection with DN 409 (e.g., a second PDU session), or both simultaneously (e.g., the first PDU session and the second PDU sessions).

A PDU session (e.g., each PDU) session may be associated with at least one UPF configured to operate as a PDU session anchor (PSA, or anchor). The anchor may be a UPF that may provide an N6 interface with a DN.

The UPF 405 may be the anchor for the first PDU session between wireless device 401 and DN 408. The UPF 406 may be the anchor for the second PDU session between wireless device 401 and DN 409. The core network may use the anchor to provide service continuity of a particular PDU session (e.g., IP address continuity) as wireless device 401 moves from one access network to another. The wireless device 401 may establish a PDU session using a data path to the DN 408 and using an access network other than AN 402. The data path may use the UPF 405 acting as anchor. The wireless device 401 may (e.g., later) move into the coverage area of the AN 402. The SMF 414 may select a new UPF (e.g., the UPF 407) to bridge the gap between the newly-entered access network (e.g., the AN 402) and the anchor UPF (e.g., the UPF 405). The continuity of the PDU session may be preserved as any quantity/number of UPFs may be added and/or removed from the data path. A UPF added to a data path (e.g., as shown in FIG. 4A) may be described as an intermediate UPF and/or a cascaded UPF.

The UPF 406 may be the anchor for the second PDU session between wireless device 401 and the DN 409. The anchor for the first PDU session and the anchor for the second PDU sessions being associated with different UPFs (e.g., as shown in FIG. 4A) is merely exemplary. Multiple PDU sessions with a single DN may correspond to any quantity/number of anchors. A UPF at the branching point (e.g., the UPF 407 in FIG. 4) may operate as an uplink classifier (UL-CL), for example, if there are multiple UPFs. The UL-CL may divert uplink user plane traffic to different UPFs.

The SMF 414 may allocate, manage, and/or assign an IP address to the wireless device 401. The SMF 414 may allocate, manage, and/or assign an IP address to the wireless device 401, for example, based on establishment of a PDU session. The SMF 414 may maintain an internal pool of IP addresses to be assigned. The SMF 414 may (e.g., if necessary) assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of wireless device 401 may be maintained (and the same anchor UPF may be used) as the wireless device moves within the network. In SSC mode 2, the IP address of wireless device 401 may be changed as the wireless device 401 moves within the network. For example, the old IP address and an old anchor UPF may be abandoned and a new IP address and a new anchor UPF may be established, for example, as the wireless device 401 moves within the network. In SSC mode 3, it may be possible to maintain an old IP address (e.g., similar to SSC mode 1) temporarily while establishing a new IP address (e.g., similar to SSC mode 2). Applications that may be sensitive to IP address changes may operate in accordance with SSC mode 1.

UPF selection may be controlled by the SMF 414. The SMF 414 may select the UPF 405 as the anchor for the PDU session and/or the UPF 407 as an intermediate UPF, for example, based on establishment and/or modification of a PDU session between the wireless device 401 and DN 408. Criteria for UPF selection may comprise path efficiency and/or speed (e.g., a data rate) between the AN 402 and the DN 408. Reliability, load status, location, slice support and/or other capabilities of candidate UPFs may also be considered for UPF selection.

FIG. 4B shows an example of a core network architecture. The core network architecture 400B of FIG. 4B may accommodate untrusted access. The wireless device 401, as shown in FIG. 4B, may communicate with (e.g., connect to) the DN 408 via the AN 402 and the UPF 405. The AN 402 and the UPF 405 may constitute/comprise/provide trusted (e.g., 3GPP) access to the DN 408. The wireless device 401 may access the DN 408 using an untrusted access network. The untrusted access network may comprise the AN 403 and/or a non-3GPP interworking function (N3IWF) 404.

The AN 403 may be a wireless local area network (WLAN) (e.g., operating in accordance with the IEEE 802.11 standard). The wireless device 401 may communicate with (e.g., connect to) the AN 403 via an interface Y1. The connection may be in a manner that is prescribed for the AN 403. The connection to the AN 403 may or may not involve authentication. The wireless device 401 may obtain/receive an IP address from the AN 403. The wireless device 401 may determine to connect to the core network 400B using untrusted access. The AN 403 may communicate with N3IWF 404 via a Y2 interface. After selecting untrusted access, the wireless device 401 may provide N3IWF 404 with sufficient information to select an AMF. The selected AMF may be, for example, the same AMF that is used by wireless device 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA). The UPF 405 may remain the anchor for a PDU session, for example, even as wireless device 401 shifts between trusted access and untrusted access.

FIG. 5 shows an example of a core network architecture. The core network architecture 500 of FIG. 5 may correspond to an example in which a wireless device 501 may be roaming. The wireless device 501 (e.g., in a roaming scenario) may be a subscriber of a first PLMN (e.g., a home PLMN, or HPLMN) but may attach to a second PLMN (e.g., a visited PLMN, or VPLMN). The core network architecture 500 may comprise a wireless device 501, an AN 502, a UPF 505, and/or a DN 508. The AN 502 and the UPF 505 may be associated with a VPLMN. The VPLMN may manage the AN 502 and/or the UPF 505 using core network elements associated with the VPLMN. The core network elements associated with the VPLMN may comprise an AMF 512, an SMF 514, a PCF 520, an NRF 530, an NEF 540, and/or an NSSF 570. An AF 599 may be adjacent the core network of the VPLMN.

The wireless device 501 may not be a subscriber of the VPLMN. The AMF 512 may authorize the wireless device 501 to access the network (e.g., the VPLMN), for example, based on roaming restrictions that may apply to wireless device 501. The core network of the VPLMN may interact with core network elements of an HPLMN of the wireless device 501 (e.g., a PCF 521, an NRF 531, an NEF 541, a UDM 551, and/or an AUSF 561), for example, to obtain network services provided by the VPLMN. The VPLMN and the HPLMN may communicate using an N32 interface connecting respective security edge protection proxies (SEPPs). The respective SEPPs may be a VSEPP 590 and/or an HSEPP 591.

The VSEPP 590 and/or the HSEPP 591 may communicate via an N32 interface (e.g., for defined purposes). The VSEPP 590 and the HSEPP 591 may communicate via an N32 interface while concealing information about each PLMN from the other. The SEPPs may apply roaming policies, for example, based on communications via the N32 interface. The PCF 520 and/or the PCF 521 may communicate via the SEPPs to exchange policy-related signaling. The NRF 530 and/or the NRF 531 may communicate via the SEPPs to enable service discovery of NFs in the respective PLMNs. The VPLMN and HPLMN may independently maintain the NEF 540 and the NEF 541. The NSSF 570 and/or the NSSF 571 may communicate via the SEPPs to coordinate slice selection for the wireless device 501. The HPLMN may handle all authentication and subscription related signaling. The VPLMN may authenticate the wireless device 501 and/or obtain subscription data of the wireless device 501 by accessing, via the SEPPs, the UDM 551 and the AUSF 561 of the HPLMN, for example, if the wireless device 501 registers and/or requests service via the VPLMN.

The core network architecture 500 may be referred to as a local breakout configuration, in which the wireless device 501 may access the DN 508 using one or more UPFs of the VPLMN (i.e., the UPF 505). Other configurations are possible. For example, in a home-routed configuration (not shown in FIG. 5), the wireless device 501 may access a DN using one or more UPFs of the HPLMN. In the home-routed configuration, an N9 interface may run parallel to the N32 interface, crossing the frontier between the VPLMN and the HPLMN, to carry user plane data. One or more SMFs of the respective PLMNs may communicate, via the N32 interface, to coordinate session management for the wireless device 501. The SMFs may control their respective UPFs on either side of the frontier.

Figure 6:
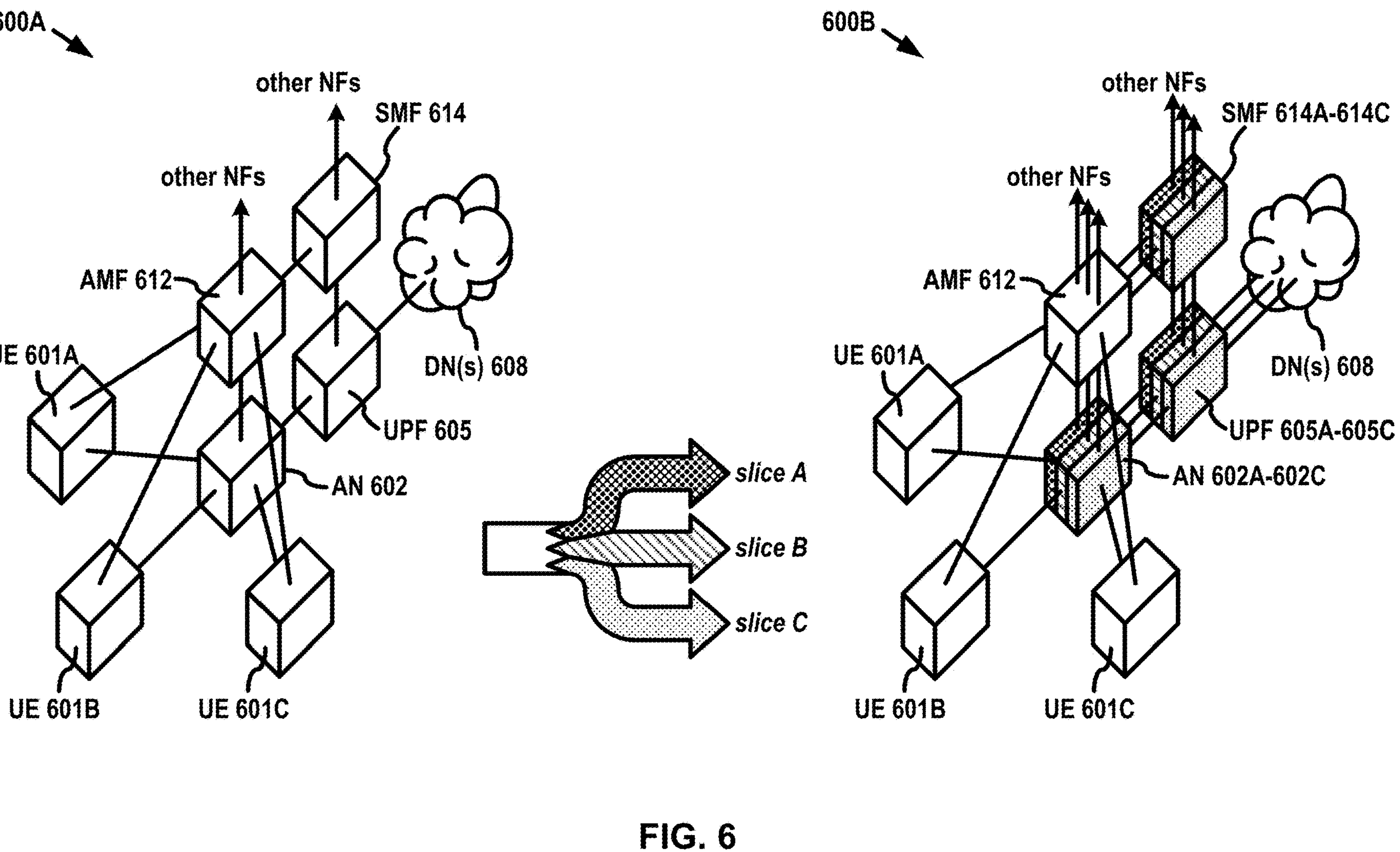
FIG. 6 shows an example of network slicing.

FIG. 6 shows an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A shows an un-sliced physical network corresponding to a single logical network. The network architecture 600A may comprise a user plane. Wireless devices 601A, 601B, 601C (collectively, wireless devices 601) may have a physical and/or a logical connection to a DN 608 via an AN 602 and a UPF 605 of the user plane. The network architecture 600A may comprise a control plane. An AMF 612 and an SMF 614, in the control plane, may control various aspects of the user plane.

The network architecture 600A may have a specific set of characteristics (e.g., relating to maximum bit rate, reliability, latency, bandwidth usage, power consumption, etc.). The set of characteristics may be affected by the nature/properties of the network elements (e.g., processing power, availability of free memory, proximity to other network elements, etc.) and/or the management thereof (e.g., optimization to maximize bit rate or reliability, reduce latency, reduce power, reduce bandwidth usage, etc.). The characteristics of the network architecture 600A may change over time. For example, by upgrading equipment and/or by modifying procedures to target a particular characteristic may change the characteristics of the network architecture 600A. At any given time, the network architecture 600A may have a single set of characteristics that may or may not be optimized for a particular use case. For example, wireless devices 601A, 601B, 601C may have different requirements, with the network architecture 600A being optimized for one of the three wireless devices.

The network architecture 600B shows an example of a sliced physical network divided into multiple logical networks. The physical network may be divided into three logical networks (e.g., slice A, slice B, and slice C). For example, the wireless device 601A may be served by AN 602A, UPF 605A, AMF 612, and SMF 614A. Wireless device 601B may be served by AN 602B, UPF 605B, AMF 612, and SMF 614B. Wireless device 601C may be served by AN 602C, UPF 605C, AMF 612, and SMF 614C. Although the respective wireless devices 601 may communicate with different network elements from a logical perspective, the network elements may be deployed by a network operator using the same physical network elements.

One or more network slices (e.g., each network slice) may be configured for providing network services with different sets of characteristics. For example, slice A may correspond to an enhanced mobile broadband (eMBB) service. Mobile broadband may refer to internet access by mobile users, commonly associated with smartphones. Slice B may correspond to ultra-reliable low-latency communication (URLLC), which may focus on reliability and speed. Relative to eMBB, URLLC may improve the feasibility of use cases such as autonomous driving and telesurgery. Slice C may correspond to massive machine type communication (mMTC), which may focus on low-power services delivered to a large number of users. For example, slice C may be optimized for a dense network of battery-powered sensors that may provide small amounts of data at regular intervals. Many mMTC use cases may be prohibitively expensive if they operated using an eMBB or URLLC network.

A network slice serving a wireless device 601 may be updated (e.g., to provide better and/or more suitable services), for example, if service requirements for one of the wireless devices 601 changes. The set of network characteristics corresponding to eMBB, URLLC, and mMTC may be varied, such that differentiated species of eMBB, URLLC, and mMTC may be provided for a wireless device. Network operators may provide entirely new services, for example, based on/in response to customer demand.

A wireless device 601 (e.g., each of the wireless devices 601) may have/use (or be associated with) a corresponding network slice. A single slice may serve any number/quantity of wireless devices and a single wireless device may operate using any number/quantity of slices. The AN 602, the UPF 605 and the SMF 614 may be separated into three separate slices, and the AMF 612 may be unsliced. A network operator may deploy any architecture that selectively utilizes any mix of sliced and unsliced network elements, with different network elements divided into different numbers/quantities of slices. Although FIG. 6 shows three core network functions (e.g., the UPF 605, the AMF 612, the SMF 614), other core network functions (e.g., such as other core network functions not shown) may be sliced. A PLMN that supports multiple network slices may maintain a separate network repository function (NFR) for each slice, which may enable other NFs to discover network services associated with that slice.

Network slice selection may be controlled by an AMF, or alternatively, by a separate network slice selection function (NSSF). For example, a network operator may define/configure and implement distinct network slice instances (NSIs). Each NSI may be associated with single network slice selection assistance information (S-NSSAI). The S-NSSAI may comprise a particular slice/service type (SST) indicator (e.g., indicating eMBB, URLLC, mMTC, etc.). For example, a particular tracking area may be associated with one or more configured S-NSSAIs. wireless devices may identify one or more requested and/or subscribed S-NSSAIs (e.g., during registration). The network may indicate to the wireless device one or more allowed and/or rejected S-NSSAIs.

The S-NSSAI may comprise a slice differentiator (SD) to distinguish between different tenants of a particular slice and/or service type. For example, a tenant may be a customer (e.g., a vehicle manufacture, a service provider, etc.) of a network operator that obtains (e.g., purchases) guaranteed network resources and/or specific policies for servicing its subscribers. The network operator may configure different slices and/or slice types, and use the SD to determine which tenant is associated with a particular slice.

FIG. 7A shows an example UP protocol stack. FIG. 7B shows an example CP protocol stack. FIG. 7C shows example services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a PHY layer. PHY layer may correspond to physical infrastructure used for transfer of signals (e.g., cables, fiber optics, and/or radio frequency transceivers). Layer 1 (e.g., in NR protocols) may comprise a PHY layer. Layer 2 may correspond to a data link layer. Layer 2 may correspond to/be associated with packaging of data (into, e.g., data frames) for transfer, between nodes of the network (e.g., using the physical infrastructure of layer 1). Layer 2 (e.g., in NR protocols) may comprise a MAC layer, an RLC layer, a PDCP layer, and an SDAP layer.

Layer 3 may correspond to a network layer. Layer 3 may be associated with routing of the data which has been packaged in layer 2. Layer 3 may handle prioritization of data and traffic avoidance. Layer 3 (e.g., in NR protocols) may comprise an RRC layer and a NAS layer. Layers 4 through 7 may correspond to a transport layer, a session layer, a presentation layer, and an application layer. The application layer may interact with an end user to provide data associated with an application. An end user, implementing the application, may generate data associated with the application and initiate sending of that information to a targeted data network (e.g., the Internet, an application server, etc.). Starting at the application layer, each layer in the OSI model may manipulate and/or repackage the information and/or deliver it to a lower layer. At the lowest layer, the manipulated and/or repackaged information may be exchanged via physical infrastructure (e.g., electrically, optically, and/or electromagnetically). The information, approaching/received at the targeted data network, may be unpackaged and provided to higher layers, for example, until it reaches the application layer in a form that is usable by the targeted data network (e.g., the same form in which it was provided by the end user). The data network may perform this procedure, in reverse, for responding to the end user.

FIG. 7A shows an example UP protocol stack. The UP protocol stack may be an NR protocol stack for a Uu interface between a wireless device 701 and a base station 702. In layer 1 of the UP protocol stack, the wireless device 701 may implement a PHY layer (e.g., PHY 731) and the base station 702 may implement a PHY layer (e.g., PHY 732). In layer 2 of the UP protocol stack, the wireless device 701 may implement a MAC layer (e.g., MAC 741), an RLC layer (e.g., RLC 751), a PDCP layer (e.g., PDCP 761), and an SDAP layer (e.g., SDAP 771). The base station 702 may implement a MAC layer (e.g., MAC 742), an RLC layer (e.g., RLC 752), a PDCP layer (e.g., PDCP 762), and an SDAP layer (e.g., SDAP 772).

FIG. 7B shows a CP protocol stack. The CP protocol stack may be an NR protocol stack for the Uu interface between the wireless device 701 and the base station 702 and/or an N1 interface between the wireless device 701 and an AMF 712. In layer 1 of the CP protocol stack, the wireless device 701 may implement the PHY 731 and the base station 702 may implement the PHY 732. In layer 2 of the CP protocol stack, the wireless device 701 may implement the MAC 741, the RLC 751, the PDCP 761, an RRC layer (e.g., RRC 781), and a NAS layer (e.g., NAS 791). The base station 702 may implement the MAC 742, the RLC 752, the PDCP 762, and an RRC layer (e.g., RRC 782). The AMF 712 may implement a NAS layer (e.g., NAS 792).

The NAS (e.g., NAS 791 and NAS 792) may be concerned with/correspond to the non-access stratum. The non-access stratum may comprise communication between the wireless device 701 and the core network (e.g., the AMF 712). Lower layers may be concerned with/correspond to the access stratum. The access stratum may comprise communication between the wireless device 701 and the base station 702. Messages sent between the wireless device 701 and the core network may be referred to as NAS messages. A NAS message may be relayed by the base station 702 Content of the NAS message (e.g., information elements of the NAS message) may not be visible to the base station 702.

FIG. 7C shows an example of services provided between protocol layers (e.g., of the NR user plane protocol stack shown in FIG. 7A). The wireless device 701 may receive services through a PDU session. The PDU session may be a logical connection between the wireless device 701 and a DN. The wireless device 701 and the DN may exchange data packets associated with the PDU session. The PDU session may comprise one or more QoS flows. The SDAP 771 and/or the SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the base station 702. The wireless device 701 may be notified of the mapping (e.g., based on control signaling and/or reflective mapping). The SDAP 772 of the base station 220 may mark downlink packets with a QFI and/or deliver the downlink packets to the wireless device 701 (e.g., for reflective mapping). The wireless device 701 may determine the mapping based on the QFI of the downlink packets.

The PDCP 761 and the PDCP 762 may perform header compression and/or decompression. Header compression may reduce the amount of data transmitted over the physical layer. The PDCP 761 and the PDCP 762 may perform ciphering and/or deciphering. Ciphering may reduce unauthorized decoding of data sent/transmitted over the physical layer (e.g., intercepted on an air interface), and/or may protect data integrity (e.g., to ensure control messages originate from intended sources). The PDCP 761 and/or the PDCP 762 may perform retransmissions of undelivered packets, in-sequence delivery and/or reordering of packets, duplication of packets, and/or identification and removal of duplicate packets. The PDCP 761 and/or the PDCP 762 may perform mapping between a split radio bearer and RLC channels, for example, in a dual connectivity scenario.

The RLC 751 and the RLC 752 may perform segmentation and retransmission through automatic repeat request (ARQ). The RLC 751 and the RLC 752 may perform removal of duplicate data units received from the MAC 741 and the MAC 742, respectively. The RLC 751 and the RLC 752 may provide RLC channels as a service to the PDCP 761 and the PDCP 762, respectively.

The MAC 741 and/or the MAC 742 may perform multiplexing and/or demultiplexing of logical channels. The MAC 741 and/or the MAC 742 may map logical channels to transport channels. The wireless device 701 may (e.g., in MAC 741) multiplex data units of one or more logical channels into a transport block. The wireless device 701 may send/transmit the transport block to the base station 702 using PHY 731. The base station 702 may receive the transport block using the PHY 732. The base station 702 may demultiplex data units of the transport blocks back into logical channels. The MAC 741 and/or the MAC 742 may perform error correction through hybrid automatic repeat request (HARQ), logical channel prioritization, and/or padding.

The PHY 731 and/or the PHY 732 may perform mapping of transport channels to physical channels. The PHY 731 and/or the PHY 732 may perform digital and analog signal processing functions (e.g., coding/decoding and modulation/demodulation) for sending and receiving information (e.g., transmission via an air interface). The PHY 731 and/or the PHY 732 may perform multi-antenna mapping.

Figure 8:
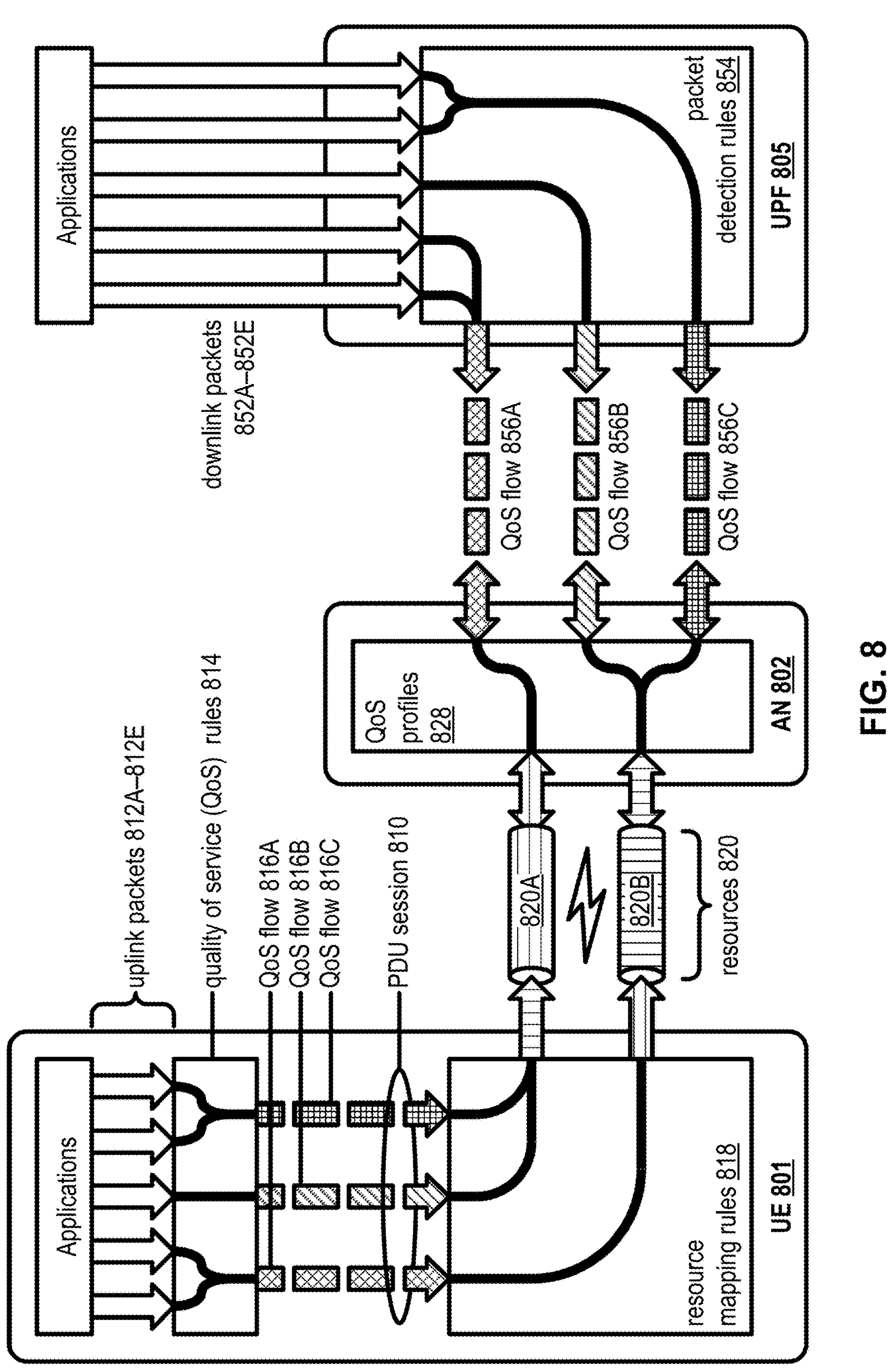
FIG. 8 shows an example quality of service (QoS) model.

FIG. 8 shows an example of a QoS model. The QoS model may be for differentiated data exchange. The QoS model may comprise a wireless device 801, an AN 802, and/or a UPF 805. The QoS model may facilitate prioritization of PDUs (which may also be referred to as packets). Higher-priority packets may be exchanged faster and/or more reliably than lower-priority packets. The network may devote more resources to exchange of high QoS packets (e.g., high priority packets).

A PDU session 810 may be established between the wireless device 801 and the UPF 805. The PDU session 810 may be a logical connection enabling the wireless device 801 to exchange data with a particular data network (e.g., the Internet). The wireless device 801 may request establishment of the PDU session 810. The wireless device 801 may indicate/identify the targeted data network based on its data network name (DNN), for example, at the time that the PDU session 810 is established. The PDU session 810 may be managed by an SMF (not shown). The SMF may select the UPF 805 (and/or optionally, one or more other UPFs, not shown), for example, to facilitate exchange of data associated with the PDU session 810, between the wireless device 801 and the data network.

One or more applications 808 associated with wireless device 801 may generate uplink packets 812A-812E associated with the PDU session 810. The wireless device 801 may apply QoS rules 814 to the uplink packets 812A-812E in accordance with a QoS model. The QoS rules 814 may be associated with the PDU session 810. The QoS rules 814 may be determined by and/or provided to the wireless device 801, for example, based on establishment and/or modification of the PDU session 810 (e.g., if/when the PDU session 810 is established and/or modified). The wireless device 801, based on the QoS rules 814, may classify the uplink packets 812A-812E, map each of the uplink packets 812A-812E to a QoS flow, and/or mark the uplink packets 812A-812E with a QFI. A packet may be sent through the network. A packet may mix with other packets from other wireless devices (e.g., having potentially different priorities). The QFI may indicate how the packet should be handled in accordance with the QoS model. As shown in the example of FIG. 8, uplink packets 812A, 812B may be mapped to a QoS flow 816A, an uplink packet 812C may be mapped to a QoS flow 816B, and the remaining packets may be mapped to QoS flow 816C.

The QoS flows may be the finest granularity of QoS differentiation in a PDU session. In FIG. 8, three QoS flows 816A-816C are shown. A different quantity/number of QoS flows may be present/used (e.g., 1, 2, 4, 5, or any other number/quantity). One or more QoS flows may be associated with a guaranteed bit rate (e.g., guaranteed bit rate (GBR) QoS flows). One or more QoS flows may have bit rates that are not guaranteed (non-GBR QoS flows). QoS flows may be subject to per-wireless device and/or per-session aggregate bit rates. A QoS flow of the QoS flows may be a default QoS flow. QoS flows may have different priorities. For example, the QoS flow 816A may have a higher priority than the QoS flow 816B, which may have a higher priority than the QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may be subject to per-wireless device and/or per-session aggregate bit rates.

The wireless device 801 may apply resource mapping rules 818 to the QoS flows 816A-816C for operating within the QoS model. The air interface between wireless device 801 and/or the AN 802 may be associated with resources 820. The QoS flow 816A may be mapped to resource 820A, and the QoS flows 816B, 816C may be mapped to resource 820B. The resource mapping rules 818 may be provided by the AN 802. The resource mapping rules 818 may designate more resources for relatively high priority QoS flows for meeting QoS requirements. A high priority QoS flow (e.g., the QoS flow 816A) may, based on the resources, be more likely to obtain the high flow bit rate, low packet delay budget, and/or other satisfy other characteristics associated with QoS rules 814. The resources 820 may comprise radio bearers. The radio bearers (e.g., data radio bearers) may be established between the wireless device 801 and the AN 802. The radio bearers in 5G, between the wireless device 801 and the AN 802, may be distinct from bearers in LTE (e.g., evolved packet system (EPS) bearers between a wireless device and a packet data network gateway (PGW), S1 bearers between an eNB and a serving gateway (SGW), and/or an S5/S8 bearer between an SGW and a PGW).

A packet associated with a particular QoS flow may be received at the AN 802 via the resource 820A or the resource 820B. The AN 802 may separate packets into respective QoS flows 856A-856C based on QoS profiles 828. The QoS profiles 828 may be received from an SMF. A QoS profile (e.g., each QoS profile) may correspond to a QFI (e.g., the QFI marked on the uplink packets 812A-812E). A QoS profile (e.g., each QoS profile) may comprise QoS parameters. The QoS parameters may comprise/indicate one or both of 5G QoS identifier (5QI) and/or an allocation and retention priority (ARP). The QoS profile for non-GBR QoS flows may comprise/indicate other/additional QoS parameters (e.g., a reflective QoS attribute (RQA)). The QoS profile for GBR QoS flows may further comprise/indicate additional QoS parameters (e.g., a GFBR, an MFBR, and/or a maximum packet loss rate). The 5QI may be a standardized 5QI having one-to-one mapping to a standardized combination of 5G QoS characteristics. The 5QI may be a dynamically assigned 5QI for which the standardized 5QI values may not be defined. The 5QI may represent 5G QoS characteristics. The 5QI may comprise/indicate one or more of a resource type, a default priority level, a packet delay budget (PDB), a packet error rate (PER), a maximum data burst volume, and/or an averaging window. The resource type may indicate a non-GBR QoS flow, a GBR QoS flow, and/or a delay-critical GBR QoS flow. The averaging window may represent a duration over which the GFBR and/or MFBR may be calculated/determined. The ARP may be a priority level comprising pre-emption capability and a pre-emption vulnerability. The AN 802 may apply admission control for the QoS flows (e.g., if resource limitations are determined), for example, based on the ARP.

The AN 802 may select/determine one or more N3 tunnels for transmission of the QoS flows 856A-856C. The packets (e.g., the uplink packets 812A-812E) may be sent to the UPF 805 (e.g., towards a DN) via the selected one or more N3 tunnels. The UPF 805 may verify that the QFIs of the uplink packets 812A-812E are aligned with the QoS rules 814 provided to the wireless device 801. The UPF 805 may measure, count packets, and/or provide packet metrics to one or more other entities in the network (e.g., a NF such as a PCF).

FIG. 8 shows a process that may comprise downlink transmissions. One or more applications may generate downlink packets 852A-852E. The UPF 805 may receive the downlink packets 852A-852E from one or more DNs and/or one or more other UPFs. The UPF 805 may apply PDRs 854 to downlink the packets 852A-852E, for example, based on the QoS model. The UPF 805 may map, based on the PDRs 854, the packets 852A-852E into QoS flows. As shown in FIG. 8, downlink packets 852A, 852B may be mapped to a QoS flow 856A, downlink packet 852C may be mapped to a QoS flow 856B, and/or the remaining packets may be mapped to a QoS flow 856C.

The QoS flows 856A-856C may be sent to the AN 802. The AN 802 may apply resource mapping rules to the QoS flows 856A-856C. The QoS flow 856A may be mapped to the resource 820A. The QoS flows 856B, 856C may be mapped to the resource 820B. The resource mapping rules may designate more resources to high priority QoS flows in order to meet QoS requirements.

FIGS. 9A-9D show example states and state transitions of a wireless device. The wireless device, at any given time, may have (or be associated with) one or more of an RRC state, a registration management (RM) state, and/or a connection management (CM) state.

Figure 9A:
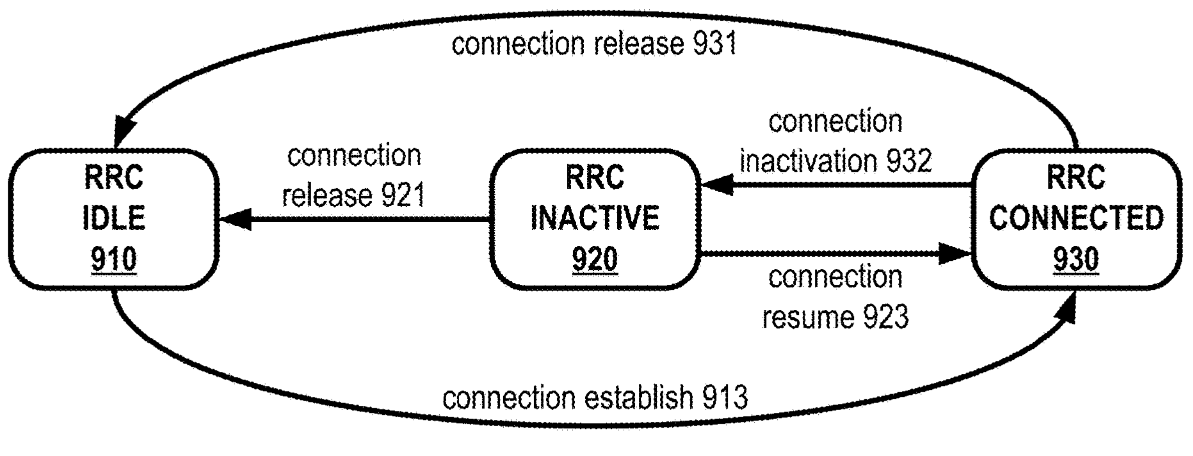
FIG. 9A, FIG. 9B, FIG. 9C, and FIG. 9D show example states and state transitions of a wireless device.

FIG. 9A shows RRC state transitions of a wireless device. The wireless device may be in one of three RRC states: RRC idle 910 (e.g., RRC_IDLE), RRC inactive 920 (e.g., RRC_INACTIVE), or RRC connected 930 (e.g., RRC_CONNECTED). The wireless device may implement/apply/use different RAN-related control plane procedures, for example, depending on the RRC state of the wireless device. Other elements of the network (e.g., a base station) may track RRC state(s) of one or more wireless devices and/or implement/apply/use RAN-related control plane procedures appropriate to an RRC state of each wireless device.

The wireless device may exchange data with a network (e.g., a base station) in an RRC connected state (e.g., RRC connected 930). The parameters necessary for exchange of data may be established and/or may be known to both the wireless device and the network. The parameters may be referred to (and/or may be included in) an RRC context of the wireless device (e.g., which may be referred to as a wireless device context). The parameters may comprise, for example, one or more access stratum (AS) contexts, one or more radio link configuration parameters, bearer configuration information (e.g., relating to a data radio bearer, signaling radio bearer, logical channel, QoS flow, and/or PDU session), security information, and/or PHY layer, MAC layer, RLC layer, PDCP layer, and/or SDAP layer configuration information. The base station with which the wireless device may be connected may store the RRC context of the wireless device.

Mobility of the wireless device, in the RRC connected state, may be managed by the access network. The wireless device may manage mobility, for example, if the wireless device is in an RRC idle state (e.g., the RRC idle 910) and/or an RRC inactive state (e.g., the RRC inactive 920). The wireless device may manage mobility, for example, by measuring signal levels (e.g., reference signal levels) of signals from a serving cell and neighboring cells, and/or by reporting measurements to the base station currently serving the wireless device. The network may initiate handover, for example, based on the reported measurements. The RRC state may transition from the RRC connected state to the RRC idle state via a connection release procedure 930. The RRC state may transition from the RRC connected state to the RRC inactive state via a connection inactivation procedure 932.

An RRC context may not be established for the wireless device. For example, this may be during the RRC idle state. During the RRC idle state (e.g., the RRC idle 910), an RRC context may not be established for the wireless device. During the RRC idle state (e.g., the RRC idle 910), the wireless device may not have an RRC connection with the base station. During the RRC idle state (e.g., the RRC idle 910), the wireless device may be in a sleep state for the majority of the time (e.g., to conserve battery power). The wireless device may wake up periodically (e.g., each discontinuous reception (DRX) cycle) to monitor for paging messages (e.g., paging messages set from the AN). Mobility of the wireless device may be managed by the wireless device via a procedure of a cell reselection. The RRC state may transition from the RRC idle state (e.g., the RRC idle 910) to the RRC connected state (e.g., the RRC connected 930) via a connection establishment procedure 913, which may involve a random access procedure.

A previously established RRC context may be maintained for the wireless device. For example, this may be during the RRC inactive state. During the RRC inactive state (e.g., the RRC inactive 920), the RRC context previously established may be maintained in the wireless device and the base station. The maintenance of the RRC context may enable/allow a fast transition to the RRC connected state (e.g., the RRC connected 930) with reduced signaling overhead as compared to the transition from the RRC idle state (e.g., the RRC idle 910) to the RRC connected state (e.g., the RRC connected 930). The RRC state may transition from the RRC inactive state (e.g., the RRC inactive 920) to the RRC connected state (e.g., the RRC connected 930) via a connection resume procedure 923. The RRC state may transition from the RRC inactive state (e.g., the RRC inactive 920) to the RRC idle state (e.g., the RRC idle 910) via a connection release procedure 921 that may be the same as or similar to connection release procedure 931.

An RRC state may be associated with a mobility management mechanism. During the RRC idle state (e.g., RRC idle 910) and the RRC inactive state (e.g., the RRC inactive 920), mobility may be managed/controlled by the wireless device via a cell reselection. The purpose of mobility management during the RRC idle state (e.g., the RRC idle 910) or during the RRC inactive state (e.g., the RRC inactive 920) may be to enable/allow the network to be able to notify the wireless device of an event via a paging message without having to broadcast the paging message over the entire mobile communications network. The mobility management mechanism used during the RRC idle state (e.g., the RRC idle 910) and/or during the RRC inactive state (e.g., the RRC inactive 920) may enable/allow the network to track the wireless device on a cell-group level, for example, so that the paging message may be broadcast over the cells of the cell group that the wireless device currently resides within (e.g., instead of sending the paging message over the entire mobile communication network). The mobility management mechanisms may be based on different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN may send to the wireless device a list of TAIs associated with a wireless device registration area (e.g., a wireless device registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 920), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 920).

Figure 9B:
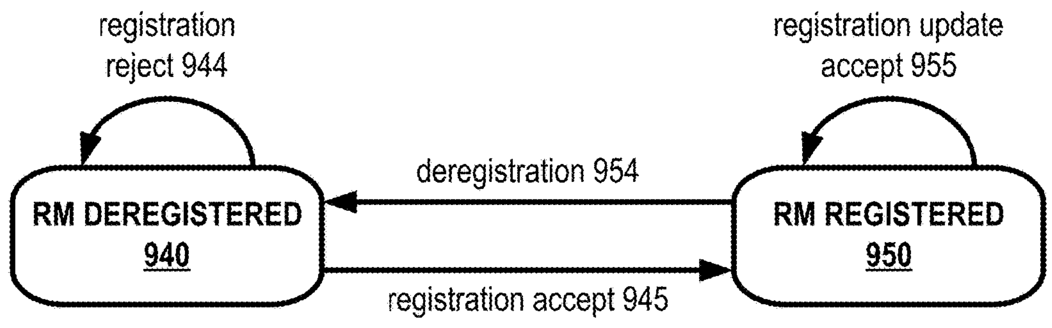

FIG. 9B shows example registration management (RM) state transitions of a wireless device. The states may be RM deregistered 940, (e.g., an RM deregistered state, RM-DEREGISTERED) and RM registered 950 (e.g., an RM deregistered state, RM-REGISTERED).

The wireless device (e.g., in RM deregistered state) may not be registered with the network, and/or the wireless device may not be reachable by the network. The wireless device may perform an initial registration, for example, in order to be reachable by the network. The wireless device may register with an AMF of the network. The wireless device may remain in the RM deregistered state, for example, if registration is rejected (e.g., via a registration reject procedure 944). The wireless device may transition to the RM registered state, for example, if the registration is accepted (e.g., via a registration accept procedure 945). The network may store, keep, and/or maintain a wireless device context for the wireless device, for example, if (e.g., while) the wireless device is in RM registered state. The wireless device context corresponding to network registration (e.g., maintained by the core network) may be different from the RRC context corresponding to RRC state (e.g., maintained by an access network or an element thereof, such as a base station). The wireless device context may comprise a wireless device indicator/identifier and a record of information relating to the wireless device. The information relating to the wireless device may comprise one or more of wireless device capability information, policy information for access and mobility management of the wireless device, lists of allowed or established slices or PDU sessions, and/or a registration area of the wireless device (i.e., a list of tracking areas covering the geographical area where the wireless device is likely to be found).

The network may store the wireless device context of the wireless device, for example, if (e.g., while) the wireless device is in an RM registered state. The network may (e.g., if necessary) use the wireless device context to reach/communicate the wireless device, for example, if (e.g., while) the wireless device is in an RM registered state. Some services may not be provided by the network unless the wireless device is registered. The wireless device may update its wireless device context while remaining in the RM registered state (e.g., via a registration update accept procedure 955). The wireless device may provide a tracking area indicator/identifier to the network, for example, if the wireless device leaves one tracking area and enters another tracking area. The network may deregister the wireless device, or the wireless device may deregister itself (e.g., via a deregistration procedure 954). The network may automatically deregister the wireless device if the wireless device is inactive for a certain amount of time. The wireless device may transition to the RM deregistered state, for example, based on the deregistration.

Figure 9C:
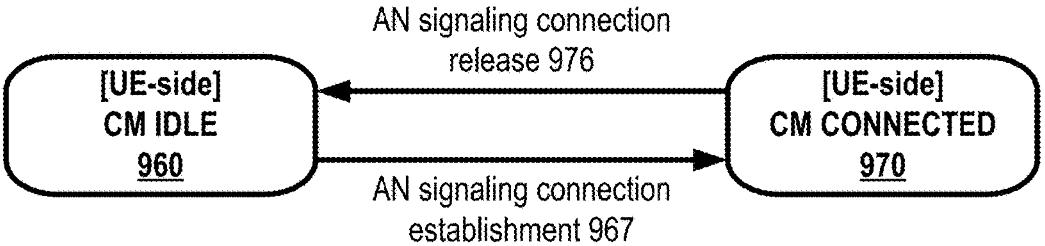

FIG. 9C shows example connection management (CM) state transitions of a wireless device. The example CM state transitions of the wireless device as shown in FIG. 9C are from a perspective of the wireless device. The wireless device may be in CM idle 960 (e.g., CM idle state, CM-IDLE) or CM connected 970 (e.g., CM connected state, CM-CONNECTED).

The wireless device may not have a NAS signaling connection with the network, for example, if the wireless device is in a CM idle state. The wireless device may not communicate with core network functions, for example, based on not having the NAS signaling connection. The wireless device may transition to a CM connected state by establishing an AN signaling connection (e.g., via an AN signaling connection establishment procedure 967). The transition may be initiated by sending an initial NAS message. The initial NAS message may be a registration request (e.g., if the wireless device is in an RM deregistered state) or a service request (e.g., if the wireless device is in an RM registered state). The wireless device may initiate the AN signaling connection establishment by sending a service request and/or the network may send a page (e.g., triggering the wireless device to send the service request), for example, If the wireless device is in an RM registered state.

The wireless device may communicate with core network functions using NAS signaling, for example, if the wireless device is in a CM connected state. For example, the wireless device may exchange (e.g., send and/or receive) NAS signaling with an AMF for registration management purposes, service request procedures, and/or authentication procedures. The wireless device may exchange NAS signaling, with an SMF, to establish and/or modify a PDU session. The network may disconnect the wireless device, or the wireless device may disconnect itself (e.g., via an AN signaling connection release procedure 976). The wireless device may transition to the CM idle state, for example, if the wireless device transitions to the RM deregistered state. The network may deactivate a user plane connection of a PDU session of the wireless device, for example, based on the wireless device transitioning to the CM idle state.

Figure 9D:
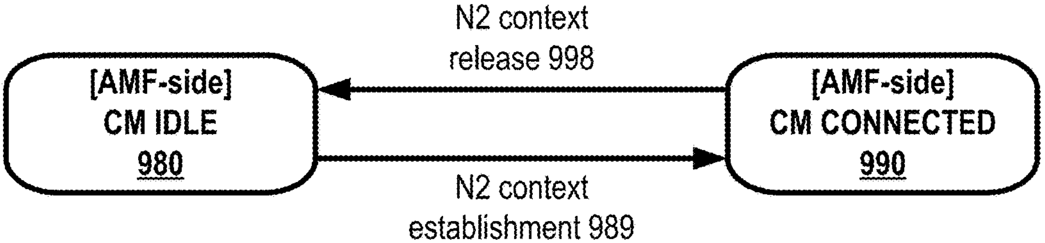

FIG. 9D shows example CM state transitions of the wireless device. The example CM state transitions of the wireless device as shown in FIG. 9D may be from a network perspective (e.g., an AMF perspective). The CM state of the wireless device, as tracked by the AMF, may be CM idle 980 (e.g., CM idle state, CM-IDLE) or CM connected 990 (e.g., CM connected state, CM-CONNECTED). The AMF many establish an N2 context of the wireless device (e.g., via an N2 context establishment procedure 989), for example, based on the wireless device transitioning from CM idle 980 to CM connected 990. The AMF may release the N2 context of the wireless device (e.g., via an N2 context release 998 procedure), for example, based on the wireless device transitioning from CM connected 990 to CM idle 980.

Figure 10:
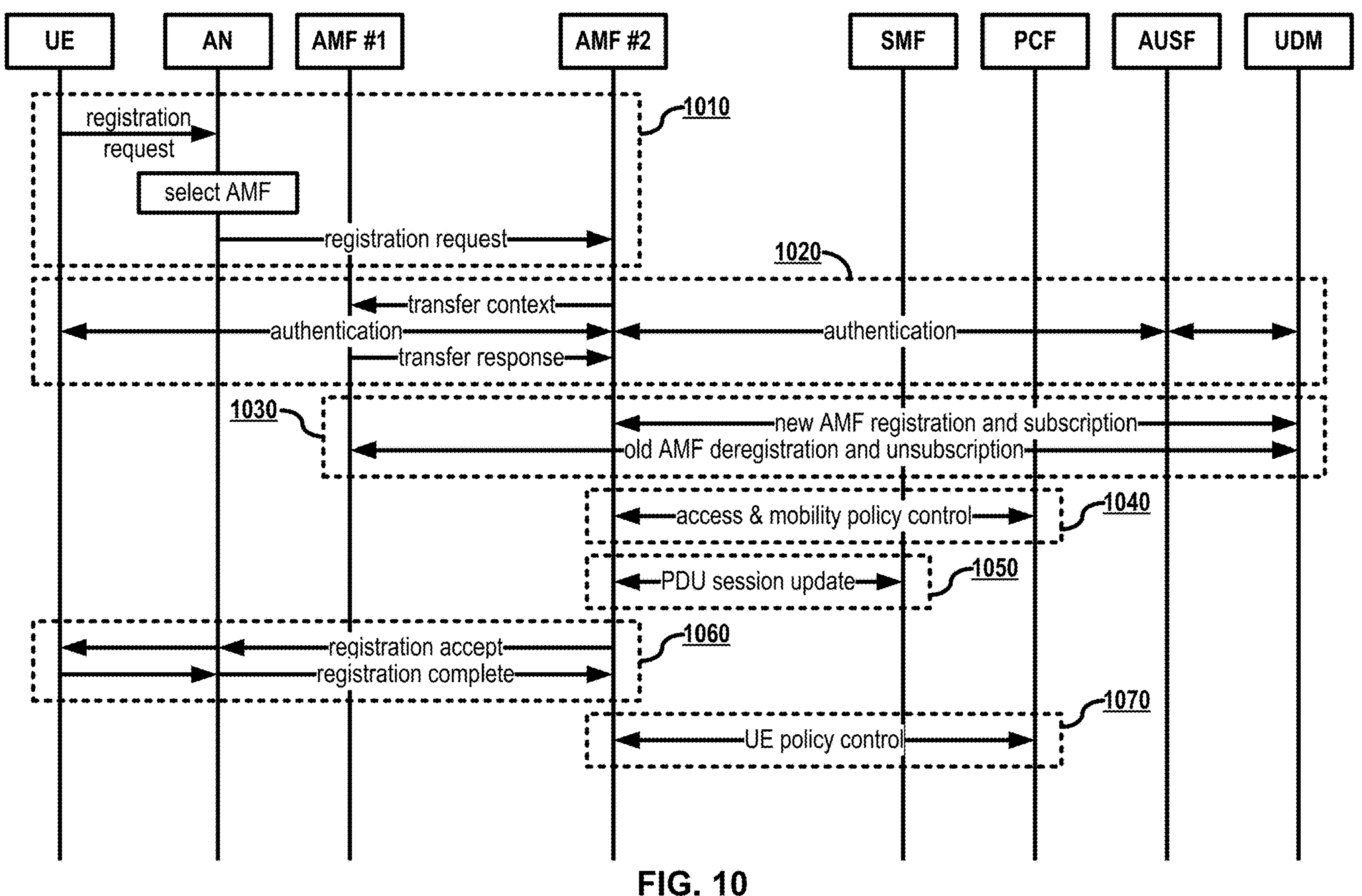
FIG. 10 shows an example registration procedure for a wireless device.
Figure 11:
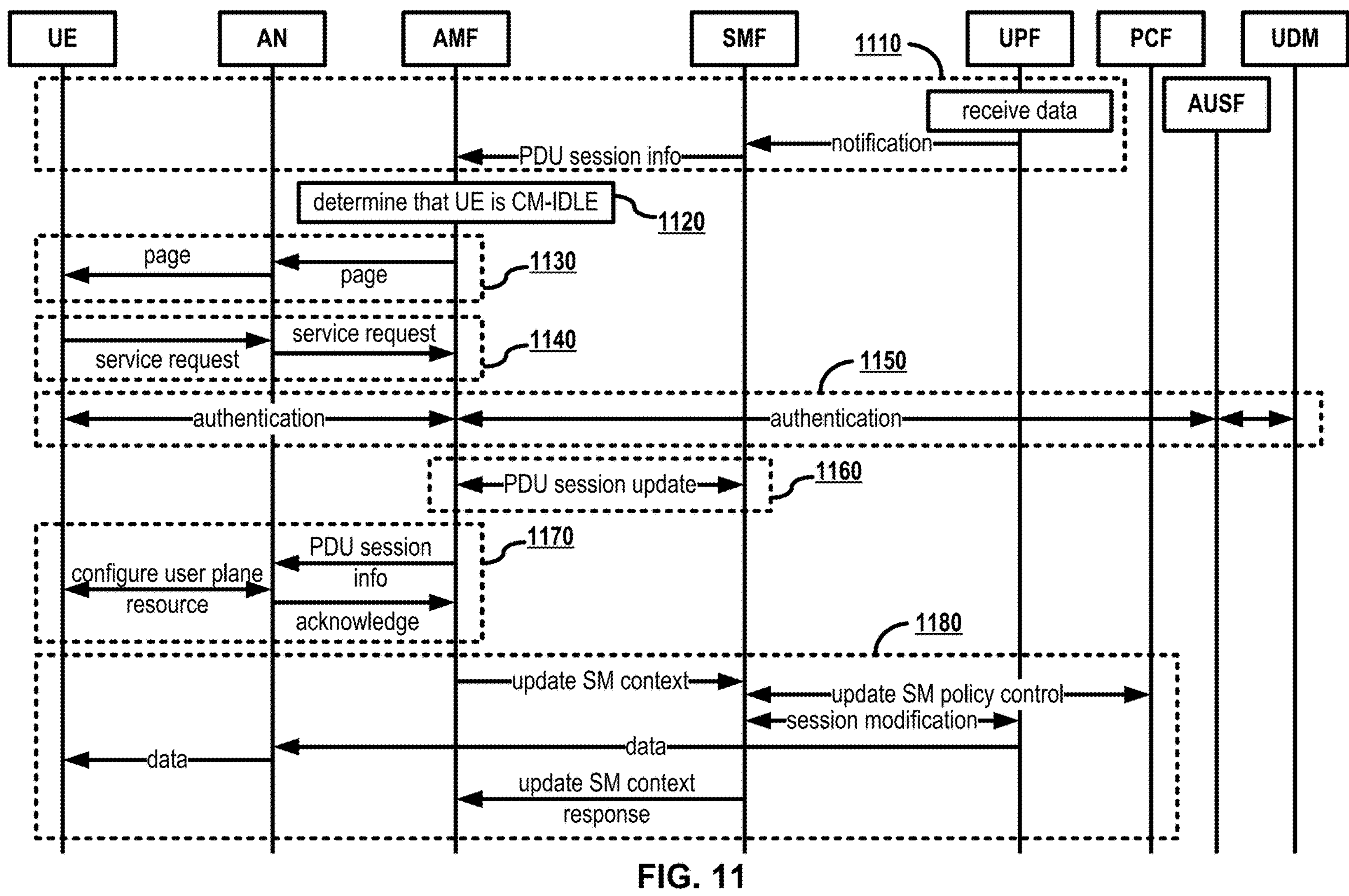
FIG. 11 shows an example service request procedure for a wireless device.
Figure 12:
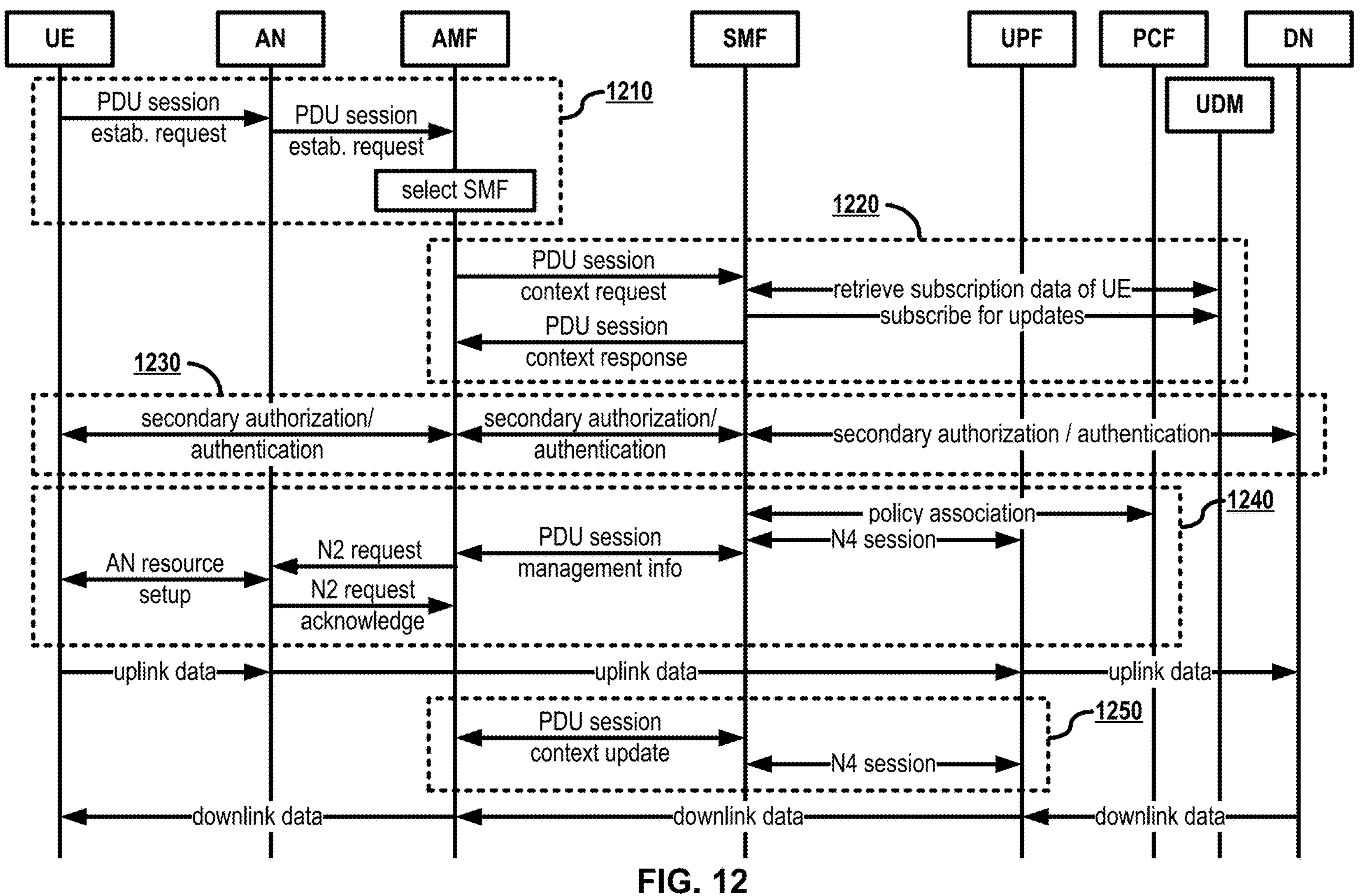
FIG. 12 shows an example of a protocol data unit session establishment procedure for a wireless device.

FIG. 10, FIG. 11, and FIG. 12 show example procedures for registering, service request, and PDU session establishment of a wireless device. FIG. 10 shows an example registration procedure for a wireless device. The wireless device 1002 may transition from an RM deregistered state (e.g., RM deregistered 940) to an RM registered state (e.g., RM registered 950), for example, based on the registration procedure.

Registration may be initiated by a wireless device 1002 for obtaining authorization to receive services, enabling mobility tracking, enabling reachability, and/or any other purpose. The wireless device 1002 may perform an initial registration (e.g., as a first step toward connecting to the network). For example, the wireless device 1002 may perform an initial registration based on the wireless device being powered on (e.g., if the wireless device is powered on), based on an airplane mode being turned off (e.g., if an airplane mode is turned off), and/or based on one or more other conditions and/or events. Registration may be performed periodically which may keep the network informed of the wireless device's presence (e.g., while the wireless device 1002 is in a CM idle state). Registration may be performed based on (e.g., in response to) a change in wireless device capability and/or registration area. Deregistration (not shown in FIG. 10) may be performed to stop network access.

At step 1010, the wireless device 1002 may send/transmit a registration request to an AN 1004. For example, the wireless device 1002 may have moved from a coverage area of a previous AMF (e.g., AMF 1006) into a coverage area of a new AMF (e.g., AMF 1008). The registration request may be/comprise a NAS message. The registration request may comprise a wireless device identifier. The AN 1004 may determine/select an AMF for registration of the wireless device. The AN 1004 may select a default AMF, or may determine/select an AMF that is already mapped to the wireless device 1002 (e.g., a previous AMF). The NAS registration request may comprise a network slice identifier. The AN 1004 may determine/select an AMF based on the requested slice. The AN 1004 may send the registration request to the selected AMF, for example, based on determination of the selected AMF. The selected AMF (e.g., AMF 1008) may receive the registration request.

At step 1020, the AMF that receives the registration request (e.g., AMF 1008) may perform a context transfer. The context may be a wireless device context (e.g., an RRC context for the wireless device). The AMF 1008 may send, to the AMF 1006, a message (e.g., an Namf_Communication_UEContextTransfer message) requesting a context of the wireless device. The message may comprise the wireless device indicator/identifier. The AMF 1006 may send, to the AMF 1008, a message (e.g., an Namf_Communication_UEContextTransfer message) that comprises the requested wireless device context. The AMF 1008 may coordinate authentication of the wireless device 1002, for example, based on receiving the wireless device context. The AMF 1008 may send, to the AMF 1006 and based on completion of authentication, a message (e.g., an Namf_Communication_UEContextTransfer Response message) indicating that the wireless device context transfer is complete.

The authentication may involve participation of one or more of the wireless device 1002, an AUSF 1016, a UDM 1018 and/or a UDR (not shown). The AMF 1008 may request that the AUSF 1016 authenticate the wireless device 1002. The AUSF may execute authentication of the wireless device 1002 (e.g., based on the request). The AUSF 1016 may get authentication data from the UDM 1018. The AUSF 1016 may send, to the AMF 1008, a subscription permanent identifier (SUPI), for example, based on the authentication being successful. The AUSF 1016 may provide an intermediate key to the AMF 1008. The intermediate key may be used to derive an access-specific security key for the wireless device 1002. The access-specific security key may enable the AMF 1008 to perform security context management (SCM). The AUSF 1016 may obtain subscription data from the UDM 1018. The subscription data may be based on information obtained from the UDM 1018 (and/or the UDR). The subscription data may comprise subscription identifiers/indicators, security credentials, access and mobility related subscription data, and/or session related data.

At step 1030, the AMF 1008 may register and/or subscribe to the UDM 1018. The AMF 1008 may perform registration using a wireless device context management service of the UDM 1018 (e.g., Nudm_UECM). The AMF 1008 may obtain subscription information of the wireless device 1002 using a subscriber data management service of the UDM 1018 (e.g., Nudm_SDM). The AMF 1008 may further request that the UDM 1018 notify/send a notification to the AMF 1008 if the subscription information of the wireless device 1002 changes. The AMF 1006 may deregister and unsubscribe, for example, based on the AMF 1008 registering and/or subscribing. The AMF 1006 may no longer need to perform mobility management of the wireless device 1006, for example, based on (e.g., after) deregistering.

At step 1040, the AMF 1008 may retrieve access and mobility (AM) policies from the PCF 1014. The AMF 1008 may provide subscription data of the wireless device 1002 to the PCF 1014. The PCF 1014 may determine access and mobility policies for the wireless device 1002, for example, based on the subscription data, network operator data, current network conditions, and/or other suitable information. For example, the owner/user of a first wireless device may purchase a higher level of service than the owner/user of a second wireless device. The PCF 1014 may provide the rules associated with the different levels of service. The network may apply different policies which facilitate different levels of service, for example, based on the subscription data of the respective wireless devices.

Access and mobility policies may relate to (e.g., may be based on and/or comprise) service area restrictions, radio access technology (RAT) frequency selection priority (RFSP), authorization and prioritization of access type (e.g., LTE versus NR), and/or selection of non-3GPP access (e.g., access network discovery and selection policy (ANDSP)). The service area restrictions may comprise list(s) of tracking areas where the wireless device is allowed to be served (and/or forbidden from being served). The access and mobility policies may comprise a wireless device (e.g., UE) route selection policy (URSP) that may influence routing to an established PDU session and/or a new PDU session. Different policies may be obtained and/or be enforced based on subscription data of the wireless device, location of the wireless device (e.g., location of the AN and/or AMF), and/or other suitable factors.

At step 1050, the AMF 1008 may update a context of a PDU session. The AMF 1008 may coordinate/communicate with an SMF (e.g., SMF 1012) to activate a user plane connection associated with an existing PDU session, for example, if the wireless device has/is associated with the existing PDU session. The SMF 1012 may update and/or release a session management context of the PDU session (e.g., Nsmf_PDUSession_UpdateSMContext, Nsmf_PDUSession_ReleaseSMContext).

At step 1060, the AMF 1008 may send a registration accept message to the AN 1004. The AN 1004 may forward the registration accept message to the wireless device 1002. The registration accept message may comprise a new wireless device indicator/identifier and/or a new configured slice indicator/identifier. The wireless device 1002 may send/transmit a registration complete message to the AN 1004. The AN 1004 may forward the registration complete message to the AMF 1008. The registration complete message may acknowledge receipt of the new wireless device identifier and/or new configured slice identifier.

At step 1070, the AMF 1008 may receive/obtain wireless device policy control information from the PCF 1014. The PCF 1014 may send/provide an ANDSP (e.g., to facilitate non-3GPP access). The PCF 1014 may provide URSP to facilitate mapping of particular data traffic to particular PDU session connectivity parameters. The URSP may indicate that data traffic associated with a particular application should be mapped to a particular SSC mode, network slice, PDU session type, and/or preferred access type (e.g., 3GPP or non-3GPP).

FIG. 11 shows an example service request procedure for a wireless device. The service request procedure may be a network-triggered service request procedure for a wireless device in a CM idle state. Other service request procedures (e.g., a wireless device-triggered service request procedure) may be performed in a manner similar to that described with reference to FIG. 11.

At step 1110, a UPF 1112 may receive data. The data may be downlink data for transmission to a wireless device (e.g., wireless device 1102). The data may be associated with an existing PDU session between the wireless device 1102 and a DN. The data may be received from a DN and/or another UPF. The UPF 1112 may buffer the received data. The UPF 1112 may notify an SMF (e.g., SMF 1108) of the received data, for example, based on (e.g., in response to) receiving the data. The identity of the SMF to be notified may be determined based on the received data. The notification may be an N4 session report. The notification may indicate that the UPF 1112 has received data associated with the wireless device 1102 and/or a particular PDU session associated with the wireless device 1102. The SMF 1108 may send PDU session information to an AMF 1106, for example, based on (e.g., in response to) receiving the notification. The PDU session information may be sent in an N1N2 message transfer for forwarding to an AN 1104. The PDU session information may comprise UPF tunnel endpoint information and/or QoS information.

At step 1120, the AMF 1106 may determine that the wireless device 1102 is in a CM idle state. The determining may be based on (e.g., in response to) the receiving of the PDU session information. The service request procedure may proceed to steps 1130 and 1140, for example, based on the determination that the wireless device is in CM idle state. The steps 1130 and 1140 may be skipped, and the service request procedure may proceed directly to 1150, for example, based on determining that the wireless device is not in CM idle state (e.g., the wireless device is in CM connected state).

At step 1130, the AMF 1106 may page the wireless device 1102. The paging at step 1130 may be performed based on the wireless device being in a CM idle state. The AMF 1106 may send a page to the AN 1104 to perform the paging. The page may be referred to as a paging or a paging message. The page may be an N2 request message. The AN 1104 may be one of a plurality of ANs in a RAN notification area of the wireless device 1102. The AN may send a page to the wireless device 1102. The wireless device 1102 may be in a coverage area of the AN 1104 and may receive the page.

At step 1140, the wireless device 1102 may request service. The wireless device 1102 may send/transmit a service request to the AMF 1106 via the AN 1104. The wireless device 1102 may request service at step 1140, for example, based on (e.g., in response to) receiving the paging at step 1130. The wireless device 1102 may receive the page and request service based on the service request procedure being a network-triggered service request procedure. The wireless device 1102 may commence a wireless device-triggered service request procedure in some scenarios (e.g., if uplink data becomes available at the wireless device). The wireless device-triggered service request procedure may commence starting at step 1140 (e.g., one or more of steps 1110 and 1120 may be skipped).

At step 1150, the network may authenticate the wireless device 1102. Authentication may require participation of the wireless device 1102, an AUSF 1116, and/or a UDM 1118 (e.g., as described herein). The authentication at step 1150 may be skipped, for example, in one or more scenarios (e.g., if the wireless device 1102 has recently been authenticated).

At step 1160, the AMF 1106 and the SMF 1108 may perform a PDU session update. The PDU session update may comprise the SMF 1108 providing, to the AMF 1106, with one or more UPF tunnel endpoint identifiers. The SMF 1108 may coordinate with one or more other SMFs and/or one or more other UPFs to set up a user plane.

At step 1170, the AMF 1106 may send PDU session information to the AN 1104. The PDU session information may be included in an N2 request message. The AN 1104 may configure a user plane resource for the wireless device 1102, for example, based on the PDU session information. The AN 1104 may perform an RRC reconfiguration of the wireless device 1102, for example, to configure the user plane resource. The AN 1104 may acknowledge the AMF 1106 (e.g., send an acknowledgment message to the AMF 1106 indicating) that the PDU session information has been received. The AN 1104 may notify the AMF 1106 (e.g., via the acknowledgment message) that the user plane resource has been configured, and/or provide information relating to the user plane resource configuration.

The wireless device 1102 may receive (e.g., at step 1170), for a wireless device-triggered service procedure, a NAS service accept message from the AMF 1106 via the AN 1104. The wireless device 1102 may send/transmit uplink data (e.g., the uplink data that caused the wireless device 1102 to trigger the service request procedure), for example, based on (e.g., after) configuring the user plane resource.

At step 1180, the AMF 1106 may update a session management (SM) context of the PDU session. The AMF 1106 may notify the SMF 1108 (and/or one or more other associated SMFs) that the user plane resource has been configured, and/or may provide information relating to the user plane resource configuration. The AMF 1106 may provide/send to the SMF 1108 (and/or one or more other associated SMFs) one or more AN tunnel endpoint identifiers/indicators of the AN 1104. The SMF 1108 may send an update SM context response message to the AMF 1106, for example, based on (e.g., after) the SM context update being complete.

The SMF 1108 may update a PCF (e.g., the PCF 1114) for purposes of policy control, for example, based on the update of the session management context. For example, the SMF 1108 may notify (e.g., via PCF 1114 update) the PCF 1114 of a new location of the wireless device 1102 if a location of the wireless device 1102 has changed. The SMF 1108 and the UPF 1112 may perform a session modification, for example, based on the update of the session management context. The session modification may be performed using N4 session modification messages. The UPF 1112 may send/transmit downlink data (e.g., the downlink data that caused the UPF 1112 to trigger the network-triggered service request procedure) to the wireless device, for example, based on the session modification being completed. The sending/transmitting of the downlink data may be based on the one or more AN tunnel endpoint identifiers of the AN 1104.

FIG. 12 shows an example PDU session establishment procedure for a wireless device. The wireless device 1202 may determine to send/transmit a PDU session establishment request (e.g., for the PDU session establishment procedure) to create a new PDU session, to hand over an existing PDU session to a 3GPP network, and/or for any other suitable reason.

At step 1210, the wireless device 1202 may initiate PDU session establishment. The wireless device 1202 may send/transmit a PDU session establishment request, via an AN 1204, to an AMF 1206. The PDU session establishment request may be a NAS message. The PDU session establishment request may indicate/comprise one or more of: a PDU session indicator/ID; a requested PDU session type (e.g., whether the requested PDU session is new or existing); a requested DN (e.g., a DNN); a requested network slice (S-NSSAI); a requested SSC mode; and/or any other suitable information. The PDU session ID may be generated by the wireless device 1202. The PDU session type may be, for example, an Internet Protocol (IP)-based type (e.g., IPv4, IPv6, or dual stack IPv4/IPv6), an Ethernet type, or an unstructured type.

The AMF 1206 may determine/select an SMF (e.g., SMF 1208) based on the PDU session establishment request. The requested PDU session may, in at least some scenarios, already be associated with a particular SMF. For example, the AMF 1206 may store a wireless device context of the wireless device 1202, and the wireless device context may indicate that the PDU session ID of the requested PDU session is already associated with the particular SMF. In some scenarios, the AMF 1206 may select the SMF based on a determination that the SMF is prepared to handle the requested PDU session. For example, the requested PDU session may be associated with a particular DNN and/or S-NSSAL. The SMF may be selected based on a determination that the SMF can manage a PDU session associated with the particular DNN and/or S-NSSAI.

At step 1220, the network may manage a context of the PDU session. The AMF 1206 may send a PDU session context request to the SMF 1208, for example, based on (e.g., after) selecting the SMF 1208 at 1210. The PDU session context request may comprise the PDU session establishment request received from the wireless device 1202 at step 1210. The PDU session context request may be a Nsmf_PDUSession_CreateSMContext Request and/or a Nsmf_PDUSession_UpdateSMContext Request. The PDU session context request may indicate/comprise indicators/identifiers of the wireless device 1202; the requested DN; and/or the requested network slice. The SMF 1208 may retrieve subscription data from a UDM 1216, for example, based on the PDU session context request. The subscription data may be session management subscription data of the wireless device 1202. The SMF 1208 may subscribe for updates to the subscription data. The PCF 1208 may send, to the SMF 1208, new information if the subscription data of the wireless device 1202 changes, for example, based on the SMF 1208 subscribing for the updates. The SMF 1208 may send/transmit a PDU session context response to the AMF 1206, for example, based on (e.g., after) receiving/obtaining the subscription data of the wireless device 1202. The PDU session context response may be a Nsmf_PDUSession_CreateSMContext Response and/or a Nsmf_PDUSession_UpdateSMContext Response. The PDU session context response may include/comprise a session management context ID.

At step 1230, secondary authorization/authentication may be performed, if necessary. The secondary authorization/authentication may involve the wireless device 1202, the AMF 1206, the SMF 1208, and/or the DN 1218. The SMF 1208 may access the DN 1218 via a server (e.g., a data network authentication, authorization, and accounting (DN AAA) server).

At step 1240, the network may set up a data path for uplink data associated with the PDU session. The SMF 1208 may select/determine a PCF (e.g., a PCF 1214). The SMF 1208 may establish a session management policy association. The PCF 1214 may provide an initial set of policy control and charging rules (PCC rules) for the PDU session, for example, based on the association. The PCF 1214 may (e.g., if targeting a particular PDU session) indicate, to the SMF 1208, one or more of a method for allocating an IP address to the PDU Session, a default charging method for the PDU session, an address of the corresponding charging entity, triggers for requesting new policies, and/or any other method, action, and/or information. The PCF 1214 may target a service data flow (SDF) comprising one or more PDU sessions. The PCF may (e.g., if targeting an SDF) indicate, to the SMF 1208, policies for one or more of applying QoS requirements, monitoring traffic (e.g., for charging purposes), steering traffic (e.g., by using one or more particular N6 interfaces), and/or any other purpose.

The SMF 1208 may determine and/or allocate an IP address for the PDU session. The SMF 1208 may select one or more UPFs (e.g., a single UPF 1212 as shown in FIG. 12) to handle the PDU session. The SMF 1208 may send an N4 session message to the selected UPF 1212. The N4 session message may be an N4 session establishment request and/or an N4 session modification request. The N4 session message may include/comprise packet detection, enforcement, and/or reporting rules associated with the PDU session. The UPF 1212 may acknowledge the N4 session message by sending an N4 session establishment response and/or an N4 session modification response.

The SMF 1208 may send PDU session management information to the AMF 1206. The PDU session management information may be/comprise a Namf_Communication_N1N2MessageTransfer message. The PDU session management information may include/comprise the PDU session ID. The PDU session management information may be/comprise a NAS message. The PDU session management information may include/comprise N1 session management information and/or N2 session management information. The N1 session management information may include/comprise a PDU session establishment accept message. The PDU session establishment accept message may include/comprise tunneling endpoint information of the UPF 1212 and QoS information associated with the PDU session.

The AMF 1206 may send an N2 request to the AN 1204. The N2 request may include/comprise the PDU session establishment accept message. The AN 1204 may determine AN resources for the wireless device 1202, for example, based on the N2 request. The AN resources may be used by the wireless device 1202 to establish the PDU session, via the AN 1204, with the DN 1218. The AN 1204 may determine resources to be used for the PDU session and indicate, to the wireless device 1202, the determined resources. The AN 1204 may send the PDU session establishment accept message to the wireless device 1202. The AN 1204 may perform an RRC reconfiguration of the wireless device 1202. The AN 1204 may send an N2 request acknowledge to the AMF 1206, for example, based on (e.g., after) the AN resources being set up. The N2 request acknowledge may include/comprise N2 session management information (e.g., the PDU session ID and tunneling endpoint information of the AN 1204).

The wireless device 1202 may (e.g., optionally) send uplink data associated with the PDU session, for example, based on the data path for uplink data being set up (e.g., at step 1240). The uplink data may be sent to a DN 1218, associated with the PDU session, via the AN 1204 and the UPF 1212.

At step 1250, the network may update the PDU session context. The AMF 1206 may send/transmit a PDU session context update request to the SMF 1208. The PDU session context update request may be a Nsmf_PDUSession_UpdateSMContext request. The PDU session context update request may comprise the N2 session management information received from the AN 1204. The SMF 1208 may acknowledge (e.g., send an acknowledgment message based on/in response to) the PDU session context update. The acknowledgement may be a Nsmf_PDUSession_UpdateSMContext response. The acknowledgement may comprise a subscription requesting that the SMF 1208 be notified of any wireless device mobility event. The SMF 1208 may send an N4 session message to the UPF 1212, for example, based on the PDU session context update request. The N4 session message may be an N4 session modification request. The N4 session message may comprise tunneling endpoint information of the AN 1204. The N4 session message may comprise forwarding rules associated with the PDU session. The UPF 1212 may acknowledge (e.g., reception of the N4 session message) by sending an N4 session modification response.

The UPF 1212 may relay downlink data associated with the PDU session, for example, based on (e.g., after) the UPF 1212 receiving the tunneling endpoint information of the AN 1204 The downlink data may be received from a DN 1218, associated with the PDU session, via the AN 1204 and the UPF 1212.

Figure 13A:
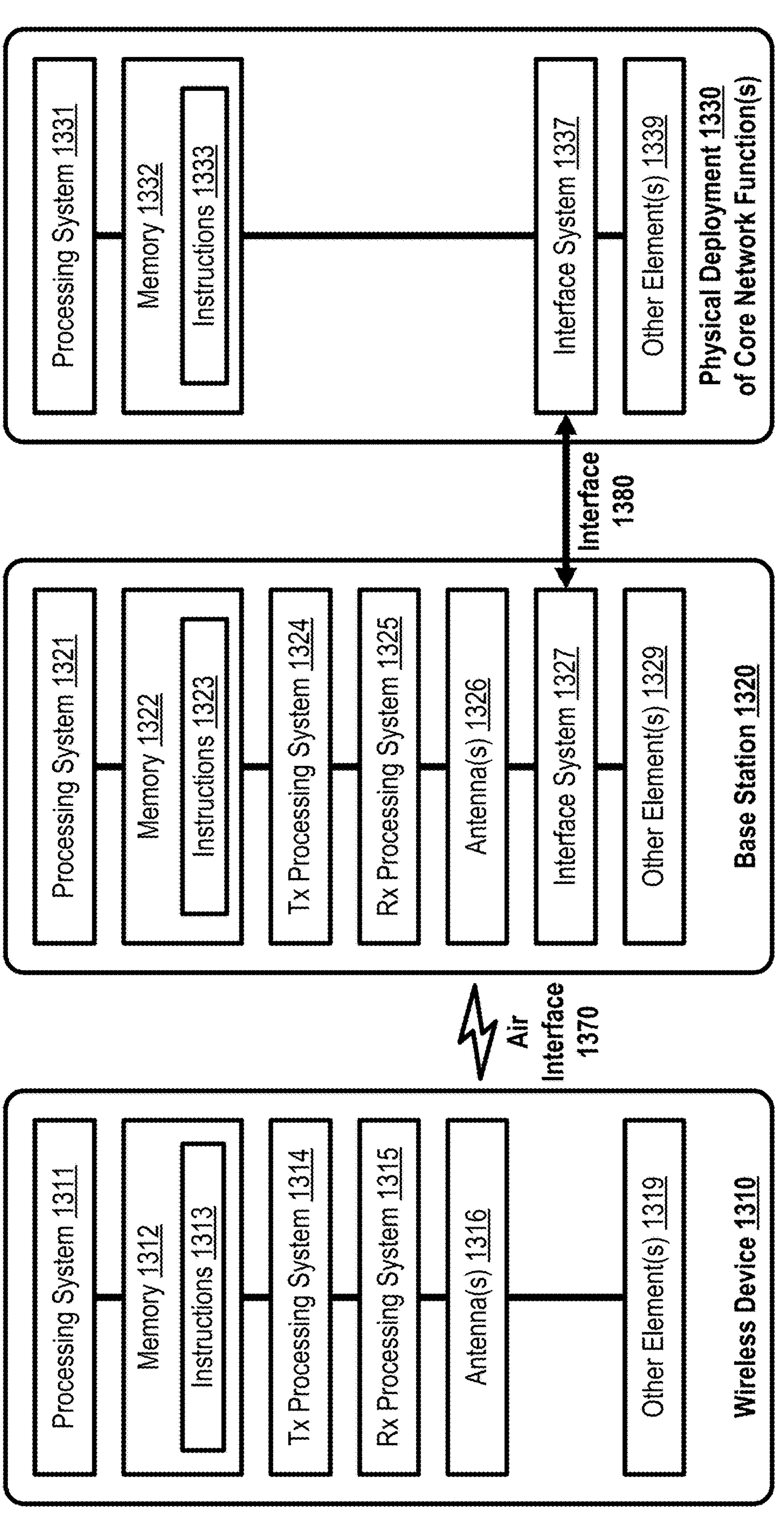
FIG. 13A shows example elements in a communications network.

FIG. 13A shows example elements in a communications network. FIG. 13A shows a wireless device 1310, a base station 1320, and a physical deployment of one or more network functions 1330 (henceforth, "deployment 1330"). Any wireless device described herein may have similar components and/or may be implemented in a similar manner as the wireless device 1310. Any base station described herein (or any portion of the base station, depending on the architecture of the base station) may have similar components and/or may be implemented in a similar manner as the base station 1320. Any physical core network deployment described herein (or any portion of the deployment, depending on the architecture of the deployment) may have similar components and may be implemented in a similar manner as the deployment 1330.

The wireless device 1310 may communicate with base station 1320 over an air interface 1370. A communication direction from wireless device 1310 to base station 1320 over air interface 1370 may be known as uplink, and a communication direction from base station 1320 to wireless device 1310 over air interface 1370 may be known as downlink. Downlink transmissions may be separated from uplink transmissions using FDD, TDD, and/or some combination of duplexing techniques. FIG. 13A shows a single wireless device 1310 and a single base station 1320, but it may be understood that wireless device 1310 may communicate with any number/quantity of base stations and/or other access network components over air interface 1370, and it may be understood that that base station 1320 may communicate with any number/quantity of wireless devices over air interface 1370.

The wireless device 1310 may comprise a processing system 1311 and a memory 1312. The memory 1312 may comprise one or more computer-readable media (e.g., one or more non-transitory computer readable media). The memory 1312 may include/comprise/store instructions 1313. The processing system 1311 may process and/or execute the instructions 1313. Processing and/or execution of the instructions 1313 may cause the wireless device 1310 and/or the processing system 1311 to perform one or more functions or activities. The memory 1312 may include/comprise data (not shown). One of the functions or activities performed by the processing system 1311 may be to store data in the memory 1312 and/or retrieve previously-stored data from the memory 1312. For example, downlink data received from the base station 1320 may be stored in the memory 1312, and uplink data for transmission to the base station 1320 may be retrieved from the memory 1312. The wireless device 1310 may communicate with the base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13A, the transmission processing system 1314 and/or the reception processing system 1315 may be coupled to a dedicated memory that may be analogous to but separate from the memory 1312. The dedicated memory may comprise instructions that may be processed and/or executed to carry out one or more respective functionalities of the transmission processing system 1314 and/or the reception processing system 1315. The wireless device 1310 may comprise one or more antennas 1316 to access the air interface 1370.

The wireless device 1310 may comprise one or more other elements 1319. The one or more other elements 1319 may comprise software and/or hardware that may provide features and/or functionalities. For example, the one or more other elements 1319 may comprise one or more of a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise or connect to one or more sources of power (e.g., a battery, a solar cell, a fuel cell, a wall outlet, an electrical grid, and/or any combination thereof).

The wireless device 1310 may send/transmit uplink data to and/or receive downlink data from the base station 1320 via the air interface 1370. One or more of the processing system 1311, transmission processing system 1314, and/or reception system 1315 may implement open systems interconnection (OSI) functionality to perform transmission and/or reception. For example, the transmission processing system 1314 and/or the reception system 1315 may perform layer 1 OSI functionality, and the processing system 1311 may perform higher layer functionality. The wireless device 1310 may transmit and/or receive data over the air interface 1370 via/using one or more antennas 1316. For scenarios where the one or more antennas 1316 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media (e.g., one or more non-transitory computer readable media). The memory 1322 may comprise instructions 1323. The processing system 1321 may process and/or execute the instructions 1323. Processing and/or execution of the instructions 1323 may cause the base station 1320 and/or the processing system 1321 to perform one or more functions or activities. The memory 1322 may comprise data (not shown). One of the functions or activities performed by the processing system 1321 may be to store data in the memory 1322 and/or retrieve previously-stored data from the memory 1322. The base station 1320 may communicate with the wireless device 1310 using a transmission processing system 1324 and/or a reception processing system 1325. The transmission processing system 1324 and/or the reception processing system 1325 may be coupled to a dedicated memory (not shown) that may be analogous to but separate from memory 1322. The dedicated memory may comprise instructions that may be processed and/or executed to carry out one or more of their respective functionalities. The base station 1320 may comprise one or more antennas 1326 to access the air interface 1370.

The base station 1320 may send/transmit downlink data to and/or receive uplink data from wireless device 1310 via the air interface 1370. To perform the transmission and/or reception, one or more of the processing system 1321, the transmission processing system 1324, and/or the reception system 1325 may implement OSI functionality. For example, the transmission processing system 1324 and/or the reception system 1325 may perform layer 1 OSI functionality, and the processing system 1321 may perform higher layer functionality. The base station 1320 may transmit and/or receive data via the air interface 1370 using one or more antennas 1326. For scenarios where the one or more antennas 1326 comprise multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless. The interface system 1327 may comprise one or more components suitable for communicating via the interface 1380. As shown in FIG. 13A, the interface 1380 may connect the base station 1320 to a single deployment 1330 (e.g., as shown in FIG. 13A), but it may be understood that wireless device 1310 may communicate with any number/quantity of base stations and/or CN deployments via the interface 1380, and it may be understood that that deployment 1330 may communicate with any number/quantity of base stations and/or other CN deployments via the interface 1380. The base station 1320 may comprise one or more other elements 1329 analogous to one or more of the one or more other elements 1319.

The deployment 1330 may comprise any quantity/number of portions of any quantity/number of instances of one or more NFs. The deployment 1330 may comprise a processing system 1331 and a memory 1332. The memory 1332 may comprise one or more computer-readable media (e.g., one or more non-transitory computer readable media). The memory 1332 may comprise instructions 1333. The processing system 1331 may process and/or execute instructions 1333. Processing and/or execution of the instructions 1333 may cause the deployment 1330 and/or the processing system 1331 to perform one or more functions or activities. The memory 1332 may comprise data (not shown). One of the functions or activities performed by processing system 1331 may be to store data in the memory 1332 and/or retrieve previously-stored data from the memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

The wireless device 1310, the base station 1320, and/or the deployment 1330 may implement timers and/or counters. A timer/counter may start and/or restart at an initial value. The timer/counter may run based on the starting. Running of the timer/counter may be associated with an occurrence. The value of the timer/counter may change (e.g., increment or decrement). The occurrence may be an exogenous event (e.g., a reception of a signal, a measurement of a condition, etc.), an endogenous event (e.g., a transmission of a signal, a calculation, a comparison, a performance of an action or a decision to so perform, etc.), and/or any combination thereof. The occurrence may be the passage of a particular amount of time. A timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused (e.g., a present value of the timer/counter may be held, maintained, and/or carried over), for example, even after an occurrence of one or more occurrences that would otherwise cause the value of the timer/counter to change. The timer/counter may be un-paused or continued (e.g., the value that was held, maintained, and/or carried over may begin changing again), for example, after an occurrence of the one or more occurrence occur. A timer/counter may be set and/or reset. As used herein, setting may comprise resetting. The value of the timer/counter may be set to the initial value, for example, if the timer/counter sets and/or resets. A timer/counter may be started and/or restarted. Starting may comprise restarting. The value of the timer/counter may be set to the initial value and the timer/counter may begin to run (e.g., increment or decrement), for example, if the timer/counter restarts.

Figure 13B:
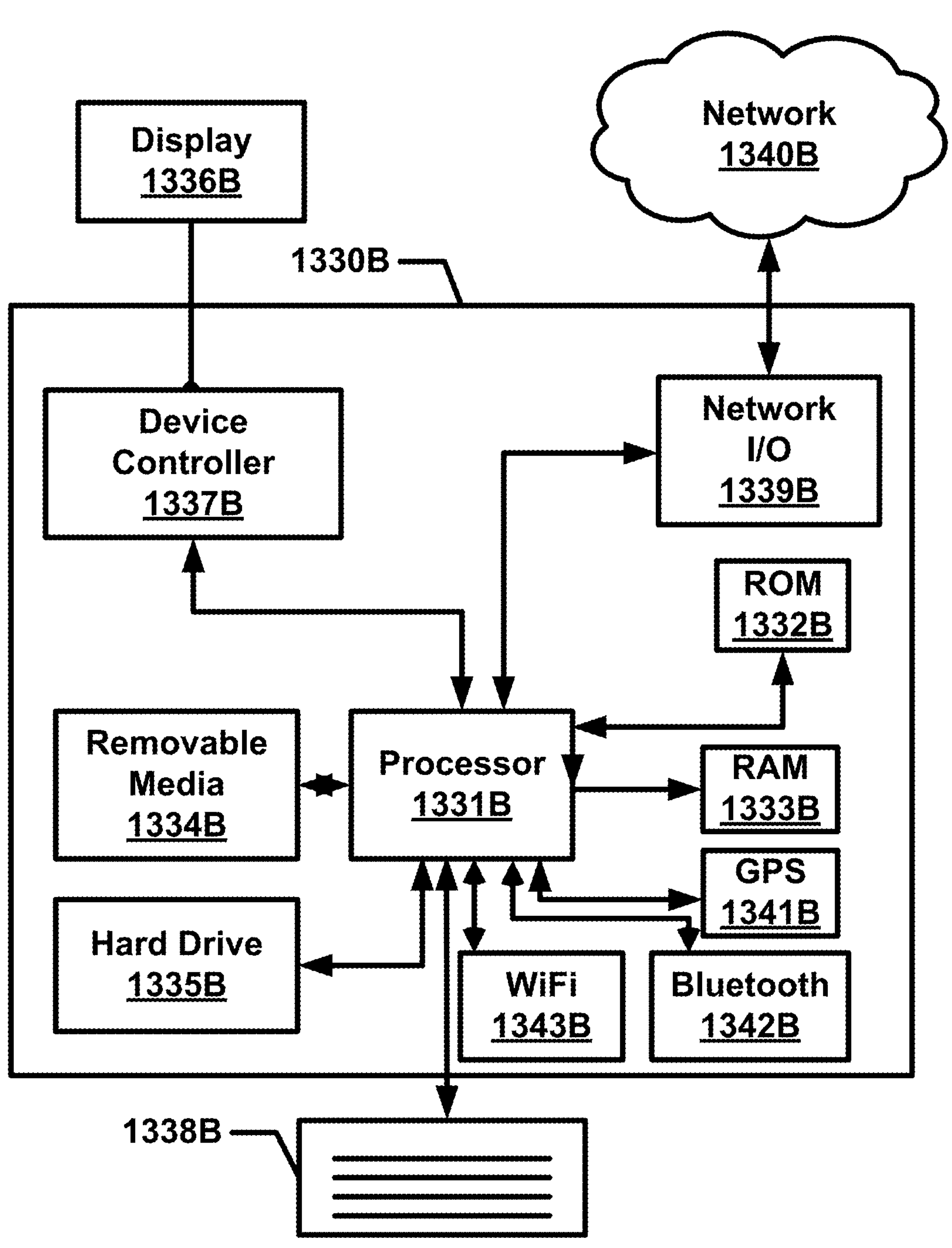
FIG. 13B shows example elements of a computing device that may be used to implement any of the various devices described herein.

FIG. 13B shows example elements of a computing device that may be used to implement any of the various devices described herein, including, for example, a base station 152A, 152B, 302, 402, 403, 502 602, 602A, 602B, 602C, 702, 802, 1004, 1104, 1204, 1320, 26301840, 1940, 2040, 2140, and/or 2240, a wireless device 101, 151, 301, 401, 501, 601A, 601B, 601C, 701, 801, 1002, 1102, 1202, 1310, 1810, 1820, 1830, 1910, 1920, 1935, 2011, 2012, 2013, 2014, 2110, 2120, and/or 2210, or any other base station, wireless device, node, NF (e.g., AMF, SMF, UPF, PCF, etc.), UDM, OAM, UDM/OAM, network device, or computing device described herein. The computing device 1330B may include one or more processors 1331B, which may execute instructions stored in the random-access memory (RAM) 1333B, the removable media 1334B (such as a Universal Serial Bus (USB) drive, compact disk (CD) or digital versatile disk (DVD), or floppy disk drive), or any other desired storage medium. Instructions may also be stored in an attached (or internal) hard drive 1335B. The computing device 1330B may also include a security processor (not shown), which may execute instructions of one or more computer programs to monitor the processes executing on the processor 1331B and any process that requests access to any hardware and/or software components of the computing device 1330B (e.g., ROM 1332B, RAM 1333B, the removable media 1334B, the hard drive 1335B, the device controller 1337B, a network interface 1339B, a GPS 1341B, a Bluetooth interface 1342B, a WiFi interface 1343B, etc.). The computing device 1330B may include one or more output devices, such as the display 1336B (e.g., a screen, a display device, a monitor, a television, etc.), and may include one or more output device controllers 1337B, such as a video processor. There may also be one or more user input devices 1338B, such as a remote control, keyboard, mouse, touch screen, microphone, etc. The computing device 1330B may also include one or more network interfaces, such as a network interface 1339B, which may be a wired interface, a wireless interface, or a combination of the two. The network interface 1339B may provide an interface for the computing device 1330B to communicate with a network 1340B (e.g., a RAN, or any other network). The network interface 1339B may include a modem (e.g., a cable modem), and the external network 1340B may include communication links, an external network, an in-home network, a provider's wireless, coaxial, fiber, or hybrid fiber/coaxial distribution system (e.g., a DOCSIS network), or any other desired network. Additionally, the computing device 1330B may include a location-detecting device, such as a global positioning system (GPS) microprocessor 1341B, which may be configured to receive and process global positioning signals and determine, with possible assistance from an external server and antenna, a geographic position of the computing device 1330B.

The example in FIG. 13B may be a hardware configuration, although the components shown may be implemented as software as well. Modifications may be made to add, remove, combine, divide, etc. components of the computing device 1330B as desired. Additionally, the components may be implemented using basic computing devices and components, and the same components (e.g., processor 1331B, ROM storage 1332B, display 1336B, etc.) may be used to implement any of the other computing devices and components described herein. For example, the various components described herein may be implemented using computing devices having components such as a processor executing computer-executable instructions stored on a computer-readable medium, as shown in FIG. 13B. Some or all of the entities described herein may be software based, and may co-exist in a common physical platform (e.g., a requesting entity may be a separate software process and program from a dependent entity, both of which may be executed as software on a common computing device).

FIGS. 14A, 14B, 14C, and 14D show various example arrangements of physical core network deployments. Each of the arrangements may comprise one or more network functions and/or portions thereof. The core network deployments may comprise a deployment 1410, a deployment 1420, a deployment 1430, a deployment 1440, and/or a deployment 1450. Any of the deployments (e.g., each deployment) may be analogous to the deployment 1330 as shown in FIG. 13A. Any of the deployments (e.g., each deployment) may comprise a processing system for performing one or more functions and/or activities, memory for storing data and/or instructions, and/or an interface system for communicating with other network elements (e.g., other core network deployments). Any of the deployments (e.g., each deployment) may comprise one or more NFs. An NF may refer to a particular set of functionalities and/or one or more physical elements configured to perform those functionalities (e.g., a processing system and memory comprising instructions that, when executed by the processing system, cause the processing system to perform the functionalities). As described herein, a network function performing X, Y, and Z, may comprise the one or more physical elements configured to perform X, Y, and Z (e.g., irrespective of configuration and/or location of the deployment of the one or more physical elements), where X, Y, and Z, each may refer to one or more operations. An NF may comprise one or more of a network node, network element, and/or network device.

Different types of NF may be present in a deployment. Each type of NF may be associated with a different set of one or more functionalities. A plurality of different NFs may be flexibly deployed at different locations (e.g., in different physical core network deployments) or in a same location (e.g., co-located in a same deployment). A single NF may be flexibly deployed at different locations (e.g., implemented using different physical core network deployments) or in a same location. Physical core network deployments may also implement one or more base stations, application functions (AFs), data networks (DNs), and/or any portions thereof. NFs may be implemented in many ways, including as network elements on dedicated or shared hardware, as software instances running on dedicated or shared hardware, and/or as virtualized functions instantiated on a platform (e.g., a cloud-based platform).

Figures 14A, 14B, 14C, 14D:
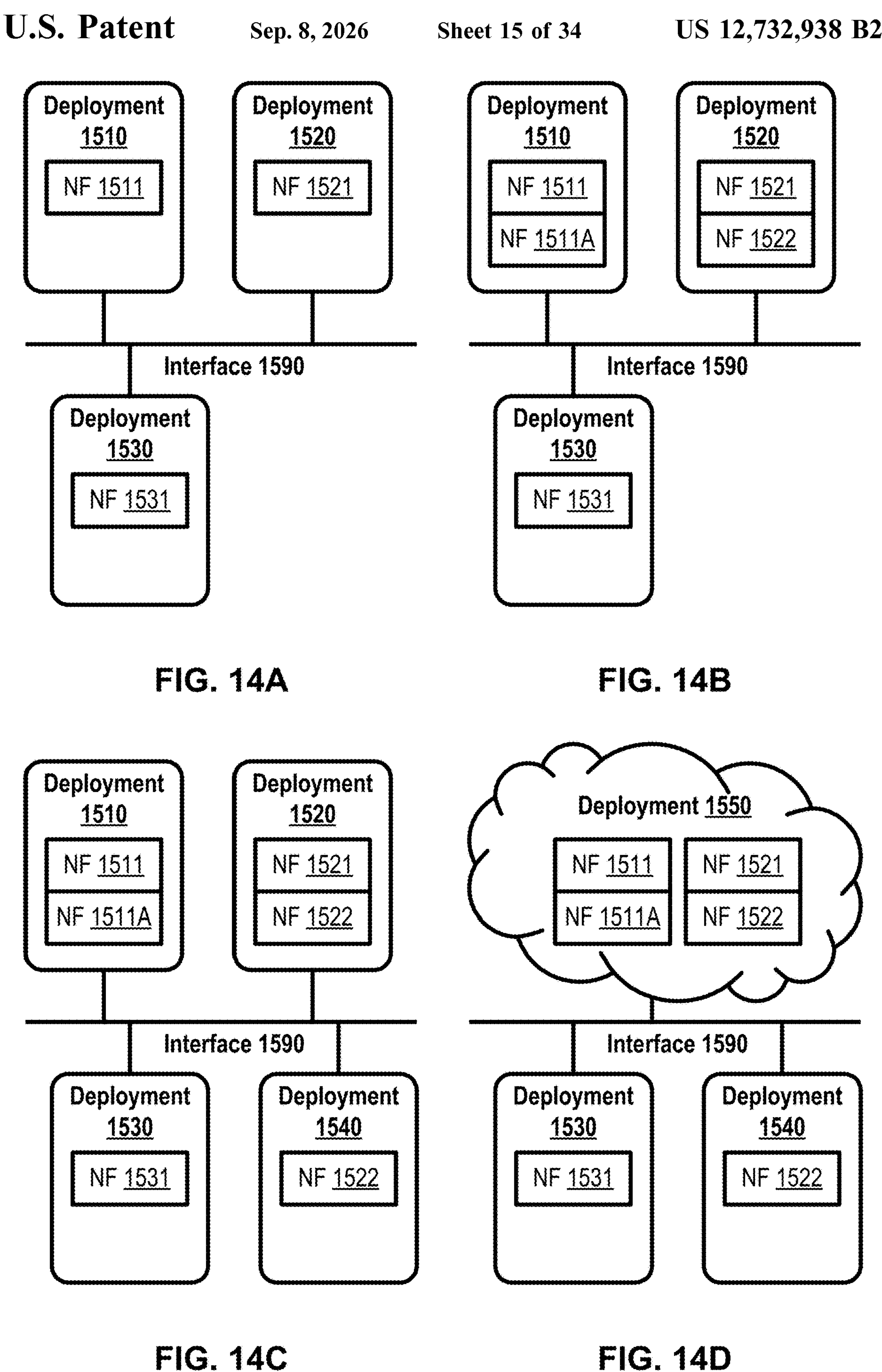
FIG. 14A, FIG. 14B, FIG. 14C, and FIG. 14D show various example arrangements of physical core network deployments.

FIG. 14A shows an example arrangement of core network deployments. Any of the core network deployments (e.g., each of the core network deployments) may comprise one network function. A deployment 1410 may comprise an NF 1411, a deployment 1420 may comprise an NF 1421, and a deployment 1430 may comprise an NF 1431. The deployments 1410, 1420, 1430 may communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B shows an example arrangement where a single deployment may comprise more than one NF. Multiple NFs may be deployed in deployments 1410, 1420. Deployments 1410, 1420 may implement a software-defined network (SDN) and/or a network function virtualization (NFV).

Deployment 1410 may comprise an additional network function, NF 1411A. The NFs 1411, 1411A may comprise multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. NFs 1411, 1411A may be associated with different PLMNs, but deployment 1410, which implements NFs 1411, 1411A, may be owned and/or operated by a single entity.

Deployment 1420 may comprise a NF 1421 and an additional NF 1422. The NFs 1421, 1422 may be different NF types. Similar to NFs 1411, 1411A, the NFs 1421, 1422 may be co-located within the same deployment 1420, but may be separately implemented. For example, a first PLMN may own and/or operate deployment 1420 comprising NFs 1421, 1422. As another example, the first PLMN may implement the NF 1421 and a second PLMN may obtain, from the first PLMN (e.g., rent, lease, procure, etc.), at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. Networks may operate with greater speed, coverage, security, and/or efficiency, for example, if multiple NFs are provided at a single deployment.

FIG. 14C shows an example arrangement of core network deployments in which a single instance of an NF may be implemented using a plurality of different deployments. For example, a single instance of NF 1422 may be implemented at deployments 1420, 1440. The functionality provided by NF 1422 may be implemented as a bundle or sequence of subservices. Any subservice (e.g., each subservice) may be implemented independently, for example, at a different deployment. Any subservice (e.g., each subservice) may be implemented in a different physical location. By distributing implementation of subservices of a single NF across different physical locations, the mobile communications network may operate with greater speed, coverage, security, and/or efficiency.

FIG. 14D shows an example arrangement of core network deployments in which one or more network functions may be implemented using a data processing service. As shown in FIG. 14D, NFs 1411, 1411A, 1421, 1422 may be included in a deployment 1450 that may be implemented as a data processing service. The deployment 1450 may comprise a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the FIGS. 14A-14D, different network elements (e.g., NFs) may be located in different physical deployments, or co-located in a single physical deployment. Sending and receiving of messages among different network elements, as described herein, is not limited to inter-deployment transmission or intra-deployment transmission, unless explicitly indicated.

A deployment may be a black box that may be preconfigured with one or more NFs and preconfigured to communicate, in a prescribed manner, with other black box deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

In at least some wireless communications (e.g., 5G communication system), time service may be used. A time service may comprise, for example, a service that provides time information (e.g., absolute time information, relative time information) to a wireless device. The time service may be provided by and/or via a communication network. The time service may determine and/or obtain time information from one or more time sources. The time service may be, for example, a coordinated universal time (UTC) service.

The time service may require traceability for at least some wireless communication systems. Traceability may comprise tracing, authentication, verification, confirmation, and/or proof Traceability of a time service (e.g., traceability to UTC) may comprise an indication that time information is accurate (e.g., accurate to a particular degree of accuracy), precise (e.g., to a particular degree of precision) provided by and/or determined, for example, based on one or more particular (e.g., identified) sources of time, authentic, and/or calibrated. Traceability may be associated with particular time information and/or a particular time service. A wireless device may require and/or request that a network provide traceability associated with particular time information and/or a particular time service. A network that provides a time service may or may not provide traceability and/or specific aspects of traceability.

Figure 15:
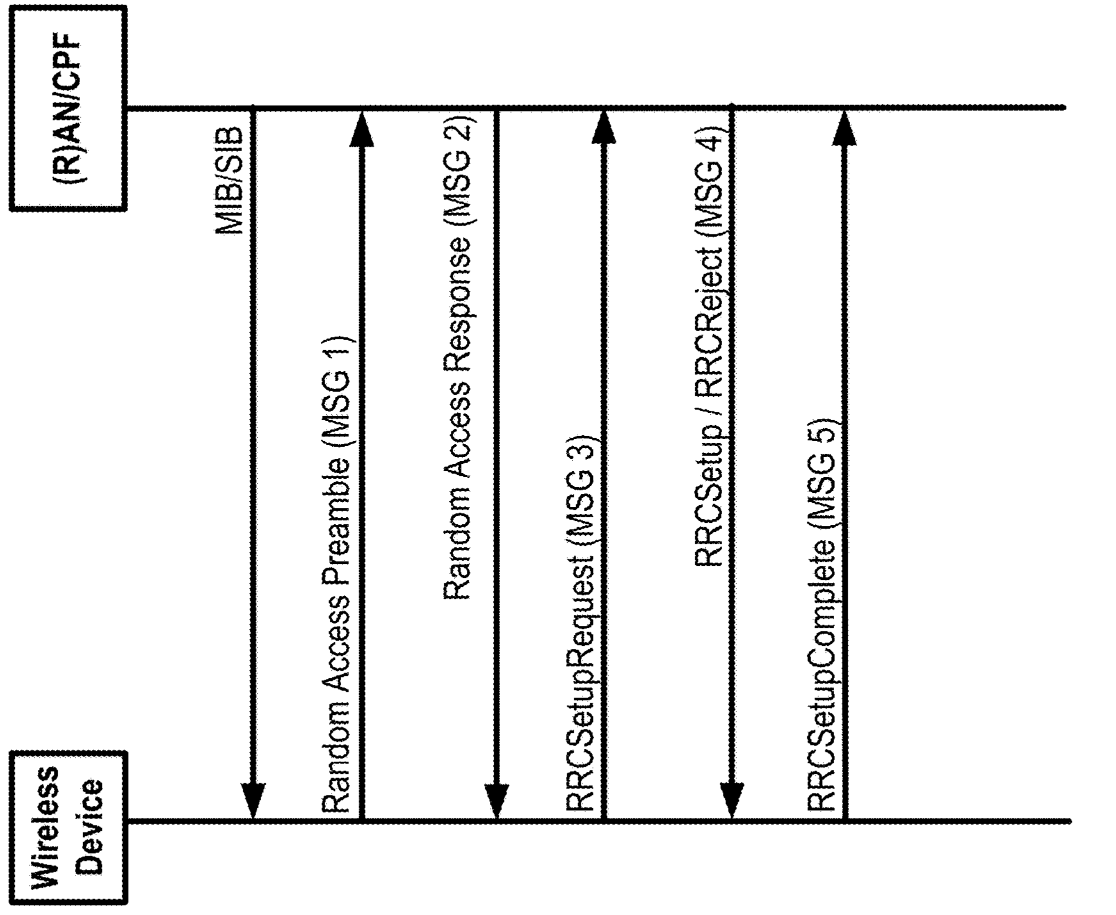
FIG. 15 shows an example call flow for RRC connection establishment.

FIG. 15 shows an example call flow for RRC connection establishment. A wireless device may receive master information block (MIB) information (e.g., information element, parameter, message) and/or system information block (SIB) information (e.g., information element, parameter, message) from a base station (e.g., (R)AN) and/or a control plane function (CPF) (e.g., an AMF). For example, the wireless device may receive SIB 1 information from the base station (e.g., (R)AN). The MIB information may comprise system information. For example, the MIB information may comprise at least one of parameters including systemFrameNumber, subCarrierSpacingCommon, ssb-SubcarrierOffset, dmrs-TypeA-Position, pdcch-ConfigSIB1, cellBarred, intraFreqReselection, and/or the like. The SIB 1 information may comprise information relevant if evaluating whether a wireless device is allowed to access a cell and defines the scheduling of other system information. The SIB 1 information may comprise radio resource configuration information that is common for all wireless devices and barring information used for the unified access control. The wireless device may receive SIB x information (e.g., information element, parameter, message) from the base station (e.g., (R)AN) and/or the CPF (e.g., an AMF). For example, the SIB x information may comprise SIB 2, SIB 3, SIB 4, and/or the like, other than SIB 1. The SIB 2 information may comprise cell re-selection information common for intra-frequency, inter-frequency and/or inter-RAT cell re-selection (e.g., applicable for more than one type of cell re-selection but not necessarily all) as well as intra-frequency cell re-selection information other than neighboring cell related. For example, the SIB 2 message may comprise at least one of parameters including cellReselectionInfoCommon, cellReselectionServingFreqInfo, intraFreqCellReselectionInfo, and/or the like. The SIB 3 information may comprise neighboring cell related information relevant only for intra-frequency cell re-selection. The IE may include cells with specific re-selection parameters as well as blacklisted cells. For example, the SIB 3 information may comprise at least one of parameters including intraFreqNeighCellList, intraFreqBlackCellList, and/or the like.

The wireless device may send (e.g., transmit) at least one random access preamble to the base station (e.g., (R)AN), for example, based on (e.g., after or in response to) the message being received from the base station (e.g., (R)AN) and/or the CPF (e.g., an AMF). The wireless device may send (e.g., transmit) at least one random access preamble to the CPF (e.g., an AMF), for example, via the base station (e.g., (R)AN). For example, the wireless device may send the at least one random access preamble to the base station (e.g., (R)AN) via a message 1 (MSG 1). The base station (e.g., (R)AN) may send a random access response message to the wireless device, for example, based on (e.g., after or in response to) the at least one random access preamble being received from the wireless device. The CPF (e.g., an AMF) may send (e.g., transmit) a random access response message to the wireless device, for example, via the base station (e.g., (R)AN). For example, the CPF and/or the base station (e.g., (R)AN) may send the random access response message to the wireless device via a message 2 (MSG 2).

The wireless device may send a message (e.g., RRC setup request or RRCSetupRequest) to the base station (e.g., (R)AN) and/or the CPF (e.g., an AMF), for example, based on (e.g., in response to) the random access response message (e.g., MSG 2). For example, the wireless device may send the RRC setup request message via a message 3 (MSG 3). For example, the wireless device may send the RRC setup request message to the CPF via the base station (e.g., (R)AN). For example, the RRC setup request message may indicate establishing an RRC connection for the wireless device. The RRC setup request message may comprise at least one of parameters including a wireless device identity (e.g., TMSI), a parameter (e.g., establishmentCause) indicating a cause value of RRC establishment, a dedicated-NAS-Message, and/or the like. For example, the establishmentCause may comprise at least one of values including emergency, highPriorityAccess, mt-Access, mo-Signalling, mo-Data, mo-VoiceCall, mo-VideoCall, mo-SMS, mps-PriorityAccess, mcs-PriorityAccess, and/or the like.

The base station (e.g., (R)AN) and/or the CPF (e.g., an AMF) may send an RRC setup (or RRCSetup) message to the wireless device via a message 4 (MSG 4), for example, based on (e.g., after or in response to) the message (e.g., MSG 3) being received from the wireless device. For example, the CPF may send the RRC setup message to the wireless device via the base station (e.g., (R)AN). For example, the RRC setup message may be used to establish SRB 1. The RRC setup message may comprise at least one of information elements including a masterCellGroup, a radioBearerConfig, dedicatedNAS-Message, and/or the like. The masterCellGroup may indicate that the network configures the RLC bearer for the SRB1. The radioBearerConfig may indicate that the SRB1 may be configured in RRC setup. Alternatively, the base station (e.g., (R)AN) and/or the CPF (e.g., an AMF) may send an RRC reject (or RRCReject) message to the wireless device via a message 4 (MSG 4), for example, based on (e.g., after or in response to) the message (e.g., MSG 3) being received from the wireless device. The RRC reject message may contain failure information (e.g., FESSI as will be described later), wait time, and/or the like.

The wireless device may send an RRC setup complete (or RRCSetupComplete) message to the base station (e.g., (R)AN), for example, based on (after or in response to) the message (e.g., MSG 4) being received from the base station (e.g., (R)AN) and/or the CPF (e.g., an AMF). For example, the wireless device may send an RRC setup complete message to the base station (e.g., (R)AN) via a message 5 (MSG 5). For example, the wireless device may send the RRC setup complete message to the CPF (e.g., an AMF) via the base station (e.g., (R)AN). The RRC setup complete message may comprise at least one of parameters including a selectedPLMN-Identity, a registeredCPF, a guami-Type (e.g., native, mapped), s-NSSAI-List (e.g., list of network slice identifiers), dedicatedNAS-Message, a TMSI, and/or the like. The registeredCPF may comprise a PLMN identity and/or a CPF identifier. The RRC setup complete message may comprise a NAS message. For example, the dedicatedNAS-Message of the RRC setup complete message may comprise the NAS message. For example, the dedicatedNAS-Message may comprise a registration request message.

Figure 16:
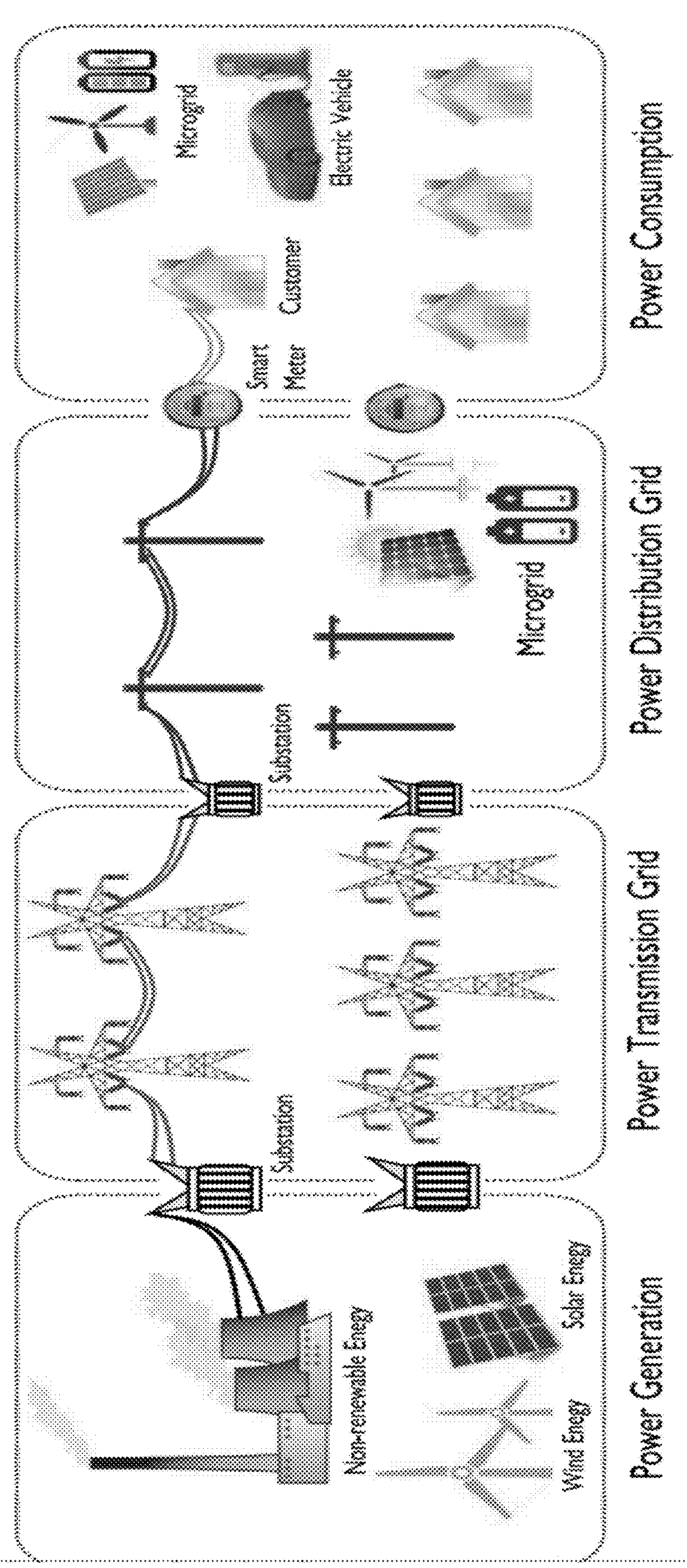
FIG. 16 shows an example of a power system/smart energy system.

FIG. 16 shows an example of a power system/smart energy system. The "power system", "electrical power system", "power grid", "smart grid" and/or "smart energy system" may be used interchangeably. A power system/smart energy system may comprise power generation, power transmission, power distribution, and/or power consumption. The power generation may comprise generating/supplying (electric) power by means of solar, wind, fuel cell, gas, and/or the like, individually or combined in one or more power generating centers. For example, the power generation may comprise coal-fired power generation, gas-fired power generation, hydropower, solar energy, wind energy, and/or the like. The power transmission (or power transmission grid) may comprise sending (e.g., transmitting) the power from at least one power generating center to one or more load center (e.g., power station, power substation). The power distribution (or power distribution grid) may comprise distributing the power to nearby power users/consumers (e.g., homes, industries, electric vehicles). The power consumption may comprise consuming/using the power by the power users/consumers (e.g., homes, industries, electric vehicles). In addition, FIG. 16 shows that one or more substations may be connected between the power generation and power transmission, and between power transmission and power distribution. For example, these substations may be equipped with one or more communication equipment.

Line current differential protection may be used in electrical transmission systems. Line current differential protection, as described, for example, in IEEE C37.2-2008, may be used in electrical transmission systems to protect High-Voltage (HV) transmission lines and in power distribution networks to protect Medium-Voltage (MV) distribution lines. Line current differential protection may use Kirchhoffs current law, where the sum of the currents entering and exiting a junction of a circuit equals zero. Typically in a distribution grid, a MV power line transmits electricity between two substations. Two protection relays may be installed at both ends of the power line. A first relay (e.g., Relay_a) may continuously sample and measure the local current (e.g., I_a'). For example, first relay (e.g., Relay_a) may sample local current values (e.g., I_a') and store the sampled local current values locally. First relay (e.g., Relay_a) may send the measured local current values (e.g., I_a') to a second relay (e.g., Relay_b). First relay (e.g., Relay_a) may send the local current values (e.g., I_a') to second relay (e.g., Relay_b) periodically. First relay (e.g., Relay_a) may attach a first timestamp to the measured local current values (e.g., I_a'). Second relay (e.g., Relay_b) may receive the measured local current values (e.g., I_a') and store the measured local current values (e.g., I_a'). Second relay (e.g., Relay_b) may receive samples from first relay (e.g., Relay_a) within the latency required by IEC 61850-90-1. Depending on the applied voltage levels, the maximum allowed latency may be between 5 milliseconds (ms) and 10 ms. For example, second relay (e.g., Relay_b) may store the received samples in a local buffer. Second relay (e.g., Relay_b) may then use the timestamps to match the received sampled current values to sample current values measured by second relay (e.g., Relay_b). Second relay (e.g., Relay_b) may perform similar steps to first relay (e.g., Relay_a). For example, second relay (e.g., Relay_b) may sample local current values (e.g., I_b') and store the sampled local current values (e.g., I_b') locally. Second relay (e.g., Relay_b) may then send the sampled local current values (e.g., I_b') to first relay (e.g., Relay_a) periodically. Second relay (e.g., Relay_b) may attach a second timestamp to the sampled local current values. First relay (e.g., Relay_a) may receive the sampled local current values (e.g., I_b') and store the received sampled local current values (e.g., I_b') in a local buffer. First relay (e.g., Relay_a) may receive samples from second relay (e.g., Relay_b) within the latency required by IEC 61850-90-1. Depending on the applied voltage levels, the maximum allowed latency may be between 5 ms and 10 ms. As noted above, the second timestamp may allow first relay (e.g., Relay_a) to match the sample current values received from second relay to sample current values obtained by first relay. After first relay (e.g., Relay_a) and second relay (e.g., Relay_b) determine that relevant data for the time period has been acquired, each of the respective relays (e.g., Relay_a, Relay_b) may align the data and calculate a differential current for each instant of time. For example, relays may not be tripped, for example, based on the differential current calculated at both first relay (e.g., Relay_a) and second relay (e.g., Relay_b) being below a threshold (e.g., within a restraining region). The system may continue to function in normal condition.

However, when the current difference exceeds a threshold, first relay (e.g., Relay_a) and/or second relay (e.g., Relay_b) may send a trip signal to one or more circuit breakers. The current difference may be due to a tree branch falling on an overhead distribution line, which may cause an electrical discharge. The electrical discharge may cause current from both substations to flow into the power line with increased magnitude. To prevent damage, the one or more circuit breakers may open and stop the current from flowing into the power line. The abnormal condition of the power line in the protected zone may also be isolated from the electrical grid.

Line current differential protection may provide a fast protection mechanism, reliability, and/or an ability to protected zones. However, line current differential protection may be limited by communication channel asymmetry. In this regard, the maximum communication channel asymmetry may be dependent on a chosen type of differential protection relay and/or be vendor-specific. A time division multiplexed (TDM)-based differential protection relay may be more sensitive to asymmetry than a modern type differential protection relay with an Ethernet interface. In this regard, a differential protection relay with an Ethernet interface may allow for asymmetry of 3 milliseconds (ms), after which the relay may enter a blocking mode. According to the IEEE C37.243 Guide, the allowed asymmetry in terms of communication channel latency is around 2 ms. To address the shortcomings with prior approaches, line current differential protection may be deployed with cellular technology for Low-Voltage (LV) or MV power lines (either underground or overhead) in new, or refurbished, distribution substation construction projects without having to lay dedicated communication cables.

Figure 17:
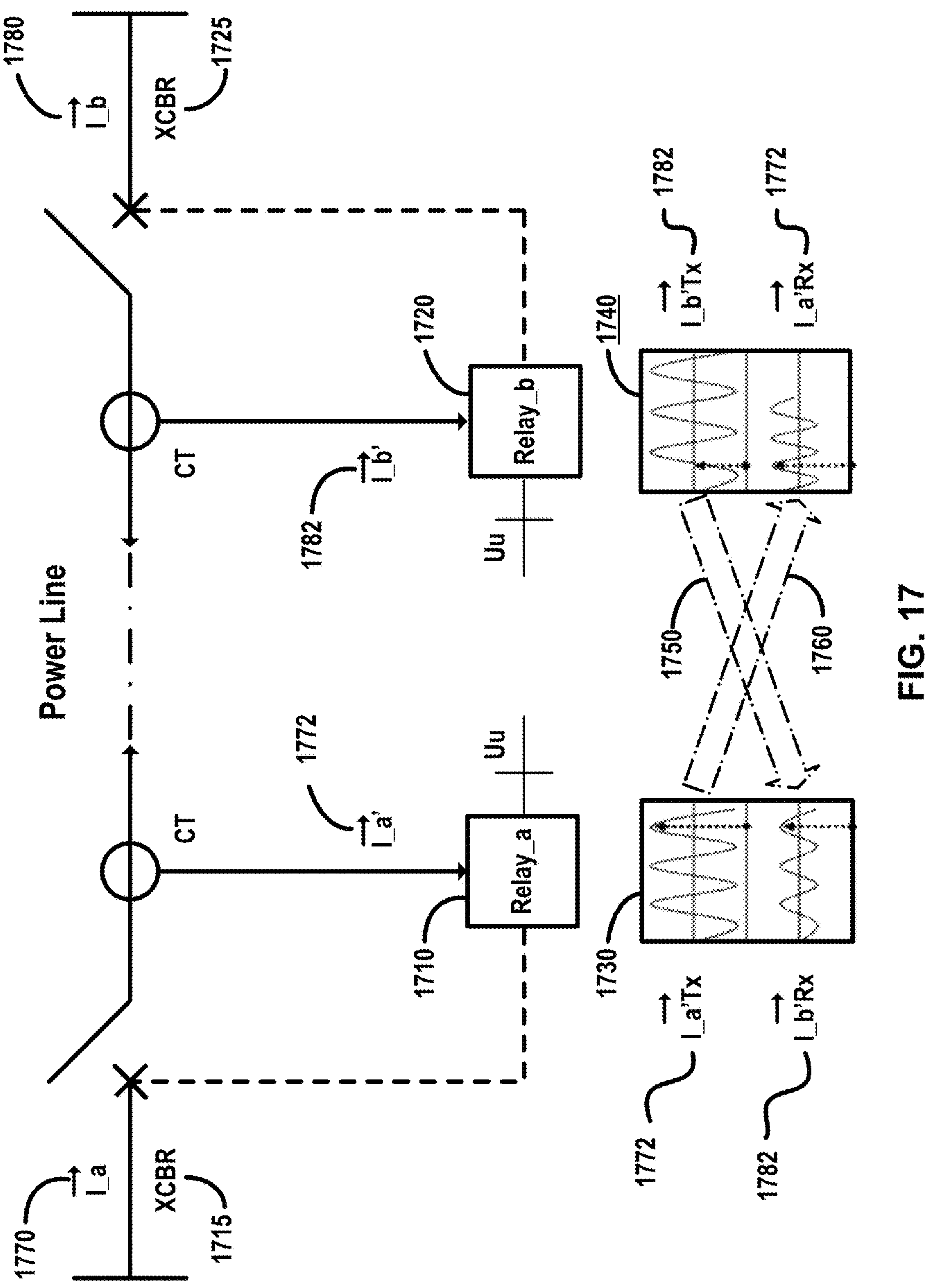
FIG. 17 illustrates an example of line current differential protection provided by two protection relays deployed in two substations.

FIG. 17 illustrates an example of line current differential protection provided by two protection relays deployed in two substations. As illustrated in FIG. 17, a first relay 1710 (e.g., Relay_a) and a second relay 1720 (e.g., Relay_b) may be deployed at two substations along a power line to form a protection zone. The protection zone may protect the power line from incidents, such as short circuits, overloads, etc. FIG. 17 also shows two communication channels (e.g., first communication channel 1750, second communication channel 1760) (illustrated as dashed arrows) between two protection relays (e.g., first relay 1710, second relay 1720). A "communication channel" may refer to a channel used for transferring phase segregated current values between two protection relays (e.g., first relay 1710, second relay 1720). The current phasors may form two geographically separated protection relays that should be aligned in time for a correct calculation of the differential current. Protection functions of a protection relay (e.g., a first relay 1710, a second relay 1720, etc.) may depend on first relay 1710 sampling a local current 1770 (e.g., I_a), buffering the sampled locally measured current value 1772 (e.g., I_a'), and sending (e.g., transmitting) the locally measured current value 1772 to a remote protection relay (e.g., second relay 1720); receiving sampled current values 1782 (e.g., I_b'Rx) from a remote protection relay (e.g., second relay 1720); and/or (3) a time synchronization between the transferring and receiving protection relays (e.g., performing a time-alignment of the locally buffered sampled current values with the received remote sampled current values).

Each protection relay (e.g., first relay 1710, second relay 1720) may continuously measure a local current (e.g., first current 1770, second current 1780) at the protection relay and transmit the measured local current (e.g., first measured current 1772, second measured current 1782) to a remote protection relay. Each protection relay (e.g., first relay 1710, second relay 1720) may compare a locally measured current (e.g., first measured current 1772 (I_a')) to a current (e.g., second current 1782 (I_b')) received from a remote protection relay (e.g., second relay 1720). Each protection relay (e.g., first relay 1710, second relay 1720) may calculate a differential current at a specific moment in time (e.g., I_a'−I_b'). For example, first relay 1710 may measure first current 1770 (e.g., I_a) to obtain first measured current 1772 (e.g., I_a'). First relay 1710 may also receive a time-aligned remote second measured current 1782 (e.g., I_b'_Rx) from second relay 1720. The protection algorithm in the first relay 1710 may derive a differential current, for example, based on the difference between the first measured current 1772 and the received second measured current 1782. A similar mechanism may be applied in second relay 1720. First relay 1710 and/or second relay 1720 may send a trip command to a circuit breaker (XCBR) (e.g., first circuit breaker 1715, second circuit breaker 1725) to open, for example, if the differential current exceeds one or more threshold values determined by the protection relay (e.g., the first relay 1715 or the second relay 1725) restraint characteristics. By tripping a circuit breaker, first relay 1710 and/or second relay 1720 may protect a power line from overload and/or other secondary damages (e.g., a fireball blaze on the power line or the power line burning down).

A protection relay (e.g., first relay 1710, second relay 1720, etc.) may periodically sample local currents (e.g., first current 1770, second current 1780) to obtain measured local currents (e.g., first measured current 1772, second measured current 1782). The protection relay may buffer the local current values (e.g., first measured current 1772, second measured current 1782). A first relay 1710 may send (transmit) a sampled local current value (e.g., first measured current 1772 (e.g., I_a'Tx)) to second relay 1720 within a predetermined quantity of time. The predetermined quantity of time may comprise a defined period of time and/or an upper bound of communication latency. The upper bound of communication latency may be between 5 ms and 10 ms, for example, as specified in IEC 61850-90-1. A second relay 1720 may compare a buffered sampled local current value 1782 (e.g., I_b'Tx) to a received remotely sampled current value 1772 (e.g., I_a'Rx), for example, based on or in response to the second relay 1720 receiving a remotely sampled current value 1772 (e.g., I_a'Rx) that coincides in time with a sampled local current value 1782 (e.g., I_b'TX). A protection relay (e.g., first relay 1710, second relay 1720) may temporally align a local sampled current value 1772 (e.g., I_a') and a received sampled current value 1782 (e.g., I_b'), for example, to determine the current differential.

In another example, first relay 1710 (e.g., Relay_a) may compare a received current value 1782 (e.g., I_b'Rx) with a locally measured current value 1772 (e.g., I_a'), for example, using a time-based alignment method. A second relay 1720 (e.g., Relay_b) may send (transmit) a second current value 1782 (e.g., I_b'Tx), with a timestamp, to a first relay 1710 (e.g., Relay_a). The second current value 1782 may be sent with a timestamp. The timestamp may indicate a sampling time of the second current value 1782 (e.g., I_b'Tx). In some examples, time-based alignment may use an external time source, such as global navigation satellite system (GNSS) to obtain (derive, receive, etc.) a timestamp. The first relay 1710 (e.g., Relay_a) may determine (identify) a first current value 1772 (e.g., I_a') associated with the timestamp. The first relay 1710 may send a trip command to first circuit breaker (XCBR) 1715 to open the circuit, for example, based on or in response to the difference between the received second current value 1782 (e.g., I_b'Rx) and the locally measured first current value 1772 (e.g., I_a') being equal to or greater than a threshold value. Similarly, second relay 1720 (e.g., Relay_b) may compare a received first current value 1772 (e.g., I_a'Rx) with a locally measured second current value 1782 (e.g., I_b'Tx), for example, when using a time-based alignment method. A first relay (e.g., Relay_a) 1710 may send (transmit) 1760 a first current value (e.g., I_a'Tx) 1736, with a timestamp, to a second relay (e.g., Relay_b) 1720, where the timestamp may indicate a sampling time of the first current value (e.g., I_a'Tx) 1736. The second relay (e.g., Relay_b) 1720 may determine (identify) a second current value (e.g., I_b') 1780 associated with a second time. The second relay 1720 may determine the second time may be the same as the first time, for example, based on the timestamp received 1760 from the first relay (e.g., Relay_a) 1710. The second relay 1720 may send a trip command to the circuit breaker (XCBR) 1725 to open the circuit, for example, if the difference between the received 1760 first current value (e.g., I_a'Rx) 1748 and the locally measured second current value (e.g., I_b') 1780 exceeds a threshold value.

Figure 18:
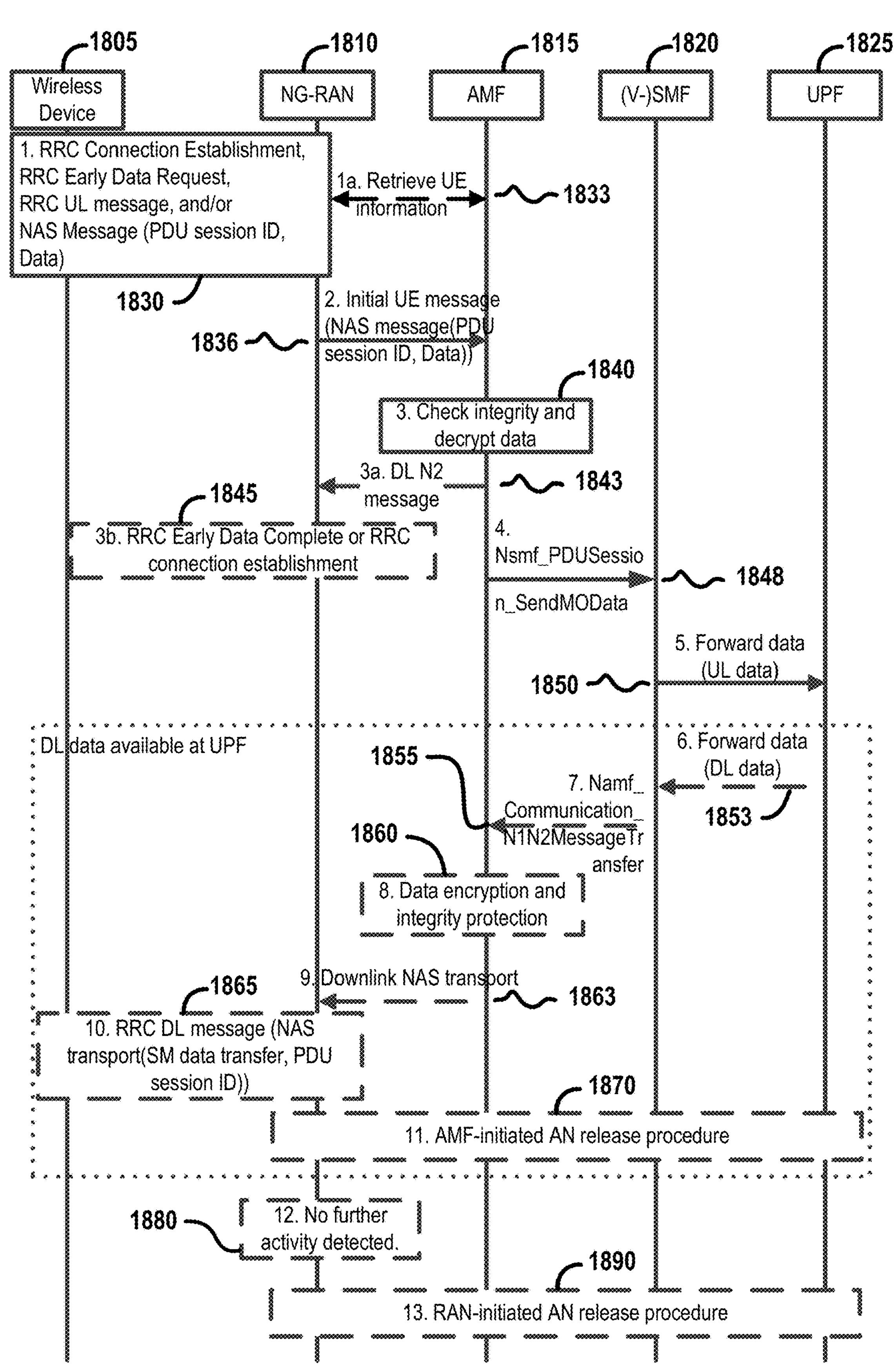
FIG. 18 shows an example of a process for a user plane function (UPF) anchored mobile originated data transport in control plane a cellular internet of things (CIoT) 5GS optimization.

To address time alignment of the local and received sample current values, a relay may perform time alignment. In some examples, the relay may use FIG. 18 shows an example of a process for user plane function (UPF) anchored mobile originated data transport in control plane CIoT 5GS optimization. In step 1830, wireless device 1805 may send (transmit) one or more messages to base station 1810 (e.g., a next generation radio access network [NG-RAN]). Wireless device 1805 may comprise a protection relay (e.g., Relay_a 1710 and/or Relay_b 1720). The one or more messages may be one or more of an: RRC Connection Establishment, an RRC Early Data Request, an RRC uplink message, or a NAS message. The one or more communications may comprise a ciphered PDU session ID and/or a payload comprising ciphered uplink data. Wireless device 1805 may establish an RRC connection with base station 1810. Wireless device 1805 may send (transmit) a NAS message, for example, based on or in response to wireless device 1805 being in a CM-CONNECTED state. Wireless device 1805 may send (transmit) an RRC Early Data Request message and/or a NAS message, for example, based on or in response to the wireless device 1805 being in a CM-IDLE state. The NAS message may include NAS Release Assistance Information (NAS RAI). The NAS RAI may indicate that no further uplink and/or downlink data transmissions are expected. Additionally or alternatively, the NAS RAI may indicate that only a single downlink data transmission (e.g., acknowledgement or response to uplink data) subsequent to the uplink data transmission is expected.

In step 1830, base station 1810 (e.g., NG-RAN) may receive one or more messages from wireless device 1805. Base station 1810 (e.g., NG-RAN) may establish a RRC connection with wireless device 1805, for example, based on or in response to receiving the one or more messages. As noted above, base station 1810 (e.g., NG-RAN) may receive a NAS message from wireless device 1805, for example, based on or in response to wireless device 1810 being in a CM-CONNECTED state. The base station 1810 (e.g., NG-RAN) may receive an RRC Early Data Request message and/or a NAS message, for example, based on or in response to wireless device 1810 being in a CM-IDLE state.

In step 1833, base station 1810 (e.g., NG-RAN) may retrieve information associated with wireless device 1805. The information may be retrieved from AMF 1815. Additionally or alternatively, base station 1810 may send (transmit) information associated with wireless device 1805 to AMF 1815. Base station 1810 may receive (retrieve) one or more parameters from AMF 1815. The one or more parameters may comprise NB-IoT wireless device priority and/or expected wireless device behavior parameters. Base station 1810 may receive the one or more parameters from AMF 1815, for example, based on or in response to not having previously received the one or more parameters. Base station 1810 (e.g., NG-RAN) may prioritize requests from different wireless devices throughout the RRC connection, for example, based on NB-IoT wireless device priority and/or the expected wireless device behavior parameters. Base station 1810 (e.g., NG-RAN) may receive one or more parameters (e.g., Radio Capabilities) associated one or more additional wireless devices. In step 1833, AMF 1815 may receive a request for information associated with wireless device 1805. In step 1833, AMF 1815 may send (transmit) information associated with wireless device 1805 to a base station 1810 (e.g., NG_RAN), for example, based on or in response to receiving the request from base station 1810 (e.g., NG-RAN). Additionally or alternatively, AMF 1815 may receive information associated with wireless device 1805 (e.g., UE).

In step 1836, base station 1810 (e.g., NG-RAN) may send (transmit, forward) one or more messages to AMF 1815. The one or more messages may be sent (transmitted) to AMF 1815 using an Initial NAS message, for example, based on or in response to wireless device 1805 being in a CM-IDLE state. The one or more messages may be sent (transmitted) to AMF 1815 using an uplink NAS message, for example, based on or in response to wireless device 1805 being in CM-CONNECTED state. In step 1836, AMF 1815 may receive one or messages from base station 1810 (e.g., NG-RAN). The one or more messages may indicate an estimated delivery time session, "EDT Session," for example, based on or in response to base station 1810 receiving an RRC Early Data Request message, in step 1830. Additionally or alternatively, the one or more messages may comprise an N2 initial wireless device message, for example, based on or in response to base station 1810 receiving an RRC Early Data Request message, in step 1830. A RAI signaled by MAC based on a buffer status report (BSR) may not be used, for example, if using a Control Plane CIoT 5GS Optimization. A NAS RAI may take precedence, for example, based on or in response to base station 1810 (e.g., NG-RAN) receiving a NAS RAI from wireless device 1805 (e.g., UE), in step 1830, and the NAS RAI conflicting with the expected wireless device (e.g., UE) behavior received in step 1833.

In step 1840, AMF 1815 may check the integrity of one or more messages received from base station 1810. As noted above, the one or more messages may comprise at least one of a NAS message, a PDU session ID, and/or uplink data. In step 1840, AMF 1815 may decipher a PDU session ID and/or uplink data.

In step 1843, AMF 1815 may send (transmit) one or more messages to base station 1810. The one or more messages may comprise an N2 message, for example, based on or in response to AMF 1815 receiving an "EDT Session" indication from base station 1810, in step 1836. An AMF 1815 may not expect any other signaling with wireless device 1805, for example, based on or in response to AMF 1815 receiving a NAS RAI from a wireless device 1805 (e.g., UE) 1805 with uplink data that indicated downlink data was not expected. In step 1843, AMF 1815 may send (transmit) one or more messages to base station 1810. The one or more messages may comprise one or more of: an N2 downlink NAS transport message with End Indication or an N2 Connection Establishment Indication message with End Indication. Additionally or alternatively, AMF 1815 may send (transmit), to the base station 1810, a NAS service accept in an N2 downlink NAS transport message including End Indication, for example, to indicate that no further data and/or signaling may be expected from the wireless device 1805. Additionally or alternatively, AMF 1815 may send (transmit), to the base station 1810, an N2 Connection Establishment Indication message including End Indication, for example, to indicate that no further data and/or signaling is expected with the wireless device 1805. In step 1843, AMF 1815 may send an N2 Downlink NAS Transport message or Initial Context Setup Request message without End Indication, for example, based on or in response to AMF 1815 determines that more data and/or signaling may be pending.

In step 1843, a base station 1810 may receive one or more messages from an AMF 1815. The one or more messages may comprise one or more NAS messages. The one or more NAS messages may comprise one or more of: an N2 downlink NAS Transport message with End Indication, an N2 Connection Establishment Indication message with End Indication, an N2 downlink NAS Transport message without End Indication, and/or an Initial Context Setup Request message without End Indication.

In step 1845, base station 1810 may send (transmit) one or more messages to wireless device 1805. The one or more messages may indicate an RRC Early Data Complete or an RRC connection establishment. The process may perform steps 1848 and 1850, for example, based on the one or more messages indicating an RRC Early Data Complete. Alternatively, the process may perform the steps up to, and including, step 1890, for example, based on the one or more messages indicating an RRC connection establishment. Base station 1810 may complete an RRC Early Data Request with wireless device 1805, for example, based on or in response to base station 1810 receiving a DL N2 message from AMF 1815*m* in step 1843. In step 1845, wireless device 1805 may receive one or more messages from base station 1810. As noted above, the one or more messages may indicate an RRC Early Data Complete or an RRC connection establishment.

In step 1848, AMF 1815 may determine a (V-)SMF 1820 for a PDU session, for example, based on a PDU Session ID contained in a NAS message. AMF 1815 may send (transmit, pass) a PDU Session ID and/or data to (V-)SMF 1820 by invoking a Nsmf_PDUSession_SendMOData service operation. AMF 1815 may indicate (inform) an (H-)SMF (not shown) that RRC establishment cause may be set to "MO exception data," for example, based on or in response to base station 1810 sending (transmitting, forwarding) a NAS message to AMF 1815 using the Initial NAS message procedure of step 1836 and/or wireless device 1805 accessing via NB-IoT RAT. The "MO Exception Data" may be similar to that described in clause 5.31.14.3 of 3GPP TS 23.501. AMF 1815 may send a MO Exception Data Counter to (H-)SMF (not shown). AMF 1815 may not wait for a Namf_Communication_N1N2MessageTransfer, as shown in step 1855. Instead, AMF 1815 may proceed to step 1880, and detect no further activity, for example, based on or in response to no downlink data being expected from a wireless device 1805 based on a NAS RAI being sent in step 1830. Additionally or alternatively, AMF 1815 may proceed to step 1880, and detect no further activity, for example, based on or in response to not being aware of pending MT traffic.

In step 1850, a (V-)SMF 1820 may send (forward, transmit) data to UPF 1825. The data may be uplink data. Prior to sending the data, (V-)SMF 1820 may decompress a header of the data, for example, based on a determination that header compression applies to a PDU session. UPF 1825 may send (transmit, forward) the data to a DN, for example, based on a data forwarding rule. For example, for unstructured data, tunneling may be applied to unstructured data in accordance with clause 5.6.10.3 in 3GPP TS 23.501.

In step 1853, UPF 1825 may send (forward, transmit) available downlink data to the (V-)SMF 1820, for example, in a non-roaming and/or local break out (LBO) case. A H-UPF (not shown) may send (transmit, forward) data to a V-UPF and/or a (V-)SMF 1825, for example, in the home-routed roaming case. In step 1855, (V-)SMF 1825 may compress a header, for example, based on a determination that header compression applies to a PDU session. (V-)SMF 1825 may send (transmit, forward) downlink data and/or a PDU Session ID to AMF 1815, for example, using the Namf_Communication_N1N2MessageTransfer service operation.

In step 1860, AMF 1815 may generate (create) one or more messages. The one or more messages may comprise a DL NAS transport message with a PDU Session ID and/or downlink data. AMF 1815 may encrypt (cipher) and/or integrity protect a NAS transport message. In step 1863, AMF 1815 may send the one or more messages to base station 1810. As noted above, the one or more messages may comprise a DL NAS transport message. AMF 1815 may include an End Indication in a DL NAS transport message to indicate that no further data and/or signaling may be expected from wireless device 1805, for example, based on or in response to NAS RAI indicating a single uplink and/or a single downlink packet (e.g., acknowledgment expected). Additionally or alternatively, AMF 1815 may include an End Indication in a DL NAS transport message to indicate that no further data and/or signaling may be expected from wireless device 1805, for example, based on or in response to AMF 1815 determining that a data transmission may be for single uplink and/or single downlink packets.

In step 1865, base station 1810 may send one or more downlink communications to wireless device 1805. The one or more downlink communications may comprise a NAS transport. The NAS transport may comprise an SM data transfer and/or a PDU session ID. The one or more downlink communications may be sent to the wireless device 1805 via an RRC connection. In step 1870, AMF 1815 may send a signal to one or more of base station 1810, (V-)SMF 1820, and/or UPF 1825. The signal may trigger an AN Release procedure, for example, as described in clause 4.2.6 of 3GPP TS 38.413. The AN Release procedure may end the method. The process shown in FIG. 18 may end, for example, based on or in response to AMF 1815 detecting no further pending data and/or signaling. Additionally or alternatively, the process shown in FIG. 18 may end, for example, based on or in response to AMF 1815 receiving NAS RAI indicating single downlink data transmission. In step 1880, base station 1810 detect no further activity. Base station 1810 may signal (trigger) an AN Release Procedure, for example, based on or in response to base station 1810 detecting no further activity. In step 1890, a logical NG-AP signaling and/or RRC signaling connection of a wireless device 1805 may be released.

Figure 19:
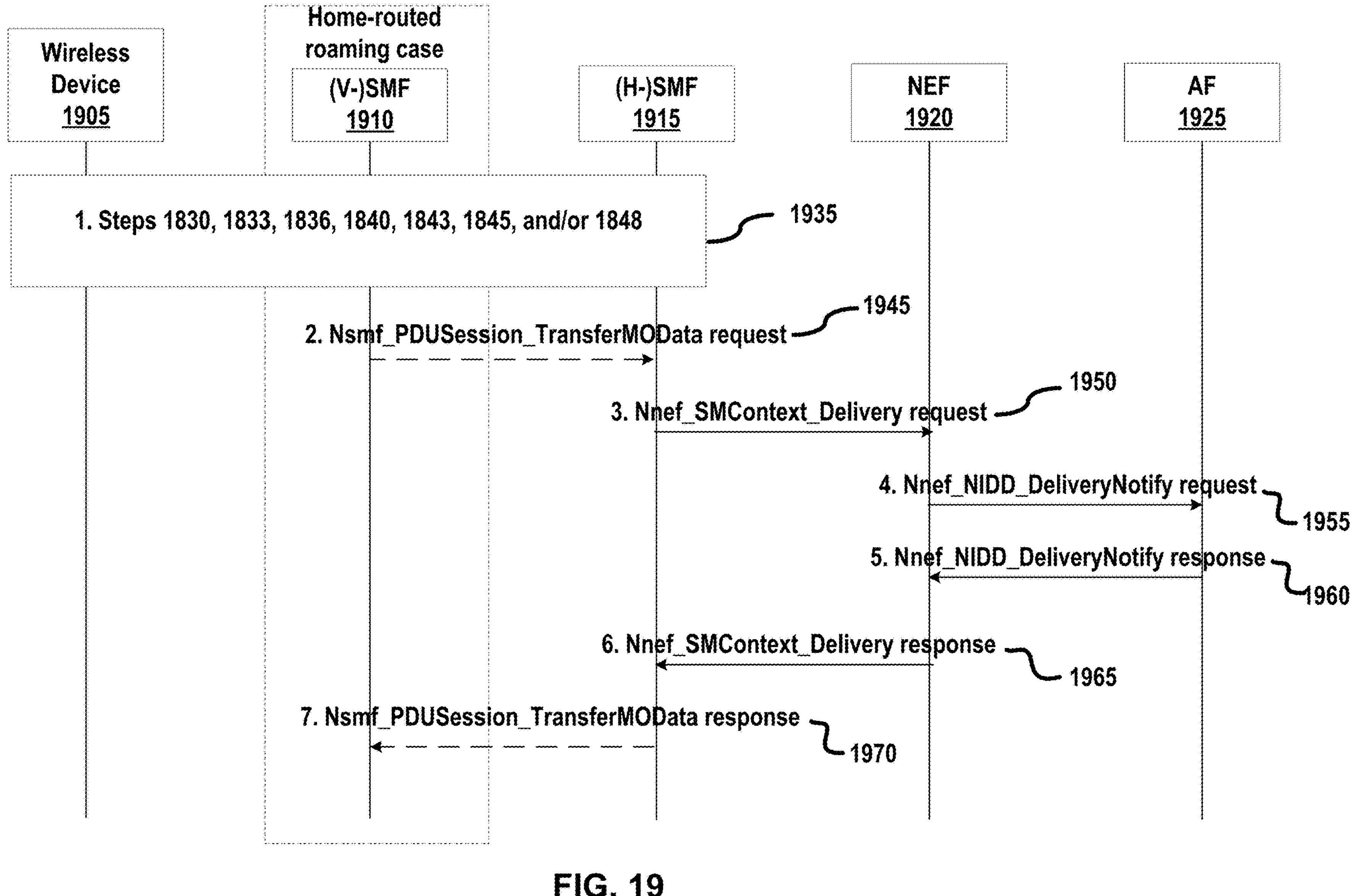
FIG. 19 shows an example of a process for a network exposure function (NEF) anchored mobile originated data transport in control plane CIoT 5GS optimization.

FIG. 19 shows an example of a process for a network element function (NEF) anchored mobile originated data transport in control plane CIoT 5GS optimization. In step 1935, wireless device 1905 may send (transmit) one or more communications. The one or more communications may comprise a NAS message with unstructured data. The one or more communications may be sent (transmitted) according to steps 1830, 1833, 1836, 1840, 1843, 1845, and/or 1848 of FIG. 18. A reliable data service header may be included in the one or more communications, for example, based on or in response to a Reliable Data Service being enabled.

In step 1945, (V-)SMF 1910 may send a first request to (H-)SMF 1915. (V-)SMF 1910 may send the first request for home-routed roaming. The first request may be a Nsmf_PDUSession_TransferMOData request. The first request may include MO small data. In step 1950, (H-)SMF 1915 may send a second request to NEF 1920. The second request may be a Nnef_SMContext_Delivery Request message. The second request may comprise at least one of: a user identity, PDU Session ID, unstructured data, etc. In step 1955, NEF 1920 may send a third request to AF 1925. The third request may comprise unstructured data. Additionally or alternatively, the third request may comprise a Nnef_NIDD_DeliveryNotify Request. AF 1925 may be identified by a destination address (e.g., the T8 Destination address) in the third request (e.g., Nnef_NIDD_DeliveryNotify Request), for example, based on or in response to NEF 1920 receiving the unstructured data and/or finding a NEF PDU Session context and the related destination address (e.g., T8 Destination Address). The third request may comprise one or more of: GPSI, unstructured data, reliable data service configuration, etc. A reliable data service configuration may be used, for example, to provide AF 1925 with additional information, such as an acknowledgement indication that may have been requested and/or port numbers for originator application and/or receiver application, for example, based on the reliable data service being enabled. In some examples, data may be discarded, a Nnef_NIDD_DeliveryNotify Request may not be sent, and/or flow may skip step 1960, for example, based on or in response to no destination address (e.g., T8 Destination address) being associated with a connection (e.g., PDN connection) of wireless device 1905.

In step 1960, AF 1925 send (transmit) a third response to NEF 1920. The third response may be a response to the third request. That is, AF 1925 may respond to NEF 1920 with a Nnef_NIDD_DeliveryNotify Response. In step 1965, NEF 1920 may send a second response to (H-)SMF 1915. In other words, NEF 1920 may send a Nnef_SMContext_Delivery Response to (H-)SMF 1915. The second response may be a response to the second request sent from (H-)SMF 1915 to NEF 1920. NEF 1920 may send an error code to (H-)SMF, for example, based on or in response to NEF 1920 being unable to deliver the data. NEF 1920 may be unable to deliver the data, for example, based on a missing AF configuration. In step 1960, (H-)SMF 1915 may send a first response to (V-)SMF 1910. respond to the V-SMF with a Nsmf_PDUSession_TransferMOData (Result Indication) Response, for example, in the case of home-routed roaming.

Figure 20:
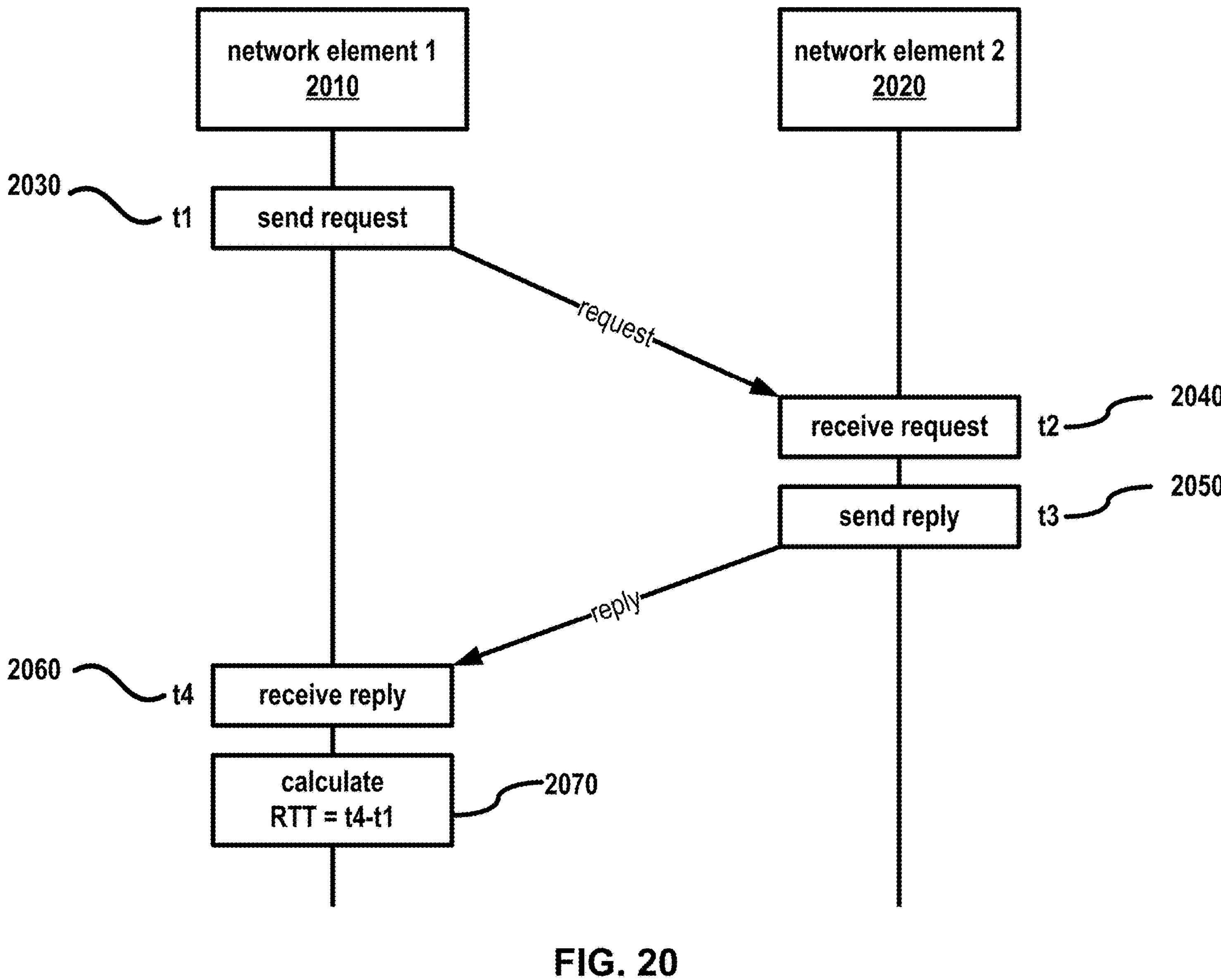
FIG. 20 shows an example of a process for a round trip time (RTT) measurement.

FIG. 20 an example of a process for round trip time (RTT) measurement. A RTT (latency) may be a duration between a send (transmit) request and a received response. The duration may be a length of time, for example, measured in milliseconds. FIG. 20 comprises a first network element 2010 and a second network element 2020. First network element 2010 may comprise a wireless device, user equipment, a cellular modem, a cellular router, and/or a protection relay. The second network element 2020 may comprise a wireless device, user equipment, a cellular modem, a cellular router, and/or a protection relay.

At a first time 2030 (e.g., t1), first network element 2010 may send (transmit) a request message to second network element 2020. The request message may comprise a first timestamp. At a second time 2040 (e.g., t2), second network element 2920 may receive the request message from the first network element 2010. At a third time 2050 (e.g., t3), second network element 2020 may send (transmit) a reply message to the first network element 2010. The reply may comprise a second timestamp. The second timestamp may indicate a time at which the request was received (e.g., second time 2040), a time at which the reply was sent (e.g., third time 2050), or both. At a fourth time 2060 (e.g., t4), first network element 2010 may receive the reply message from second network element 2020. First network element 2010 may determine (calculate) a RTT between first network element 2010 and second network element 2020, for example, based on the difference between first time 2030, the time the request was sent by first network element 2010, and fourth time 2060, the time that the reply was received by first network element 2010. That is, the RTT may be determined by subtracting the first time 2030 from the fourth time 2060 (e.g., RTT=t4−t1). The first network element 2010 may determine (estimate, calculate) a one-way latency (OWL) and/or one-way delay (OWD) between first element 2010 and second element 2020 by dividing the RTT in half (e.g., one way latency≈RTT/2). The estimate may only be accurate if two conditions (assumptions) are true: first, the amount of processing time required by second network element 2020 to receive the request and send the reply should be negligible and/or equal to zero (e.g., t3−t2≈0); second, the amount of time to send a request from first network element 2010 to second network element 2020 should be about equal to the amount of time to send a reply from second network element 2020 to first network element 2010 (e.g., t2−t1≈t4−t3). An estimate of OWL/OWD may be inaccurate, for example, if either assumption is false. RTT may not be used to determine that a latency between a first network element 2010 and a second network element 2020 is symmetrical.

Figure 21:
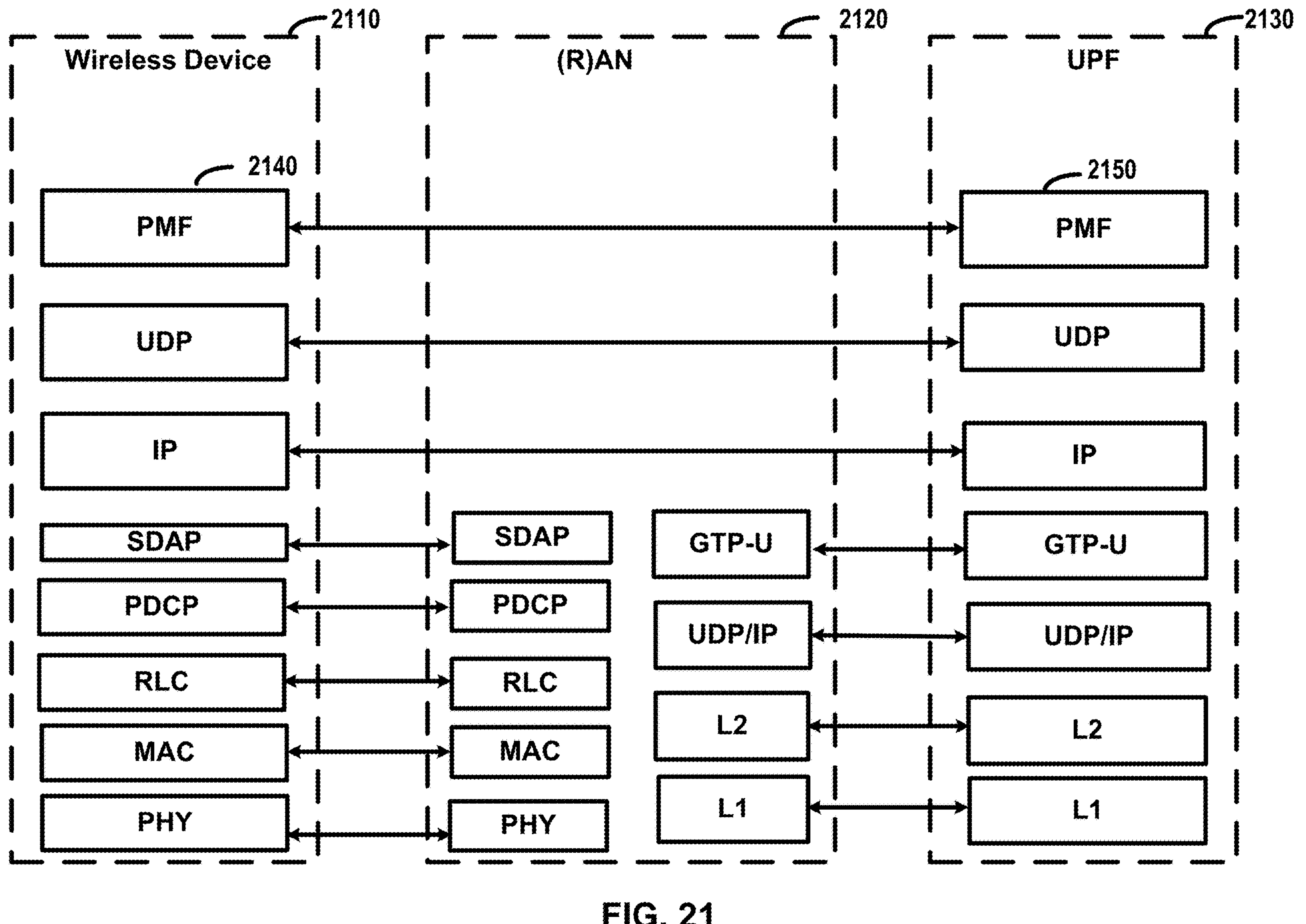
FIG. 21 shows an example of a protocol stack for user plane measurements.

FIG. 21 shows an example of a protocol stack for user plane measurements. RTT measurements may be conducted, for example, by wireless device 2110 and/or UPF 2130. There may be no measurement reporting from one side to the other. RTT measurements may be defined as “Smallest Delay,” “Priority-based,” or “Load Balancing” steering mode, for example, when a RTT threshold value is applied.

An estimation of the RTT by wireless device 2110 may be based on a Performance Measurement Function 2140. Similarly, an estimation of the RTT by UPF 2130 may be based on Performance Measurement Function (PMF) 2150. For example, wireless device 2110 may send (transmit) a message to UPF 2130. Specifically, PMF 2140 may send a message to PMF 2150. The message may be sent (transmitted) via a user plane. The message may comprise one or more PMF-Echo Request messages. UPF 2130 may respond to the request from wireless device 2110. That is, PMF 2150 may respond to each one of the one or more PMF-Echo Response messages. Similarly, PMF 2150 may send (transmit) a message to wireless device 2110. The message may be sent via a user plane. The message may comprise one or more PMF-Echo Request messages. PMF 2140 may respond to each of the one or more PMF-Echo Request Messages with a PMF-Echo Response message. PMF-Echo Request messages may not be sent on this access, for example, based on the UP connection of the MA PDU session being deactivated on an access. PMF 2150 may not send (transmit) a PMF-Echo Request on this access, for example, based on the UP connection not being available or after the UP connection receives notification from a (H-)SMF to stop sending the PMF-Echo Request on this access. Wireless device 2110 and/or UPF 2130 may determine (calculate, derive) an estimation of an average RTT over an access type and/or QoS Flow, for example, by averaging RTT measurements obtained over this access type and/or QoS Flow.

Figures 22A, 22B:
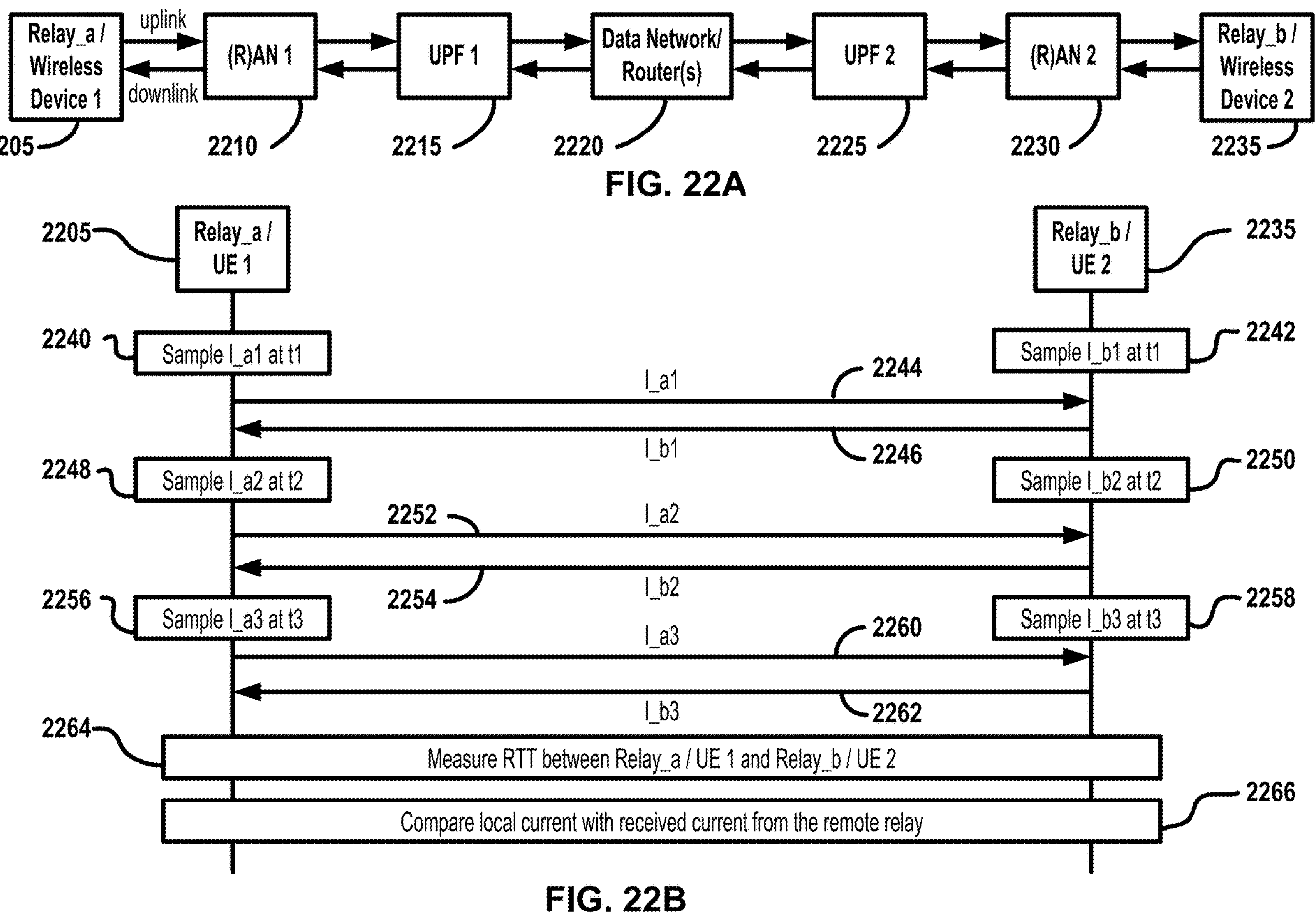
FIG. 22A shows an example of a communication network.
FIG. 22B shows an example process of determining a current differential.

FIG. 22A shows an example of a communication network. As shown in FIG. 22A, the communication network may comprise a first relay 2205, a first base station 2210, a first UPF 2215, a network 2220, a second UPF 2225, a second base station 2230, and/or a second relay 2235. First relay 2205 may comprise and/or be co-located with a first wireless device. Similarly, second relay 2235 may comprise and/or be co-located with a second wireless device. First relay 2205 may communicate with second relay 2235 using the first wireless device, and second relay 2235 may communicate with first relay 2205 using the second wireless device. While FIG. 22A shows first base station 2210, first UPF 2215, network 2220, second UPF 2225, and second base station 2230, one or more additional network functions and/or nodes may be located between first relay 2205 and/or second relay 2235. From the perspective of first relay 2205, an uplink communication channel and/or communication path may comprise a direction from first relay 2205 to second relay 2235. The uplink communication channel from first relay 2205 to second relay 2235 may comprise one or more network functions and/or nodes (e.g., first base station 2210, first UPF 2215, Data Network/Router(s) 2220, second UPF 2225, and/or second base station 2230). From the perspective of first relay 2205, a downlink communication channel and/or communication path may comprise a direction from second relay 2235 to first relay 2205. The downlink communication channel from second relay 2235 to first relay 2205 may comprise one or more network functions and/or nodes (e.g., first base station 2210, first UPF 2215, Data Network/Router(s) 2220, second UPF 2225, and/or second base station 2230). From the perspective of second relay 2235, an uplink communication channel and/or communication path may comprise a direction from second relay 2235 to first relay 2205. The uplink communication channel may comprise one or more network functions and/or nodes (e.g., first base station 2210, first UPF 2215, Data Network/Router(s) 2220, second UPF 2225, and/or second base station 2230). From the perspective of second relay 2235, a downlink communication channel and/or communication path may comprise a direction from first relay 2205 to second relay 2235. The downlink communication path may comprise one or more network functions and/or nodes (e.g., first base station 2210, first UPF 2215, Data Network/Router(s) 2220, second UPF 2225, and/or second base station 2230).

FIG. 22B shows an example process of determining a current differential. As shown in FIG. 22B, first relay 2205 may continuously measure (sample) a first current (e.g., $I\_a_n$, n=1, 2, 3, . . . ), for example, as described above with respect to FIG. 17. First relay 2205 may send (transmit) the first current values to second relay 2235. Additionally or alternatively, first relay 2205 may store the measured first current values, locally. Second relay 2235 may continuously measure (sample) a second current (e.g., $I\_b_n$, n=1, 2, 3, . . . ). Second relay 2235 may send (transmit) the second current values to first relay 2205. Additionally or alternatively, second relay 2235 may store the measured second current values locally. First relay 2205 may measure (determine) a first round trip time (RTT) between first relay 2205 and second relay 2235. Similarly, second relay 2235 may measure (determine) a second RTT between second relay 2235 and first relay 2205, at step 2644. First relay 2205 may obtain (calculate, derive) a second current value (e.g., I_b1) based on the first RTT and/or based on an assumption that a communication channel (path) between first relay 2205 and second relay 2235 is symmetric. A communication channel (path) may be symmetric, for example, if the uplink communication channel (path) and the downlink communication channel (path) are symmetric. An uplink communication channel (path) and the downlink communication channel (path) may be symmetric, for example, if the uplink communication channel (path) latency (e.g., the latency from first relay 2205 to second relay 2235) equals the latency of the downlink communication channel (path) (e.g., the latency from second relay 2235 to first relay 2205). An uplink communication channel (path) and a downlink communication channel (path) may be symmetric, for example, if a difference between the uplink communication channel (path) latency and the downlink communication channel (path) latency is less than or equal to a threshold value (e.g., 2 ms).

At a first time 2240 (t1), first relay 2205 may sample a first current (e.g., I_a). At a second time 2242 (t1), second relay 2235 may sample a second current (e.g., I_b). The first time 2240 and the second time 2242 may be the same, or approximately the same, time. At step 2244, first relay 2205 may send (transmit) a first sample current (e.g., I_a1) to second relay 2235. At or about the same time, at step 2246, second relay 2235 may send (transmit) a second sample current (e.g., I_b1) to first relay 2205. The process may repeat. For example, at second time 2248, 2250, first relay 2205 may sample (measure) the first current (e.g., I_a) and/or second relay 2235 may sample (measure) the second current (e.g., I_b). First relay 2205 may send the sampled first current (e.g., I_a2) to second relay 2235, at step 2252. Similarly, second relay 2235 may send the sampled second current (e.g., I_a2) to first relay 2205, at step 2254. At third time 2256, 2258, first relay 2205 may sample (measure) the first current (e.g., I_a) and/or second relay 2235 may sample (measure) the second current (e.g., I_b). First relay 2205 may send the sampled first current (e.g., I_a3) to second relay 2235, at step 2260, and second relay 2235 may send the sampled second current (e.g., I_a3) to first relay 2205, at step 2262.

At step 2264, first relay 2205 may measure a RTT (e.g., 20 ms) between first relay 2205 and second relay 2235. First relay 2205 may derive a second current value (e.g., I_b1), for example, based on the RTT and/or an assumption that the communication channel (path) between first relay 2205 and second relay 2235 is symmetric. For example, first relay 2205 may receive the secure current value (e.g., I_b1) at a time of 10 ms. First relay 2205 may calculate (determine) that the latency of the downlink communication channel (path) from second relay 2235 as half of the RTT (e.g., 10 ms). First relay 2205 may determine (calculate, derive) that the received second current value (e.g., I_b1) was sampled and measured by second relay 2235 at the first time 2242 (t1), for example, based on the latency of the downlink communication channel (path). In step 2266, first relay 2205 may compare the local current (e.g., I_a1) with the derived second current value (e.g., I_b1), for example, based on a determination that the local current (e.g., I_a1) and the derived second current (e.g., I_b1) were sampled at the same time 2240/2242. First relay 2205 may perform a similar comparison on subsequently obtained current samples (e.g., I_a2, I_a3, etc.) and subsequently received current values (e.g., I_b2, I_b3, etc.)

While solutions have focused on symmetric communication, at least some systems have not addressed the issue of how the first relay and the second relay obtain one-way delay (e.g. latency) information. For example, in the current differential protection use-case described above with respect to FIG. 17, channel symmetry may be a requirement. Accordingly, first relay and second relay need to know the one-way delay (e.g., latency) information from the first relay to the second relay and the one-way delay (e.g., latency) information from the second relay to the first relay. In the absence of effective methods of setting up and/or maintaining channel symmetry, and without the one-way delay (e.g., latency information), the current differential protection solution cannot be implemented or cannot be implemented reliably. This may result in power failures, severe damage, and/or destruction (e.g., forest fires). For example, a first relay may incorrectly compare a first local current value measured at a first time (e.g., t0) with a second received current value measured at a second time (e.g., t1), for example, based on or in response to the communication channel (path) between the first relay and the second relay being asymmetric. The latency of the uplink communication channel (path) may be 5 ms, while the latency of the downlink communication channel (path) may be 15 ms. The first relay may receive the sample current (e.g., I_b1) at a time of 15 ms. Based on half of the RTT (e.g., 10 ms), the first relay may incorrectly conclude that the received current value (e.g., I_b1) was sampled and measured by the second relay at a time of 5 ms. The received current value (e.g., I_b1) may not be compared with measured current value (e.g., I_a1) because the first relay may determine that the samples were measured at different times. The first relay may not be able to determine (calculate, derive) a locally measured current that corresponds to the received current value (e.g., I_b1) because the communication channel (path) between the first relay and the second relay is asymmetric. Additionally or alternatively, the first relay may determine (calculate, derive) an incorrect measurement time of the received current value (e.g., I_b1) because of the asymmetric communication channel (path) between the first relay and the second relay. First relay may compare the received current value (e.g., I_b1) to an incorrect locally measured (sampled) current value. A first relay may send a trip signal to a connected circuit breaker, for example, based on the incorrect comparison. The trip signal may cause the power supply to be incorrectly interrupted. Alternatively, a first relay may fail to trip (break) the circuit, for example, based on or in response to an incorrect comparison. The failure to trip (break) the circuit may cause destruction of a power line, a power station/substation, and/or an electrical grid. The second relay may have similar problems, for example, if the communication channel (path) between the second relay and the first relay is not symmetric.

In another example, a delay due to an asymmetric communication channel (path) may provide at least one player an advantage, or disadvantage, over one or more other players. In this regard, a first user (e.g., UE 1) and a second user (e.g., UE 2) may play a game, for example, via a communication network such as the one shown in FIG. 22A. The first user may send an order to the second user, and the latency from the first user to the second user may be a first duration (e.g., 10 ms). The second user may respond to the first user, for example, in response to receiving the order. The first user may receive a delayed response, for example, due to the communication channel (path) between the first user and the second user not being symmetric. Accordingly, the game may not be played fairly because at least one user may have an advantage over one or more other users.

As shown by the examples above, determining (calculating, measuring) one-way delay (latency) between two network elements (e.g., between two wireless devices, between a wireless device and a base station, etc.) may be difficult and/or inefficient. There may be difficulties in measuring a one-way delay between two wireless devices and/or providing the measured one-way delay to both wireless devices. Due to technology advancements, certain environments may require channel symmetry between network elements. That is, the one-way latency from a first network element to a second network element should be about equal to the one-way latency from the second network element to the first network element. Moreover, the delays caused by asymmetric communication channels may prevent network elements from remediating problems. Applications and/or services that benefit from channel symmetry may not be able to achieve that symmetry without being able to determine the one-way delay (latency) between devices.

As described herein, improvement are provided for measuring (calculating, deriving) one-way delay (latency) between two network elements, two wireless devices, and/or a wireless device and a network element (e.g., a base station). Additionally or alternatively, improvements are provided that allow a network to measure one way-delay between two wireless devices and provide the measured one-way delay to each of the two wireless devices. By being informed of the one-way delay between network element, improvements are provided that allow a network to implement remedial actions, for example, based on a determination that a communication channel (path) between two wireless devices is not symmetric. Accordingly, applications and/or services may factor in the one-way delay between network elements, for example, when determining what, if any, remedial actions should be taken. This may allow the network to performed correctly and/or efficiently.

FIG. 23 shows an example of a process 2300 for a base station to measure a one-way latency between a first wireless device and a second wireless device. As shown in FIG. 23, the system may comprise a first wireless device 2310, a second wireless device 2320, and a base station 2330. As noted above, first wireless device 2310 and second wireless device 2320 may comprise a wireless device, user equipment (e.g., mobile phone, cellular phone, tablet, laptop, etc.), a cellular modem, a cellular router, and/or a protection relay. Base station 2330 may be a network element, such as a base station, (R)AN, control plane function, user plane function (UPF), L-UPF (GW). A local UPF (L-UPF)/local gateway (L-GW) may be co-located with base station 2330. The L-UPF/L-GW may have an interface with base station 2330. The L-UPF/L-GW may perform an end-to-end latency measurement. The end-to-end latency measurement may comprise a first (e.g., uplink) one-way delay and/or a second (e.g., downlink) one way delay. The L-UPF/L-GW may send a measured end-to-end latency to base station 2330, for example, via the interface.

At step 2340, first wireless device 2310 may send one or more first messages to base station 2330. At step 2340, base station 2330 may receive the one or more first messages from the first wireless device 2310. The one or more first messages may comprise a request to measure an end-to-end latency between first wireless device 2310 and second wireless device 2320. The one or more first messages may comprise one or more parameters indicating a request to measure an end-to-end latency between first wireless device 2310 and second wireless device 2320. The one or more first messages may also comprise a request to perform the end-to-end latency measurement and/or notify the first wireless device 2310 of a result of the end-to-end latency measurement. The one or more first messages may comprise one or more of an RRC message, a latency measurement request (LMR), a registration request message, or a protocol data unit (PDU) session request message. Additionally or alternatively, the one or more first messages may comprise an RRC request message. The RRC request message may comprise at least one of: an MSG 3; an MSG 5; a RRCSetupRequest; a RRCSetupComplete; a RRCResumeRequest; a RRCResumeComplete; a UEAssistanceInformation; a UEInformationResponse; and/or a UECapabilityInformation. FIG. 24 shows an example diagram depicting a RRCSetupRequest message that can be used to request an end-to-end latency measurement.

At step 2345, base station 2330 may send one or more second messages to first wireless device 2310. The one or more second messages may comprise a response to the first wireless device 2310's request to measure the end-to-end latency between first wireless device 2310 and second wireless device 2320. As shown in FIG. 23, the one or more second messages comprise an indication of acceptance of the request to measure the end-to-end latency between first wireless device 2310 and second wireless device 2320. The response message may indicate that the base station 2330 may perform a measurement. Additionally or alternatively, the response message may notify the first wireless device 2310 of a result of a measurement. The response message may one or more of an RRC message or a latency measurement accept (LMA). The response message may indicate whether the base station 2330 accepts the request for measuring an end-to-end latency between the first wireless device 2310 and the second wireless device 2320. The response message may comprise at least one of: a fifth parameter and/or an End-to-End Latency Measurement Accept; a radio bearer configuration information of a radio bearer for an end-to-end latency measurement; and/or a RRC configuration information for end-to-end latency measurements. The response message may comprise a RRC response message. The RRC response message may comprise one or more of: a RRCReconfiguration, a MSG 4, a RRCSetup, a RRCResume, a UEReconfiguration, a UEInformationRequest, and/or a UECapabilityEnquiry. The response message may comprise at least one of: a registration response message, and/or a PDU session response message.

First wireless device 2310 may perform one or more actions, for example, based on or in response to receiving the response message. First wireless device 2310 may measure an end-to-end delay between the first wireless device 2310 and base station 2330. First wireless device 2310 may measure the end-to-end delay over a PDU session, a network slice, a QoS flow, a service data flow, and/or a radio bearer, for example, based on an indication from the base station that the RRC connection, the PDU session, the network slice, the QoS flow, the service data flow, and/or the radio bearer be applied and/or used for the end-to-end latency measurement. First wireless device 2310 may establish a RRC connection, a PDU session, a network slice, a QoS flow, a service data flow, and/or a radio bearer applied and/or radio bearer for the end-to-end latency measurement. A PDU session, a network slice, a QoS flow, a service data flow, and/or a radio bearer may be between first wireless device 2310 and base station 2330. A PDU session, a network slice, a QoS flow, and/or a service data flow may be between first wireless device 2310 and a core network function (e.g., an AMF, an SMF, and/or a UPF).

Based on the acceptance, process 2300 may proceed to step 2360, where base station 2330 may determine a first one-way latency between first wireless device 2310 and second wireless device 2320 and/or a second one-way latency between second wireless device 2320 and first wireless device 2310.

At step 2350, second wireless device 2320 may send one or more first messages to base station 2330. At step 2350, base station 2330 may receive the one or more first messages from the second wireless device 2320. The one or more first messages may comprise a request to measure an end-to-end latency between second wireless device 2320 and first wireless device 2310. The one or more first messages sent at step 2350 may be the same, or similar, format to those transmitted in step 2340. At step 2355, base station 2330 may send one or more second messages to first wireless device 2310. The one or more second messages may comprise a response to second wireless device 2320's request to measure the end-to-end latency between second wireless device 2320 and first wireless device 2310. As discussed above, FIG. 23 shows the base station accepting the request to measure the end-to-end latency between second wireless device 2320 and first wireless device 2310, in step 2355. Based on the acceptance, process 2300 may proceed to step 2360, where base station 2330 may determine a first one-way latency between first wireless device 2310 and second wireless device 2320 and/or a second one-way latency between second wireless device 2320 and first wireless device 2310.

The second wireless device 2320 sending a request to measure the end-to-end latency between second wireless device 2320 and first wireless device 2310 may be sent concurrently as the first wireless device 2310's request to measure the end-to-end latency. Alternatively, the second wireless device 2320's request to measure the end-to-end latency between second wireless device 2320 and first wireless device 2310 may be sent independently of the first wireless device 2310's request. In yet a further alternative, only one of the devices may request the end-to-end latency measurement.

In step 2360, base station 2330 may determine (e.g., measure) the end-to-end latency, for example, based on one or more parameters. The one or more parameters may be received in the request to measure the end-to-end latency.

In step 2365, base station 2330 may send (transmit), to first wireless device 2310, a third message, for example, based on or in response to the request to measure end-to-end latency sent in step 2340. The third message may indicate the end-to-end latency between first wireless device 2310 and the second wireless device 2320. The third message may also indicate an RRC connection, a PDU session, a network slice, a QoS flow, a service data flow, and/or a radio bearer applied and/or radio bearer used for the end-to-end latency measurement. The third message may comprise a PDU session identifier indicating a PDU session used and/or applied to the end-to-end latency measurement. The third message may comprise a S-NSSAI indicating a network slice used and/or applied to the end-to-end latency measurement. The end-to-end latency between first wireless device 2310 and second wireless device 2320 may comprise a first one-way end-to-end latency (L1) from first wireless device 2310 to second wireless device 2320 and/or a second one-way end-to-end latency (L2) from second wireless device 2320 to the first wireless device 2310. The first one-way latency (L1) and second one-way latency (L2) may not be equal (e.g., symmetrical). As discussed above, an end-to-end latency may indicate a time (duration) to (successfully) deliver a data packet and/or message from a first network element (e.g., user equipment 1, a base station 1, a UPF 1, a router 1, etc.) to a second network element (e.g., user equipment 2, a base station 2, a UPF 2, a router 2, etc). An end-to-end latency may indicate a time (duration) to (successfully) deliver a data packet and/or message from a first wireless device to a second wireless device. An end-to-end latency may indicate a time (duration) to (successfully) deliver a data packet and/or message from a wireless device (e.g., UE 1) to a base station (e.g., (R)AN).

In step 2370, base station 2330 may send (transmit), to second wireless device 2320, a third message, for example, based on or in response to the request to measure end-to-end latency sent in step 2350. The third message may indicate the end-to-end latency between second wireless device 2320 and first wireless device 2310. The end-to-end latency between second wireless device 2320 and first wireless device 2310 may comprise a second one-way end-to-end latency (L2) from second wireless device 2320 to first wireless device 2310 and/or a first one-way end-to-end latency (L1) from first wireless device 2310 to second wireless device 2320. The first one-way latency (L1) and second one-way latency (L2) may not be equal (e.g., symmetrical).

At step 2375, first wireless device 2310, second wireless device 2320, and/or base station 2330 may perform channel alignment. The channel alignment may be based on the first one-way end-to-end latency (L1) from first wireless device 2310 to second wireless device 2320 and/or the second one-way end-to-end latency (L2) from second wireless device 2320 to the first wireless device 2310. The channel alignment may be time-based channel alignment and/or channel-based alignment, as discussed above with respect to FIG. 17. First wireless device 2310 and/or second wireless device 2320 may perform a channel-based alignment for line current differential protection over a PDU session, a network slice, a QoS flow, a service data flow, and/or a radio bearer. First wireless device 2310 and/or second wireless device 2320 may perform a channel-based alignment, for example, based on the end-to-end latency (e.g., an uplink channel latency and/or a downlink channel latency) received from base station 2330. First wireless 2310 device and/or second wireless device 2320 may perform other applications (e.g., games) over a PDU session, a network slice, a QoS flow, a service data flow, and/or a radio bearer, for example, based on the end-to-end latency (e.g., an uplink channel latency and/or a downlink channel latency) received from base station 2330.

One or more of the elements depicted in FIG. 23 may perform one or more actions to align or facilitate alignment of the channels between the first wireless device 2310 and the second wireless device 2320. The one or more elements may maintain channel symmetry such that L1 may equal L2 and/or a difference between L1 and L2 may be less than a threshold value. Base station 2330, or another network element, may perform an alignment, for example, based on L1 and/or L2, in step 2375. Base station 2330 may provide L1 and/or L2 to first wireless device 2310 and/or second wireless device 2320. First wireless device 2310 and/or second wireless device 2320 may perform an alignment in step 2375, for example, based on or in response to receiving L1 and/or L2 from base station 2330.

Base station 2330 may compare a first (e.g., uplink) one-way delay between first wireless device 2310 and second wireless device 2320 and a second (e.g., downlink) one-way delay between first wireless device 2310 and the second wireless device 2320. In step 2375, base station 2330 may modify and/or adjust one or more parameters (e.g., a radio bearer and/or QoS resources), for example, based on or in response to the comparison. The one or more parameters may be modified or adjusted so that the first (e.g., uplink) one-way delay may be equal to the second (e.g., downlink) one-way delay to maintain a symmetric uplink communication channel and downlink communication channel). Additionally or alternatively, base station 2330 may modify and/or adjust one or more parameters (e.g., a radio bearer and/or QoS resources) so that a difference between the first (e.g., uplink) one-way delay and the second (e.g., downlink) one-way delay is less than a threshold value (e.g., 2 ms). Base station 2330 may modify and/or adjust one or more parameters (e.g., a radio bearer and/or QoS resources) between base station 2330 and first wireless device 2310. Additionally or alternatively, base station 2330 may modify and/or adjust one or more parameters (e.g., the radio bearer and/or QoS resources) between base station 2330 and second wireless device 2320. Base station 2330 may send a RRCReconfiguration message to first wireless device 2310 and/or second wireless device 2320. The RRCReconfiguration message may comprise one or more parameters to modify and/or adjust the radio bearer and/or QoS resources.

In step 2375, base station 2330 may modify and/or adjust one or more parameters (e.g., time, frequency, space, and/or power resources) between base station 2330 and first wireless device 2310. Base station may modify and/or adjust the one or more parameters (e.g., time, frequency, space, and/or power resources) between base station 2330 and second wireless device 2320. By modifying or adjusting the one or more parameters, base station 2330 may ensure that a first (e.g., uplink) one-way delay may be equal to a second (e.g., downlink) one-way delay between first wireless device 2310 and second wireless device 2320 to maintain a symmetric uplink communication channel and downlink communication channel.

In step 2375, base station 2330 may modify and/or adjust one or more parameters (e.g., time, frequency, space, and/or power resources) between base station 2330 and first wireless device 2310. Base station 2330 may modify and/or adjust the one or more parameters (e.g., time, frequency, space, and/or power resources) between base station 2330 and second wireless device 2320. The one or more parameters may be modified or adjusted, for example, based on the end-to-end delay measurement. Modifying and/or adjusting the one or more parameters may ensure that a difference between a first (e.g., uplink) one-way delay and a second (e.g., downlink) one-way delay is less than a threshold value (e.g., 2 ms). Base station 2330 may send (transmit) a RRCReconfiguration message to first wireless device 2310 and/or second wireless device 2320. The RRCReconfiguration message may comprise one or more parameters to modify and/or adjust the time, frequency, space, and/or power resources.

Figure 25:
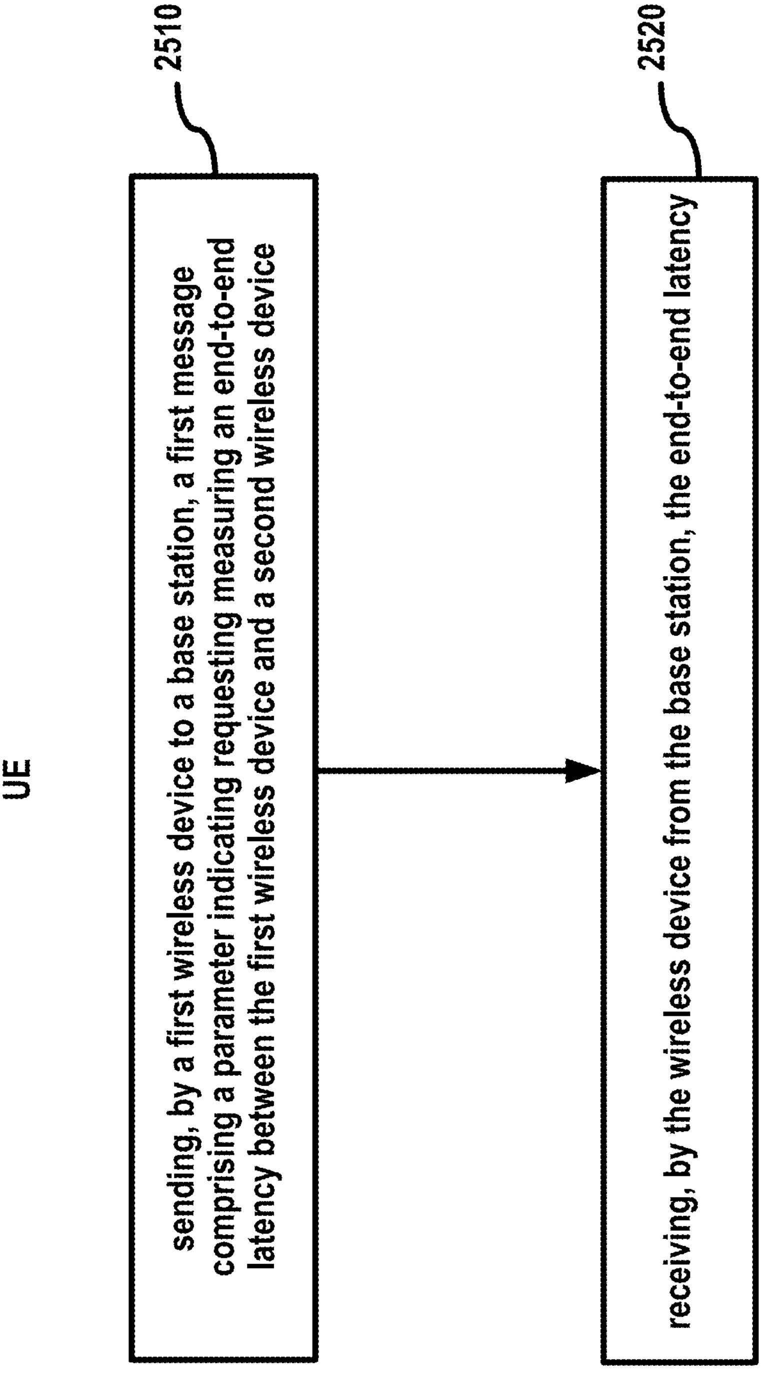
FIG. 25 shows an example of a wireless device requesting an end-to-end latency measurement.

FIG. 25 shows an example process of a wireless device requesting an end-to-end latency measurement between a. In step 2510, a first wireless device may send (transmit) a first message to a base station. The first message may comprise one or more messages and/or communications. The first message may comprise a first parameter indicating a request to measure an end-to-end latency between the first wireless device and a second wireless device. Additionally, the first message may comprise one or more of: an identity of the first wireless device or an identity of the second wireless device. An identity of the first wireless device and/or an identity of the second wireless device may comprise at least one of: a Generic Public Subscription Identifier (GPSI); a Subscription Permanent Identifier (SUPI); a Subscription Concealed Identifier (SUCI); a 5G Globally unique Temporary Identity (5G-GUTI); a permanent equipment identifier (PEI); an IP address; and/or an application level identifier to identify the first wireless device and/or the second wireless device. The GPSI may comprise a Mobile Station Integrated Services Digital Network (MSISDN) and/or an external identifier. The SUPI may comprise an International Mobile Subscriber Identity (IMSI) and/or Network Access Identifier (NAI). The PEI may comprise an International Mobile Equipment Identity (IMEI). The IP address may comprise an IPv4 address and/or an IPv6 prefix.

Additionally or alternatively, the first message may comprise a second parameter (e.g., Latency Accuracy) indicating an accuracy (e.g., requested accuracy, required accuracy) of the end-to-end latency measurement. The accuracy of the end-to-end latency measurement may comprise at least one of: a second; a decisecond; a centisecond; a millisecond; a microsecond; and/or the like.

The first message may comprise a third parameter indicating symmetric communication channels. Symmetric communication channels may be referred to as first and second, uplink and downlink, and/or any other appropriate label. An end-to-end latency of at least one uplink communication channel (e.g., L1) may be equal to an end-to-end latency of at least one downlink communication channel (e.g., L2, where L2=L1). The at least one uplink communication channel may indicate a first communication path from a first network element to a second network element. The at least one downlink communication channel may indicate a second communication path from the second network element to the first network element. The first network element may comprise at least one of: a first wireless device; a first base station; a first access and mobility management function (AMF); a first session management function (SMF); a first user plane function (UPF); a first network exposure function (NEF); a first router; and/or the like. The second network element may comprise at least one of: a second wireless device; a second base station; a second AMF; a second SMF; a second UPF; a second NEF; a second router; and/or the like. A communication path may comprise at least one of: at least one physical uplink control channel (PUCCH); at least one physical downlink control channel (PDCCH); at least one physical uplink shared channel (PUSCH); at least one physical downlink shared channel (PDSCH); at least one signaling radio bearer (SRB); at least one data radio bearer (DRB); at least one RRC connection; at least one service data flow; at least one QoS flow; at least one protocol data unit (PDU) session; and/or the like. A communication path may indicate a path of communication over at least one of: an air interface; an ethernet cable; a fiber cable; a communication network; and/or the like. The end-to-end latency of the at least one uplink communication channel may indicate a time (duration) to (successfully) deliver a data packet/message from the first network element (e.g., UE 1) to the second network element (e.g., UE 2). The end-to-end latency of the at least one downlink communication channel may indicate a time (duration) to (successfully) deliver a data packet/message from the second network element (e.g., UE 2) to the first network element (e.g., UE 1). A difference between L1 and L2 may be less than or equal to a configured value (e.g., a threshold). A difference between L1 and L2 may be less than 2 milliseconds (e.g., $|L1-L2|<2$ ms).

The third parameter may be a channel symmetry request (CSR). Symmetric communication channels may be applied to a service and/or an application of a wireless device. A service of the wireless device may comprise a video service, a URLLC service (e.g., as described above in FIG. 6), an eMBB service (e.g., as described above in FIG. 6), an mMTC service (e.g., as described above in FIG. 6), a Massive Internet of things (MIoT) service, a High-Performance Machine-Type Communications (HMTC) service, and/or the like. A MIoT may indicate one or more physical objects that are embedded with sensors, processing ability, software, and/or other technologies that connect and/or exchange data with other devices and systems over the Internet and/or other communications networks. An HMTC service may indicate a type of low power wide area network (LPWAN) radio technology to enable a wide range of cellular devices, sensors, and/or services (e.g., for M2M and/or IoT applications). An application of a wireless device may be an application for smart energy (e.g., line current differential protection). Additionally or alternatively, an application of the wireless device may be a game application.

Additionally or alternatively, the third parameter (e.g., Channel Symmetry Request) may indicate a request for a radio bearer for symmetric communication channels. The radio bearer may comprise a data radio bearer (DRB) and/or a signaling radio bearer (SRB). The third parameter (e.g., Channel Symmetry Request) may indicate a request for a PDU session for the symmetric communication channels. The PDU session may be associated with at least one radio bearer. The at least one radio bearer may comprise at least one data radio bearer and/or at least one signaling radio bearer.

The third parameter (e.g., Channel Symmetry Request) may indicate that a requested maximum end-to-end latency asymmetry and/or latency difference between the at least one uplink communication channel and the at least one downlink communication channel may be less than or equal to a value (e.g., 2 ms). The end-to-end latency asymmetry and/or latency difference between the at least one uplink communication channel and the at least one downlink communication channel may be 2 ms (e.g., 7 ms−5 ms=2 ms), for example, based on the end-to-end latency of the at least one uplink communication channel being 5 ms, and the end-to-end latency of the at least one downlink communication channel being 7 ms.

The third parameter (e.g., a Channel Symmetry Request) may indicate that an end-to-end latency between the first network element and the second network element be less than or equal to a threshold value (e.g., 5 ms, 10 ms, etc.). The end-to-end latency between the first network element and the second network element may indicate a time (duration) to (successfully) deliver a data packet/message from the first network element (e.g., UE 1) to the second network element (e.g., UE 2). The third parameter (e.g., Channel Symmetry Request) may request that the end-to-end latency of the at least one uplink communication channel be less than or equal to a threshold value (e.g., 5 ms, 10 ms, etc.). The third parameter (e.g., Channel Symmetry Request) may request that the end-to-end latency of the at least one downlink communication channel be less than or equal to a threshold value (e.g., 5 ms, 10 ms, etc.).

The first message may comprise a fourth parameter (e.g., Asymmetric End-to-End Latency) indicating a maximum end-to-end latency asymmetry and/or latency difference between the at least one uplink communication channel and the at least one downlink communication channel. The fourth parameter (e.g., Asymmetric End-to-End Latency) may indicate that the end-to-end latency asymmetry and/or the latency difference be less than and/or equal to a threshold value.

In step 2520, the first wireless device may receive a response message from the base station. The response message may comprise a measurement of the end-to-end latency between the first wireless device and the second wireless device.

Figure 26:
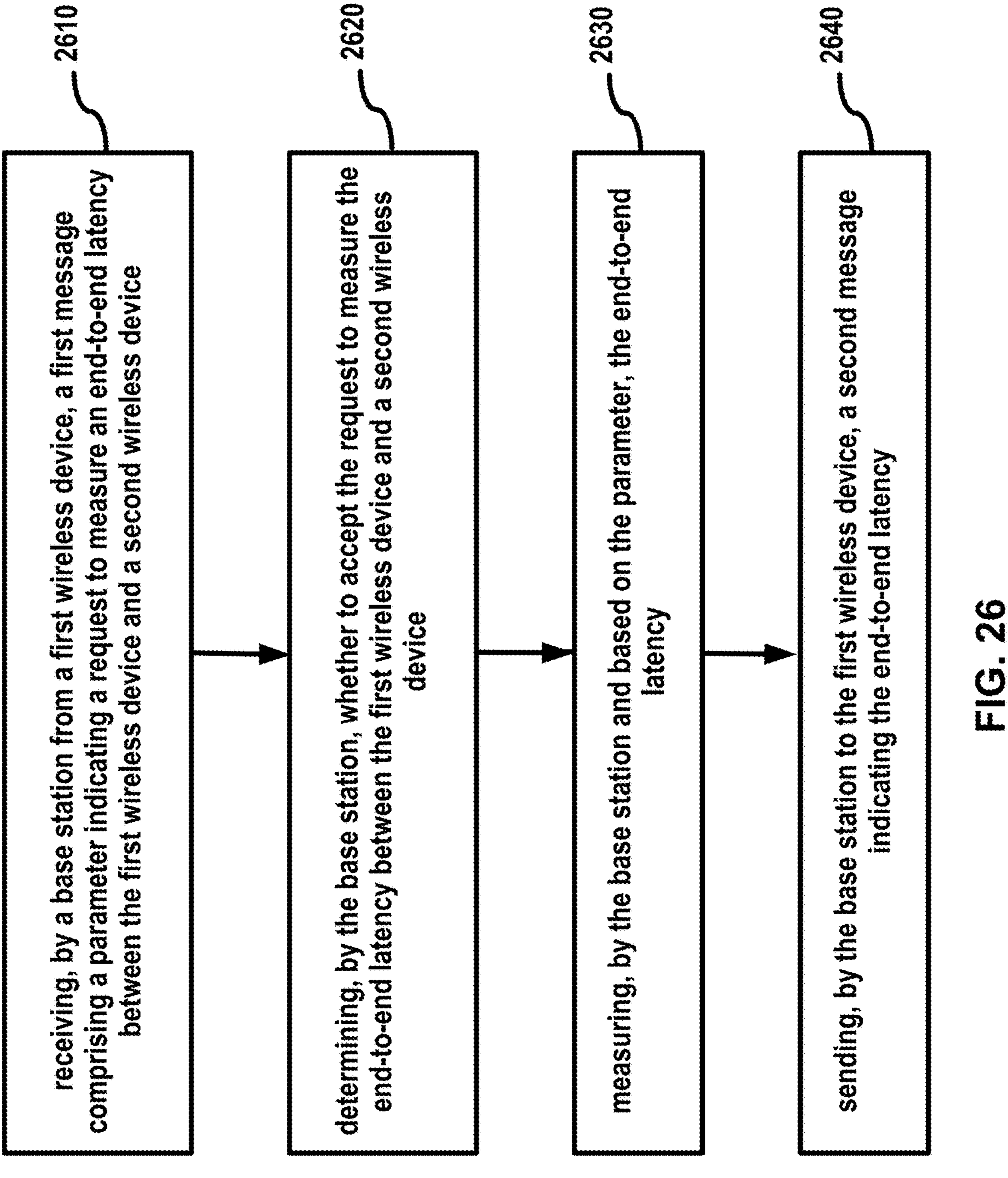
FIG. 26 shows an example of a base station determining end-to-end latency.

FIG. 26 shows an example of process for a base station to determine end-to-end latency.

In step 2610, a base station may receive a first message from a first wireless device. The first message may be similar to the first message sent in step 2510, discussed above with respect to FIG. 25. The first message may comprise one or more parameters indicating a request to measure an end-to-end latency between the first wireless device and a second wireless device.

In step 2620, the base station may determine whether to accept a request to measure the end-to-end latency between the first wireless device and the second wireless device, for example, based on or in response to receiving the first message. The determination may be based on at least one of: one or more parameters of the first message; a capability of the base station supporting the end-to-end latency measurement; resources of the base station; local policy; and/or subscription information of the first wireless device. The capability of the base station supporting an end-to-end latency measurement may be based on whether the base station has the capability to measure the end-to-end latency within a requested accuracy (e.g., a second parameter and/or a Latency Accuracy) from the first wireless device. The base station may accept the request of measuring the end-to-end latency between the first wireless device and the second wireless device, for example, based on one or more of: a first parameter and/or an End-to End Latency Measurement Request, a second parameter and/or a Latency Accuracy, a third parameter and/or a Channel Symmetry Request, a fourth parameter and/or an Asymmetric End-to-end Latency, an identity of the first wireless device, an identity of the second wireless device, a capability of the base station supporting the end-to-end latency measurement, resources of the base station, the local policy, and/or subscription information of the first wireless device. The first parameter and/or an End-to End Latency Measurement Request, the identity of the first wireless device, and/or the identity of the second wireless device may indicate a request to measure the end-to-end latency between the first wireless device and the second wireless device. The second parameter and/or a Latency Accuracy may indicate a latency accuracy for the end-to-end latency measurement. The latency accuracy may be indicated in milliseconds. The capability of the base station supporting the end-to-end latency measurement may indicate that the base station supports the end-to-end latency measurement within the latency accuracy (e.g., within the milliseconds indicated in the first message). The resources of the base station may allow the end-to-end latency measurement. The local policy and/or subscription information of the first wireless device may allow the end-to-end latency measurement. The base station may determine to accept the request for determining the end-to-end latency between the first wireless device and the second wireless device, for example, based on one or more of the factors identified above.

The base station may determine a fifth parameter (e.g., End-to End Latency Measurement Accept), for example, based on at least one of: one or more parameters of the first message; the capability of the base station supporting the end-to-end latency measurement; resources of the base station; local policy; subscription information of the first wireless device; and/or determining whether to accept the request to measure the end-to-end latency.

In step 2630, the base station may measure the end-to-end latency over a radio bearer for the first wireless device. The base station may determine that the end-to-end latency measurement may be associated with the radio bearer for the first wireless device. The radio bearer may comprise a data radio bearer and/or a signaling radio bearer. The base station may determine that the end-to-end latency measurement may be associated with the radio bearer, for example, based on at least one of: one or more parameters of the first message; a capability of the base station supporting the end-to-end latency measurement; resources of the base station; local policy; subscription information of the first wireless device; and/or determining whether to accept the request to the end-to-end latency. The base station may determine a radio bearer for the end-to-end latency measurement, for example, based on at least one of: one or more parameters of the first message; capability of the base station supporting the end-to-end latency measurement; resources of the base station; local policy; subscription information of the first wireless device; and/or determining whether to accept the request to measure the end-to-end latency. A base station may determine at least one radio bearer to perform the end-to-end latency measurement. The at least one radio bearer may comprise at least one data radio bearer and/or at least one signaling radio bearer.

The base station may determine radio bearer configuration information of the radio bearer for the end-to-end latency measurement, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency. The radio bearer configuration information may comprise one or more parameters for a data radio bearer. The radio bearer configuration information may comprise one or more parameters for a signal radio bearer. The radio bearer configuration information may comprise one or more QoS parameters for a signal radio bearer and/or a data radio bearer. The one or more QoS parameters may comprise at least one of: Resource type; priority level; Packet Delay Budget (PDB); Packet Error Rate (PER); Averaging window; and/or Maximum Data Burst Volume. The radio bearer configuration information may comprise one or more parameters for at least one DRB. The radio bearer configuration information may comprise one or more parameters for at least one SRB. The radio bearer configuration information may comprise one or more QoS parameters for at least one signal radio bearer and/or at least one data radio bearer for a symmetric communication channel.

The at least one data radio bearer may be used to send (transmit) user plane data. The at least one signal radio bearer may be radio bearer(s) that are used for the transmission of RRC and/or NAS messages. The at least one signal radio bearer may comprise at least one of: SRB0, SRB1, SRB2, and/or SRB3. An SRB0 may be for RRC messages using a Common Control Channel (CCCH) logical channel. An SRB1 may be for RRC messages (which may comprise a piggybacked NAS message), as well as for NAS messages prior to an establishment of SRB2, using Dedicated Control Channel (DCCH) logical channel. An SRB2 may be for NAS messages and for RRC messages, which may comprise logged measurement information using a DCCH logical channel. SRB2 may have a lower priority than SRB1. SRB2 may be configured by a network. SRB3 may be for specific RRC messages, for example, based on a wireless device in E-UTRA New Radio Dual Connectivity with E-UTRA connected to EPC ((NG)EN-DC) and/or New Radio Dual Connectivity (NR-DC), using a DCCH logical channel.

The one or more QoS parameters for the at least one SRB and/or the at least one DRB may comprise at least one of: a Resource type; a priority level; a Packet Delay Budget (PDB); a Packet Error Rate (PER); an Averaging window; a Maximum Data Burst Volume; and/or the like. The Resource type may indicate a resource for Non-Guaranteed Bit Rate (GBR), a resource for GBR, and/or a resource for Delay-critical GBR. The resource type may determine whether dedicated network resources may be permanently allocated, for example, based on an admission control function in a radio base station. The priority level may indicate a priority in scheduling resources among DRB/SRB/QoS Flows. A lowest priority level value may indicate a highest priority. The Packet Delay Budget (PDB) may indicate an upper bound for time that a packet may be delayed between a wireless device and another network function (e.g., UPF). The Packet Error Rate (PER) may indicate an upper bound for a rate of PDUs (e.g., IP packets) that have been processed by a sender of a link layer protocol (e.g., RLC in RAN of a 3GPP access), but that may not be successfully delivered by a corresponding receiver to an upper layer (e.g., PDCP in RAN of a 3GPP access). The PER may define an upper bound for a rate of non-congestion related packet losses. The GBR QoS Flow may be associated with the Averaging window. The Averaging window may represent a duration over which a Guaranteed Flow Bit Rate (GFBR) and/or a Maximum Flow Bit Rate (MFBR) may be calculated (e.g., in the (R)AN, UPF, UE). The GBR QoS Flow with a Delay-critical resource type may be associated with a Maximum Data Burst Volume (MDBV). The MDBV may indicate a largest amount of data that a base station may be required to serve within a period of 5G-AN PDB. An (R)AN 1 may determine one or more QoS parameters for at least one SRB and/or at least one DRB for symmetric communication channels, for example, in an uplink end-to-end delay of at least one DRB may be equal to a downlink end-to-end delay of at least one DRB. An (R)AN 1 may determine one or more QoS parameters for at least one SRB and/or at least one DRB for symmetric communication channels, for example, to verify that asymmetry and/or difference between an uplink end-to-end delay of at least one DRB and downlink end-to-end delay of the at least one DRB may be less than or equal to a threshold value. The at least one SRB and/or the at least one DRB may be between the UE 1 and the (R)AN 1.

The radio bearer configuration information may comprise one or more parameters of a SDAP configuration information. The SDAP configuration information may be used to set one or more configurable SDAP parameters for the data radio bearer. The SDAP configuration information may comprise at least one of the following information elements (IEs)/parameters: defaultDRB; mappedQoS-FlowsToAdd, FlowsToRelease, PDU session ID, and/or SDAP header information. A defaultDRB may indicate whether the default DRB is for a PDU session identified by a PDU session ID. A mappedQoS-FlowsToAdd may indicate a list of QoS flow IDs (QFIs) of uplink (UL) QoS flows of a PDU session to be additionally mapped to the DRB. A QFI value may be included in configured instances of SDAP-Config with the same PDU session ID. A QFI value of a remapped QoS flow may be included in a mappedQoS-FlowsToAdd in sdap-Config corresponding to a new DRB and may not be included in a mappedQoS-FlowsToRelease in sdap-Config corresponding to an old DRB. A mappedQoS-FlowsToRelease may indicate a list of QFIs of QoS flows of a PDU session to be released from an existing QoS flow to a DRB mapping of the DRB. SDAP header information may indicate whether a SDAP header is present for uplink data and/or downlink data on the DRB.

The radio bearer configuration information may comprise one or more parameters of PDCP configuration information. The PDCP configuration information may comprise at least one parameter: PDCP SN UL Size, PDCP SN DL Size, RLC mode, ROHC (Robust header compression) Parameters, UL Data Split Threshold, PDCP Duplication, PDCP Re-establishment, PDCP Data Recovery, Duplication Activation, Out Of Order Delivery, PDCP Status Report Indication, Additional PDCP duplication Information, EHC Parameters, and/or the like. A PDCP SN UL Size may indicate a PDCP sequence number size (e.g. in bits) for an uplink. A PDCP SN DL Size may indicate a PDCP sequence number size (e.g. in bits) for a downlink. A RLC mode may indicate a RLC mode for a DRB (e.g., Acknowledged Mode (AM), Unacknowledged Mode (UM), and/or Transparent Mode (TM)). ROHC Parameters may indicate ROHC parameters for header compression. A UL Data Split Threshold may indicate the uplink data split threshold (e.g. in bytes). A PDCP Duplication may indicate whether PDCP duplication may be configured for a DRB. A PDCP Re-establishment may indicate PDCP entity re-establishment may be triggered. A PDCP Data Recovery may indicate PDCP data recovery may be triggered. A Duplication Activation may comprise information on an initial state of DL PDCP duplication. Out Of Order Delivery may indicate whether outOfOrderDelivery may be configured. Out Of Order Delivery may be configured when a radio bearer may be established. A PDCP Status Report Indication may indicate a PDCP Status Report. A "downlink" may indicate that a PDCP entity is configured to send PDCP status report(s) to a wireless device, and an "uplink" may indicate that a wireless device is configured to send PDCP status report(s), for example, in Acknowledged Mode DRB. Additional PDCP duplication Information may indicate a number of PDCP duplications configured, for example, based on the PDCP Duplication Information indicating more than 2 for the DRB. EHC Parameters may indicate Ethernet Header Compression parameters.

The base station may determine RRC configuration information for the end-to-end latency measurement, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency. RRC configuration information may comprise radio bearer configuration information.

In step 2630, the base station may measure the end-to-end latency over a network slice and/or a PDU session for the first wireless device. The base station may determine that the end-to-end latency measurement may be associated with the network slice for the first wireless device, for example, based on the network slice being associated with a PDU session. The base station may determine that the end-to-end latency measurement may be associated with the network slice and/or the PDU session, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency.

In step 2630, the base station may measure the end-to-end latency over a QoS flow and/or a PDU session for the first wireless device. The base station may determine that the end-to-end latency measurement may be associated with the QoS flow for the first wireless device, for example, based on the QoS flow being associated with a PDU session. The base station may determine that the end-to-end latency measurement may be associated with the QoS flow and/or the PDU session, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency. The base station may determine a QoS resource for the end-to-end latency measurement, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency.

In step 2630, the base station may measure the end-to-end latency over a service data flow and/or a PDU session for the first wireless device. The base station may determine that the end-to-end latency measurement may be associated with the service data flow for the first wireless device, for example, based on the service data flow being associated with a PDU session. The base station may determine that the end-to-end latency measurement may be associated with the service data flow and/or the PDU session, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency.

In step 2630, the base station may measure the end-to-end latency over a PDU session and/or the at least one radio bearer for the first wireless device. The base station may determine that the end-to-end latency measurement may be associated with the PDU session for the first wireless device, for example, based on the PDU session being associated with the at least one radio bearer. The at least one radio bearer may comprise at least one data radio bearer and/or at least one signaling radio bearer. The base station may determine that the end-to-end latency measurement may be associated with the PDU session, for example, based on at least one of: one or more parameters of the first message; a capability of the base station supporting the end-to-end latency measurement; resources of the base station; local policy; subscription information of the first wireless device; and/or determining whether to accept the request to measure the end-to-end latency.

In step 2630, the base station may determine (e.g., measure, calculate) a first one-way latency (L1) from the first wireless device to the second wireless device. Further, in step, 262, the base station may determine (e.g., measure, calculate) a second one-way latency (L2) from the second wireless device to the first wireless device. The determination(s) may be based on an indication received from the first wireless device and/or the second wireless device. The base station may measure the first end-to-end latency between the first wireless device and the base station. The base station may measure a second end-to-end latency between the second wireless device and the base station. The first measurement of the first end-to-end latency and the second measurement of the second end-to-end latency may be based on at least one of: one or more parameters of a first message received from the first wireless device; one or more parameters of a first message received from the second wireless device; a capability of the base station supporting the end-to-end latency measurement; resources of the base station; local policy; subscription information of the first wireless device; and/or determining whether to accept a request to measure the end-to-end latency. The base station may measure, combine, and/or calculate the end-to-end latency between the first wireless device and the second wireless device by combining (adding) the first end-to-end latency to the second end-to-end latency. The base station, the first wireless device, and/or the second wireless device may take actions as described in FIG. 30 and/or FIG. 31 below to measure the end-to-end latency.

In step 2630, the base station may determine (measure) a first (e.g., uplink) one-way delay between the first wireless device and the second wireless device. The base station may determine (measure) a first one-way delay between the first wireless device and the base station, and/or a first one-way delay between the base station and the second wireless device. The base station may measure, determine, and/or derive a first (e.g., uplink) one-way delay between the first wireless device and the second wireless device by combining (adding) the first one-way delay between the first wireless device and the base station and the first one-way delay between the base station and the second wireless device.

In step 2630, the base station may determine (measure) a second (e.g., downlink) one-way delay between the first wireless device and the second wireless device. The base station may determine (measure) a second one-way delay between the second wireless device and the base station, and/or a second one-way delay between the base station and the first wireless device. The base station may measure, determine, and/or derive a second (e.g., downlink) one-way delay between the first wireless device and the second wireless device by combining (adding) the second one-way delay between the second wireless device and the base station, and the second one-way delay between the base station and the first wireless device.

In step 2640, the base station may send a response message to the first wireless device. The response message may be a response to the request to measure the end-to-end latency between the first wireless device and the second wireless device. The response message may indicate that the base station will perform the end-to-end latency measurement. The response message may indicate whether the base station accepts the request to measure the end-to-end latency between the first wireless device and the second wireless device. Additionally or alternatively, the response message may notify the first wireless device of a result of the end-to-end latency measurement. The message may be an RRC message. The response message may comprise an RRC response message. The RRC response message may comprise at least one of: an RRCReconfiguration; an MSG 4; a RRCSetup; a RRCResume; a UEReconfiguration; a UEInformationRequest; and/or a UECapabilityEnquiry. In an example, the response message may comprise at least one of: a registration response message; and/or a PDU session response message. The response message may comprise a latency measurement accept (LMA). The response message may comprise one or more of: a fifth parameter (e.g., an End-to End Latency Measurement Accept), the radio bearer configuration information of a radio bearer for the end-to-end latency measurement; and/or the RRC configuration information for the end-to-end latency measurement. The response message may indicate a RRC connection, a PDU session, a network slice, a QoS flow, a service data flow, and/or a radio bearer applied and/or radio bearer used for the end-to-end latency measurement. The response message may comprise a PDU session identifier indicating the PDU session to use (apply) for the end-to-end latency measurement. The response message may comprise a S-NSSAI indicating the network slice to use (apply) for the end-to-end latency measurement.

In step 2640, the base station may send, to the first wireless device and/or the second wireless device, a second message indicating the end-to-end latency between the first wireless and the second wireless device. The base station may send the second message to the first wireless device. The second message may comprise the measured end-to-end latency between the first wireless and the second wireless device. The base station may send a second message to the second wireless device. The second message may comprise the measured end-to-end latency between the first wireless and the second wireless device. The second message may comprise an RRC response message. The RRC response message may comprise at least one of: an RRCReconfiguration; an MSG 4; a RRCSetup; a RRCResume; UEReconfiguration; UEInformationRequest; and/or UECapabilityEnquiry. The second message may comprise at least one of: a registration response message; and/or a PDU session response message.

The first wireless device may take one or more actions, for example, based on or in response to the received message (e.g., response message, second message_. The first wireless device may measure the end-to-end delay between the first wireless device and a base station. The first wireless device may measure the end-to-end delay over a PDU session, a network slice, a QoS flow, a service data flow, and/or a radio bearer. The first wireless device may measure the end-to-end delay, for example, based on an indication from the base station that the RRC connection, the PDU session, the network slice, the QoS flow, the service data flow, and/or the radio bearer be applied (used) for the end-to-end latency measurement. The first wireless device may establish a RRC connection, a PDU session, a network slice, a QoS flow, a service data flow, and/or a radio bearer applied (used) for the end-to-end latency measurement. The PDU session, the network slice, the QoS flow, the service data flow, and/or the radio bearer may be between the first wireless device and the base station. The PDU session, the network slice, the QoS flow, and/or the service data flow may be between the first wireless device and a core network function (e.g., an AMF, an SMF, a UPF, etc.).

The second wireless device may take one or more actions, for example, based on or in response to the received message (e.g., response message, second message). The second wireless device may measure the end-to-end delay between the second wireless device and a base station. The second wireless device may measure the end-to-end delay over a PDU session, a network slice, a QoS flow, a service data flow, and/or a radio bearer. The second wireless device may measure the end-to-end delay, for example, based on an indication from the base station that the RRC connection, the PDU session, the network slice, the QoS flow, the service data flow, and/or the radio bearer be applied (used) for the end-to-end latency measurement. The second wireless device may establish a RRC connection, a PDU session, a network slice, a QoS flow, a service data flow, and/or a radio bearer applied (used) for the end-to-end latency measurement. The PDU session, the network slice, the QoS flow, the service data flow, and/or the radio bearer may be between the second wireless device and the base station. The PDU session, the network slice, the QoS flow, and/or the service data flow may be between the second wireless device and a core network function (e.g., an AMF, an SMF, a UPF, etc.).

A first wireless device and/or a second wireless device may perform a channel-based alignment for line current differential protection over a PDU session, a network slice, a QoS flow, a service data flow, and/or a radio bearer, for example, based on the end-to-end latency (e.g., uplink channel latency and downlink channel latency) received from the base station. A first wireless device and/or a second wireless device may perform other applications (e.g., games) over a PDU session, a network slice, a QoS flow, a service data flow, and/or a radio bearer, for example, based on the end-to-end latency (e.g., uplink channel latency and downlink channel latency) received from the base station.

A second wireless device may perform similar steps to those described above with respect to FIG. 25. The second wireless device may send a first message to the base station requesting an end-to-end latency measurement between the first wireless device and the second wireless device. The first message sent by the second wireless device may comprise one or more of the same parameters as those included in the first message sent by the first wireless device. The base station may perform similar steps to those described above in FIG. 26, for example, in response to receiving an end-to-end latency measurement request from the second wireless device.

At least some systems and/or devices may have issues supporting Control Plane CIoT 5GS Optimization efficiently. A wireless device and a SMF may exchange user data, for example, when applying the Control Plane CIoT 5GS Optimization between the wireless device and the SMF. The user data may be sent (transmitted) as payload of a NAS message in both the uplink and downlink directions. Sending user data as a payload of a NAS message may require a plurality of network functions, complicating the exchange of the user data. For example, the wireless device may send the user data to an application server, via a base station, an AMF, a SMF, a NEF, and/or a UPF. By sending the user data in this way, the process may employ a plurality of network resources. Sending the user data via a payload of a NAS message may also cause long latency between the wireless device and the application server.

TAs described herein, improvements are provided to support Control Plane CIoT 5GS Optimization efficiently. A wireless device may exchange user data with an AMF exchanging user data. The user data may be sent (transmitted), between the wireless device and the AMF, as payload of a NAS message in both the uplink and the downlink directions. The wireless device may send (transmit) the user data an application server via a base station, an AMF and/or a NEF. The wireless device may not need to communicate with a SMF and/or a UPF. Accordingly, fewer network resource may be used and the latency between the wireless device and the application server may be reduced (e.g., decreased).

Figure 27:
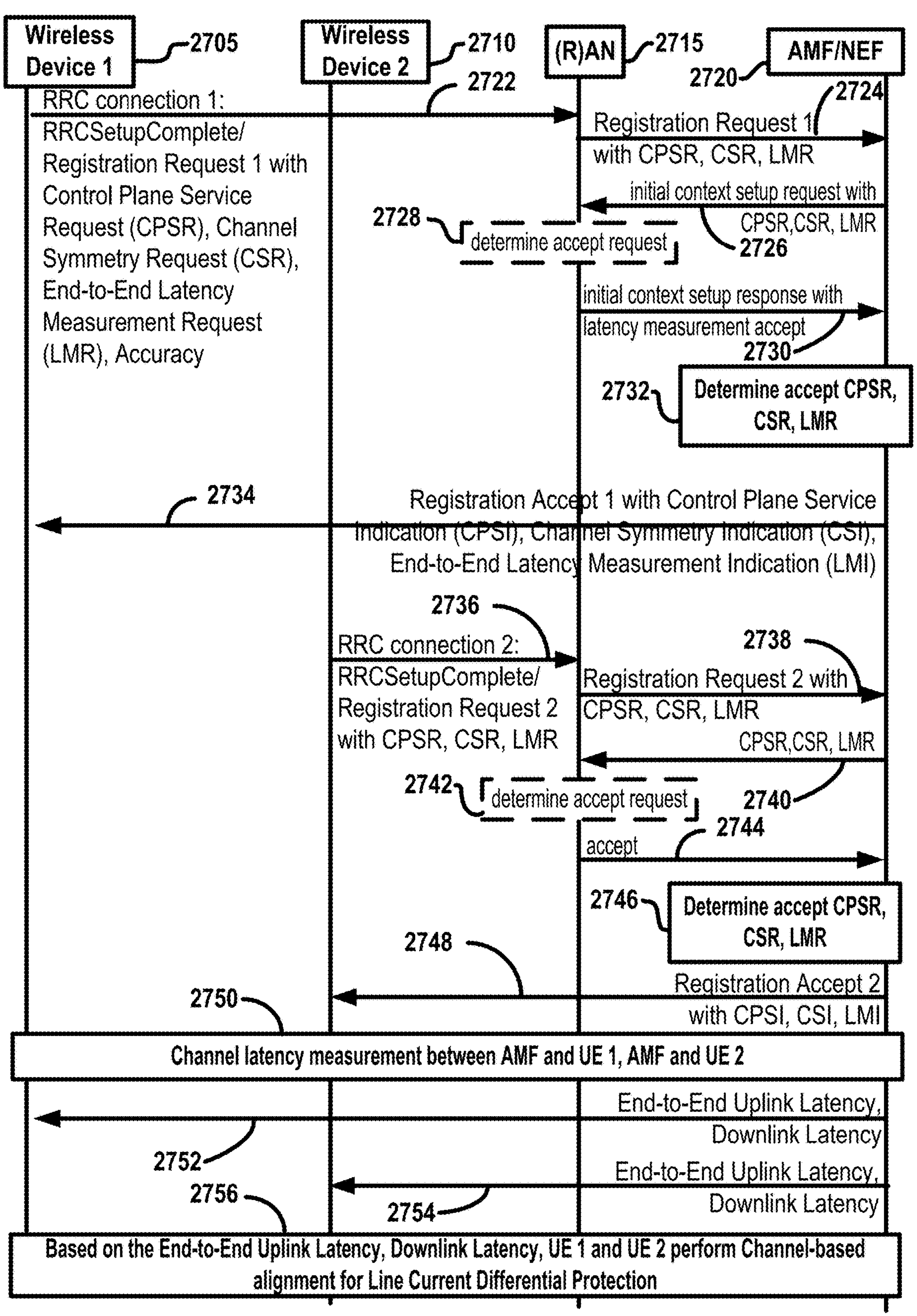
FIG. 27 shows an example of a process for a wireless device and an AMF to exchange user data.

FIG. 27 shows an example of a wireless device and an AMF exchanging user data. FIG. 27 shows a first wireless device 2705, a second wireless device 2170, a base station 2715 (e.g., (R)AN), and a network function 2720 (e.g., AMF/NEF).

In step 2722, first wireless device 2705 may send (transmit) one or more first messages to base station 2715. The one or more first messages may comprise an RRCSetupComplete message. The RRCSetupComplete message may comprise a registration request message. The one or more first messages may comprise an RRC message (e.g., RRCSetupComplete) and/or a NAS message (e.g., registration request). A registration request message may comprise at least one of: a registration type, a wireless device identity (e.g., SUCI, SUPI and/or 5G-GUTI), a last visited TAI (if available), security parameters, a requested NSSAI, a mapping of requested NSSAI, wireless device 5GC capability, a PDU session status, PDU session(s) to be re-activated, Follow on request, MICO mode preference, and/or the like.

The one or more first messages may comprise an identity (e.g., identifier) of first wireless device 2705 and/or an identity (e.g., identifier) of second wireless device 2710. A definition and/or a content of the identity of first wireless device 2705 and/or second wireless 2710 device may be similar to the definition and/or content of the identity of first wireless device 2705 and/or second wireless device 2710 as discussed above. The one or more first messages may comprise one or more parameters. For example, the one or more first messages may comprise a first parameter (e.g., End-to End Latency Measurement Request) indicating a request to measure an end-to-end latency between first wireless device 2705 and second wireless device 2710. A definition and/or a content of the first parameter (e.g., the End-to End Latency Measurement Request) may be similar to the definition and/or the content of the first parameter (e.g., the End-to End Latency Measurement Request) discussed above. The one or more first messages may comprise a second parameter (e.g., Latency Accuracy) indicating an accuracy of the end-to-end latency measurement. The accuracy of the end-to-end latency may be indicated in at least one of: seconds; deciseconds; centiseconds; milliseconds; microseconds; and/or the like. A definition and/or a content of the second parameter (e.g., the Latency Accuracy) may be similar to the definition and/or the content of the second parameter (e.g., Latency Accuracy) as described above. The one or more first messages may comprise a third parameter (e.g., a Channel Symmetry Request (CSR)) indicating a request for symmetric communication channels. A definition and/or a content of a third parameter (e.g., the Channel Symmetry Request) may be similar to the definition and/or content of the third parameter (e.g., Channel Symmetry Request) as described above. The one or more first messages may comprise a fourth parameter (e.g., Asymmetric End-to-end Latency) requesting a maximum end-to-end latency asymmetry. Additionally or alternatively, the fourth parameter may request that a latency difference between at least one uplink communication channel and at least one downlink communication channel be less than and/or equal to a threshold value. A definition and/or a content of the fourth parameter (e.g., the Asymmetric End-to-End Latency) may be similar to the definition and/or content of the fourth parameter (e.g., the Asymmetric End-to-End Latency) as described above. The one or more first messages may comprise a fifth parameter (e.g., Control Plane Service Request) indicating a request to send application user data via a control plane. The fifth parameter (e.g., a Control Plane Service Request) may indicate that first wireless device 2705 requests sending application user data via control plane signaling, rather than user plane signaling. For example, the application user data may be sent from first wireless device 2705 to network function 2720 via a NAS message. First wireless device 2705 may send (transmit) user data to second wireless device 2710, for example, via base station 2715, and/or network function 2720. First wireless device 2705 may send (transmit) user data to second wireless device 2710, for example, via base station 2715, a first AMF (not shown), a NEF (not shown), a second AMF (not shown), and/or a second base station (not shown). The one or more first messages may comprise a sixth parameter (e.g., Control Plane CIoT 5GS Optimization) indicating a capability of first wireless device 2705 supporting sending application user data via control plane.

A first message may comprise 5GMM Capability IE. The 5GMM Capability IE may indicate at least one capability of a first wireless device including, for example: Whether Control Plane CIoT 5GS Optimization may be supported; Whether User Plane CIoT 5GS Optimization may be supported; Whether N3 data transfer may be supported; and/or Whether header compression for Control Plane CIoT 5GS Optimization may be supported. A Control Plane CIoT 5GS Optimization may indicate that first wireless device 2705 may support exchanging user data between first wireless device 2705 and AMF/NEF 2720 as payload of a NAS message in both the uplink and downlink directions. The ability to exchange user data as a payload of a NAS in both the uplink and downlink directions may avoid an establishment of a user plane connection for a PDU Session. A User Plane CIoT 5GS Optimization may indicate transfer of user plane data from CM-IDLE without a need for using a Service Request procedure to establish Access Stratum (AS) context in base station 2715 and first wireless device 2705.

In step 2724, base station 2715 may send (transmit, forward) the one or more first messages (e.g., the registration request message) to a network function 2720. Network function 2720 may comprise an AMF, an NEF, or an AMF/NEF (e.g., the AMF is co-located with the NEF). In step 2724, the network function may receive the one or more first messages from base station 2715. The one or more first messages may indicate a request to measure an end-to-end latency between first wireless device 2705 and second wireless device 2710.

In step 2726, network function 2720 may send a message to base station 2715, for example, based on or in response to receiving the one or more first messages. The message may comprise an Initial Context Setup Request. The Initial Context Setup Request message may comprise one or more parameters from the one or more first messages. For example, the Initial Context Setup Request message may comprise at least one of: the first parameter (e.g., the End-to End Latency Measurement Request), the second parameter (e.g., the Latency Accuracy), the third parameter (e.g., the Channel Symmetry Request), the fourth parameter (e.g., the Asymmetric End-to-End Latency), the identity(ies) (e.g., identifier) of first wireless device 2705 and/or second wireless device (2710), the fifth parameter (e.g., the Control Plane Service Request), and/or a sixth parameter and/or a Control Plane CIoT 5GS Optimization. The Initial Context Setup Request message may comprise at least one of: AMF UE NGAP ID, RAN UE NGAP ID, UE Aggregate Maximum Bit Rate, Core Network Assistance Information for RRC INACTIVE, GUAMI, PDU Session Resource Setup Request List (e.g., PDU session associated with the end-to-end latency measurement), Allowed NSSAI, wireless device Security Capabilities, Security Key, Mobility Restriction List, Trace Activation, wireless device Radio Capability, Index to RAT/Frequency Selection Priority, Masked IMEISV, NAS-PDU, Emergency Fallback Indicator, RRC Inactive Transition Report Request, wireless device Radio Capability for Paging, Enhanced Coverage Restriction, wireless device Differentiation Information, NR V2X Services Authorized, wireless device User Plane CIoT Support Indicator, and/or wireless device Radio Capability ID.

At least some systems and/or devices may not apply QoS for control plane signaling (e.g., signal radio bearer). The lack of QOS for control plane signaling may cause lost or delayed control plane signaling. The inability to apply QoS for control plane signally may apply to transferring user data over control plane, such as transferring user data over NAS signaling. The lack of QoS when transferring user data over the control plane may cause unguaranteed delivery of the user data over control plane. As described herein, solutions are provided to enable QoS control over control plane signaling and allow for user data to be transferred via the control plane. The Initial Context Setup Request Message may comprise one or more of a QoS policy and/or parameters for control plane signaling, which would allow QoS to be applied to NAS signaling, which may include user data.

To enable QoS control over control plain signaling, the Initial Context Setup Request message may comprise QoS policy and/or parameters for control plane signaling. QoS policy and/or parameters may be applied to NAS signaling (e.g., a signaling radio bearer). The NAS signaling may comprise user data. QoS policy and/or parameters may comprise at least one of: 5QI/QCI, ARP, RQA, GFBR, MFBR and/or maximum packet loss rate as described above with respect to FIG. 8. QoS policy and/or parameters determined by a SMF may comprise a QoS class identifier (QCI). QCI may be a scalar that may be used as a reference to a specific packet forwarding behavior (e.g., packet loss rate and/or packet delay budget) to be provided to a SDF, which may be implemented in an access network by QCI referencing node specific parameters that control packet forwarding treatment (e.g., scheduling weights, admission thresholds, queue management thresholds, link layer protocol configuration, etc.), that have been pre-configured by an operator at a specific node(s) (e.g., a base station).

In step 2728, base station 2715 may determine whether to accept a request to measure the end-to-end latency between first wireless device 2705 and second wireless device 2710, for example, based on or in response to receiving the message from network function 2720. Base station 2715 may determine whether to accept a request to measure the end-to-end latency between first wireless device 2705 and second wireless device 2710, for example, based on at least one of: one or more parameters of the Initial Context Setup Request message; a capability of base station 2715 supporting the end-to-end latency measurement; resources of base station 2715; local policy; and/or subscription information of first wireless device 2705. Base station 2715 may determine a seventh parameter (e.g., End-to End Latency Measurement Accept) indicating that the base station accepts the request to measure the end-to-end latency. The seventh parameter may indicate that base station 2715 accept the request to send application user data via the control plane. The seventh parameter may indicate base station 2715 accepts a request for symmetric communication channels.

In step 2730, base station 2715 may send a response message to network function 2720. The response message may comprise an Initial Context Setup Response. The response message may indicate that base station 2715 accepts the request to measure the end-to-end latency. The Initial Context Setup Response may comprise the seventh parameter (e.g., the End-to End Latency Measurement Accept). The Initial Context Setup Response message may comprise at least one of the following parameters associated with the end-to-end measurement: parameter(s) for radio bearer configuration, parameter(s) for MAC configuration, parameter(s) for PDCP configuration, parameter(s) for RRC configuration, and/or parameter(s) for physical layer configuration. The Initial Context Setup Response may comprise at least one of: AMF UE NGAP ID, RAN UE NGAP ID, PDU Session Resource Setup Response List, PDU Session Resource Failed to Setup List, and/or Criticality Diagnostics. A Criticality Diagnostics IE may be sent by base station 2715 and/or network function 2720, for example, based on parts of a received message having not been comprehended or having been missing. A Criticality Diagnostics IE may be sent by base station 2715 and/or network function 2720, for example, based on the message containing one or more logical errors.

In step 2732, network function 2720 may determine whether to accept the request to measure the end-to-end latency between first wireless device 2705 and second wireless device 2710. Network function 2720 may determine an eighth parameter (e.g., End-to End Latency Measurement Indication). The eighth parameter may indicate whether network function 2720 accepts the request to measure the end-to-end latency between first wireless device 2705 and second wireless device 2710. Network function 2720 may determine whether to accept the request to measure the end-to-end latency between first wireless device 2705 and second wireless device 2710, for example, based on or in response to the message received from base station 2715. Network function 2720 may determine whether to accept the request to measure the end-to-end latency between first wireless device 2705 and second wireless device 2710, for example, based on at least one of: one or more parameters of the first message; one or more parameters of the Initial Context Setup Response message; capabilities of the network (e.g., AMF, base station, NEF) to support the end-to-end latency measurement; resources of a network; a local policy; and/or subscription information of first wireless device 2705. The eighth parameter (e.g., the End-to End Latency Measurement Indication) may indicate that a network has the capability to support measuring an end-to-end latency. The network may be a communication system (e.g., 5G system), where the communication system may comprise one or more base stations, AMFs, SMFs, UPFs, PCFs, NEFs, and/or the like.

As noted above, the one or more first messages may indicate a request to measure the end-to-end latency. The Initial Context Setup Response message may indicate that base station 2715 accepts the request to measure the end-to-end latency measurement. The capability of the network and/or resources of the network may indicate that the network supports end-to-end latency measurements. A local policy and/or a subscription information of first wireless device 2705 may indicate that first wireless device 2705 is allowed to measure the end-to-end latency between first wireless device 2705 and second wireless device 2710. Network function 2720 may determine to accept the request to measure the end-to-end latency between first wireless device 2705 and second wireless device 2710, for example, based on the information contained in the one or more first messages, the information contained in the Initial Context Setup Response message, the capability of the network, resources of the network, a local policy associated with first wireless device 2705, subscription information associated with first wireless device 2705, etc.

In step 2732, network function 2720 may determine whether to accept a request to send application user data via a control plane. Network function 2720 may determine a ninth parameter (e.g., Control Plane Service Indication). The ninth parameter may indicate that network function 2720 accepts the request to send application user data via a control plane. Network function 2720 may determine to accept the request to send application user data via the control plane, for example, based on at least one of: one or more parameters of the first message; one or more parameters of the Initial Context Setup Response message; a capability of the network (e.g., AMF, base station, NEF) to support sending application user data via the control plane; resources of the network; a local policy; and/or subscription information of first wireless device 2705. The ninth parameter (e.g., Control Plane Service Indication) may indicate that the network has the capability to support sending application user data via a control plane. Network function 2720 may determine to accept the request to send application user data via a control plane, for example, based on the information contained in the one or more first messages, the information contained in the Initial Context Setup Response message, the capability of the network, resources of the network, a local policy associated with first wireless device 2705, subscription information associated with first wireless device 2705, etc.

In step 2732, network function 2720 may determine whether to accept a request for symmetric communication channels. Network function 2732 may determine a tenth parameter (e.g., Channel Symmetry Indication). The tenth parameter may indicate that network function 2720 accepts a request for symmetric communication channels. Network function 2720 may determine whether to accept a request for symmetric communication channels, for example, based on at least one of: one or more parameters of the first message; one or more parameters of the Initial Context Setup Response message; a capability of the network (e.g., AMF, base station, NEF) to support symmetric communication channels; resources of the network; a local policy; and/or subscription information of first wireless device 2705. The tenth parameter (e.g., a Channel Symmetry Indication) may indicate that the network has the capability to support symmetric communication channels.

In step 2732, network function 2720 may determine an end-to-end latency measurement may be associated with a network slice for first wireless device 2705. The network slice may be associated with a PDU session, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705, and/or a determination to accept a request to measure the end-to-end latency. As will be discussed in greater detail below with respect to step 2750, network function 2720 may measure the end-to-end latency over the network slice and/or the PDU session for first wireless device 2705.

In step 2732, network function 2720 may determine the end-to-end latency measurement may be associated with a QoS flow for first wireless device 2705. The QoS flow may be associated with a PDU session, for example, based on at least one of: one or more parameters of the first message; one or more parameters of the Initial Context Setup Response message; a capability of the network (e.g., AMF, base station, NEF) to support an end-to-end latency measurement; resources of the network; a local policy; subscription information of first wireless device 2705, and/or a determination to accept the request to measure the end-to-end latency. As will be discussed in greater detail below with respect to step 2750, network function 2720 may measure the end-to-end latency over the QoS flow and/or the PDU session for first wireless device 2705.

In step 2732, network function 2720 may determine the end-to-end latency measurement may be associated with a service data flow for first wireless device 2705. The service data flow may be associated with a PDU session, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705, and/or a determination to accept a request to measure the end-to-end latency. As will be discussed in greater detail below with respect to step 2750, network function 2720 may measure the end-to-end latency over the service data flow and/or the PDU session for first wireless device 2705.

In step 2732, network function 2720 may determine the end-to-end latency measurement may be associated with a PDU session for first wireless device 2705. The PDU session may be associated with at least one radio bearer. The at least one radio bearer may comprise at least one data radio bearer and/or at least one signaling radio bearer. The PDU session may be associated with at least one radio bearer, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705, and/or a determination to accept a request to measure the end-to-end latency. As will be discussed in greater detail below with respect to step 2750, network function 2720 may measure the end-to-end latency over a PDU session and/or at least one radio bearer for first wireless device 2705.

In step 2732, network function 2720 may determine radio bearer resources and/or QoS resources for the end-to-end latency measurement. Network function 2720 may determine the bearer resources and/or QoS resources, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705, and/or a determination to accept a request to measure the end-to-end latency. To perform the end-to-end latency measurement, network function 2720 may determine at least one radio bearer resource and/or at least one QoS resource. The at least one radio bearer resource may comprise at least one data radio bearer and/or at least one signaling radio bearer.

In step 2732, network function 2720 may determine one or more QoS policies and/or QoS parameters for measuring the end-to-end latency. Network function 2720 may determine the one or more QoS policies and/or QoS parameters, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705; and/or a determination to accept a request to measure the end-to-end latency. QoS policies and/or QoS parameters may comprise at least one of: 5QI/QCI, ARP, RQA, GFBR, MFBR and/or a maximum packet loss rate as described above with respect to FIG. 8.

In step 2734, network function 2720 may send a response message to first wireless device 2705. The response message may be in response to the one or more first messages transmitted in step 2722, discussed above. The response message may indicate whether network function 2720 accepts the request to measure the end-to-end latency between first wireless device 2705 and second wireless device 2710. The response message may indicate whether network function 2720 accepts a request to send application user data via a control plane. The response message may indicate whether network function 2720 accepts the request for symmetric communication channels. The response message may comprise at least one of: the eighth parameter (e.g., the End-to End Latency Measurement Indication), the ninth parameter (e.g., the Control Plane Service Indication), and/or the tenth parameter (e.g., the Channel Symmetry Indication). the response message may indicate an RRC connection, a PDU session, a network slice, a QoS flow, a service data flow, and/or a radio bearer to be applied (used) for the end-to-end latency measurement. The response message may comprise a PDU session identifier indicating the PDU session that may be used for and/or applied to the end-to-end latency measurement. The response message may comprise a S-NSSAI indicating a network slice that may be used for and/or applied to the end-to-end latency measurement.

In step 2736, second wireless device 2710 may send one or more first messages to base station 2715. The one or more first messages may indicate a request to measure an end-to-end latency between first wireless device 2705 and second wireless device 2710. The one or more first messages may comprise one or more parameters of the same parameters and/or information as that of the one or more first messages sent by first wireless device 2705, in step 2722 discussed above. In step 2738, base station 2715 may send (transmit, forward) the one or more first messages to network function 2720, as discussed above with respect to step 2724. In step 2740, network function 2720 may send a message to base station 2715, as discussed above with respect to step 2726. In step 2742, base station 2715 may determine whether to accept a request to measure the end-to-end latency between second wireless device 2710 and first wireless device 2705, similar to step 2728 discussed above. In step 2744, base station 2715 may send a response message to network function 2720, similar to step 2730 discussed above. In step 2746, network function 2720 may determine whether to accept the request to measure the end-to-end latency between second wireless device 2710 and first wireless device 2705, similar to step 2732 discussed above. In step 2748, network function 2720 may send a response message to second wireless device 2710, similar to step 2734 discussed above.

In step 2750, network function 2720 may measure a first end-to-end latency between first wireless device 2710 and network function 2720. In step 2750, network function 2720 may measure a second end-to-end latency between second wireless device 2710 and network function 2720. First end-to-end latency and/or the second end-to-end latency may be determined, for example, based on at least one of: one or more parameters of the first message; one or more parameters of the Initial Context Setup Response message; a capability of the network (e.g., AMF, base station, NEF) to support the end-to-end latency measurement; resources of the network; a local policy; subscription information of first wireless device 2705; subscription information of second wireless device 2710; and/or a determination to accept a request to measure the end-to-end latency. Network function 2720 may determine (e.g., calculate and/or measure) the end-to-end latency between first wireless device 2705 and second wireless device 2710, for example, by combining (e.g., adding) the first end-to-end latency to the second end-to-end latency. As will be discussed in greater detail below with respect to FIG. 30, network function 2720, first wireless device 2705, and/or second wireless device 2710 may measure the end-to-end latency.

In step 2750, network function 2720 may measure a first (e.g., uplink) one-way delay between first wireless device 2705 and second wireless device 2710. Network function 2720 may measure the first one-way delay between first wireless device 2705 and network function 2720. Network function 2720 may measure the first one-way delay between network function 2720 and second wireless device 2710. Network function 2720 may measure, determine, and/or derive the first (e.g., uplink) one-way delay between first wireless device 2705 and second wireless device 2710, for example, by combining (e.g., adding) the first one-way delay between first wireless device 2705 and network function 2720 and the first one-way delay between the network function 2720 and second wireless device 2710.

In step 2750, network function 2720 may measure a second (e.g., downlink) one-way delay between first wireless device 2705 and second wireless device 2720. Network function 2720 may measure a second one-way delay between second wireless device 2710 and network function 2720. Network function 2720 may measure a second one-way delay between network function 2720 and first wireless device 2705. Network function 2720 may measure, determine, and/or derive the second (e.g., downlink) one-way delay between first wireless device 2705 and second wireless device 2710, for example, by combining (e.g., adding) the second one-way delay between second wireless device 2710 and network function 2720 and the second one-way delay between network function 2720 and first wireless device 2705.

Network function 2720 may compare a first (e.g., uplink) one-way delay between first wireless device 2705 and second wireless device 2710 and a second (e.g., downlink) one-way delay between first wireless device 2705 and second wireless device 2710. Network function 2720 may modify and/or adjust one or more parameters (e.g., radio bearer resources and/or QoS resources) so that the first (e.g., uplink) one-way delay may equal the second (e.g., downlink) one-way delay. Modifying and/or adjusting the one or more parameters may keep the uplink communication channel and the downlink communication channel symmetric. Network function 2720 may modify and/or adjust one or more parameters, for example, based on the end-to-end delay measurement. Network function 2720 may modify and/or adjust one or more parameters (e.g., radio bearer resources and/or QoS resources) so that a difference between the first (e.g., uplink) one-way delay and the second (e.g., downlink) one-way delay is less than a threshold value (e.g., 2 ms). Network function 2720 may modify and/or adjust one or more parameters between network function 2720 and first wireless device 2705. Network function 2720 may modify and/or adjust one or more parameters between network function 2720 and second wireless device 2710. Network function 2720 may send a message to base station 2715, first wireless device 2705, and/or second wireless device 2710. The message may indicate comprise one or more parameters that modify and/or adjust radio bearer resources and/or QoS resources.

Network function 2720 may indicate that base station 2715 modify and/or adjust one or more parameters, such as time, frequency, space, and/or power resources. Base station 2715 may modify and/or adjust one or more parameters between base station 2715 and first wireless device 2705, for example, based on the end-to-end latency measurement. Base station may modify and/or adjust one or more parameters between base station 2715 and second wireless device 2710, for example, based on the end-to-end latency measurement. Modifying and/or adjusting the one or more parameters may be done so that a first (e.g., uplink) one-way delay may be equal to a second (e.g., downlink) one-way delay between first wireless device 2705 and second wireless device 2710. This ensures that the uplink communication channel and the downlink communication channel remain symmetric.

In step 2752, network function 2720 may send a second message to first wireless device 2705. The second message may indicate the measured end-to-end latency between first wireless 2705 and second wireless device 2710. The second message may comprise the measured end-to-end latency between first wireless device 2705 and second wireless device 2710. In step 2754, network function 2720 may send a second message to second wireless device 2710. The second message may indicate the measured end-to-end latency between first wireless device 2705 and second wireless device 2710. The second message may comprise the measured end-to-end latency between first wireless device 2705 and second wireless device 2710.

First wireless device 2705 may measure an end-to-end latency (delay) between first wireless device 2705 and network function 2720, for example, based on or in response to one or more messages received from network function 2720. First wireless device 2705 may measure the end-to-end delay between first wireless device 2705 and network function 2720 over a RRC connection, a PDU session, a network slice, QoS flow, service data flow, and/or a radio bearer. First wireless device 2705 may measure the end-to-end delay between first wireless device 2705 and network function 2720, for example, based on an indication from network function 2720 to use the RRC connection, the PDU session, the network slice, the QoS flow, the service data flow, and/or the radio bearer for the end-to-end latency measurement. First wireless device may establish a RRC connection, a PDU session, a network slice, a QoS flow, a service data flow, and/or a radio bearer for the end-to-end latency measurement. A PDU session, a network slice, QoS flow, service data flow and/or a radio bearer may be between first wireless device 2705 and base station 2715. A PDU session, a network slice, QoS flow, and/or service data flow may be between first wireless device 2705 and a core network function (e.g., an AMF, a SMF, and/or a UPF). Second wireless device 2710 may perform similar actions as first wireless device 2705, for example, based on or in response to one or more messages received from network function 2720.

In step 2756, first wireless device 2705 may perform channel-based alignment, for example, based on the measured end-to-end latency. In step 2756, second wireless device 2710 may perform channel-based alignment, for example, based on the measured end-to-end latency. The channel-based alignment may be for line current differential protection over a PDU session, a network slice, QoS flow, service data flow, and/or a radio bearer. The end-to-end latency (e.g., uplink channel latency and downlink channel latency) may be received from network element 2720. First wireless device 2705 and/or second wireless device 2710 may perform other applications (e.g., games) over a PDU session, a network slice, QoS flow, service data flow, and/or a radio bearer, for example, based on the end-to-end latency (e.g., uplink channel latency and downlink channel latency) received from network function 2720.

Figure 28:
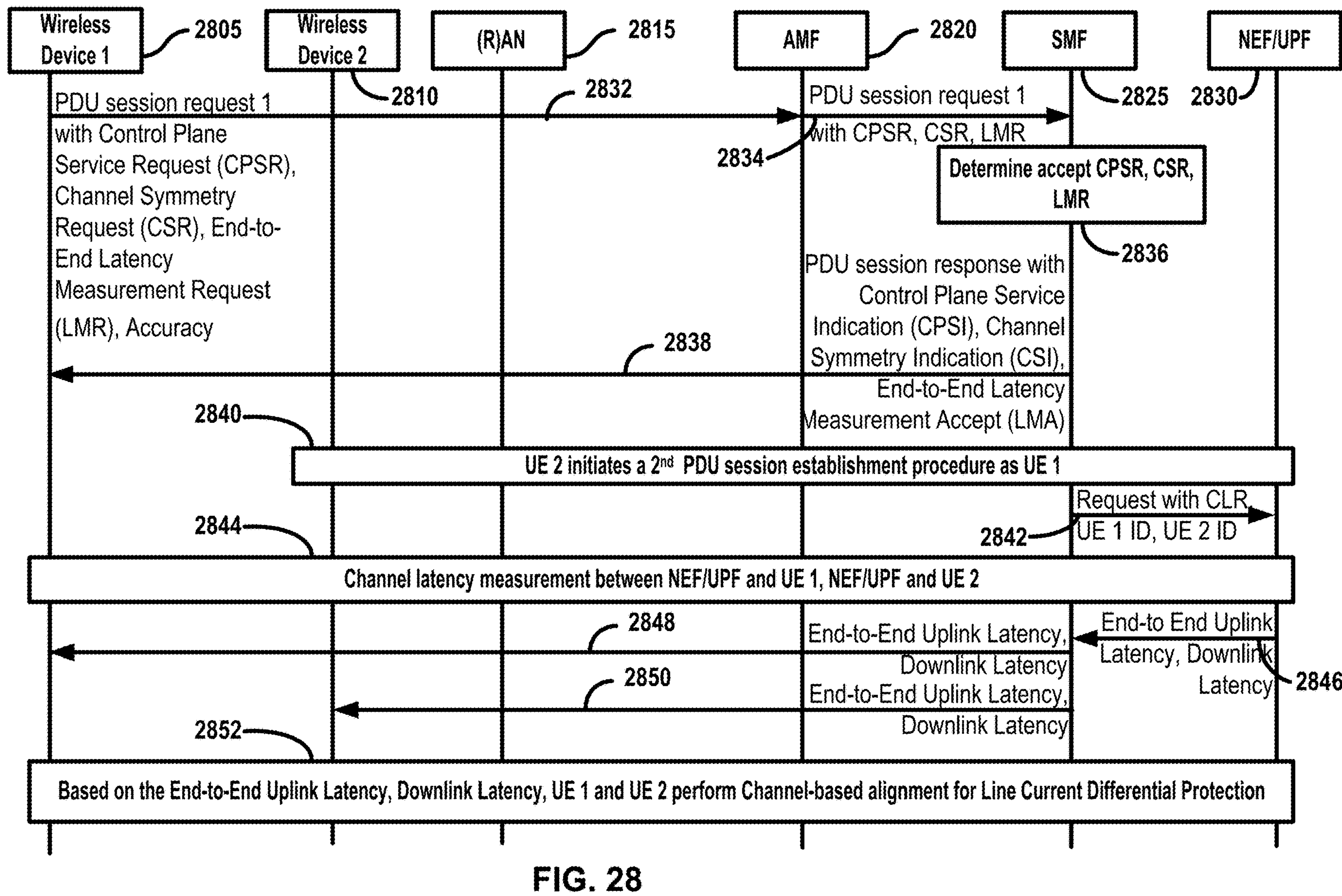
FIG. 28 shows an example of a process for a wireless device and a core network element to exchange data.

FIG. 28 is an example process for a wireless device and a core network element to exchange data.

In step 2832, first wireless device 2805 may send (transmit) one or more first messages to AMF 2820. In step 2832, AMF 2820 (e.g., a network function) may receive the one or more first messages from first wireless device 2805. The first message may indicate a request to measure an end-to-end latency between first wireless device 2805 and second wireless device 2810. The first message may comprise a first parameter (e.g., an End-to End Latency Measurement Request) which may indicate a request to measure the end-to-end latency between first wireless device 2805 and second wireless device 2810. A definition and/or content of the first parameter (e.g., an End-to End Latency Measurement Request) may be similar to the discussion of the first parameter (e.g., an End-to End Latency Measurement Request) above.

The one or more first messages may comprise a second parameter (e.g., a Latency Accuracy) which may indicate an accuracy of the end-to-end latency. The accuracy of the end-to-end latency may be indicated in at least one of: seconds; deciseconds; centiseconds; milliseconds; microseconds; and/or the like. A definition and/or content of the second parameter (e.g., a Latency Accuracy) may be similar to the discussion above. The one or more first messages may comprise a third parameter (e.g., a Channel Symmetry Request (CSR)) which may indicate a request for symmetric communication channels. The definition and/or content of the third parameter (e.g., a Channel Symmetry Request) may be similar to discussion of the third parameter, as discussed above. The one or more first messages may comprise a fourth parameter (e.g., an Asymmetric End-to-end Latency) which may indicate a request for a maximum end-to-end latency asymmetry and/or a difference between at least one uplink communication channel and at least one downlink communication channel to be less than and/or equal to a threshold value. The definition and/or content of the fourth parameter (e.g., an Asymmetric End-to-end Latency) may be similar to the discussion above with respect to the fourth parameter (e.g., an Asymmetric End-to-End Latency). The one or more first messages may comprise an identity (e.g., identifier) of first wireless device 2705 and/or an identity (e.g., identifier) of second wireless device 2710. The definition and/or content of the identifiers may be similar to the discussion above.

The one or more first messages may comprise a fifth parameter (e.g., a Control Plane Service Request) which may indicate a request to send application user data via a control plane. The fifth parameter (e.g., a Control Plane Service Request) may indicate that first wireless device 2805 requests sending application user data via a control plane signaling, rather than a user plane. For example, application user data may be sent from first wireless device 2805 to SMF 2825 in a NAS message. First wireless device 2805 may send user data to second wireless device 2810 via base station 2815, AMF 2820, SMF 2825, and/or NEF/UPR 2830. First wireless device 2805 may send user data to second wireless device 2810 via a first base station, a first AMF, a first SMF, a NEF, a second SMF, a second AMF, and/or a second base station.

The one or more first messages may comprise a sixth parameter (e.g., a Control Plane CIoT 5GS Optimization) which may indicate a capability of first wireless device 2805 to support sending application user data via a control plane. The one or more first messages may comprise a 5GMM Capability IE. The 5GMM Capability IE may indicate at least one capability of first wireless device 2805. The at least one capability may include whether Control Plane CIoT 5GS Optimization is supported; whether User Plane CIoT 5GS Optimization is supported; whether N3 data transfer is supported; and/or whether header compression for Control Plane CIoT 5GS Optimization is supported. Control Plane CIoT 5GS Optimization may indicate whether first wireless device 2805 may support the exchange of user data between first wireless device 2805 and SMF 2825 as payload of a NAS message, for example, in both the uplink and the downlink directions, thereby avoiding an establishment of a user plane connection for a PDU Session. A User Plane CIoT 5GS Optimization may indicate a transfer of user plane data from CM-IDLE without a need to use a Service Request procedure to establish Access Stratum (AS) context in a base station and a wireless device.

The one or more first messages may comprise an RRC message, such as ULInformationTransfer. The one or more first messages may comprise a NAS message, such as PDU Session Establishment Request. First wireless device 2805 may send (transmit) a ULInformationTransfer message to base station 2815. The ULInformationTransfer message may comprise a PDU Session Establishment Request message. In step 2832, first wireless device 2805 may send (transmit) a PDU Session Establishment Request message to SMF 2825 via base station 2815 and/or AMF 2820. In step 2832, first wireless device 2805 may send (transmit) a NAS message to AMF 2820. The NAS message may comprise at least one of: S-NSSAI(s), wireless device Requested DNN, PDU Session ID (s) (e.g., identity of a first PDU session, and/or an identity of a second PDU session), a Request type, an Old PDU Session ID, and/or a N1 SM container. The N1 SM container may comprise a PDU Session Establishment Request message and/or a Port Management Information Container. The PDU Session Establishment Request message may comprise at least one of: a first parameter (e.g., an End-to End Latency Measurement Request); a second parameter (e.g., a Latency Accuracy); a third parameter (e.g., a Channel Symmetry Request); a fourth parameter (e.g., an Asymmetric End-to-end Latency); an identity (e.g., identifier) of first wireless device 2805; an identity (e.g., identifier) of second wireless device 2810; a fifth parameter (e.g., a Control Plane Service Request); a sixth parameter (e.g., a Control Plane CIoT 5GS Optimization); an identity (e.g., identifier) of a first PDU session; and/or an identity (e.g., an identifier) of a second PDU session. The PDU Session Establishment Request message may comprise at least one of: a PDU session and/or PDU session ID(s), a Requested PDU Session Type, a Requested SSC mode, a 5 GSM Capability, a PCO, a SM PDU DN Request Container, a Number of Packet Filters, a Header Compression Configuration, a wireless device Integrity Protection Maximum Data Rate, an Always-on PDU Session Requested, and/or the like.

In step 2834, SMF 2825 may receive the one or more first messages from first wireless device 2805. The one or more first messages may be received via AMF 2820 and/or base station 2815. For example, AMF 2820 may select SMF 2825, for example, based on or in response to receiving the one or more first messages. AMF 2820 may send an Nsmf_PDUSession_CreateSMContext Request message to SMF 2825, for example, based on or in response to receiving the one or more first messages. The Nsmf_PDUSession_CreateSMContext Request message may comprise at least one of: a SUPI, a selected DNN, a wireless device requested DNN, at least one S-NSSAI, at least one PDU Session ID, an AMF ID, a Request Type, a PCF ID, a Same PCF Selection Indication, Priority Access, a Small Data Rate Control Status, an N1 SM container (e.g., a PDU Session Establishment Request message), User location information, an Access Type, a RAT Type, a PEI, a GPSI, a wireless device presence in LADN service area, a Subscription For PDU Session Status Notification, a DNN Selection Mode, Trace Requirements, a Control Plane CIoT 5GS Optimization indication, and/or a Control Plane Only indicator.

In step 2836, SMF 2825 may determine whether to accept the request to measure the end-to-end latency between first wireless device 2805 and second wireless device 2810. The determination of whether to accept the request to measure the end-to-end latency may be based on receiving the message. SMF 2825 may determine an eighth parameter (e.g., an End-to End Latency Measurement Indication) indicating whether SMF 2825 accepts the request to measure the end-to-end latency between first wireless device 2805 and second wireless device 2810. SMF 2825 may determine whether to accept the request to measure the end-to-end latency between first wireless device 2805 and second wireless device 2810, for example, based on at least one of: one or more parameters of the one or more first messages; a capability of the network (e.g., SMF, AMF, base station, NEF) supporting the end-to-end latency measurement; resources of the network; a local policy; and/or subscription information of first wireless device 2825. The eighth parameter (e.g., an End-to End Latency Measurement Indication) may indicate that the network has the capability to support measuring the end-to-end latency.

SMF 2825 may determine to accept the request to measure the end-to-end latency between first wireless device 2805 and second wireless device 2810, for example, based on at least one of the request to measure the end-to-end latency, capabilities of the network, and/or resources of the network that may indicate whether the network supports the end-to-end latency measurement, a local policy, and/or subscription information of first wireless device 2805.

In step 2836, SMF 2825 may determine whether to accept a request to send application user data via a control plane. SMF 2825 may determine a ninth parameter (e.g., a Control Plane Service Indication) indicating that SMF 2825 accepts the request to send application user data via a control plane. SMF 2825 may determine to accept the request to send application user data via the control plane, for example, based on at least one of: one or more parameters of the one or more first messages; capabilities of the network (e.g., SMF, AMF, base station, NEF) supporting the end-to-end latency measurement; resources of the network; a local policy; and/or subscription information of the first wireless device 2805. The ninth parameter (e.g., a Control Plane Service Indication) may indicate that the network has the capability to support sending application user data via a control plane.

SMF 2825 may determine to accept the request to send application user data via the control plane, for example, based on at least one of: the capabilities of the network; the resources of the network indicating that the network supports sending application user data via the control plane; a local policy; and/or the subscription information of first wireless device 2805.

The one or more first messages may indicate a request to send application user data via a control plane. The one or more first messages may indicate User Plane CIoT 5GS Optimization may be supported by first wireless device 2805. The one or more first messages may indicate the capabilities of the network; that the resources of the network indicate that the network supports sending application user data via a user plane; local policy; and/or subscription information of first wireless device 2805. SMF 2825 may determine to reject the request to send application user data via control plane, for example, based on User Plane CIoT 5GS Optimization being supported by first wireless device 2805; the capabilities of the network; that the resources of the network indicate that the network supports sending application user data via a user plane; local policy; and/or subscription information of first wireless device 2805. SMF 2825 may determine to send application user data via a user plane (e.g., UPF).

In step 2836, SMF 2825 may determine whether to accept a request for symmetric communication channels. SMF 2825 may determine a tenth parameter (e.g., a Channel Symmetry Indication) that may indicate that SMF 2825 accepts the request for symmetric communication channels. SMF 2825 may determine to accept the request for symmetric communication channels, for example, based on at least one of: one or more parameters of the one or more first messages; resources of the network; a local policy; and/or subscription information of first wireless device 2805. The tenth parameter (e.g., a Channel Symmetry Indication) may indicate that the network has the capability to support symmetric communication channels.

In step 2836, SMF 2825 may determine that the end-to-end latency measurement is associated with a network slice for first wireless device 2805. The network slice may be associated with a PDU session, for example, based on at least one of: one or more parameters of the one or more first messages; capabilities of the network (e.g., SMF, AMF, base station, NEF) that supports the end-to-end latency measurement; resources of the network; a local policy; subscription information of first wireless device 2805, and/or a determination to accept the request to measure the end-to-end latency. As will be discussed in greater detail below with respect to step 2844, SMF 2825 may measure the end-to-end latency over a network slice and/or a PDU session for first wireless device 2805.

In step 2836, SMF 2825 may determine that the end-to-end latency measurement may be associated with a QoS flow for first wireless device 2805. The QoS flow may be associated with a PDU session, for example, based on at least one of: one or more parameters of the one or more first messages; a capabilities of the network (e.g., SMF, AMF, base station, NEF) supporting the end-to-end latency measurement; resources of the network; a local policy; subscription information of first wireless device 2805, and/or a determination to accept the request to measure the end-to-end latency. As will be discussed in greater detail below with respect to step 2844, SMF 2825 may measure the end-to-end latency over QoS flow and/or a PDU session for first wireless device 2805.

In step 2836, SMF 2825 may determine an end-to-end latency measurement may be associated with a service data flow for first wireless device 2805. The service data flow may be associated with a PDU session, for example, based on at least one of: one or more parameters of the one or more first messages; capabilities of the network (e.g., SMF, AMF, base station, NEF) supporting the end-to-end latency measurement; resources of the network; a local policy; subscription information of first wireless device 2805, and/or a determination to accept the request to measure the end-to-end latency. As will be discussed in greater detail below with respect to step 2844, SMF 2825 may measure the end-to-end latency over a service data flow and/or the PDU session for first wireless device 2805.

In step 2836, SMF 2825 may determine that an end-to-end latency measurement may be associated with a PDU session for first wireless device 2805. The PDU session may be associated with at least one radio bearer. The at least one radio bearer may comprise at least one data radio bearer and/or at least one signaling radio bearer. The determination that the end-to-end latency measurement may be associated the PDU session may be based on at least one of: one or more parameters of the one or more first messages; capabilities of the network (e.g., SMF, AMF, base station, NEF) supporting the end-to-end latency measurement; resources of the network; a local policy; subscription information of first wireless device 2805; and/or a determination to accept the request to measure the end-to-end latency. As will be discussed in greater detail below with respect to step 2844, SMF 2825 may measure an end-to-end latency over a PDU session and/or at least one radio bearer for a first wireless device.

In step 2836, SMF 2825 may determine a radio bearer, QoS policies, and/or QoS parameters for an end-to-end latency measurement. The determination of the radio bearer, QoS policies, and/or QoS parameters, for example, based on at least one of: one or more parameters of the one or more first messages; capabilities of the network (e.g., SMF, AMF, base station, NEF) supporting the end-to-end latency measurement; resources of the network; a local policy; subscription information of first wireless device 2805; and/or a determination to accept the request to measure the end-to-end latency. SMF 2825 may determine at least one radio bearer, QoS policy, and/or QoS parameter to perform an end-to-end latency measurement. At least one radio bearer may comprise at least one data radio bearer and/or at least one signaling radio bearer.

The end-to-end latency measurement and/or symmetric communication channels may comprise a first PDU session and/or a second PDU session. QoS policy and/or QoS parameters determined by SMF 2825 may be applied to an uplink PDU session and/or a downlink PDU session. The uplink PDU session may be between first wireless device 2805 and a first core network (e.g., UPF 1). The downlink PDU session may be between the first core network (e.g., UPF 1) and the first wireless device 2805. QoS policy and/or QoS parameters determined by SMF 2825 may be applied to the first PDU session and/or the second PDU session between first wireless device 2805 and second wireless device 2810.

A first PDU session and/or a second PDU session may comprise at least one QoS flow and/or at least one service data flow. QoS policy and/or QoS parameters determined by SMF 2825 may be applied to an uplink of the at least one QoS flow and/or uplink of the at least one service data flow. QoS policy and/or QoS parameters determined by SMF 2825 may be applied to a downlink of the at least one QoS flow and/or a downlink of the at least one service data flow. QoS policy and/or QoS parameters determined by SMF 2825 may be applied to the at least one QoS flow and/or the at least one service data flow of a first PDU session, between first wireless device 2805 and second wireless device 2810. QoS policy and/or QoS parameters determined by SMF 2825 may be applied to the at least one QoS flow and/or at least one service data flow of a second PDU session, between first wireless device 2805 and second wireless device 2810.

The at least one service data flow (SDF) may be an aggregate set of packet flows carried through a UPF that matches a service data flow template. A service data flow template may be a set of service data flow filters in a PCC Rule or an application identifier in a PCC rule referring to an application detection filter in a SMF and/or in a UPF required for defining a service data flow. A service data flow filter may be a set of packet flow header parameter values and/or ranges used to identify one or more packet flows in a UPF. A QoS Flow may be a finest granularity of QoS differentiation in a PDU Session. A QoS flow may be similar to a bearer in 4G/LTE. A QoS Flow ID (QFI) may be used to identify a QoS Flow in a 5G System. User Plane traffic with the same QFI within a PDU Session may receive identical traffic forwarding treatment (e.g., scheduling, admission threshold). QFI may be carried in an encapsulation header on an N3 interface and/or an N9 interface (e.g., without any changes to the e2e packet header). QFI may be used for any PDU Session Types. QFI may be unique within a PDU Session. QFI may be dynamically assigned or may be equal to a 5QI. Within a 5GS, a QoS Flow may be controlled by a SMF and may be preconfigured and/or established via a PDU Session Establishment procedure or a PDU Session Modification procedure.

QoS policy and/or QoS parameters determined by SMF 2825 may comprise at least one PCC rule for the end-to-end latency measurement and/or a symmetric communication channels for first wireless device 2805. The at least one PCC rule may comprise at least one of: at least one charging control rule; at least one policy control rule; at least one usage monitoring control rule; at least one application detection and control rule; at least one traffic steering control rule; and/or at least one service data flow detection information (e.g., service data flow template). The at least one policy control rule may comprise at least one QoS control rule and/or at least one gating control rule. The at least one charging control rule may comprise at least one of: an information element indicating a charging method and/or a charging type; an information element indicating at least one charging rate; and/or an information element indicating at least one identifier or address of a CHF. A charging method and/or charging type may comprise at least one of: online charging, offline charging, and/or converged charging.

A policy control rule may be used for policy control, where at least one QoS control rule may be used for QoS control, and at least one gating control rule may be used for gating control. A QoS control rule may be used to authorize QoS on a service data flow and/or a QoS flow. A gating control rule may be used to discard packets that do not match a service data flow of a gating control rule and/or associated PCC rules. A usage monitoring control rule may be used to monitor volume and/or time usage. The usage monitoring control rule may report an accumulated usage of network resources. An application detection and control rule may comprise a request to detect a specified application traffic. An application detection and control rule may comprise a report to a PCF on a start or stop of application traffic. An application detection and control rule may apply a specified enforcement and charging actions. A traffic steering control rule may be used to activate and/or deactivate traffic steering policies for steering a subscriber's traffic to an appropriate operator and/or to appropriate 3rd party service functions (e.g., NAT, antimalware, parental control, DDoS protection) in an (S)Gi-LAN. Service data flow detection information (e.g., service data flow template) may comprise a list of service data flow filters and/or an application identifier that may reference a corresponding application detection filter for a detection of service data flow. Service data flow detection information (e.g., service data flow template) may comprise a combination of traffic patterns of Ethernet PDU traffic.

QoS policy and/or QoS parameters determined by SMF 2825 may comprise at least one of: 5QI/QCI, ARP, RQA, GFBR, MFBR and/or a maximum packet loss rate as described in FIG. 8. QoS policy and/or QoS parameters determined by SMF 2825 may comprise a QoS class identifier (QCI). QCI may be a scalar that may be used as a reference for a specific packet forwarding behavior (e.g., packet loss rate or packet delay budget) to be provided to a SDF, which may be implemented in an access network by a QCI referencing node specific parameters that control packet forwarding treatment (e.g., scheduling weights, admission thresholds, queue management thresholds, link layer protocol configuration, etc.) that may have been pre-configured by an operator at least one specific node (e.g., base station).

QoS policy and/or QoS parameters determined by SMF 2825 may comprise at least one of an eighth parameter (e.g., an End-to End Latency Measurement Indication), a ninth parameter (e.g., a Control Plane Service Indication), and/or a tenth parameter (e.g., a Channel Symmetry Indication).

SMF 2825 may send a message to AMF 2820. The message may comprise a Nsmf_PDUSession_CreateSM-Context Response. The Nsmf_PDUSession_CreateSMContext Response message may comprise at least one of a first parameter (e.g., an End-to End Latency Measurement Request), a second parameter (e.g., a Latency Accuracy), a third parameter (e.g., a Channel Symmetry Request), a fourth parameter (e.g., an Asymmetric End-to-end Latency), a fifth parameter (e.g., a Control Plane Service Request), a sixth parameter (e.g., a Control Plane CIoT 5GS Optimization), an identity (e.g., identifier) of first wireless device 2805; an identity (e.g., identifier) second wireless device 2810; an identity (e.g., identifier) of a first PDU session; and/or an identity (e.g., identifier) of a second PDU session. The Nsmf_PDUSession_CreateSMContext Response message may comprise a Reflective QoS Indication (RQI), which may indicate a request for symmetric communication channels for a wireless device. The RQI may indicate a maximum end-to-end latency asymmetry and/or that a difference between at least one uplink communication channel and at least one downlink communication channel be less than or equal to a threshold value (e.g., 2 ms). The RQI may indicate an end-to-end latency between two network elements may be less than or equal to a value (e.g., 5 ms, 10 ms).

The Nsmf_PDUSession_CreateSMContext Response message may comprise at least one of a Cause, a SM Context ID, and/or an N1 SM container. The N1 SM container may comprise a PDU Session Reject message. The PDU Session Reject message may comprise a cause value indicating a rejection reason. The Nsmf_PDUSession_CreateSMContext Response message may comprise N2 SM information. The N2 SM information may comprise a list of at least one PDU session that may be setup by a base station for an end-to-end latency measurement and/or symmetric communication channels. The N2 SM information may comprise at least one of a PDU Session ID for an end-to-end latency measurement and/or symmetric communication channels, a QFI for an end-to-end latency measurement and/or the symmetric communication channels, a QoS Profile for an end-to-end latency measurement and/or the symmetric communication channels (e.g., QoS policy and/or parameters determined by a SMF), CN Tunnel Info, a S-NSSAI from an Allowed NSSAI, a Session-AMBR, a PDU Session Type, User Plane Security Enforcement information, a wireless device Integrity Protection Maximum Data Rate, RSN, and/or a PDU Session Pair ID.

AMF 2820 may send a message to base station 2815, for example, based on or in response to receiving the message from SMF 2825. The message may comprise a PDU Session Resource Setup message. The PDU Session Resource Setup message may comprise one or more IEs and/or parameters of a Nsmf_PDUSession_CreateSMContext Response message. The PDU Session Resource Setup message may comprise at least one of: a first parameter (e.g., an End-to End Latency Measurement Request), a second parameter (e.g., a Latency Accuracy), a third parameter (e.g., a Channel Symmetry Request), a fourth parameter (e.g., an Asymmetric End-to-end Latency), a fifth parameter (e.g., a Control Plane Service Request), a sixth parameter (e.g., a Control Plane CIoT 5GS Optimization), an identity (e.g., identifier) of first wireless device 2805; an identity (e.g., identifier) of second wireless device 2810; an identity (e.g., identifier) of a first PDU session, an identity (e.g., identifier) of a second PDU session, and/or a RQI.

The PDU Session Resource Setup message may comprise at least one of an AMF UE NGAP ID, a RAN UE NGAP ID, a RAN Paging Priority, a NAS-PDU, a PDU Session Resource Setup Request List for an end-to-end latency measurement and/or symmetric communication channels, and/or a UE Aggregate Maximum Bit Rate. The PDU Session Resource Setup Request List may comprise a list of one or more PDU sessions that may be setup by a base station for an end-to-end latency measurement and/or symmetric communication channels. The PDU Session Resource Setup Request List may comprise at least one of a PDU Session ID, a S-NSSAI, a PDU Session NAS-PDU, and/or a PDU Session Resource Setup Request Transfer. The PDU Session NAS-PDU may comprise a NAS message sent from a core network (e.g., a SMF and/or an AMF) to a wireless device. The PDU Session Resource Setup Request Transfer may comprise PDU session information that may be setup by a base station for an end-to-end latency measurement and/or symmetric communication channels. The PDU session information may be associated with a SMF (e.g., SMF 2825).

Base station 2815 may determine whether to accept the request to measure the end-to-end latency between first wireless device 2805 and second wireless device 2810, for example, based on or in response to receiving the message from AMF 2820. Base station 2815 may determine whether to accept the request to measure the end-to-end latency, for example, based on a PDU Session Resource Setup message, a capability of base station 2815 to support the end-to-end latency measurement, resources of base station 2815, a local policy, and/or subscription information of first wireless device 2805. Base station 2815 may determine a seventh parameter (e.g., End-to End Latency Measurement Accept). The seventh parameter may indicate that base station 2815 accepts the request to measure the end-to-end latency. Base station 2815 may determine to accepts the request to measure the end-to-end latency, for example, based on at least one of one or more parameters of a PDU Session Resource Setup message, a capability of base station 2815 to support the end-to-end latency measurement, resources of base station 2815, a local policy, and/or subscription information of first wireless device 2805. The seventh parameter may indicate that base station 2815 accepts the request to send application user data via a control plane. The seventh parameter may indicate that base 2815 station accepts the request for symmetric communication channels.

Base station 2815 may send a response message to AMF 2820. The response may be a PDU Session Resource Setup Response response. The response may indicate that base station 2815 accepts the request for the end-to-end latency measurement and/or symmetric communication channels. Base station 2815 may send a PDU Session Resource Setup Response message to AMF 2820. The PDU Session Resource Setup Response message may comprise the seventh parameter (e.g., an End-to End Latency Measurement Accept). The PDU Session Resource Setup Response message may comprise at least one of an AMF UE NGAP ID, RAN UE NGAP ID, a PDU Session Resource Setup Response List, a PDU Session Resource Failed to Setup List, and/or Criticality Diagnostics. Criticality Diagnostics IE may be sent by an NG-RAN node and/or an AMF, for example, when parts of a received message have not been comprehended or were missing, and/or if a message contained logical errors.

AMF 2820 may send a message to a SMF 2825, for example, based one or in response to receiving the message from base station 2815. The message may comprise a Nsmf_PDUSession_UpdateSMContext Request message. The Nsmf_PDUSession_UpdateSMContext Request message may comprise at least one of the seventh parameter (e.g., an End-to End Latency Measurement Accept), a SM Context ID, N2 SM information, and/or a Request Type. N2 SM information may comprise one or more IEs and/or parameters of a PDU Session Resource Setup Response message.

In step 2842, SMF 2825 may send a message to NEF/UPF 2830, for example, based on or in response to receiving the message from AMF 2820. The message may comprise an End-to-end Latency Measurement Request. The message may request a measurement of an end-to-end latency between first wireless device 2805 and second wireless device 2810, for example, based on a determination to accept a request to send application user data via a control plane. An End-to-end Latency Measurement Request message may comprise at least one of: the first parameter (e.g., an End-to End Latency Measurement Request); the second parameter (e.g., a Latency Accuracy); the third parameter (e.g., a Channel Symmetry Request); the fourth parameter (e.g., an Asymmetric End-to-end Latency); an identity (e.g., identifier) of first wireless device 2805; an identity (e.g., identifier) of second wireless device 2810; the fifth parameter (e.g., a Control Plane Service Request); the sixth parameter (e.g., a Control Plane CIoT 5GS Optimization); an identity (e.g., identifier) of a first PDU session; an identity (e.g., identifier) of a second PDU session; the seventh parameter (e.g., an End-to End Latency Measurement Accept); the eighth parameter (e.g., an End-to End Latency Measurement Indication); the ninth parameter (e.g., Control Plane Service Indication), and/or the tenth parameter (e.g., a Channel Symmetry Indication).

SMF 2825 may determine at least one user plane rule for an end-to-end latency measurement and/or symmetric communication channels for a wireless device. The at least one user plane rule may be determined, for example, based on a determination to send application user data via a user plane. SMF 2825 may determine at least one user plane rule, for example, based on at least one of: a QoS policy and/or parameters determined by SMF 2825; the first parameter (e.g., an End-to End Latency Measurement Request); the second parameter (e.g., a Latency Accuracy); the third parameter (e.g., a Channel Symmetry Request); the fourth parameter (e.g., an Asymmetric End-to-end Latency); an identity (e.g., identifier) of first wireless device 2805; an identity (e.g., identifier) of second wireless device 2810; the fifth parameter (e.g., a Control Plane Service Request); the sixth parameter (e.g., a Control Plane CIoT 5GS Optimization); an identity (e.g., identifier) of a first PDU session; an identity (e.g., identifier) of a second PDU session; the seventh parameter (e.g., an End-to End Latency Measurement Accept); the eighth parameter (e.g., an End-to End Latency Measurement Indication); the ninth parameter (e.g., a Control Plane Service Indication); the tenth parameter (e.g., a Channel Symmetry Indication), and/or RQI. At least one user plane rule determined by SMF 2825 may comprise at least one of QoS policy and/or parameters determined by SMF 2825; the first parameter (e.g., an End-to End Latency Measurement Request); the second parameter (e.g., a Latency Accuracy); the third parameter (e.g., a Channel Symmetry Request); the fourth parameter (e.g., an Asymmetric End-to-end Latency); an identity (e.g., identifier) of first wireless device 2805; an identity (e.g., identifier) of second wireless device 2810; the fifth parameter (e.g., a Control Plane Service Request); the sixth parameter (e.g., a Control Plane CIoT 5GS Optimization); an identity (e.g., identifier) of a first PDU session; an identity (e.g., identifier) of a second PDU session; the seventh parameter (e.g., an End-to End Latency Measurement Accept); the eighth parameter (e.g., an End-to End Latency Measurement Indication); the ninth parameter (e.g., a Control Plane Service Indication); the tenth parameter (e.g., a Channel Symmetry Indication), and/or RQI. At least one user plane rule may comprise a parameter indicating measuring an end-to-end latency by PMF protocol.

At least one user plane rule may comprise at least one of: a packet detection rule, a forwarding action rule, a QoS enforcement rule, and/or a usage reporting rule. At least one packet detection rule may comprise data and/or traffic packet detection information (e.g., one or more match fields against which incoming packets may be matched) and/or may apply other user plane rules (e.g., at least one forwarding action rule, at least one QoS enforcement rule, and/or at least one usage reporting rule) to data and/or traffic packets matching a packet detection rule. At least one forwarding action rule may comprise an apply action parameter, which may indicate whether a UP function may forward, duplicate, drop and/or buffer a data and/or traffic packet respectively. At least one usage reporting rule may be used to measure network resource usage, which may be in terms of traffic data volume, duration (e.g., time), and/or events, according to a measurement method in a usage reporting rule. An event may indicate a start of a time service and/or a stop of a time service. At least one QoS enforcement rule may comprise instructions to request a UP function to perform QoS enforcement of a user plane traffic.

SMF 2825 may determine a packet detection rule, for example, based on service data flow detection information (e.g., a service data flow template). SMF 2825 may determine a forwarding action rule, for example, based on one or more policy control rules. SMF may determine a usage reporting rule, for example, based on one or more usage monitoring control rules.

SMF 2825 may select a UPF (e.g., NEF/UPF 2830) to support the end-to-end latency measurement and/or symmetric communication channels. The selection may be based on a capability of a UPF indicating that the UPF supports an end-to-end latency measurement (e.g., a PMF protocol) and/or symmetric communication channels. SMF 2825 may send a message to a UPF (e.g., NEF/UPF 2830) The message may comprise an N4 session establishment or modification request. The message may comprise at least one user plane rule. A UPF (e.g., NEF/UPF 2830) may install user plane rules received from SMF 2825, for example, based on or in response to receiving the message from SMF 2825. A UPF (e.g., NEF/UPF 2830) may send a response message to SMF 2825. The response message may comprise an N4 session establishment and/or modification response. UPF (e.g., NEF/UPF) may enforce the user plane rules.

UPF (e.g., NEF/UPF 2830) may take one or more actions, for example, based on the at least one user plane rule. UPF (e.g., NEF/UPF 2830) may determine whether to provide the end-to-end latency measurement and/or symmetric communication channels, for example, based on the capability of the UPF and/or the local configuration. UPF (e.g., NEF/UPF 2830) may determine whether to provide the end-to-end latency measurement and/or symmetric communication channels, for example, based on the N4 session establishment/modification request message. UPF (e.g., NEF/UPF 2830) may allocate resources for the end-to-end latency measurement and/or symmetric communication channels, for example, based on the N4 session establishment/modification request message. UPF (e.g., NEF/UPF 2830) may schedule uplink and/or downlink data packet to support the end-to-end latency measurement and/or symmetric communication channels, for example, based on the N4 session establishment/modification request message.

UPF (e.g., NEF/UPF 2830) may enforce at least one user plane rule. UPF (e.g., NEF/UPF 2830) may enforce at least one packet detection rule, for example, by matching user data and/or traffic packet with a service data flow template (e.g., service data flow filters and/or application identifiers). UPF may apply other user plane rules, such as forwarding action rules, QoS enforcement rules, and usage reporting rule, to data and/or traffic packets that matched a packet detection rule. UPF (e.g., NEF/UPF 2830) may enforce at least one forwarding action rule by forwarding, duplicating, dropping, and/or buffering a data and/or traffic packet, respectively. UPF (e.g., NEF/UPF 2830) may redirect traffic to a web portal of an operator. UPF (e.g., NEF/UPF 2830) may enforce at least one usage reporting rule, for example, by measuring network resource usage in terms of traffic data volume, duration (e.g., time), and/or events, according to a measurement method in a usage reporting rule. UPF (e.g., NEF/UPF 2830) may report a network resource usage to SMF 2825, for example, if a quota and/or a threshold may have been reached, and/or if an event and/or another trigger may have been met. UPF (e.g., NEF/UPF 2830) may enforce at least one QoS enforcement rule by applying at least one of QoS parameters: 5QI, ARP, MBR, GBR to a service data flow. UPF (e.g., NEF/UPF 2830) may enforce at least one QoS enforcement rule by applying at least one QoS parameters (e.g., a Session AMBR and default 5QI/ARP combination) to a PDU session.

In step 2838, SMF 2825 may send a message to first wireless device 2838. The message may comprise a NAS response message (e.g., PDU session establishment response). The message may be sent, for example, based on or in response to the one or more first messages sent by first wireless device 2805 in step 2832. The PDU session establishment response message (e.g., PDU Session Establishment Accept) may indicate an acceptance of the request to measure the end-to-end latency. The PDU session establishment response message may indicate an acceptance of the request to send application user data via a control plane. The PDU session establishment response message may indicate acceptance of symmetric communication channels. The PDU session establishment response message may comprise at least one of: a QoS policy and/or a parameter determined by a SMF, RQI, the eighth parameter (e.g., an End-to End Latency Measurement Indication), the ninth parameter (e.g., Control Plane Service Indication), and/or the tenth parameter (e.g., a Channel Symmetry Indication). The PDU session establishment response message may indicate a RRC connection, a PDU session, a network slice, QoS flow, service data flow, and/or radio bearer for the end-to-end latency measurement. The PDU session establishment response message may comprise a PDU session identifier indicating the PDU session may be used for and/or applied to the end-to-end latency measurement. The PDU session establishment response message may comprise a S-NSSAI indicating a network slice may be used for and/or applied to the end-to-end latency measurement.

SMF 2825 may send a NAS response message to first wireless device 2805 via AMF 2820 and/or base station 2815. SMF 2825 may send a Namf_Communication_N1N2MessageTransfer message to AMF 2820. A Namf_Communication_N1N2MessageTransfer message may comprise at least one of: a QoS policy/parameters determined by a SMF; RQI; the eighth parameter (e.g., an End-to End Latency Measurement Indication); the ninth parameter (e.g., a Control Plane Service Indication); and/or the tenth parameter (e.g., a Channel Symmetry Indication). The Namf_Communication_N1N2MessageTransfer message may comprise at least one of: a PDU Session ID for the end-to-end latency measurement and/or symmetric communication channels, N2 SM information, and/or an N1 SM container. N2 SM information may comprise information sent to base station 2815. The N1 SM container may comprise information sent to first wireless device 2805. N2 SM information may comprise at least one of: a QoS policy/parameters determined by a SMF; RQI; the eighth parameter (e.g., an End-to End Latency Measurement Indication); the ninth parameter (e.g., a Control Plane Service Indication); the tenth parameter (e.g., a Channel Symmetry Indication); a PDU Session ID for an end-to-end latency measurement and/or symmetric communication channels, QFI for an end-to-end latency measurement and/or symmetric communication channels, a QoS Profile for an end-to-end latency measurement and/or symmetric communication channels, CN Tunnel Info, S-NSSAI from an Allowed NSSAI, a Session-AMBR, a PDU Session Type, User Plane Security Enforcement information, a wireless device Integrity Protection Maximum Data Rate, RSN, and/or PDU Session Pair ID. The N1 SM container may comprise a PDU Session Establishment Accept message and/or parameter. The PDU Session Establishment Accept message and/or parameter may comprise at least one of: QoS policy and/or parameters determined by a SMF; RQI; the eighth parameter (e.g., an End-to End Latency Measurement Indication); the ninth parameter (e.g., a Control Plane Service Indication); the tenth parameter (e.g., a Channel Symmetry Indication); QoS Rule(s) and/or QoS Flow level QoS parameters if needed for a QoS Flow(s) associated with a QoS rule(s) for an end-to-end latency measurement and/or symmetric communication channels, a selected SSC mode, S-NSSAI(s), a wireless device Requested DNN, an allocated IPv4 address, an interface identifier, Session-AMBR, a selected PDU Session Type, a Reflective QoS Timer (if available), P-CSCF address(es), a Control Plane Only indicator, a Header Compression Configuration, an Always-on PDU Session Granted, Small Data Rate Control parameters, a Small Data Rate Control Status, and/or a Serving PLMN Rate Control.

AMF 2820 may send N2 SM information to base station 2815. AMF 2820 may send an N1 SM container to first wireless device 2805 via a NAS message. Base station may perform one or more actions, for example, based on or in response to the message received from AMF 2820. For example, base station 2815 may send an RRC message (e.g., a RRCReconfiguration) to first wireless device 2805. The RRCReconfiguration message may indicate acceptance of the end-to-end latency measurement and/or symmetric communication channels. The RRCReconfiguration message may comprise at least one of: RRC configuration information for the end-to-end latency measurement and/or symmetric communication channels, a radio bearer configuration information for the end-to-end latency measurement and/or symmetric communication channels, a logical channel configuration information for the end-to-end latency measurement and/or symmetric communication channels, the eighth parameter (e.g., an End-to End Latency Measurement Indication); the ninth parameter (e.g., a Control Plane Service Indication); and/or the tenth parameter (e.g., a Channel Symmetry Indication).

Base station 2815 may associate and/or map the PDU session to the at least one QoS flow and/or service data flow for the end-to-end latency measurement and/or symmetric communication channels. Base station 2815 may associate and/or map the at least one QoS flow and/or service data flow to at least one DRB and/or at least one SRB for the end-to-end latency measurement and/or symmetric communication channels. Base station 2815 may associate and/or map at least one DRB and/or at least one SRB to at least one logical channel and/or at least one physical channel for the end-to-end latency measurement and/or symmetric communication channels. Base station 2815 may allocate one or more resources for the end-to-end latency measurement and/or symmetric communication channels. Base station 2815 may schedule uplink and/or downlink data packets to support the end-to-end latency measurement and/or symmetric communication channels.

First wireless device 2805 may take one or more actions, for example, based on or in response to a received message from SMF 2825, AMF 2820, and/or base station 2815. The one or more actions may be based on at least one of: QoS policy and/or parameters determined by a SMF; RQI; the eighth parameter (e.g., an End-to End Latency Measurement Indication); the ninth parameter (e.g., a Control Plane Service Indication); and/or the tenth parameter (e.g., a Channel Symmetry Indication). First wireless device 2805 may allocate radio bearer resources and/or QoS resources for the end-to-end latency measurement and/or symmetric communication channels. The radio bearer resources and/or QoS resources may be based on at least one of: RRC configuration information for the end-to-end latency measurement and/or symmetric communication channels, radio bearer configuration information for the end-to-end latency measurement and/or symmetric communication channels, logical channel configuration information for the end-to-end latency measurement and/or symmetric communication channels, the eighth parameter (e.g., an End-to End Latency Measurement Indication); the ninth parameter (e.g., a Control Plane Service Indication); and/or the tenth parameter (e.g., a Channel Symmetry Indication).

First wireless device 2805 may schedule uplink and/or downlink data packets to support the end-to-end latency measurement and/or symmetric communication channels. First wireless device 2805 may establish at least one RRC connection for the end-to-end latency measurement and/or symmetric communication channels. The RRC connection for the end-to-end latency measurement and/or symmetric communication channels may be between first wireless device 2805 and base station 2815. The RRC connection for the end-to-end latency measurement and/or symmetric communication channels may be between first wireless device 2805 and second wireless device 2810.

At least one uplink communication channel and/or at least one downlink communication channel may be associated with the RRC connection. The RRC connection for the end-to-end latency measurement and/or symmetric communication channels may be associated with a PDU session for symmetric communication channels.

In step 2840, second wireless device 2810 may perform actions similar to those describe above with respect to first wireless device 2805. Specifically, second wireless device 2810 may initialize a PDU session request in accordance with steps 2832, 2834, 2836, and/or 2838 described above. The network may perform similar actions to establish a second PDU session.

In step 2844, SMF 2825 may determine (measure, calculate) the end-to-end latency between first wireless device 2805 and second wireless device 2810. SMF 2825 may perform similar actions to measure an end-to-end latency as those described with respect to network function 2720 in FIG. 27. SMF 2825 may determine (measure, calculate) the end-to-end latency between first wireless device 2805 and second wireless device 2810, for example, based one or in response to a message received from SMF 2825. SMF 2825 may determine (measure, calculate) the end-to-end latency between first wireless device 2805 and second wireless device 2810, for example, based on one or more parameters received from a SMF, a NEF and/or a UPF.

SMF 2825, a UPF, and/or a NEF (e.g., NEF/UPF 2830) may determine (measure, calculate) a first end-to-end latency between first wireless device 2805 and SMF 2825, the UPF, and/or the NEF (e.g., NEF/UPF 2830). SMF 2825, a UPF, and/or a NEF (e.g., NEF/UPF 2830) may determine (measure, calculate) a second end-to-end latency between second wireless device 2810 and SMF 2825, the UPF, and/or the NEF (e.g., NEF/UPF 2830). SMF 2825, a UPF, and/or a NEF (e.g., NEF/UPF 2830) may calculate and/or measure the end-to-end latency between first wireless device 2805 and second wireless device 2810 by combining (e.g., adding) the first end-to-end latency to the second end-to-end latency. SMF 2825, a UPF, and/or a NEF (e.g., NEF/UPF 2830), first wireless device 2805 and/or second wireless device 2810 may perform actions described in greater detail below with respect to FIG. 30 and/or FIG. 31 to measure the end-to-end latency. SMF 2825, a UPF, and/or a NEF (e.g., NEF/UPF 2830), first wireless device 2805 and/or second wireless device 2810 may apply a PMF protocol to determine (measure, calculate) the end-to-end latency.

SMF 2825, a UPF, and/or a NEF (e.g., NEF/UPF 2830) may determine (measure, calculate) a first (e.g., uplink) one-way delay between first wireless device 2805 and second wireless device 2810. SMF 2825, a UPF, and/or a NEF (e.g., NEF/UPF 2830) may determine (measure, calculate) a first one-way delay between first wireless device 2805 and SMF 2825, the UPF, and/or the NEF (e.g., NEF/UPF 2830). SMF 2825, a UPF, and/or a NEF (e.g., NEF/UPF 2830) may determine (measure, calculate) a first one-way delay between SMF 2825, the UPF, the NEF (e.g., NEF/UPF 2830) and second wireless device 2810. SMF 2825, a UPF, and/or a NEF (e.g., NEF/UPF 2830) may determine (measure, calculate, derive) a first (e.g., uplink) one-way delay between first wireless device 2805 and second wireless device 2810, for example, by combing (adding) the first one-way delay between first wireless device 2805 and SMF 2825, the UPF, and/or the NEF (e.g., NEF/UPF 2830) and the first one-way delay between SMF 2825, the UPF, and/or the NEF (e.g., NEF/UPF 2830) and second wireless device 2810.

SMF 2825, a UPF, and/or a NEF (e.g., NEF/UPF 2830) may determine (measure, calculate) a second (e.g., downlink) one-way delay between first wireless device 2805 and second wireless device 2810. SMF 2825, a UPF, and/or a NEF (e.g., NEF/UPF 2830) may determine (measure, calculate) a second one-way delay between second wireless device 2810 and SMF 2825, the UPF, and/or the NEF (e.g., NEF/UPF 2830). SMF 2825, a UPF, and/or a NEF (e.g., NEF/UPF 2830) may determine (measure, calculate) a second one-way delay between SMF 2825, the UPF, and/or the NEF (e.g., NEF/UPF 2830) and first wireless device 2805. SMF 2825, a UPF, and/or a NEF (e.g., NEF/UPF 2830) may determine (measure, calculate, and/or derive) a second (e.g., downlink) one-way delay between first wireless device 2805 and second wireless device 2810, for example, by combing (adding) the second one-way delay between second wireless device 2810 and SMF 2825, the UPF, and/or the NEF (e.g., NEF/UPF 2830) and the second one-way delay between SMF 2825, the UPF, and/or the NEF (e.g., NEF/UPF 2830) and first wireless device 2805.

In step 2846, a UPF and/or a NEF (e.g., NEF/UPF 2830) may send (report) a measured end-to-end latency to SMF 285. UPF and/or NEF (e.g., NEF/UPF 2830) may send the measured end-to-end latency, for example, if the end-to-end latency measurement was performed by the UPF and/or the NEF (e.g., NEF/UPF 2830). A UPF and/or a NEF (e.g., NEF/UPF 2830) may send a message to SMF 2825. The message may comprise an End-to-end Latency Report. The End-to-end Latency Report message may comprise at least one of: the first (e.g., uplink) one-way delay between first wireless device 2805 and second wireless device 2810; a first one-way delay between first wireless device 2805 and a UPF and/or a NEF (e.g., NEF/UPF 2830), a first one-way delay between a UPF and/or a NEF (e.g., NEF/UPF 2830) and second wireless device 2810; a second (e.g., downlink) one-way delay between first wireless 2805 device and second wireless device 2810; a second one-way delay between second wireless device 2810 and a UPF and/or a NEF (e.g., NEF/UPF 2830); and/or a second one-way delay between a UPF and/or a NEF (e.g., NEF/UPF 2830) and first wireless device 2805.

SMF 2825 may compare a first (e.g., uplink) one-way delay between first wireless device 2805 and second wireless device 2810 and a second (e.g., downlink) one-way delay between first wireless device 2805 and second wireless device 2810. SMF 2825 may modify and/or adjust QoS policy, parameters, radio bearer, and/or QoS resources (e.g., parameters) so that the first (e.g., uplink) one-way delay is equal the second (e.g., downlink) one-way delay. The ensures a symmetric uplink communication channel and downlink communication channel. SMF 2825 may modify and/or adjust the parameters, for example, based on or in response to the end-to-end latency measured by SMF 2825. SMF 2825 may modify and/or adjust the one or more parameters, for example, based on or in response to a message and/or a report received from the UPF and/or the NEF (e.g., NEF/UPF 2830). SMF 2825 may modify and/or adjust the parameters, for example, based on the end-to-end delay measurement. SMF 2825 may send a PDU session modification request message to first wireless device 2805 via AMF 2820 and/or base station. The PDU session modification request message may comprise modified and/or updated QoS policy and/or parameters for uplink and/or downlink so that a first (e.g., uplink) one-way delay may equal a second (e.g., downlink) one-way delay. Base station 2815 may modify and/or adjust one or more parameters (e.g., radio bearer resources and/or QoS resources) so that a first (e.g., uplink) one-way delay may equal a second (e.g., downlink) one-way delay. Base station 2815 may modify and/or adjust the one or more parameters, for example, based on or in response to receiving the message SMF 2825 and/or AMF 2820. Base station 2815 may modify and/or adjust the one or more parameters (e.g., radio bearer resources and/or QoS resources) so that a difference between the first (e.g., uplink) one-way delay and the second (e.g., downlink) one-way delay may be less than a threshold value (e.g., 2 ms).

In steps 2848, SMF 2825 may send a second message to first wireless device 2805. The second message may indicate the end-to-end latency between first wireless device 2805 and second wireless device 2810. The second message may comprise the measured end-to-end latency between first wireless device 2805 and second wireless device 2810. In step 2850, SMF 2825 may send a second message to second wireless device 2810. The second message may indicate the end-to-end latency between first wireless device 2805 and second wireless device 2810. The second message may comprise the measured end-to-end latency between first wireless 2805 and second wireless device 2810.

First wireless device 2805 may perform one or more actions, for example, based on or in response to receiving the second message from SMF 2825. First wireless device 2805 may determine (measure, calculate) the end-to-end delay between first wireless device 2805 and a UPF and/or a NEF (e.g., NEF/UPF 2830) over a PDU session, a network slice, QoS flow, service data flow, and/or a radio bearer. First wireless device 2805 may determine (measure, calculate) the end-to-end delay over the PDU session, the network slice, the QoS flow, the service data flow, and/or the radio bearer, for example, based on an indication from AMF 2820 and/or a NEF (e.g., NEF/UPF 2830) that an RRC connection, a PDU session, a network slice, QoS flow, service data flow, and/or a radio bearer be applied to and/or used for the end-to-end latency measurement. First wireless device 2805 may establish a RRC connection, a PDU session, a network slice, a QoS flow, a service data flow, and/or a radio bearer applied to and/or used for the end-to-end latency measurement. The PDU session, the network slice, the QoS flow, the service data flow, and/or the radio bearer may be between first wireless device 2805 and base station 2815. The PDU session, the network slice, the QoS flow, and/or the service data flow may be between first wireless device 2805 and a core network function (e.g., AMF 2820, SMF 2825, and/or a UPF (e.g., NEF/UPF 2830)). Second wireless device may perform similar actions as described above.

In step 2852, first wireless device 2805 may perform channel-based alignment. In step 2852, second wireless device 2810 may perform channel-based alignment. The channel-based alignment performed by first wireless device 2805 and/or second wireless device 2810 may be for line current differential protection over a PDU session, a network slice, QoS flow, service data flow, and/or a radio bearer. The channel-based alignment performed by first wireless device 2805 and/or second wireless device 2810 may be based on the end-to-end latency (e.g., uplink channel latency and downlink channel latency) received from SMF 2825. First wireless device 2805 and/or second wireless device 2810 may perform other applications (e.g., games) over a PDU session, a network slice, QoS flow, service data flow, and/or a radio bearer, for example, based on an end-to-end latency (e.g., uplink channel latency and downlink channel latency) received from SMF 2825.

Figure 29:
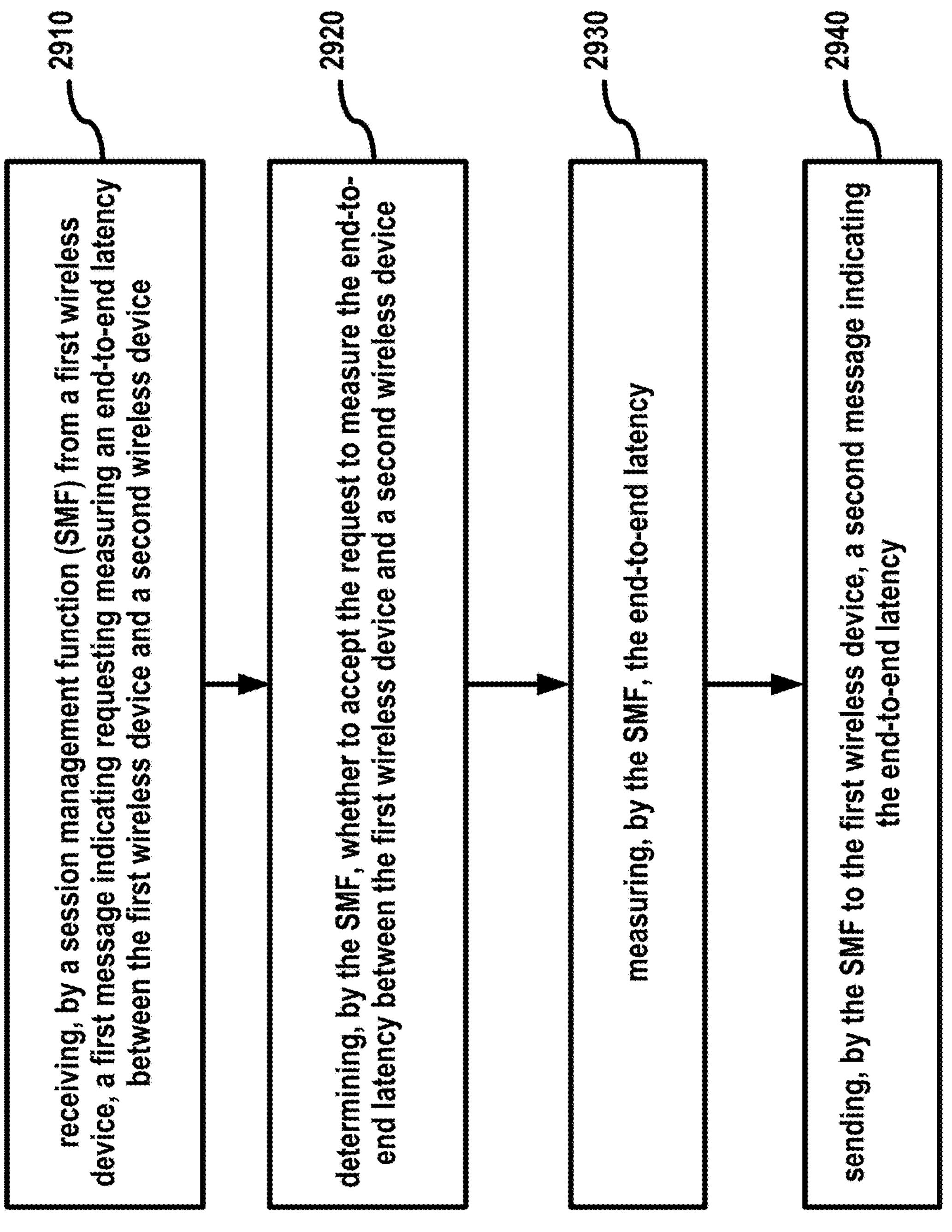
FIG. 29 shows an example of a session management function (SMF) determining end-to-end latency.

FIG. 29 shows an example of a SMF determining end-to-end latency.

In step 2910, a SMF may receive one or more first messages from a first wireless device. The one or more message may indicate a request to measure an end-to-end latency between the first wireless device and a second wireless device. The SMF may receive the one or more first messages as described, for example, in steps 2832 and/or 2834 above. In step 2920, the SMF may determine whether to accept the request to measure the end-to-end latency between the first wireless device and the second wireless device as described, for example, in steps 2836 above. In step 2930, the SMF may measure the end-to-end latency between the first wireless device and the second wireless device, for example, based on a determination to accept the request to measure the end-to-end latency between the first wireless device and the second wireless device. The SMF may measure the end-to-end latency between the first wireless device and the second wireless device as described, for example, in steps 2844 above. In step 2940, the SMF may send a second message to the first wireless device. The second message may indicate the end-to-end latency between the first wireless device and the second wireless device.

Figure 30:
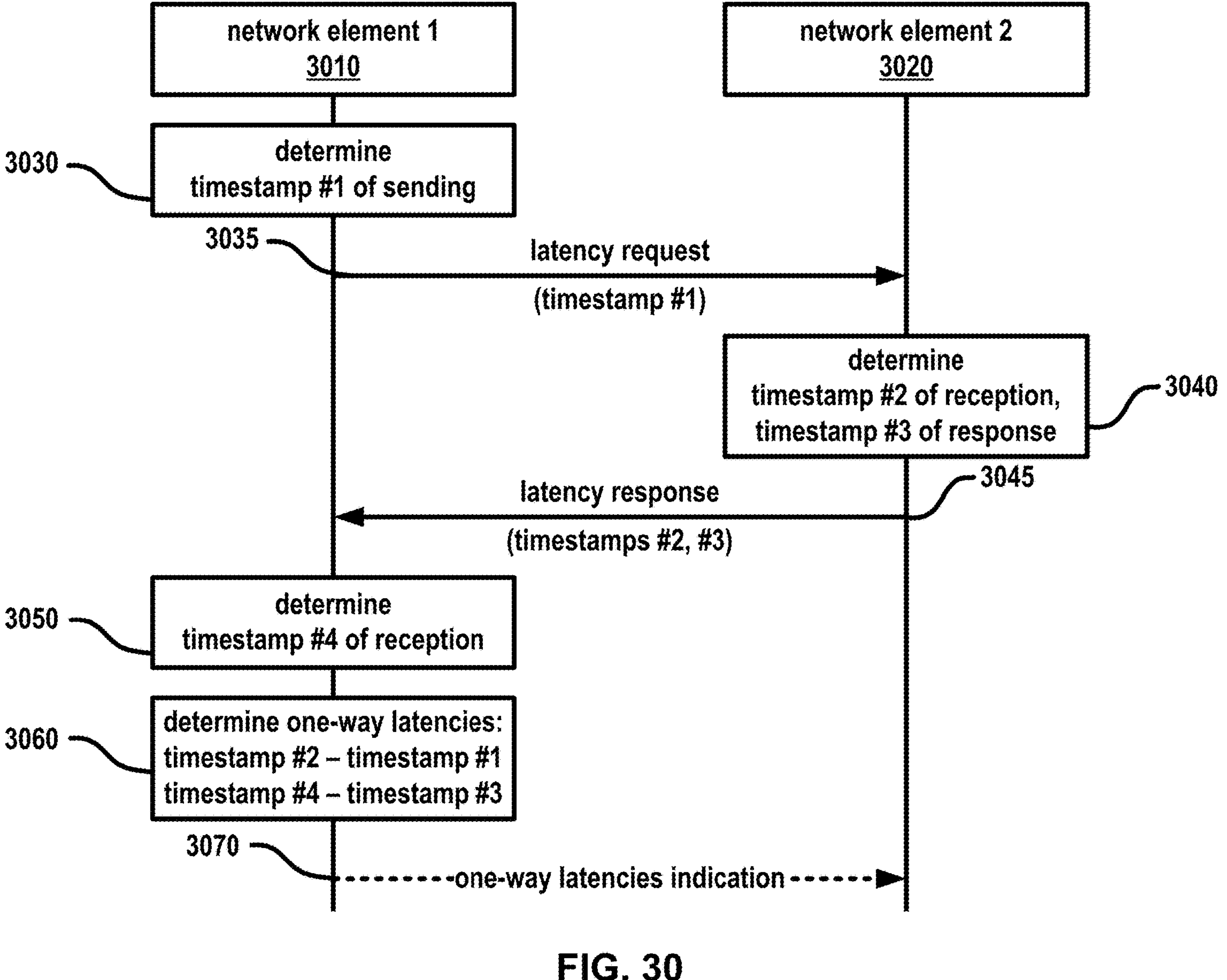
FIG. 30 shows an example of a process for determining one-way delay measurement.

FIG. 30 show an example of a process for determining one-way delay measurements. As shown in FIG. 30, the one-way delay measurements may be between first network element 3010 and second network element 3020. First network element 3010 may be a first wireless device, a first base station, a first AMF, a first SMF, a first UPF, a first NEF, a first router, and/or the like. Second network element 3020 may be a second wireless device, a second base station, a second AMF, a second SMF, a second UPF, a second NEF, a second router, and/or the like. Second network element 3020 may be a first wireless device and first network element 3010 may be a base station, a L-UPF, and/or a L-GW. Second network element 3020 may be a first wireless device, and first network element 3010 may be an AMF and/or a NEF. Second network element 3020 may be a first wireless device, and first network element 3010 may be a SMF, a UPF, and/or a NEF. The examples above may apply to a second wireless device and other network elements (e.g., a (R)AN, an AMF, a SMF, a UPF, a NEF).

At 3030, first network element 3010 may determine a first timestamp. The first timestamp may correspond to a time a first message is sent. At 3035, first network element 3010 may send a first message (e.g., a One-Way Delay Measurement Request) to second network element 3020. The first message may indicate a request to measure a one-way delay between first network element 3010 and second network element 3020. The first message may comprise a first parameter (e.g., a One-Way Delay Measurement) indicating a request to measure a one-way delay between first network element 3010 and second network element 3020. The first message may comprise the first timestamp. At 3035 (or shortly thereafter), second network element 3020 may receive the first message comprising the first timestamp. At 3040, second network element 3020 may determine a second timestamp. The second timestamp may correspond to a time the first message was received. Second network element 3020 may determine a third timestamp. The third timestamp may correspond to a time second network element 3020 sends a second message (e.g., a latency response) to first network element 3010. The second message may comprise the second timestamp and/or the third timestamp. At 3045, second network element 3020 may send the second message (e.g., the latency response) to first network element 3010. At 3050, first network element 3010 may determine a fourth timestamp corresponding to when the first network element receives the second message from second network element 3020. At 3060, first network element 3010 may determine (e.g., calculate, derive) a first one-way latency (e.g., a first one-way delay) by subtracting the first timestamp from the second timestamp (e.g., timestamp #2–timestamp #1). First network element 3010 may determine (e.g., calculate, derive) a second one-way latency (e.g., a second one-way delay) by subtracting the third timestamp from the fourth timestamp (e.g., timestamp #4–timestamp #3). One-way latencies (e.g., one-way delays) may be referred to as first and second, uplink and downlink, or any other appropriate labels, depending on the context in which the one-way latencies and/or one-way delays may be calculated. At 3070, first network element 3010 may send a third message to second network element 3020. The third message may indicate a first one-way delay, a second one-way delay, a difference between the first and second one-way delays, or any other indicator of symmetry. Additionally or alternatively, the third message may comprise the fourth timestamp. Second network element 3020 may determine (e.g., calculate, derive) respective one-way delays, for example, based on the first timestamp, the second timestamp, the third timestamp, and/or the fourth timestamp. The first message (e.g., a latency request) may comprise the first timestamp, while the third message comprises a fourth timestamp. The first timestamp, the second timestamp, the third timestamp, and/or the fourth timestamp may be UTC time, GPS time, and/or the like.

Figure 31:
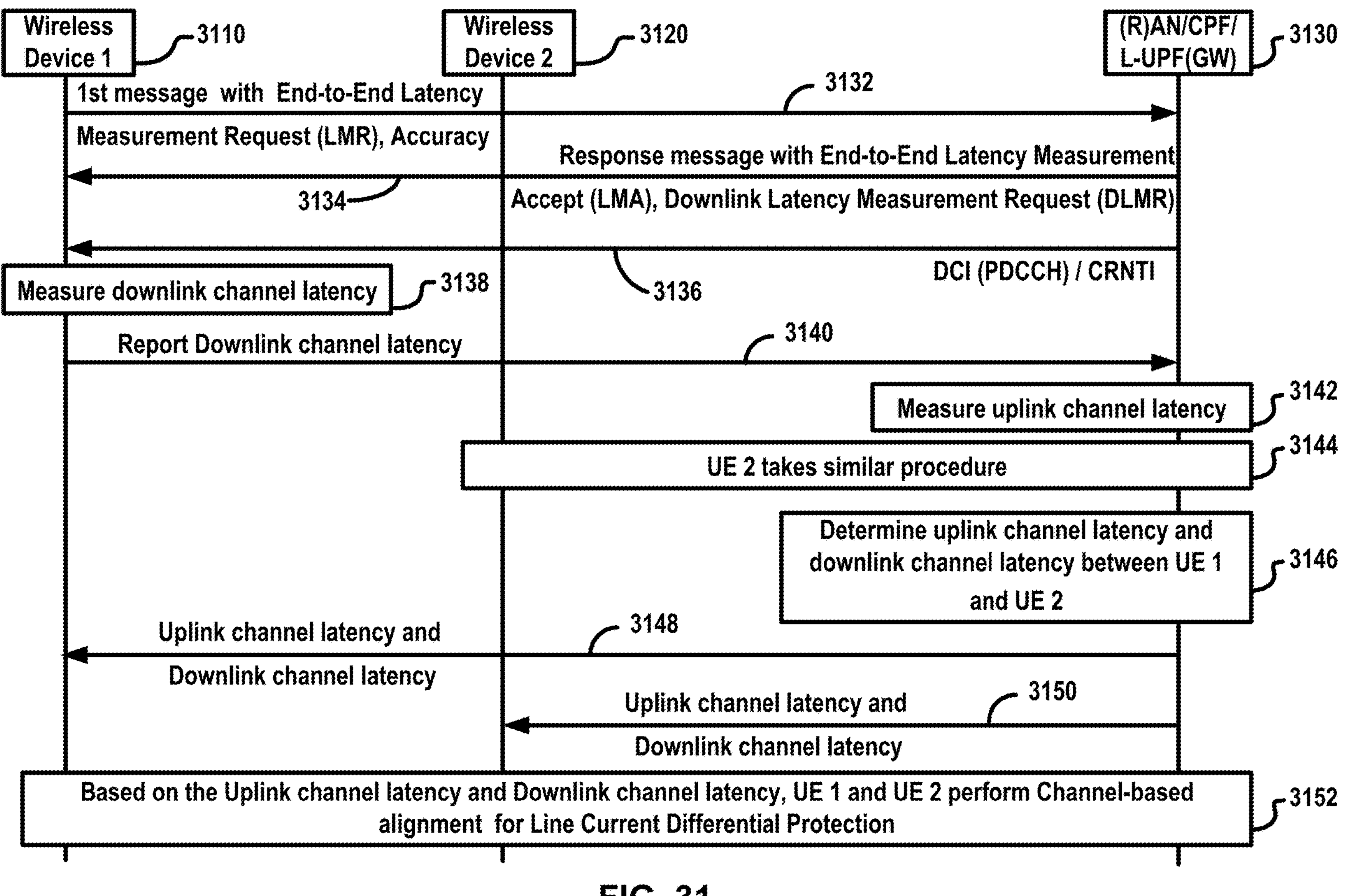
FIG. 31 shows an example of a process for performing channel-based alignment for line current differential protection.

FIG. 31 shows an example of a process for performing channel-based alignment for line current differential protection. The process in FIG. 31 includes first wireless device 3110, second wireless device 3120, and base station 3130. The process may allow for the synchronization of first wireless device 3110, second wireless device 3120, and base station 3130. Synchronization between first wireless device 3110 and base station 3130 (e.g., (R)AN) may comprise synchronization for transmission and/or synchronization for reception. Synchronization may comprise downlink synchronization and/or uplink synchronization. A downlink may be a path from base station 3130 to first wireless device 3110. An uplink may be a path from first wireless device 3110 to base station 3130. Downlink synchronization may be a process where first wireless device 3110 detects a radio boundary (e.g., a time when a radio frame starts) and/or an OFDM symbol boundary (e.g., a time when an OFDM symbol starts). First wireless device 3110 may implement downlink synchronization by detecting and/or analyzing a Synchronization Signal Block (SSB) received from base station 3130. Uplink synchronization may be a process where first wireless device 3110 determines an aligned time when first wireless device 3110 should send uplink data (e.g., PUSCH, PUCCH, etc.). Base station 3130 may handle multiple wireless devices and a network may align uplink signals from the multiple wireless devices with a common receiver timer of the network.

In step 3132, first wireless device 3110 may send (transmit) a first message to base station 3130. In step 3132, base station 3130 may receive the first message from first wireless device 3110. The first message may comprise an indication of a request to measure an end-to-end latency between first wireless device 3110 and second wireless device 3120. Base station 3130 may receive the first message from first wireless device 3110. The first message may comprise a first parameter (e.g., an End-to End Latency Measurement Request) indicating a request to measure an end-to-end latency between first wireless device 3110 and second wireless device 3120. The first parameter may be the same, or similar, to the first parameter discussed above. The first message may comprise a second parameter (e.g., a Latency Accuracy) indicating an accuracy of the end-to-end latency measurement. The accuracy of the end-to-end latency measurement may be indicated by at least one of: seconds, deciseconds, centiseconds, milliseconds, microseconds, and/or the like. The second parameter may be the same, or similar, to the second parameter discussed above. The first message may comprise at least one of: an identity (e.g., identifier) of first wireless device 3110 and/or an identity (e.g., identifier) of second wireless device 3120. The identity (e.g., identifier) of first wireless device 3110 and/or an identity (e.g., identifier) of second wireless device 3120 may be the same, or similar, to the identities (e.g., identifiers) discussed above.

A base station may determine whether to accept the request to measure the end-to-end latency between first wireless device 3110 and second wireless device 3120, for example, based on or in response to receiving the first message. A base station may determine whether to accept the request to measure the end-to-end latency between first wireless device 3110 and second wireless device 3120, for example, based on at least one of: one or more parameters of the first message, capabilities of base station 3130 to support the end-to-end latency measurement, resources of base station 3130, a local policy, and/or subscription information of first wireless device 3110.

Base station 3130 may determine a third parameter (e.g., an End-to End Latency Measurement Accept) that may indicate an acceptance of the request to measure the end-to-end latency. The determination to accept the request to measure the end-to-end latency may be based on at least one of: one or more parameters of the first message, capabilities of base station 3130 to support the end-to-end latency measurement, resources of base station 3130, a local policy, subscription information of first wireless device 3110, and/or a determination to accept the request to measure the end-to-end latency.

In step 3134, base station 3130 may send a second message to first wireless device 3110. The second message may comprise the third parameter (e.g., an End-to End Latency Measurement Accept). The second message may indicate a request to measure a downlink one-way delay and/or a downlink latency between base station 3130 and first wireless device 3110. The second message may comprise a fourth parameter (e.g., a Downlink Latency Measurement Request) that may indicate a request to measure a downlink one-way delay and/or a downlink one-way latency between base station 3130 and first wireless device 3110.

In step 3136, base station 3130 may send a third message to first wireless device 3110. The third message may comprise a physical layer message. The third message may indicate physical layer resources for an uplink channel and/or a downlink channel. The third message may comprise a DCI and/or C-RNTI. The DCI may indicate allocated time and/or frequency resources for PDSCH and/or PUSCH. Time and/or frequency resource for PDSCH may indicate when base station 3130 may send a data packet to first wireless device 3110. Time and/or frequency resources for PUSCH may indicate when first wireless device 3130 may send a data packet to base station 3130. Base station 3130 may send a data packet to first wireless device 3110, for example, over an allocated PDSCH. Base station 3130 may send a data packet to first wireless device 3110 at a first time (e.g., t1). First wireless device 3110 may receive the data packet from base station 3130 over the allocated PDSCH at a second time (e.g., t2). First wireless device 3110 may determine (calculate, derive) the first time (e.g., t1) base station 3130 sent the data packet. The determination of the first time may be based on at least one of: a synchronization between first wireless device 3110 and base station 3130, the fourth parameter (e.g., a Downlink Latency Measurement Request), the DCI and/or the C-RNTI.

In step 3138, first wireless device 3110 may determine (calculate, derive) a downlink one-way delay and/or a downlink latency. First wireless device 3110 may determine (calculate, derive) the downlink one-way delay and/or the downlink latency, for example, by subtracting the first time from the second time (e.g., t2−t1). In step 3140, first wireless device 3110 may report the downlink one-way delay and/or the downlink latency to base station 3130. First wireless device 3110 may send a fourth message to base station 3130 that may report the downlink one-way delay and/or the downlink latency. The fourth message may comprise a downlink one-way delay, a downlink one-way latency, and/or the second time (e.g., t2).

In step 3142, base station 3130 may measure an uplink one-way delay and/or an uplink latency. First wireless device 3110 may send a data packet to base station 3130, for example, over an allocated PUSCH. The allocated PUSCH may be indicated by a DCI and/or a C-RNTI. Base station 3130 may receive the data packet over the allocated PUSCH at a fourth time (e.g., t4). Base station 3130 may determine (calculate, derive) a third time (e.g., t3). The third time may be a time first wireless device 3110 sent the data packet. Base station 3130 may determine (calculate, derive) the third time, for example, based on at least one of: a synchronization between first wireless device 3110 and base station 3130, a DCI and/or a C-RNTI. Base station 3130 may determine (calculate, derive) the uplink one-way delay and/or a one-way latency, for example, by subtracting the third time from the fourth time (e.g., t4−t3).

In step 3144, second wireless device 3120 may perform steps similar to steps 3132, 3134, 3136, 3138, 3140, and/or 3142 to determine the latency between second wireless device 3120 and base station 3130. In step 3146, base station 3130 may determine (calculate, derive) an end-to-end latency between first wireless device 3110 and second wireless device 3120. For example, base station 3130 may determine (calculate, derive) a first end-to-end latency by combining (adding) the uplink latency between first wireless device 3110 and base station 3130 and the downlink latency between second wireless device 3120 and base station 3130. Similarly, base station 3130 may determine (calculate, derive) a second end-to-end latency by combining (adding) the uplink latency between second wireless device 3120 and base station 3130 and the downlink latency between first wireless device 3110 and base station 3130.

In step 3148, base station 3130 may send (transmit) uplink channel latency (e.g., from first wireless device 3110 to base station 3130) to first wireless device 3110. In step 3148, base station may send (transmit) downlink channel latency (e.g., from base station 3130 to first wireless device 3110) to first wireless device 3110. In step 3148, base station 3130 may send the first end-to-end latency and/or the second end-to-end latency to first wireless device 3110.

In step 3150, base station 3130 may send (transmit) uplink channel latency (e.g., from second wireless device 3120 to base station 3130) to second wireless device 3120. In step 3150, base station may send (transmit) downlink channel latency (e.g., from base station 3130 to second wireless device 3120) to second wireless device 3120. In step 3150, base station 3130 may send the first end-to-end latency and/or the second end-to-end latency to second wireless device 3110.

In step 3152, first wireless device 3110, second wireless device 3120, and/or base station 3130 may perform channel-based alignment, for example, based on one or more of the latency measurements (e.g., the uplink channel latencies, the downlink channel latencies, the first end-to-end latency, the second end-to-end latency, etc.). The channel-based alignment performed by first wireless device 3110, second wireless device 3120, and/or base station 3130 may be for line current differential protection. The channel-based alignment may be performed over a PDU session, a network slice, QoS flow, service data flow, and/or a radio bearer. The channel-based alignment performed by first wireless device 3110, second wireless device 3120, and/or base station 3130 may be based on the end-to-end latency (e.g., uplink channel latency and downlink channel latency) received from base station 3130.

Figure 32:
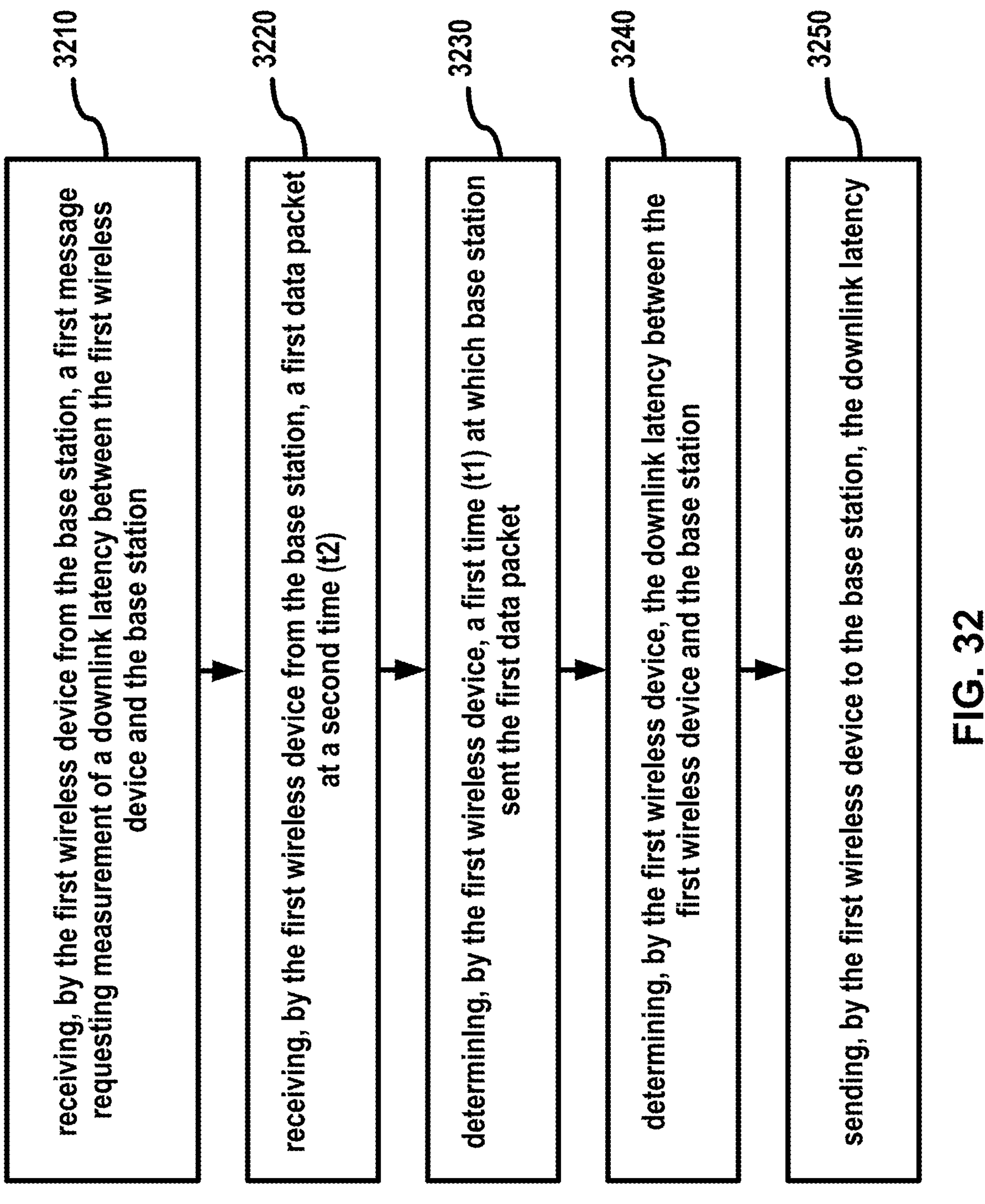
FIG. 32 shows an example of a process for a wireless device to measure downlink latency.

FIG. 32 shows an example of a process for a wireless device to measure downlink latency. In step 3210, a first wireless device may receive a first message from abase station. The first measure may comprise a request to measure a downlink latency from the base station to the first wireless device. The first message may comprise a physical layer message. The first message may indicate one or more physical layer resources for the downlink channel. The first message may comprise a DCI and/or C-RNTI. The DCI may indicate allocated time and/or frequency resources for PDSCH and/or PUSCH. Time and/or frequency resource for PDSCH may indicate when the base station may send a data packet to first wireless device. Base station may send a data packet to first wireless device, for example, over an allocated PDSCH. Base station may send the data packet to the first wireless device at a first time (e.g., t1).

In step 3220, first wireless device may receive the data packet from base station. The data packet may be received over the allocated PDSCH. The data packet may be received at a second time (e.g., t2). In step 3230, first wireless device may determine (calculate, derive) the first time (e.g., t1) the base station sent the data packet. The determination of the first time may be based on at least one of: a synchronization between the first wireless device and the base station, the fourth parameter (e.g., a Downlink Latency Measurement Request), the DCI and/or the C-RNTI.

In step 3240, first wireless device may determine (calculate, derive) a downlink one-way delay and/or a downlink latency. First wireless device may determine (calculate, derive) the downlink one-way delay and/or the downlink latency, for example, by subtracting the first time from the second time (e.g., t2−t1). In step 3250, the first wireless device may report the downlink one-way delay and/or the downlink latency to the base station. First wireless device may send a message the base station comprising the downlink one-way delay and/or the downlink latency.

At least some systems and/or devices may have difficulties in supporting a channel-based alignment method and/or a time-based alignment method between two relays/wireless devices, for example, when applying line current differential protection. For example, a first relay (e.g., UE 1) may not know whether a second relay (e.g., UE 2) supports a channel-based alignment method and/or a time-based alignment method. The first relay (e.g., UE 1) may apply a method that the second relay (e.g., UE 2) may not support. Line current differential protection may not be supported by relays and/or wireless devices, for example, based on the first relay and the second relay applying different alignment techniques. As described herein, a first relay may determine an alignment method used by a second relay, for example, to improve synchronization between the first relay and the second relay and/or to apply line current differential protection.

FIG. 33 shows an example of a process for determining capabilities of a relay for line current differential protection. As shown in FIG. 33, the process may comprise a first wireless device 3305, a first base station 3310, core network elements 3315, a second base station 3320, and/or a second wireless device 3325. A first protection relay may be co-located with first wireless device 3305. A second protection relay may be co-located with second wireless device 3325.

In step 3330, first wireless device 3310 may establish a PDU session with second wireless device 3325. In step 3332, first wireless device 3310 may send a first message to second wireless device 3325. The first message may indicate first wireless device 3305's alignment capabilities (e.g., time-based alignment, channel-based alignment, etc.). The first message may comprise a first parameter (e.g., a time-based alignment request). The first parameter may comprise a request to perform time-based alignment with second wireless device 3325. Time-based alignment between first wireless device 3305 and second wireless device 3325 may be for line current differential protection. The time-based alignment method may comprise first wireless device 3305 (e.g., a first protection relay) sending a first current value with a timestamp to second wireless device 3325 (e.g., a second protection relay). The timestamp may indicate a sampling time of the first current value. Second wireless device 3325 (e.g., second protection relay) may determine (calculate, derive, identify) a second current value sampled, by second wireless device 3325, at, or about, the same time as the timestamp, for example, based on the timestamp and/or the first current value.

The first message may comprise a second parameter (e.g., a channel-based alignment request). The second parameter may indicate a request to perform channel-based alignment. Channel-based alignment between first wireless device 3305 and second wireless device 3325 may be for line current differential protection. The channel-based alignment method may comprise first wireless device 3305 (e.g., first protection relay) sending a first current value to second wireless device 3325 (e.g., second protection relay). Second wireless device 3325 (e.g., second protection relay) may determine (calculate, derive, identify) a second current value sampled, by second wireless device 3325 (e.g., second protection relay), associated with the first current value, for example, based on the first current value and/or a latency of a communication channel between first wireless device 3305 (e.g., first protection relay) and second wireless device 3325 (e.g., second protection relay). Second wireless device 3325 (e.g., second protection relay) may determine (calculate, derive, identify) a second current value sampled, by second wireless device 3325 (e.g., second protection relay), associated with the first current value, for example, based on or using a latency of the communication channel between first wireless device 3305 (e.g., first protection relay) and second wireless device 3325 (e.g., second protection relay).

The first message may comprise a third parameter (e.g., a channel-based Alignment capability). The third parameter may indicate a channel-based alignment capability of first wireless device 3305 (e.g., first protection relay). The third parameter (e.g., a channel-based alignment capability) may indicate whether first wireless device 3305 (e.g., first protection relay) supports channel-based alignment. A first message may comprise a fourth parameter (e.g., a time-based alignment capability). The fourth parameter may indicate a time-based alignment capability of first wireless device 3305 (e.g., first protection relay). The fourth parameter (e.g., a time-based alignment capability) may indicate whether first wireless device 3305 (e.g., first protection relay) supports a time-based alignment method.

In step 3334, second wireless device 3325 (e.g., second protection relay) may send a second message (e.g., a response) to first wireless device 3305 (e.g., a first protection relay), for example, based on or in response to the first message. The second message may indicate second wireless device 3325's alignment capabilities (e.g., time-based alignment, channel-based alignment, etc.). The second message may comprise a fifth parameter (e.g., an alignment method indication). The fifth parameter may indicate an acceptance to use an alignment method for line current differential protection. The fifth parameter (e.g., the alignment method indication) may indicate a time-based alignment method is to be used between first wireless device 3305 (e.g., first protection relay) and second wireless device 3325 (e.g., second protection relay), for example, for line current differential protection. the fifth parameter (e.g., the alignment method indication) may indicate a channel-based alignment method is to be used between first wireless device 3305 (e.g., first protection relay) and second wireless device 3325 (e.g., second protection relay), for example, for line current differential protection.

The second message may comprise a sixth parameter (e.g., channel-based alignment capability). The sixth parameter may indicate a channel-based alignment capability of second wireless device 3325 (e.g., second protection relay). The sixth parameter (e.g., the channel-based alignment capability) may indicate whether second wireless device 3325 (e.g., second protection relay) supports channel-based alignment method(s). The second message may comprise a seventh parameter (e.g., a time-based alignment capability). The seventh parameter may indicate a time-based alignment capability of second wireless device 3325 (e.g., second protection relay). The seventh parameter (e.g., the time-based alignment capability) may indicate whether second wireless device 3325 (e.g., second protection relay) supports time-based alignment method(s).

In step 3336, first wireless device 3305 (e.g., first protection relay) may initiate a time-based alignment method with second wireless device 3325 (e.g., second protection relay). The time-based alignment method may be for line current differential protection. The time-based alignment method may be initiated, for example, based on one or more parameters of the second message (e.g., the fifth parameter and/or the seventh parameter). The time-based alignment method may be initiated, for example, based on the capabilities of first wireless device 3305 (e.g., first protection relay). The time-based alignment method may be initiated, for example, based on or in response to receiving the second message.

In step 3338, first wireless device 3305 (e.g., first protection relay) may determine (detect) that first wireless device 3305 is losing time. In step 3338, first wireless device 3305 (e.g., first protection relay) may determine (detect) that the accuracy of the time has changed (drifted). The time may be UTC time. First wireless device 3305 (e.g., first protection relay) may not receive a UTC time. First wireless device 3305 (e.g., first protection relay) may determine (detect) that a GPS signal has been lost.

In step 3340, first base station 3315 may determine (detect) that first base station 3315 is losing time. In step 3340, first base station 3315 may determine (detect) that the accuracy of the time has changed (drifted). The time may be UTC time. First base station 3315 may not receive a UTC time. First base station 3315 may lose a GPS signal.

In step 3342, first base station 3315 may send a message to first wireless device 3305. The message may indicate that first base station 3315 has lost time (e.g., lost UTC time). First base station 3315 may send an RRC/SIB message to first wireless device 3305 (e.g., first protection relay). The RRC/SIB message may comprise a parameter (e.g., a loss of UTC time and/or a GPS Signal) indicating the loss of UTC time. The parameter may indicate a loss of GPS signal.

In step 3344, first wireless device 3305 (e.g., first protection relay) may send a third message to second wireless device 3325 (e.g., second protection relay), for example, based on or in response to detecting a loss of UTC time. First wireless device 3305 (e.g., first protection relay) may send a third message to second wireless device 3325 (e.g., second protection relay), for example, based on receiving the RRC/SIB message from first base station 3315 indicating a loss of UTC time. The third message may indicate a request to perform channel-based alignment. The third message may comprise a parameter (e.g., a loss of UTC time and/or a GPS Signal).

In step 3346, second wireless device 3325 (e.g., second protection relay) may send a fourth message (e.g., response) to first wireless device 3305 (e.g., first protection relay). The fourth message may indicate an acceptance of the request to perform channel-based alignment. First wireless device 3305 (e.g., first protection relay) and second wireless device 3325 (e.g., second protection relay) may apply channel-based alignment method(s), for example, for line current differential protection.

A base station, one or more wireless devices, and/or a core network device may perform a method comprising multiple operations. A base station may measure an end-to-end latency between a first wireless device and a second wireless device, based on a parameter, for example, if the base station receive from the first wireless device, a first message comprising the parameter indicating the request to measure the end-to-end latency between the first wireless device and the second wireless device. A base station may send a second message indicating an end-to-end latency to a first wireless device. A base station may send an end-to-end latency to a second wireless device. An end-to-end latency may indicate a time (duration) to (successfully) deliver a data packet and/or a message from a first network element to a second network element. An end-to-end latency may indicate a time (duration) to (successfully) deliver a data packet and/or a message from a first wireless device to a second wireless device. An end-to-end latency may indicate a time (duration) to (successfully) deliver a data packet and/or a message from a first wireless device to a base station. A first message may comprise a radio resource control (RRC) request message, wherein the RRC request message may comprise at least one of the following messages: an MSG 3; an MSG 5; a RRCSetupRequest; a RRCSetupComplete; a RRCResumeRequest; a RRCResumeComplete; a UEAssistanceInformation; a UEInformationResponse; and/or a UECapabilityInformation. A first message may comprise at least one of: an identity of a first wireless device and/or an identity of a second wireless device. An identity of a first wireless device and/or an identity of a second wireless device may comprise at least one of: a Generic Public Subscription Identifier (GPSI), wherein the GPSI may comprise a Mobile Station Integrated Services Digital Network (MSISDN) and/or an external identifier; a Subscription Permanent Identifier (SUPI), wherein the SUPI may comprise an International Mobile Subscriber Identity (IMSI) and/or Network Access Identifier (NAI); a Subscription Concealed Identifier (SUCI); a 5G Globally unique Temporary Identity (5G-GUTI); a permanent equipment identifier (PEI), wherein the PEI may comprise an International Mobile Equipment Identity (IMEI); an IP address, wherein the IP address may comprise an IPv4 address and/or an IPv6 prefix; and/or an application level identifier to identify the first wireless device and/or the second wireless device. A first message may comprise a second parameter indicating an accuracy of an end-to-end latency. The accuracy of the end-to-end latency may comprise at least one of: a second, a decisecond, a centisecond, a millisecond, and/or a microsecond. A base station may determine whether to accept an RRC request and/or a request to measure an end-to-end latency between a first wireless device and a second wireless device based on at least one of: a first message; a capability of a base station to support an end-to-end latency measurement; resources of the base station; a local policy; and/or subscription information of a first wireless device. A capability of a base station to support the end-to-end latency measurement may indicate whether the base station has the capability to measure the end-to-end latency within a requested accuracy of a first wireless device. A base station may determine a second parameter (e.g., an End-to End Latency Measurement Accept and/or a LMA) indicating accepting the request of measuring the end-to-end latency. A base station may determine radio bearer and/or QoS resources for an end-to-end latency measurement, based on at least one of: determining whether to accept a request to measure the end-to-end latency; a capability of the base station to support the end-to-end latency measurement; a first message; a resource of the base station; a local policy; and/or subscription information of a first wireless device. A base station may determine RRC configuration information for an end-to-end latency measurement based on at least one of: determining whether to accept a request to measure the end-to-end latency; a capability of the base station supporting the end-to-end latency measurement; a first message; a resource of the base station; a local policy; and/or subscription information of a first wireless device. A base station may determine that an end-to-end latency may be associated with a radio bearer for a first wireless device. The radio bearer comprises a data radio bearer and/or a signaling radio bearer. A base station may determine that an end-to-end latency may be associated with a network slice for a first wireless device. The network slice is associated with a PDU session. A base station may determine that an end-to-end latency may be associated with a QoS flow for a first wireless device. The QoS flow is associated with a PDU session. A base station may determine an end-to-end latency may be associated with a service data flow for a first wireless device. The service data flow is associated with a PDU session. A base station may determine that an end-to-end latency may be associated with a PDU session for a first wireless device. The PDU session is associated with at least one radio bearer. The at least one radio bearer comprises at least one data radio bearer and/or at least one signaling radio bearer. A base station may determine radio bearer configuration information of a radio bearer for an end-to-end latency measurement, based on a parameter. Radio bearer configuration information may comprise parameters for a data radio bearer. Radio bearer configuration information may comprise parameters for a signal radio bearer. Radio bearer configuration information may comprise QoS parameters for a signal radio bearer and/or a data radio bearer. QoS parameters may comprise at least one of: a Resource type, a priority level, a Packet Delay Budget (PDB), a Packet Error Rate (PER), an Averaging window, and/or a Maximum Data Burst Volume. A base station may send a first wireless device a response message to a first message that the first wireless device sent. A response message may indicate that a base station accepts a request to measure an end-to-end latency between a first wireless device and a second wireless device. A response message may comprise a second parameter indicating that a base station accepts a request to measure an end-to-end latency between a first wireless device and a second wireless device. A response message may indicate a PDU session, a network slice, a QoS flow, a service data flow, and/or a radio bearer applied and/or used for an end-to-end latency measurement. A response message may comprise an RRC response message, wherein a RRC response message comprises at least one of: an RRCReconfiguration; an MSG 4; a RRCSetup; a RRCResume; UEReconfiguration; UEInformationRequest; and/or UECapabilityEnquiry. A response message may comprise at least one of: a registration response message; and/or a PDU session response message. A first message may comprise at least one of: a registration request message; and/or a protocol data unit (PDU) session request message. A base station may measure a first end-to-end latency between a first wireless device and the base station, and a second end-to-end latency between a second wireless device and the base station example, based on a parameter. A base station may calculate an end-to-end latency by adding a first end-to-end latency to a second end-to-end latency. A base station may modify radio bearer and/or QoS resources (e.g., parameters) to enable a symmetric uplink communication channel and downlink communication channel between a first wireless device and a second wireless device, based on an end-to-end latency measurement. A base station may send a first wireless device and/or a second wireless device, a RRCCongfiguration message comprising one or more parameters to modify and/or adjust radio bearer and/or QoS resources. A base station may modify time, frequency, space, and/or power resources to enable a symmetric uplink communication channel and downlink communication channel between a first wireless device and a second wireless device, based on an end-to-end latency measurement. A base station may send to a first wireless device and/or a second wireless device, a RRCCongfiguration message comprising one or more parameters to modify and/or adjust time, frequency, space, and/or power resources. A second message may comprise an RRC response message. The RRC response message may comprise at least one of: an RRCReconfiguration; an MSG 4; a RRCSetup; a RRCResume; a UEReconfiguration; a UEInformationRequest; and/or a UECapabilityEnquiry. A second message may comprise at least one of: a registration response message; and/or a PDU session response message. A wireless device may establish a RRC connection with a base station for an end-to-end latency measurement. A wireless device may establish a protocol data unit (PDU) session with a core network for an end-to-end latency measurement, wherein a core network may comprise: an AMF; an SMF; and/or a UPF. A first message may comprise a third parameter (e.g., a Channel Symmetry Request) indicating a request for symmetric communication channels. A third parameter (e.g., a Channel Symmetry Request) may indicate that an end-to-end latency between a first network element and a second network element may be less than or equal to a value (e.g., 5 ms, 10 ms). A first message may comprise a fourth parameter (e.g., an Asymmetric End-to-end Latency) indicating a request that a maximum end-to-end latency asymmetry and/or difference between at least one uplink communication channel and at least one downlink communication channel may be less than or equal to a value. A first wireless device may measure an end-to-end delay between the first wireless device and a base station over a PDU session, a network slice, a QoS flow, a service data flow, and/or a radio bearer based on an indication from a base station that the RRC connection, the PDU session, the network slice, the QoS flow, the service data flow, and/or the radio bearer applied and/or used for the end-to-end latency measurement. A first wireless device and a second wireless device may perform a channel-based alignment for Line Current Differential Protection over a PDU session, a network slice, a QoS flow, service data flow, and/or a radio bearer, based on an end-to-end latency (e.g., uplink channel latency and downlink channel latency) received from the base station. A first wireless device and a second wireless device may perform other applications (e.g., games) over a PDU session, a network slice, a QoS flow, service data flow, a radio bearer based on an end-to-end latency (e.g., uplink channel latency and downlink channel latency) received from a base station. A base station may send to a first wireless device, a first message requesting the first wireless device to measure a latency between the base station and the first wireless device. The first message may comprise a first timestamp that may indicate when the base station may send the first message. A base station may receive a second message from a first wireless device. The second message may comprise at least one of: a second timestamp that may indicate when the first wireless device may receive the first message; and/or a third timestamp that may indicate when the first wireless device may send the second message. A base station may determine at least one of: an uplink one way delay between the base station and a first wireless device; and/or a downlink one way delay between the base station and the first wireless device, based on a second message. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive from a first wireless device, a first message that may request measuring an end-to-end latency between the first wireless device and a second wireless device. A first wireless device may send to a base station, a first message that may request measuring an end-to-end latency between the first wireless device and a second wireless device. A base station may send to a first wireless device, a second message that may indicate an end-to-end latency. A first wireless device may receive from a base station, a second message that may indicate an end-to-end latency. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A first wireless device may send to a base station, a first message comprising a parameter that may indicate a request to measure an end-to-end latency between the first wireless device and a second wireless device. A first wireless device may receive an end-to-end latency from a base station. The first wireless device may comprise one or more processors; and memory storing instructions that, when executed by the one or more processors, cause the first wireless device to perform the described method, additional operations, and/or include the additional elements. A system may comprise the first wireless device configured to perform the described method, additional operations and/or include the additional elements; a base station configured to communicate with the first wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. An AMF may receive a first message from a first wireless device. The first message may comprise a parameter indicating a request to measure an end-to-end latency between the first wireless device and a second wireless device. An AMF may measure an end-to-end latency based on a parameter. An AMF may send to a first wireless device, a second message indicating an end-to-end latency. An end-to-end latency may be via a control plane and/or via a NAS message. The AMF may comprise one or more processors; and memory storing instructions that, when executed by the one or more processors, cause the AMF to perform the described method, additional operations, and/or include the additional elements. A system may comprise the AMF configured to perform the described method, additional operations and/or include the additional elements; a base station configured to communicate with the AMF; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. An AMF may receive a first message from a first wireless device. The first message may comprise at least one of: a first parameter that may indicate a request to measure an end-to-end latency between the first wireless device and a second wireless device; a second parameter that may indicate an accuracy of an end-to-end latency; a third parameter that may request a symmetry channel for uplink and downlink; a fourth parameter that may indicate a request a maximum end-to-end latency asymmetry and/or a maximum difference between at least one uplink communication channel and at least one downlink communication channel may be less than or equal to a value; a fifth parameter that may indicate a request to send application user data via a control plane; a sixth parameter that may indicate a capability of a first wireless device to support sending application user data via a control plane; an identity of a first wireless device; and/or an identity of a second wireless device. An AMF may determine to accept at least one request based on at least one of: a capability of the AMF to support an end-to-end latency measurement; a capability of the AMF to support sending application user data via a control plane; a first message; a resource of the AMF; a local policy; and/or subscription information of a first wireless device. An AMF may measure an end-to-end latency based on a parameter. An AMF may send to a first wireless device, a second message indicating the end-to-end latency. An AMF may send to a base station, a third message comprising one or more parameters of a first message. An AMF may receive a response message from a base station. The response message may indicate that the base station may accept a request to send application user data via a control plane. A response message may indicate that a base station accepts a request to send application user data via a control plane. A response message may indicate that a base station accepts a request for symmetric communication channels. A base station may send a response message to a first wireless device. The response message may comprise at least one of: an eighth parameter indicating that a network may have a capability to support measuring an end-to-end latency; a ninth parameter indicating that an AMF may accept a request to send application user data via a control plane; and/or a tenth parameter that may indicate that an AMF may accept a request for symmetric communication channels. The AMF may comprise one or more processors; and memory storing instructions that, when executed by the one or more processors, cause the AMF to perform the described method, additional operations, and/or include the additional elements. A system may comprise the AMF configured to perform the described method, additional operations and/or include the additional elements; a base station configured to communicate with the AMF; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A network function may receive a first message from a first wireless device. The first message may indicate a request to measure an end-to-end latency between the first wireless device and a second wireless device. A network function may send a second message to a first wireless device. The second message may indicate an end-to-end latency. A network function may comprise at least one of: an AMF and/or a NEF. The network function may comprise one or more processors; and memory storing instructions that, when executed by the one or more processors, cause the network function to perform the described method, additional operations, and/or include the additional elements. A system may comprise the network function configured to perform the described method, additional operations and/or include the additional elements; one or more wireless devices configured to communicate with the network function; and/or a base station configured to communicate with the network function. A computer-readable medium may store instructions that, when executed, cause performance of the described method, additional operations, and/or include the additional elements.

A base station, one or more wireless devices, and/or a core network device may perform a method comprising multiple operations. A first wireless device may send a first message to a network function. The first message may indicate a request to measure an end-to-end latency between the first wireless device and a second wireless device. A first wireless device may receive an end-to-end latency from a network function. The first wireless device may comprise one or more processors; and memory storing instructions that, when executed by the one or more processors, cause the first wireless device to perform the described method, additional operations, and/or include the additional elements. A system may comprise the first wireless device configured to perform the described method, additional operations and/or include the additional elements; a base station configured to communicate with the first wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A wireless device may send to a network function, a first message comprising a parameter indicating a request to send application user data via a control plane. A wireless device may receive from a network function, a second message indicating if a network function may accept a request. The wireless device may comprise one or more processors; and memory storing instructions that, when executed by the one or more processors, cause the wireless device to perform the described method, additional operations, and/or include the additional elements. A system may comprise the wireless device configured to perform the described method, additional operations and/or include the additional elements; a base station configured to communicate with the wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A SMF may receive a first message from a first wireless device, wherein the first message may indicate a request to measure an end-to-end latency between the first wireless device and a second wireless device. A SMF may send a second message to a first wireless device. The second message may indicate an end-to-end latency. The SMF may comprise one or more processors; and memory storing instructions that, when executed by the one or more processors, cause the SMF to perform the described method, additional operations, and/or include the additional elements. A system may comprise the SMF configured to perform the described method, additional operations and/or include the additional elements; a base station configured to communicate with the SMF; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A SMF may receive a first message from a first wireless device. The first message may comprise at least one of: a first parameter that may indicate a request to measure an end-to-end latency between the first wireless device and a second wireless device; a second parameter that may indicate an accuracy of an end-to-end latency; a third parameter that may request a symmetry channel for uplink and downlink; a fourth parameter that may indicate a request for a maximum end-to-end latency asymmetry and/or difference between at least one uplink communication channel and at least one downlink communication channel may be less than or equal to a value; a fifth parameter that may indicate a request to send application user data via a control plane; a sixth parameter that may indicate a capability of a first wireless device to support sending application user data via a control plane; an identity of the first wireless device; and/or an identity of a second wireless device. An SMF may determine to accept at least one request based on at least one of: a capability of the SMF to support an end-to-end latency measurement; a capability of the SMF to support sending application user data via a control plane; a first message; resources of the SMF; a local policy; and/or subscription information of a first wireless device. A SMF may send a second message to a network function. The second message may indicate measuring an end-to-end latency. A second message may comprise at least one of: a first parameter; a second parameter; a third parameter; a fourth parameter; a fifth parameter; a sixth parameter; an identity of a first wireless device; and/or an identity of a second wireless device. An SMF may receive an end-to-end latency from a network function. An SMF may send to a first wireless device, a third message indicating an end-to-end latency. A network function may comprise at least one of: a UPS and/or a NEF. The SMF may comprise one or more processors; and memory storing instructions that, when executed by the one or more processors, cause the SMF to perform the described method, additional operations, and/or include the additional elements. A system may comprise the SMF configured to perform the described method, additional operations and/or include the additional elements; a base station configured to communicate with the SMF; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may send, to a first wireless device, a first message requesting measuring latency between the base station and the wireless device. The first message may comprise a timestamp 1 when the base station may send the first message. The base station may receive, from the first wireless device, a second message comprising at least one of: a timestamp 2 may indicate when the first wireless device receives the first message; and/or a timestamp 3 may indicate when the first wireless device sends the second message. The base station may determine at least one of: an uplink one way delay between the base station and the first wireless device, based on the timestamp 3 and the timestamp 4; and/or a downlink one way delay between the base station and the first wireless device, based on the timestamp 1 and the timestamp 2. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A first wireless device may send a first message to a base station. The first message may comprise a parameter that may indicate a request to measure an end-to-end latency between the first wireless device and a second wireless device. A first wireless device may receive a second message from a base station. The second message may request measuring a downlink end-to-end latency between the first wireless device and the base station. A first wireless device may measure a downlink end-to-end latency based on a second message. A first wireless device may send to a base station, a third message indicating a downlink end-to-end latency. The first wireless device may comprise one or more processors; and memory storing instructions that, when executed by the one or more processors, cause the first wireless device to perform the described method, additional operations, and/or include the additional elements. A system may comprise the first wireless device configured to perform the described method, additional operations and/or include the additional elements; a base station configured to communicate with the first wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A first wireless device may receive a first message from a base station. The first message may request measuring a downlink end-to-end latency between the first wireless device and the base station. A first wireless device may send a downlink end-to-end latency to a base station. The first wireless device may comprise one or more processors; and memory storing instructions that, when executed by the one or more processors, cause the first wireless device to perform the described method, additional operations, and/or include the additional elements. A system may comprise the first wireless device configured to perform the described method, additional operations and/or include the additional elements; a base station configured to communicate with the first wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A first wireless device may send to a second wireless device, a first message comprising at least one of: a first parameter indicating Channel-based Alignment Capability of the first wireless device; a second parameter indicating Time-based Alignment Capability of the first wireless device; and/or a third parameter indicating requesting Channel-based Alignment. A first wireless device may receive from a second wireless device, a second message comprising at least one of: a fourth parameter indicating Channel-based Alignment Capability of the second wireless device; a fifth parameter indicating Time-based Alignment Capability of the second wireless device; and/or a sixth parameter indicating whether accepting the requesting of Channel-based Alignment. The first wireless device may comprise one or more processors; and memory storing instructions that, when executed by the one or more processors, cause the first wireless device to perform the described method, additional operations, and/or include the additional elements. A system may comprise the first wireless device configured to perform the described method, additional operations and/or include the additional elements; a base station configured to communicate with the first wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A base station may receive a request to measure an end-to-end latency between a first wireless device and a second wireless device. The base station may measure the end-to-end latency between the first wireless device and the second wireless device. The base station may send, to the first wireless device, a response indicating the end-to-end latency between the first wireless device and the second wireless device. The base station may send, to the second wireless device, an indication of the end-to-end latency between the first wireless device and the second wireless device. The end-to-end latency may comprise at least one of: a duration to deliver a communication from a first network element to a second network element; a duration to deliver a communication from the first wireless device to the second wireless device; or a duration to deliver a communication from the first wireless device to the base station. The request to measure the end-to-end-latency may comprise at least one of: one or more radio resource control (RRC) messages; a registration request message; or a protocol data unit (PDU) session request message. The request to measure the end-to-end-latency may comprise at least one of: an identifier of the first wireless device; or an identifier of the second wireless device. The measuring the end-to-end latency between the first wireless device and the second wireless device may be based on at least one of: a data radio bearer for the first wireless device; a signaling radio bearer for the first wireless device; a network slice associated with a protocol data unit (PDU) session for the first wireless device; a Quality-of-Service (QoS) associated with a PDU session for the first wireless device; or a service data flow associated with a PDU session for the first wireless device. The response message may comprise at least one of: one or more RRC messages; a registration response message; or a PDU session response message. The measuring the end-to-end latency may further comprise: measuring a first end-to-end latency between the first wireless device and the base station; measuring a second end-to-end latency between the second wireless device and the base station; and combining the first end-to-end latency and the second end-to-end latency. The first end-to-end latency may comprise at least one of: an uplink latency between the base station and the first wireless device; or a downlink latency between the base station and the first wireless device. The second end-to-end latency may comprise at least one of: an uplink latency between the base station and the second wireless device; or a downlink latency between the base station and the second wireless device. The base station may modify, based on the end-to-end latency between the first wireless device and the second wireless device, one or more first parameters to establish a symmetric uplink communication channel between the first wireless device and the second wireless device. The base station may modify, based on the end-to-end latency between the first wireless device and the second wireless device, one or more second parameters to establish a symmetric downlink communication channel between the first wireless device and the second wireless device. The measuring the first end-to-end latency between the base station and the first wireless device may comprise determining a difference between a first timestamp and a second timestamp. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A wireless device may send, to a network element, a request to measure an end-to-end latency between the first wireless device and a second wireless device. The wireless device may receive the measured end-to-end latency. The wireless device may perform, based on the measured end-to-end latency, an alignment between the first wireless device and the second wireless device. The request may comprise at least one of: a radio resource control (RRC) connection; or a protocol data unit (PDU) session. The network element may comprise at least one of: a base station; an access and mobility management function (AMF); a network exposure function (NEF); a session management function (SMF); or a user plane function (UPF). The alignment may comprise at least one of: a channel-based alignment; or a time-based alignment. The alignment may comprise a channel-based alignment for line current differential protection over the connection. The end-to-end latency may comprise at least one of: an uplink latency; or a downlink latency. The wireless device may comprise one or more processors; and memory storing instructions that, when executed by the one or more processors, cause the wireless device to perform the described method, additional operations, and/or include the additional elements. A system may comprise the wireless device configured to perform the described method, additional operations and/or include the additional elements; a base station configured to communicate with the wireless device; and/or a core network device configured to communicate with the base station. A computer-readable medium may store instructions that, when executed, cause performance of the described method, additional operations, and/or include the additional elements.

A base station, one or more wireless devices, and/or a core network device may perform a method comprising multiple operations. A network function may receive a request to measure an end-to-end latency between a first wireless device and a second wireless device. The network function may measure the end-to-end latency between the first wireless device and the second wireless device. The network function may send a response indicating the end-to-end latency between the first wireless device and the second wireless device. The network function may comprise at least one of: an access and mobility management function (AMF); a network exposure function (NEF); a session management function (SMF); or a user plane function (UPF). The end-to-end latency may be measured via a control plane. The end-to-end latency may be measured via one or more non-access stratum (NAS) messages. The network function may send, to a base station, a one or more messages indicating one or more parameters for measuring the end-to-end latency between the first wireless device and the second wireless device. The network function may receive, from the base station, one or more second messages comprising application user data. The network function may receive, from a base station, an indication that the base station supports symmetric communication channels. The network function may comprise one or more processors; and memory storing instructions that, when executed by the one or more processors, cause the network function to perform the described method, additional operations, and/or include the additional elements. A system may comprise the network function configured to perform the described method, additional operations and/or include the additional elements; one or more wireless devices configured to communicate with the network function; and/or a base station configured to communicate with the network function. A computer-readable medium may store instructions that, when executed, cause performance of the described method, additional operations, and/or include the additional elements.

A base station, one or more wireless devices, and/or a core network device may perform a method comprising multiple operations. A base station may send, to a first wireless device, a request to measure a latency between the base station and the first wireless device. The request may comprise a first timestamp indicating when the base station sent the request. The base station may receive, from the first wireless device, a second message. The second message may comprise at least one of: a second timestamp indicating when the first wireless device received the request; or a third timestamp indicating when the first wireless device sent a response. The base station may determine at least one of: a one-way uplink way delay between the base station and the first wireless device, based on a difference between the third timestamp and a fourth timestamp indicating when the base station received the response; and/or a one-way downlink delay between the base station and the first wireless device, based on a difference between the first timestamp and the second timestamp. The base station may cause an alignment to be performed between a first wireless device and a second wireless device. The alignment may comprise at least one of: a channel-based alignment; or a time-based alignment. The alignment may comprise a channel-based alignment for Line Current Differential Protection over a connection. The base station may comprise one or more processors; and memory storing instructions that, when executed by the one or more processors, cause the base station to perform the described method, additional operations, and/or include the additional elements. A system may comprise the base station configured to perform the described method, additional operations and/or include the additional elements; one or more wireless devices configured to communicate with the base station; and/or a core network device configured to communicate with the base station. A computer-readable medium may store instructions that, when executed, cause performance of the described method, additional operations, and/or include the additional elements.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A method comprising: receiving, by a base station, a request to measure an end-to-end latency between a first wireless device and a second wireless device.

Clause 2. The method of clause 1, further comprising: measuring the end-to-end latency between the first wireless device and the second wireless device.

Clause 3. The method of any one of clauses 1 to 2, further comprising: sending, to the first wireless device, a response indicating the end-to-end latency between the first wireless device and the second wireless device.

Clause 4. The method of any one of clauses 1 to 3, further comprising sending, the second wireless device, an indication of the end-to-end latency between the first wireless device and the second wireless device.

Clause 5. The method of any one of clauses 1 to 4, wherein the end-to-end latency comprises at least one of: a duration to deliver a communication from a first network element to a second network element; a duration to deliver a communication from the first wireless device to the second wireless device; or a duration to deliver a communication from the first wireless device to the base station.

Clause 6. The method of any one of clauses 1 to 5, wherein the request to measure the end-to-end-latency comprises at least one of: one or more radio resource control (RRC) messages; a registration request message; or a protocol data unit (PDU) session request message.

Clause 7. The method of any one of clauses 1 to 6, wherein the request to measure the end-to-end-latency comprises at least one of: an identifier of the first wireless device; or an identifier of the second wireless device.

Clause 8. The method of any one of clauses 1 to 7, wherein the measuring the end-to-end latency between the first wireless device and the second wireless device is based on at least one of: a data radio bearer for the first wireless device; a signaling radio bearer for the first wireless device; a network slice associated with a protocol data unit (PDU) session for the first wireless device; a Quality-of-Service (QoS) associated with a PDU session for the first wireless device; or a service data flow associated with a PDU session for the first wireless device.

Clause 9. The method of any one of clauses 1 to 8, wherein the response message comprises at least one of: one or more RRC messages; a registration response message; or a PDU session response message.

Clause 10. The method of any one of clauses 1 to 9, wherein the measuring the end-to-end latency further comprises: measuring a first end-to-end latency between the first wireless device and the base station; measuring a second end-to-end latency between the second wireless device and the base station; and combining the first end-to-end latency and the second end-to-end latency.

Clause 11. The method of any one of clauses 1 to 10, wherein the first end-to-end latency comprises at least one of: an uplink latency between the base station and the first wireless device; or a downlink latency between the base station and the first wireless device.

Clause 12. The method of any one of clauses 1 to 11, wherein the second end-to-end latency comprises at least one of: an uplink latency between the base station and the second wireless device; or a downlink latency between the base station and the second wireless device.

Clause 13. The method of any one of clauses 1 to 12, further comprising: modifying, based on the end-to-end latency between the first wireless device and the second wireless device, one or more first parameters to establish a symmetric uplink communication channel between the first wireless device and the second wireless device; and modifying, based on the end-to-end latency between the first wireless device and the second wireless device, one or more second parameters to establish a symmetric downlink communication channel between the first wireless device and the second wireless device.

Clause 14. The method of any one of clauses 1 to 13, wherein the measuring the first end-to-end latency between the base station and the first wireless device comprises determining a difference between a first timestamp and a second timestamp.

Clause 15. A computing device comprising: one or more processor; and memory storing instructions that, when executed, cause the computing device to perform the method of any one of clauses 1-14.

Clause 16. A system comprising: a first computing device configured to perform the method of any one of clauses 1-14; and a second computing device configured to perform an alignment based on the measured end-to-end latency.

Clause 17. A computer-readable medium storing instructions that, when executed, cause the performance of the method of any one of clauses 1-14.

Clause 18. A method comprising: sending, by a wireless device to a network element, a request to measure an end-to-end latency between the first wireless device and a second wireless device.

Clause 19. The method of clause 18, further comprising: receiving the measured end-to-end latency.

Clause 20. The method of any one of clauses 18 to 19, further comprising: performing, based on the measured end-to-end latency, an alignment between the first wireless device and the second wireless device.

Clause 21. The method of any one of clauses 18 to 20, wherein the request comprises at least one of: a radio resource control (RRC) connection; or a protocol data unit (PDU) session.

Clause 22. The method of any one of clauses 18 to 21, wherein the network element comprises at least one of: a base station; an access and mobility management function (AMF); a network exposure function (NEF); a session management function (SMF); or a user plane function (UPF).

Clause 23. The method of any one of clauses 18 to 22, wherein the alignment comprises at least one of: a channel-based alignment; or a time-based alignment.

Clause 24. The method of any one of clauses 18 to 23, wherein the alignment comprises a channel-based alignment for line current differential protection over the connection.

Clause 25. The method of any one of clauses 18 to 24, wherein the end-to-end latency comprises at least one of: an uplink latency; or a downlink latency.

Clause 26. A computing device comprising: one or more processor; and memory storing instructions that, when executed, cause the computing device to perform the method of any one of clauses 18 to 25.

Clause 27. A system comprising: a first computing device configured to perform the method of any one of clauses 18 to 25; and a second computing device configured to send the measured end-to-end latency.

Clause 28. A computer-readable medium storing instructions that, when executed, cause the performance of the method of any one of clauses 18 to 25.

Clause 29. A method comprising: receiving, by a network function, a request to measure an end-to-end latency between a first wireless device and a second wireless device.

Clause 30. The method of clause 29, further comprising: measuring, by the network function, the end-to-end latency between the first wireless device and the second wireless device.

Clause 31. The method of any one of clauses 29 to 30, further comprising: sending a response indicating the end-to-end latency between the first wireless device and the second wireless device.

Clause 32. The method of any one of clauses 29 to 31, wherein the network function comprises at least one of: an access and mobility management function (AMF); a network exposure function (NEF); a session management function (SMF); or a user plane function (UPF).

Clause 33. The method of any one of clauses 29 to 32, wherein the end-to-end latency is measured via a control plane.

Clause 34. The method of any one of clauses 29 to 33, wherein the end-to-end latency is measured via one or more non-access stratum (NAS) messages.

Clause 35. The method of any one of clauses 29 to 34, further comprising sending, by the network function to a base station, a one or more messages indicating one or more parameters for measuring the end-to-end latency between the first wireless device and the second wireless device.

Clause 36. The method of any one of clauses 29 to 35, further comprising receiving, by the network function from the base station, one or more second messages comprising application user data.

Clause 37. The method of any one of clauses 29 to 36, further comprising receiving, by the network function from a base station, an indication that the base station supports symmetric communication channels.

Clause 38. A computing device comprising: one or more processor; and memory storing instructions that, when executed, cause the computing device to perform the method of any one of clauses 29 to 37.

Clause 39. A system comprising: a first computing device configured to perform the method of any one of clauses 29 to 37; and a second computing device configured to perform an alignment based on the measured end-to-end latency.

Clause 40. A computer-readable medium storing instructions that, when executed, cause the performance of the method of any one of clauses 29 to 37.

Clause 41. A method comprising: sending, by a base station to a first wireless device, a request to measure a latency between the base station and the first wireless device, wherein the request comprises a first timestamp indicating when the base station sent the request.

Clause 42. The method of clause 41, further comprising: receiving, by the base station from the first wireless device, a second message comprising at least one of: a second timestamp indicating when the first wireless device received the request; or a third timestamp indicating when the first wireless device sent a response.

Clause 43. The method of any one of clauses 41 to 42, further comprising: determining, by the base station, at least one of: a one-way uplink way delay between the base station and the first wireless device, based on a difference between the third timestamp and a fourth timestamp indicating when the base station received the response; and/or a one-way downlink delay between the base station and the first wireless device, based on a difference between the first timestamp and the second timestamp.

Clause 44. The method of any one of clauses 41 to 43, further comprising causing an alignment to be performed between a first wireless device and a second wireless device.

Clause 45. The method of any one of clauses 41 to 44, wherein the alignment comprises at least one of: a channel-based alignment; or a time-based alignment.

Clause 46. The method of any one of clauses 41 to 45, wherein the alignment comprises a channel-based alignment for Line Current Differential Protection over a connection.

Clause 47. A computing device comprising: one or more processor; and memory storing instructions that, when executed, cause the computing device to perform the method of any one of clauses 41 to 46.

Clause 48. A system comprising: a first computing device configured to perform the method of any one of clauses 41 to 46; and a second computing device configured to perform an alignment based on the determined delay.

Clause 49. A computer-readable medium storing instructions that, when executed, cause the performance of the method of any one of clauses 41 to 46.

Clause 50. A method comprising: receiving, by a base station from a first wireless device, a first message comprising a parameter indicating requesting measuring an end to end latency between the first wireless device and a second wireless device.

Clause 51. The method of clause 50, further comprising: measuring, by the base station and based on the parameter, the end to end latency.

Clause 52. The method of any one of clauses 50 to 51, further comprising: sending, by the base station to the first wireless device, a second message indicating the end to end latency.

Clause 53. The method of any one of clauses 50 to 52, further comprising sending, by the base station to the second wireless device, the end to end latency.

Clause 54. The method of any one of clauses 50 to 53, wherein the end to end latency indicates a time (duration) to (successfully) deliver a data packet/message from a first network element to a second network element.

Clause 55. The method of any one of clauses 50 to 54, wherein the end to end latency indicate a time (duration) to (successfully) deliver a data packet/message from the first wireless device to the second wireless device.

Clause 56. The method of any one of clauses 50 to 55, wherein the end to end latency indicate a time (duration) to (successfully) deliver a data packet/message from the first wireless device to the base station.

Clause 57. The method of any one of clauses 50 to 56, wherein the first message comprises a radio resource control (RRC) request message, wherein the RRC request message comprises at least one of the following messages: an MSG 3; an MSG 5; a RRCSetupRequest; a RRCSetupComplete; a RRCResumeRequest; a RRCResumeComplete; a UEAssistanceInformation; a UEInformationResponse; or a UECapabilityInformation.

Clause 58. The method of any one of clauses 50 to 57, wherein the first message comprises at least one of: an identity of the first wireless device; or an identity of the second wireless device.

Clause 59. The method of any one of clauses 50 to 58, wherein the identity of the first wireless device and/or the identity of the second wireless device comprises at least one of: a Generic Public Subscription Identifier (GPSI), wherein the GPSI may comprise a Mobile Station Integrated Services Digital Network (MSISDN) and/or an external identifier; a Subscription Permanent Identifier (SUPI), wherein the SUPI may comprise an International Mobile Subscriber Identity (IMSI) and/or Network Access Identifier (NAI); a Subscription Concealed Identifier (SUCI); a 5G Globally unique Temporary Identity (5G-GUTI); a permanent equipment identifier (PEI), wherein the PEI may comprise an International Mobile Equipment Identity (IMEI); an IP address, wherein the IP address may comprise an IPv4 address and/or an IPv6 prefix; or an application level identifier to identify the (first/second) wireless device.

Clause 60. The method of any one of clauses 50 to 59, wherein the first message comprises a second parameter indicating accuracy of the end to end latency, wherein the accuracy of the end to end latency comprise at least one of: a second; a decisecond; a centisecond; a millisecond; or a microsecond.

Clause 61. The method of any one of clauses 50 to 60, further comprising determining, by the base station, whether to accept the RRC request and/or request of measuring the end to end latency between the first wireless device and the second wireless device, based on at least one of: the first message; capability of the base station supporting the end to end latency measurement; resource of the base station; local policy; and/or subscription information of the first wireless device.

Clause 62. The method of any one of clauses 50 to 61, wherein the capability of the base station supporting the end to end latency measurement indicates whether the base station has the capability to measure the end to end latency with a requested accuracy of the first wireless device.

Clause 63. The method of any one of clauses 50 to 62, further comprising determining, by the base station, a second parameter/End-to End Latency Measurement Accept (LMA) indicating accepting the request of measuring the end to end latency.

Clause 64. The method of any one of clauses 50 to 63, further comprising determining, by the base station, radio bearer and/or QoS resource for end to end latency measurement, based on at least one of: determining whether accept the request of measuring the end to end latency; capability of the base station supporting the end to end latency measurement; the first message; resource of the base station; local policy; and/or subscription information of the first wireless device.

Clause 65. The method of any one of clauses 50 to 64, further comprising determining, by the base station, RRC configuration information for end to end latency measurement, based on at least one of: determining whether accept the request of measuring the end to end latency; capability of the base station supporting the end to end latency measurement; the first message; resource of the base station; local policy; and/or subscription information of the first wireless device.

Clause 66. The method of any one of clauses 50 to 65, further comprising determining, by the base station, the end to end latency is associated with a radio bearer for the first wireless device, wherein the radio bearer comprises a data radio bearer and/or a signaling radio bearer.

Clause 67. The method of any one of clauses 50 to 66, further comprising determining, by the base station, the end to end latency is associated with a network slice for the first wireless device, wherein the network slice is associated with a PDU session.

Clause 68. The method of any one of clauses 50 to 67, further comprising determining, by the base station, the end to end latency is associated with a QoS flow for the first wireless device, wherein the QoS flow is associated with a PDU session.

Clause 69. The method of any one of clauses 50 to 68, further comprising determining, by the base station, the end to end latency is associated with a service data flow for the first wireless device, wherein the service data flow is associated with a PDU session.

Clause 70. The method of any one of clauses 50 to 69, further comprising determining, by the base station, the end to end latency is associated with a PDU session for the first wireless device, wherein the PDU session is associated with at least one radio bearer, wherein the at least one radio bearer comprises at least one data radio bearer and/or at least one signaling radio bearer.

Clause 71. The method of any one of clauses 50 to 70, further comprising determining, by the base station and based on the parameter, radio bearer configuration information of a radio bearer for the end to end latency measurement.

Clause 72. The method of any one of clauses 50 to 71, wherein the radio bearer configuration information comprises parameters for a data radio bearer.

Clause 73. The method of any one of clauses 50 to 72, wherein the radio bearer configuration information comprises parameters for a signal radio bearer.

Clause 74. The method of any one of clauses 50 to 73, wherein the radio bearer configuration information comprises QoS parameters for a signal radio bearer and/or a data radio bearer.

Clause 75. The method of any one of clauses 50 to 74, wherein the QoS parameters comprise at least one of: Resource type; priority level; Packet Delay Budget (PDB); Packet Error Rate (PER); Averaging window; or Maximum Data Burst Volume.

Clause 76. The method of any one of clauses 50 to 75, further comprising sending, by the base station to the first wireless device, a response message to the first message.

Clause 77. The method of any one of clauses 50 to 76, wherein the response message indicating whether the base station accepts the request of measuring the end to end latency between the first wireless device and the second wireless device.

Clause 78. The method of any one of clauses 50 to 77, wherein the response message comprises a second parameter indicating the base station accepts the request of measuring the end to end latency between the first wireless device and the second wireless device.

Clause 79. The method of any one of clauses 50 to 78, wherein the response message indicates the PDU session, the network slice, the QoS flow, the service data flow, and/or the radio bearer applied/used for the end to end latency measurement.

Clause 80. The method of any one of clauses 50 to 79, wherein the response message comprises an RRC response message, wherein the RRC response message comprises at least one of following messages: an RRCReconfiguration; an MSG 4; a RRCSetup; a RRCResume; UEReconfiguration; UEInformationRequest; or UECapabilityEnquiry.

Clause 81. The method of any one of clauses 50 to 80, wherein the response message comprises at least one of: a registration response message; or a PDU session response message.

Clause 82. The method of any one of clauses 50 to 81, wherein the first message comprises at least one of: a registration request message; or a protocol data unit (PDU) session request message.

Clause 83. The method of any one of clauses 50 to 82, further comprising measuring, by the base station and based on the parameter, a first end to end latency between the first wireless device and the base station, and a second end to end latency between the second wireless device and the base station.

Clause 84. The method of any one of clauses 50 to 83, further comprising calculating, by the base station, the end to end latency by adding the first end to end latency to the second end to end latency.

Clause 85. The method of any one of clauses 50 to 84, further comprising modifying, by the base station and based on the measuring, radio bearer/QoS resources (e.g., parameters) to enable a symmetric uplink communication channel and downlink communication channel between the first wireless device and the second wireless device.

Clause 86. The method of any one of clauses 50 to 85, further comprising sending, by the base station to the first wireless device and/or the second wireless device, a RRC-Congfiguration message comprising one or more parameters to modify/adjust the radio bearer/QoS resources.

Clause 87. The method of any one of clauses 50 to 86, further comprising modifying, by the base station and based on the measuring, time/frequency/space/power resources to enable a symmetric uplink communication channel and downlink communication channel between the first wireless device and the second wireless device.

Clause 88. The method of any one of clauses 50 to 87, further comprising sending, by the base station to the first wireless device and/or the second wireless device, a RRC-Congfiguration message comprising one or more parameters to modify/adjust the time/frequency/space/power resources.

Clause 89. The method of any one of clauses 50 to 88, wherein the second message comprises an RRC response message, wherein the RRC response message comprises at least one of following messages: an RRCReconfiguration; an MSG 4; a RRCSetup; a RRCResume; UEReconfiguration; UEInformationRequest; or UECapabilityEnquiry.

Clause 90. The method of any one of clauses 50 to 89, wherein the second message comprises at least one of: a registration response message; or a PDU session response message.

Clause 91. The method of any one of clauses 50 to 90, further comprising establishing, by the wireless device, a RRC connection with a base station for the end to end latency measurement.

Clause 92. The method of any one of clauses 50 to 91, further comprising establishing, by the wireless device, a protocol data unit (PDU) session with a core network for the end to end latency measurement, wherein the core network may comprise: an AMF; an SMF; or a UPF.

Clause 93. The method of any one of clauses 50 to 92, wherein the first message comprises a third parameter/Channel Symmetry Request indicating a request for symmetric communication channels.

Clause 94. The method of any one of clauses 50 to 93, wherein the third parameter/Channel Symmetry Request indicates that end to end latency between a first network element and a second network element is less than and/or equal to a value (e.g., 5 ms, 10 ms).

Clause 95. The method of any one of clauses 50 to 94, wherein the first message comprises a fourth parameter/Asymmetric End to End Latency indicating requesting maximum end to end latency asymmetry/difference between [the at least one uplink communication channel] and [the at least one downlink communication channel] is less than and/or equal to a value.

Clause 96. The method of any one of clauses 50 to 95, based on the indication from the base station that the RRC connection, the PDU session, the network slice, the QoS flow, the service data flow, and/or the radio bearer applied/used for the end to end latency measurement, the first wireless device measures the end to end delay between the first wireless device and the base station over the PDU session, the network slice, the QoS flow, the service data flow, and/or the radio bearer.

Clause 97. The method of any one of clauses 50 to 96, based on the end to end latency (e.g., uplink channel latency and downlink channel latency) received from the base station, the first wireless device and the second wireless device performs channel-based alignment for Line Current Differential Protection over the PDU session/the network slice/the QoS flow/the service data flow/the radio bearer.

Clause 98. The method of any one of clauses 50 to 97, based on the end to end latency (e.g., uplink channel latency and downlink channel latency) received from the base station, the first wireless device and the second wireless device performs other applications (e.g., games) over the PDU session/the network slice/the QoS flow/the service data flow/the radio bearer.

Clause 99. The method of any one of clauses 50 to 98, further comprising: sending, by the base station to the first wireless device, a first message requesting measuring latency between the base station and the wireless device, wherein the first message comprise a timestamp 1 when the base station sending the first message; receiving, by the base station from the first wireless device, a second message comprising at least one of: a timestamp 2 indicates when the first wireless device receives the first message; and/or a timestamp 3 indicates when the first wireless device sends the second message; and determining, by the base station, and based on the second message, at least one of: an uplink one way delay between the base station and the first wireless device; and/or a downlink one way delay between the base station and the first wireless device.

Clause 100. A computing device comprising: one or more processor; and memory storing instructions that, when executed, cause the computing device to perform the method of any one of clauses 50 to 99.

Clause 101. A system comprising: a first computing device configured to perform the method of any one of clauses 50 to 99; and a second computing device configured to perform an alignment based on the measured end-to-end latency.

Clause 102. A computer-readable medium storing instructions that, when executed, cause the performance of the method of any one of clauses 50 to 99.

Clause 103. A method comprising: receiving, by a base station from a first wireless device, a first message indicates requesting measuring an end to end latency between the first wireless device and a second wireless device.

Clause 104. The method of clause 103, further comprising: sending, by the base station to the first wireless device, a second message indicating the end to end latency.

Clause 105. A computing device comprising: one or more processor; and memory storing instructions that, when executed, cause the computing device to perform the method of any one of clauses 103 to 104.

Clause 106. A system comprising: a first computing device configured to perform the method of any one of clauses 103 to 104; and a second computing device configured to perform an alignment based on the measured end-to-end latency.

Clause 107. A computer-readable medium storing instructions that, when executed, cause the performance of the method of any one of clauses 103 to 104.

Clause 108. A method comprising: sending, by a wireless device to a base station, a first message requesting measuring an end to end latency between the first wireless device and a second wireless device.

Clause 109. The method of clause 108, further comprising: receiving, by the wireless device from the base station, the end to end latency.

Clause 110. A computing device comprising: one or more processor; and memory storing instructions that, when executed, cause the computing device to perform the method of any one of clauses 108 to 109.

Clause 111. A system comprising: a first computing device configured to perform the method of any one of clauses 108 to 109; and a second computing device configured to send the measured end-to-end latency.

Clause 112. A computer-readable medium storing instructions that, when executed, cause the performance of the method of any one of clauses 108 to 109.

Clause 113. A method comprising: receiving, by an access and mobility management function (AMF) from a first wireless device, a first message comprising a parameter indicating requesting measuring an end to end latency between the first wireless device and a second wireless device.

Clause 114. The method of clause 113, further comprising: measuring, by the AMF and based on the parameter, the end to end latency.

Clause 115. The method of any one of clauses 113 to 114, further comprising: sending, by the AMF to the first wireless device, a second message indicating the end to end latency.

Clause 116. The method of any one of clauses 113 to 115, wherein the end to end latency is via a control plane and via a NAS message.

Clause 117. A computing device comprising: one or more processor; and memory storing instructions that, when executed, cause the computing device to perform the method of any one of clauses 113 to 116.

Clause 118. A system comprising: a first computing device configured to perform the method of any one of clauses 113 to 116; and a second computing device configured to perform an alignment based on the measured end-to-end latency.

Clause 119. A computer-readable medium storing instructions that, when executed, cause the performance of the method of any one of clauses 113 to 116.

Clause 120. A method comprising: receiving, by an access and mobility management function (AMF) from a first wireless device, a first message comprising: a first parameter indicating requesting measuring an end to end latency between the first wireless device and a second wireless device; a second parameter indicating accuracy of the end to end latency; a third parameter requesting symmetry channel for uplink and downlink; a fourth parameter indicating requesting maximum end to end latency asymmetry/difference between [the at least one uplink communication channel] and [the at least one downlink communication channel] is less than and/or equal to a value; a fifth parameter indicating requesting sending application user data via control plane; a sixth parameter indicating capability of the first wireless device supporting sending application user data via control plane; an identity of the first wireless device; and/or an identity of the second wireless device.

Clause 121. The method of clause 120, further comprising: determining, by the AMF to accept at least one requesting based on at least one of: capability of the AMF supporting the end to end latency measurement; capability of the AMF supporting sending application user data via control plane; the first message; resource of the AMF; local policy; and/or subscription information of the first wireless device.

Clause 122. The method of any one of clauses 120 to 121, further comprising: measuring, by the AMF and based on the parameter, the end to end latency.

Clause 123. The method of any one of clauses 120 to 122, further comprising: sending, by the AMF to the first wireless device, a second message indicating the end to end latency.

Clause 124. The method of any one of clauses 120 to 123, further comprising sending, by the AMF to a base station, a third message comprising one or more parameters of the first message.

Clause 125. The method of any one of clauses 120 to 124, further comprising receiving, by the AMF from the base station, a response message indicating the base station accepts the request of sending application user data via control plane.

Clause 126. The method of any one of clauses 120 to 125, wherein the response message further indicating the base station accepts the request of sending application user data via control plane.

Clause 127. The method of any one of clauses 120 to 126, wherein the response message further indicating the base station accepts the request of symmetric communication channels.

Clause 128. The method of any one of clauses 120 to 127, further comprising sending, by the base station to the first wireless device, a response message comprising at least one of: an eighth parameter indicating that the network has the capability to support measuring the end to end latency; a ninth parameter indicating the AMF accepts the request of sending application user data via control plane; and a tenth parameter indicating the AMF accepts the request of symmetric communication channels.

Clause 129. A computing device comprising: one or more processor; and memory storing instructions that, when executed, cause the computing device to perform the method of any one of clauses 120 to 128.

Clause 130. A system comprising: a first computing device configured to perform the method of any one of clauses 120 to 128; and a second computing device configured to perform an alignment based on the measured end-to-end latency.

Clause 131. A computer-readable medium storing instructions that, when executed, cause the performance of the method of any one of clauses 120 to 128.

Clause 132. A method comprising: receiving, by a network function from a first wireless device, a first message indicating requesting measuring an end to end latency between the first wireless device and a second wireless device.

Clause 133. The method of clause 132, further comprising: sending, by the network function to the first wireless device, a second message indicating the end to end latency.

Clause 134. The method of any one of clauses 132 to 133, wherein the network function comprises at least one of: an access and mobility management function (AMF); or a network exposure function (NEF).

Clause 135. A computing device comprising: one or more processor; and memory storing instructions that, when executed, cause the computing device to perform the method of any one of clauses 132 to 134.

Clause 136. A system comprising: a first computing device configured to perform the method of any one of clauses 132 to 134; and a second computing device configured to perform an alignment based on the measured end-to-end latency.

Clause 137. A computer-readable medium storing instructions that, when executed, cause the performance of the method of any one of clauses 132 to 134.

Clause 138. A method comprising: sending, by a wireless device to a network function, a first message indicating requesting measuring an end to end latency between the first wireless device and a second wireless device.

Clause 139. The method of clause 138, further comprising: receiving, by the wireless device from the network function, the end to end latency.

Clause 140. A method comprising: sending, by a wireless device to a network function, a first message comprising a parameter indicating requesting sending application user data via control plane.

Clause 141. The method of clause 140, further comprising: receiving, by the wireless device from the network function, a second message indicating whether the network function accept the requesting.

Clause 142. A computing device comprising: one or more processor; and memory storing instructions that, when executed, cause the computing device to perform the method of any one of clauses 138 to 141.

Clause 143. A system comprising: a first computing device configured to perform the method of any one of clauses 138 to 141; and a second computing device configured to send the measured end-to-end latency.

Clause 144. A computer-readable medium storing instructions that, when executed, cause the performance of the method of any one of clauses 138 to 141.

Clause 145. A method comprising: receiving, by a session management function (SMF) from a first wireless device, a first message indicating requesting measuring an end to end latency between the first wireless device and a second wireless device.

Clause 146. The method of clause 145, further comprising: sending, by the SMF to the first wireless device, a second message indicating the end to end latency.

Clause 147. A method comprising: receiving, by a session management function (SMF) from a first wireless device, a first message comprising: a first parameter indicating requesting measuring an end to end latency between the first wireless device and a second wireless device; a second parameter indicating accuracy of the end to end latency; a third parameter requesting symmetry channel for uplink and downlink; a fourth parameter indicating requesting maximum end to end latency asymmetry/difference between [the at least one uplink communication channel] and [the at least one downlink communication channel] is less than and/or equal to a value; a fifth parameter indicating requesting sending application user data via control plane; a sixth parameter indicating capability of the first wireless device supporting sending application user data via control plane; an identity of the first wireless device; and/or an identity of the second wireless device.

Clause 148. The method of clause 147, further comprising: determining, by the SMF to accept at least one requesting based on at least one of: capability of the SMF supporting the end to end latency measurement; capability of the SMF supporting sending application user data via control plane; the first message; resource of the SMF; local policy; and/or subscription information of the first wireless device.

Clause 149. The method of any one of clauses 147 to 148, further comprising: sending, by the SMF to a network function, a second message indicating measuring the end to end latency, wherein the second message comprises at least one of: the first parameter; the second parameter; the third parameter; the fourth parameter; the fifth parameter; the sixth parameter; the identity of the first wireless device; and the identity of the second wireless device.

Clause 150. The method of any one of clauses 147 to 149, further comprising: receiving, by the SMF from the network function, the end to end latency.

Clause 151. The method of any one of clauses 147 to 150, further comprising: sending, by the SMF to the first wireless device, a third message indicating the end to end latency.

Clause 152. The method of any one of clauses 147 to 151, wherein the network function comprises at least one of: a user plane function (UPF); or a network exposure function (NEF).

Clause 153. A computing device comprising: one or more processor; and memory storing instructions that, when executed, cause the computing device to perform the method of any one of clauses 145 to 152.

Clause 154. A system comprising: a first computing device configured to perform the method of any one of clauses 145 to 152; and a second computing device configured to perform an alignment based on the measured end-to-end latency.

Clause 155. A computer-readable medium storing instructions that, when executed, cause the performance of the method of any one of clauses 145 to 152.

Clause 156. A method comprising: sending, by a base station to a first wireless device, a first message requesting measuring latency between the base station and the wireless device, wherein the first message comprises a timestamp 1 when the base station sending the first message.

Clause 157. The method of clause 156, further comprising: receiving, by the base station from the first wireless device, a second message comprising at least one of: a timestamp 2 indicates when the first wireless device receives the first message; and/or a timestamp 3 indicates when the first wireless device sends the second message.

Clause 158. The method of any one of clauses 156 to 157, further comprising: determining, by the base station, at least one of: an uplink one way delay between the base station and the first wireless device, based on the timestamp 3 and the timestamp 4; and/or a downlink one way delay between the base station and the first wireless device, based on the timestamp 1 and the timestamp 2.

Clause 159. A computing device comprising: one or more processor; and memory storing instructions that, when executed, cause the computing device to perform the method of any one of clauses 156 to 158.

Clause 160. A system comprising: a first computing device configured to perform the method of any one of clauses 156 to 158; and a second computing device configured to perform an alignment based on the measured end-to-end latency.

Clause 161. A computer-readable medium storing instructions that, when executed, cause the performance of the method of any one of clauses 156 to 158.

Clause 162. A method comprising: sending, by a first wireless device to a base station, a first message comprising a parameter indicating requesting measuring an end to end latency between the first wireless device and a second wireless device.

Clause 163. The method of clause 162, further comprising: receiving, by the first wireless device from the base station, a second message requesting measuring downlink end to end latency between the first wireless device and the base station.

Clause 164. The method of any one of clauses 162 to 163, further comprising: measuring, by the first wireless device and based on the second message, the downlink end to end latency.

Clause 165. The method of any one of clauses 162 to 164, further comprising: sending, by the first wireless device to the base station, a third message indicating the downlink end to end latency.

Clause 166. A method comprising: receiving, by the first wireless device from the base station, a first message requesting measuring downlink end to end latency between the first wireless device and the base station.

Clause 167. The method of clause 166, further comprising: sending, by the first wireless device to the base station, the downlink end to end latency.

Clause 168. A method comprising: sending, by a first wireless device to a second wireless device, a first message comprising at least one of: a first parameter indicating Channel-based Alignment Capability of the first wireless device; a second parameter indicating Time-based Alignment Capability of the first wireless device; or a third parameter indicating requesting Channel-based Alignment.

Clause 169. The method of clause 168, further comprising: receiving, by the first wireless device from the second wireless device, a second message comprising at least one of: a fourth parameter indicating Channel-based Alignment Capability of the second wireless device; a fifth parameter indicating Time-based Alignment Capability of the second wireless device; or a sixth parameter indicating whether accepting the requesting of Channel-based Alignment.

Clause 170. A computing device comprising: one or more processor; and memory storing instructions that, when executed, cause the computing device to perform the method of any one of clauses 162 to 169.

Clause 171. A system comprising: a first computing device configured to perform the method of any one of clauses 162 to 169; and a second computing device configured to perform an alignment.

Clause 172. A computer-readable medium storing instructions that, when executed, cause the performance of the method of any one of clauses 162 to 169.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. Various examples may be used, for example, if the one or more criteria are met. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a base station, a request to measure an end-to-end latency between a first wireless device and a second wireless device;

measuring a first end-to-end latency between the first wireless device and the base station, wherein the first end-to-end latency comprises a first uplink latency and a first downlink latency;

measuring a second end-to-end latency between the second wireless device and the base station, wherein the second end-to-end latency comprises a second uplink latency and a second downlink latency; and sending, to the first wireless device, a response indicating the end-to-end latency between the first wireless device and the second wireless device, wherein the end-to-end latency is based on the first end-to-end latency and the second end-to-end latency.

2. The method of claim 1, further comprising sending, the second wireless device, an indication of the end-to-end latency between the first wireless device and the second wireless device.

3. The method of claim 1, wherein the end-to-end latency comprises at least one of:

a duration to deliver a communication from a first network element to a second network element;

a duration to deliver a communication from the first wireless device to the second wireless device; or a duration to deliver a communication from the first wireless device to the base station.

4. The method of claim 1, wherein the request to measure the end-to-end-latency comprises at least one of:

a radio resource control (RRC) message;

a registration request message; or a protocol data unit (PDU) session request message.

5. The method of claim 1, wherein the request to measure the end-to-end-latency comprises at least one of:

an identifier of the first wireless device; or an identifier of the second wireless device.

6. The method of claim 1, wherein the measuring the end-to-end latency between the first wireless device and the second wireless device is based on at least one of:

a data radio bearer for the first wireless device;

a signaling radio bearer for the first wireless device;

a network slice associated with a protocol data unit (PDU) session for the first wireless device;

a Quality-of-Service (QoS) associated with a PDU session for the first wireless device; or a service data flow associated with a PDU session for the first wireless device.

7. The method of claim 1, wherein the response message comprises at least one of:

one or more RRC messages a registration response message; or a PDU session response message.

8. The method of claim 1, wherein the end-to-end latency is based on a combination of the first end-to-end latency and the second end-to-end latency.

9. The method of claim 1, further comprising:

modifying, based on the end-to-end latency between the first wireless device and the second wireless device, one or more first parameters to establish a symmetric uplink communication channel between the first wireless device and the second wireless device; and modifying, based on the end-to-end latency between the first wireless device and the second wireless device, one or more second parameters to establish a symmetric downlink communication channel between the first wireless device and the second wireless device.

10. A method comprising:

sending, by a first wireless device to a network element, a request to measure an end-to-end latency between the first wireless device and a second wireless device;

receiving the measured end-to-end latency, wherein the measured end-to-end latency comprises an uplink latency measurement and a downlink latency measurement;

sending, by the first wireless device to the second wireless device, a message indicating an alignment between the first wireless device and the second wireless device; and performing, based on the measured end-to-end latency, an alignment between the first wireless device and the second wireless device.

11. The method of claim 10, wherein the request comprises at least one of:

a radio resource control (RRC) connection; or a protocol data unit (PDU) session.

12. The method of claim 10, wherein the network element comprises at least one of:

a base station;

an access and mobility management function (AMF);

a network function (NEF);

a session management function (SMF); or a user plane function (UPF).

13. The method of claim 10, wherein the alignment comprises at least one of:

channel-based alignment; or time-based alignment.

14. The method of claim 10, wherein the alignment comprises a channel-based alignment for line current differential protection.

15. A method comprising:

receiving, by a base station, a request to measure an end-to-end latency between a first wireless device and a second wireless device;

measuring a first end-to-end latency between the base station and the first wireless device, wherein the first end-to-end latency comprises a first uplink latency and a first downlink latency;

measuring a second end-to-end latency between the base station and the second wireless device, wherein the second end-to-end latency comprises a second uplink latency and a second downlink latency; and sending, based on the first end-to-end latency and based on the second end-to-end latency, a response indicating the end-to-end latency between the first wireless device and the second wireless device.

16. The method of claim 15, wherein the measuring the first end-to-end latency between the base station and the first wireless device comprises determining a difference between a first timestamp and a second timestamp.

17. The method of claim 1, wherein:

the first uplink latency comprises transmissions from the first wireless device to the base station; and the first downlink latency comprises transmissions from the base station to the second wireless device.

18. The method of claim 10, wherein:

the uplink latency measurement comprises transmissions from the wireless device to the network element; and the downlink latency measurement comprises transmissions from the network element to the second wireless device.

19. The method of claim 15, wherein:

the first uplink latency comprises transmissions from the first wireless device to the base station; and the first downlink latency comprises transmissions from the base station to the second wireless device.

20. The method of claim 19, wherein:

the second uplink latency comprises transmissions from the second wireless device to the base station; and the second downlink latency comprises transmissions from the base station to the first wireless device.

* * * * *